(12) United States Patent
Karty

(10) Patent No.: US 12,033,169 B1
(45) Date of Patent: Jul. 9, 2024

(54) USER INTERFACE FOR OBTAINING RESPONSE DATA ON A MOBILE COMPUTING DEVICE

(71) Applicant: Intuify, Inc., Lincoln, MA (US)

(72) Inventor: Kevin D. Karty, Lincoln, MA (US)

(73) Assignee: Intuify, Inc., Lincoln, MA (US)

( * ) Notice: Subject to any disclaimer, the term of this patent is extended or adjusted under 35 U.S.C. 154(b) by 0 days.

(21) Appl. No.: 16/871,913

(22) Filed: May 11, 2020

Related U.S. Application Data

(60) Provisional application No. 63/006,366, filed on Apr. 7, 2020, provisional application No. 62/847,102, filed on May 13, 2019.

(51) Int. Cl.
*G06Q 30/0203* (2023.01)
*G06F 16/9535* (2019.01)
*G06F 16/9538* (2019.01)
*G06Q 30/0201* (2023.01)

(52) U.S. Cl.
CPC ..... *G06Q 30/0203* (2013.01); *G06F 16/9535* (2019.01); *G06F 16/9538* (2019.01); *G06Q 30/0201* (2013.01)

(58) Field of Classification Search
None
See application file for complete search history.

(56) References Cited

U.S. PATENT DOCUMENTS

| | | | | |
|---|---|---|---|---|
| 6,513,014 | B1 * | 1/2003 | Walker | H04N 21/25891 |
| | | | | 705/7.33 |
| 10,176,640 | B2 * | 1/2019 | Tierney | H04L 67/535 |
| 10,789,603 | B2 * | 9/2020 | Bolling | G06F 3/048 |
| 2010/0004977 | A1 * | 1/2010 | Marci | H04N 21/44218 |
| | | | | 705/7.32 |
| 2012/0259240 | A1 * | 10/2012 | Llewellynn | G06Q 30/0241 |
| | | | | 600/558 |
| 2014/0272902 | A1 * | 9/2014 | Bleile | G06Q 30/0203 |
| | | | | 434/362 |

(Continued)

FOREIGN PATENT DOCUMENTS

CA 2758272 A1 * 10/2010 ............... A61B 5/16

OTHER PUBLICATIONS

Morrison et al., TigerAware: an Innovative Mobile Survey and Sensor Data Collection and Analytics System (Year: 2018).*

(Continued)

*Primary Examiner* — Mohamed N El-Bathy
(74) *Attorney, Agent, or Firm* — Sunstein LLP

(57) ABSTRACT

Software user interfaces, methods, and systems provide highly interactive survey questions on mobile internet devices. The software user interfaces are uniquely designed to provide the intensive use of rich media in questions and answers that are delivered on small screens of mobile internet devices, to incorporate unique modes of interaction, and to integrate the array of inputs that are now ubiquitous in such devices into novel response mechanisms. The associated methods and systems provide efficient gathering of response data pertaining to conscious and pre-conscious thoughts, including impulses, feelings, perceptions, sentiments, associations, and emotions. The associated methods and systems gather and aggregate the response data into databases and create derived metrics, interpretive frameworks, and predictive frameworks from this data.

18 Claims, 103 Drawing Sheets

(56) References Cited

U.S. PATENT DOCUMENTS

| | | | |
|---|---|---|---|
| 2014/0278786 A1* | 9/2014 | Liu-Qiu-Yan | G06Q 30/0251 705/7.32 |
| 2014/0289016 A1* | 9/2014 | Muto | G06Q 30/0203 705/7.32 |
| 2014/0298260 A1* | 10/2014 | Abowd | G06F 3/04842 715/810 |
| 2016/0203359 A1* | 7/2016 | von und zu Liechtenstein | G06V 40/19 345/156 |
| 2017/0053299 A1* | 2/2017 | Rozga | G06Q 30/0203 |
| 2017/0171267 A1* | 6/2017 | Cornell | G06Q 10/10 |
| 2019/0066136 A1* | 2/2019 | Kopikare | G06N 5/046 |
| 2019/0139318 A1* | 5/2019 | Tierney | G06F 3/013 |
| 2019/0318370 A1* | 10/2019 | Kopikare | G06Q 30/0282 |
| 2020/0342471 A1* | 10/2020 | Ni | G06Q 30/0203 |

OTHER PUBLICATIONS

Chastine et al., Empirically measuring control quality of gesture input (Year: 2014).*

Sawtooth Software—"Proceedings of the Sawtooth Software Conference", Mar. 2012, 413 pages.

Agarwal et al.—"An Interdiciplinary Review of Research in Conjoint Analysis: Recent Developments and Directions for Furture Research", cust. Need. and Solut. vol. 2, pp. 19-40, Oct. 2014.

Grocery Drive—"Mass retailer private label sales dominate national brands", Published online Apr. 23, 2019, 7 pages, "www_grocerydive_com_news_mass_retailer_private_label_sales".

Wikipedia—"Likert scale", 9 pages, retrieved from the Internet May 9, 2020.

Wikipedia—"Van Westendorp's Price Sensitivity Meter", 4 pages, retrieved from the Internet May 9, 2020.

Groves—"Three Eras of Survey Research", Public Opinion Quarterly, vol. 75, No. 5, pp. 861-871, 2011.

Prairie Research Associates—"A brief history of survey research", 2 pages, retrieved May 9, 2020.

Lipovetsky et al.—"Pricing Models in Marketing Research", Intelligent Information Management, vol. 3, pp. 167-174, Sep. 2011.

Reichheld—"Customers—the One Number You Need to Grow", Harvard Business Review, Dec. 2003, 19 pages.

Yu—What happens in the brain when we swipe right?, 7 pages, retrieved from the Internet May 9, 2020, https://www.headspace.com/blog/2017/08/22/modern-love-addiction/.

* cited by examiner

On the set of screens, we will show you the brands you have selected along with several images you might associate with those brands.

Select up to <##> images that best represent each brand, starting from the most representative.

When you are done, hit next.

Next

Now we are going to show you some concepts and ask what you like or dislike about them.

Just tap what you like (and then what you dislike), and tap the microphone icon to tell us why in your own words.

Let's GO!

FIG. 41

USER INTERFACE FOR OBTAINING RESPONSE DATA ON A MOBILE COMPUTING DEVICE

PRIORITY

This application claims the benefit of U.S. provisional patent application Ser. No. 62/847,102, filed May 13, 2019, and U.S. provisional patent application Ser. No. 63/006,366, filed Apr. 7, 2020. Each of these application is hereby incorporated, in its entirety, by reference.

TECHNICAL FIELD

The present invention relates to the field of market research, and more particularly to software interfaces, methods and systems for improving survey interactions on small screen multi-media devices and gathering improved response data on conscious and subconscious thought processes.

BACKGROUND ART

The modern science of formal survey research is a fairly recent development in human history. Although limited aspects of formal survey practice have been in place for a couple centuries, the field of modern survey research first coalesced in the early to middle 20th century. Some researchers [e.g., "*A brief history of survey research.*" *Prairie Research Associates*.] cite four major assumptions that contributed to the development of modern survey research. Most survey methods, practices, and supporting technology were constructed either explicitly or implicitly relying on these or similar assumptions:

- respondents can be trusted to answer questions truthfully and accurately;
- small random samples are accurate;
- multivariate analysis or other statistical techniques can be used to control for imperfect sampling;
- existing technologies allow us to sample from most or all of the population efficiently.

In his 2017 article for the American Associated for Public Opinion Research (published by Oxford University Press), Robert Groves breaks the development of surveys into three eras: 1930-1960, 1960-1990, and 1990 to the present. Although the middle period of 1960 and 1990 is often referred to as a golden age in which the usage of surveys grew to dominance, Groves notes that it was between 1930 and 1960 (which he terms the Age of Invention) that "all of the basic tools we use as a field were invented." [Groves, Robert M. *Three Eras of Survey Research. Public Opinion Quarterly*. Vol. 75, No. 5, 2011, pp. 861-871]

During each era in the field of survey research, the interactions with survey respondents were limited by the technologies of the era, but the core aspect of the survey interactions remained similar. Even with the advent of the internet and widespread household penetration of the world wide web that created a tremendous amount of innovation in the delivery mechanism of surveys, researchers made little progress in improving the survey interactions themselves. Instead, the vast majority of the innovations simply "paved the cow paths"—that is, improved the efficiency (i.e. cost, scale, speed, and reach) of existing tools that were previously conducted in person, over the phone or on paper, rather than creating new mechanisms of interaction that made innovations to improve the actual interactions with respondents. The associated methods and systems experienced a similar lack of innovation. Internet surveys, and even mobile phone surveys, generally mimicked offline modes of interaction in the same manner that early automobiles mimicked horse-drawn wagons. With few exceptions, experts in the field of survey research simply failed to create innovative interactions, methods, and systems in spite of extensive familiarity both with survey practices and new technology formats.

Several examples of the "lift and shift" approach to usage of new technology in surveys are readily available. The commonly used Likert Scale (a 5 point single response scale), which was created in 1932 by Rensis Likert to help standardize psychometric measurement and has dominated ratings questions for over 80 years, requires essentially the same interactions with respondents as Likert himself used: checking a box on a form. ["Likert Scale." *Wikipedia*. May 10, 2019.] The Likert Scale was originally delivered in verbal or paper format, often in large batteries of questions. As surveys became more prevalent and telephones became ubiquitous in modernized societies, Likert scale questions were adapted to telephone survey research. With the advent of the internet in the 1990s, Likert scales made another major transition in delivery method to online formats, however the essential structure of the Likert scale question and the method of asking the question remained nearly identical. Researchers simply moved pen and paper surveys online. Finally, the introduction and rapid adoption of mobile device technologies in the last decade enabled researchers to ask Likert scale questions over mobile devices, but once again the method of asking the question remained nearly identical to the original method in the 1930s: checking boxes or otherwise selecting one option on a scale with between 5 and 7 options.

The continued reliance on the Likert scale question structure did not result from its perfection as a survey instrument. Indeed, the more it was used in psychometrics and other measurement sciences in the last three decades, the more researchers recognized it as a deeply flawed survey instrument based on a poorly structured respondent interaction. Likert scales are well known to suffer from a wide range of response biases, including: edge avoidance effects, extreme response tendencies, response scale truncation, cultural differences in scale usage, individual differences in scale usages, acquiescence and social desirability, and many other challenges. To make matters worse, when batteries of Likert Scale questions are combined together (such as in a "grid" or "matrix" format), existing biases worsen and new biases are introduced. For example, respondents are well known to: straight-line responses (i.e. to quickly assign the same rating value to every scale question in a battery of questions), suffer from fatigue due to long sequences of questions, exhibit halo effects wherein the scores they assign on dissimilar attributes are strongly influences by an overall perception, suffer from ordering and labeling effects wherein labeling of scale responses can drastically change outcomes, and fall prey to other biases.

Another commonly used survey method and system that has been "lifted and shifted" from offline surveys to online surveys with virtually no change is Van Westendorp Price Meter, a self-stated method for capturing price sensitivity. Van Westendorp is simply a sequence of four open ended numeric entry pricing questions asking for four price points for a given product or service that is presented to the respondent in a standalone format. These questions are typically some form of: "[a]t what price is this product so expensive that you would not even consider buying it?" (i.e. the "Too Expensive" price point), "[a]t what price would you consider this product to be expensive but still worth purchasing?" (i.e. the "Expensive" price point), "[a]t what price would you consider this product a good bargain?" (i.e. the Good Bargain price point), and "[a]t what price would you consider this product so cheap that you doubt it's quality?" (i.e. the "Too Cheap" price point). A researcher will typically create a line chart for each of these questions from the responses for several hundred respondents in the survey and plot these lines on a chart in a particular order and orientation. The analyst may then select certain named intersection points to serve as focal points of analysis or create some derived metrics. The Van Westendorp method was introduced in 1976 by economist Peter Van Westendorp, and has remained largely intact in the past 43 years in spite of widespread criticism. ("Van Westendorp's Price Sensitivity Meter. *Wikipedia*. May 8, 2020; Van Westendorp, P (1976) "NSS-Price Sensitivity Meter (PSM)—A new approach to study consumer perception of price." *Proceedings of the ESOMAR Congress*; "Pricing Models in Market Research." Lipovetsky, Magnan and Polzi. *Intelligent Information*, 2011, 3, 167-174.)

Like the Likert scale question, the Van Westendorp method is another deeply flawed survey instrument that continues to be widely used simply because researchers have not invented other methods that are easy to implement. Like other methods in survey research, Van Westendorp relies heavily on assumptions about rational economic behavior that are now known to be false. Such assumptions include: consumer utility for a product is static and does not change, consumers are aware of the pricing landscape, consumers tell the truth, consumers do not cognitively anchor responses based on priming experiences in earlier questions, and consumers accurately represent their state of mind at the time of a future purchase opportunity (accounting for physical conditions like heat, hunger, or thirst, and psychological tendencies like hyperbolic time discounting). In addition, Van Westendorp is extremely tedious to answer due to the requirement for typing in numbers (with decimals) in multiple small text entry boxes for each product assessed (which is even more tedious on a mobile device than a computer with a keyboard and mouse), and is known to suffer significant presentation order effects when multiple products are evaluated by a single respondent.

The above examples should not imply that innovation in surveys has been limited simply because no one has tried. Over the past 30 years alone, researchers have invested countless hours (and entire careers) in improving survey tools. One major example is choice-based tradeoff or "conjoint" analysis, which typically applies latent choice models to response data that is gathered by showing respondents multiple products (each with one or more "attributes") on a sequence of screens and asking the respondent to choose which one he or she would buy. From one screen to the next, the attributes and price points of the products are varied according to a design of experiment to provide sufficient data to a latent utility choice model to extract estimated utilities for the attributes and price. These methods are extensively described in the literature, including:

Orme, Bryan. 2010. *Getting Started with Conjoint Analysis Strategies for Product Design and Pricing Research*. Glendale Research Publications. 2014.

Agarwal, DeSarbo, Malhotra, and Rao. "An Interdisciplinary Review of Research in Conjoint Analysis: Recent Developments and Directions for Future Research." *Customer Needs and Solutions* (2015) 2: 19.

Limitations and drawbacks of choice-based methods and conjoint analysis are described in:

U.S. Pat. No. 7,308,418B2: Determining Design Preferences of a Group

U.S. Pat. No. 7,877,346B2: Method and System for Predicting Personal Preferences Patent Application No. US20090307055A1 Assessing Demand for Products and Services Choice based conjoint surveys have several drawbacks, particularly in a mobile device environment: they require large areas of screen real estate to display multiple attributes associated with each product, they are notoriously exhausting for respondents to complete which results in rapid respondent fatigue, they are difficult and costly to program, they rely on modeling that uses strict assumptions that require well behaved and stable consumer utility structures, they suffer from extensive use of simplifying heuristics due to excessive choice complexity, they frequently overstate importance of features that consumers do not notice in real life, and more. In the context of pricing, choice based and other conjoint methods suffer additional flaws that specifically relate to anchoring, rigid mathematical assumptions relating consumer utility to price, framing effects and contextual failures. For example, respondents who are presented with several product options consistently under-use the "None of These" selection in choice-based surveys, which creates upwardly biased estimates of overall willingness to purchase a product at a given price level. Moreover, the upward bias can vary wildly depending on the base price levels that are shown in the choice tasks in the display.

Karty and Yu. 2012. "Taking Nothing Seriously." *Proceedings of the Sawtooth Conference*. March, 2012.

Additionally, even estimates of relative price sensitivity can vary wildly depending on the range of prices tested. To mitigate these biases, choice-based modelers and researchers typically recommend that "normal" prices are used, however "normal" can vary substantially based on channel (e.g., drug store vs. grocery vs. online), geographical location (e.g., San Francisco vs. Kansas City vs. Dallas vs. New York), immediacy of need, seasonality, and other factors. Even worse, this very practice of using "normal" base price levels and ranges to test price sensitivity reinforces framing and anchoring biases. This makes choice-based pricing mechanisms unsuitable for assessing willingness to pay for new products or services for which consumers do not already have an established frame of reference—including everything from a new food product to a medicine to an online home service and may other novel products, services, and delivery channels.

Likert scales, Van Westendorp, and choice question methods are just a few of a number of standardized question types that have been developed over the last several decades. All of the various question types (ranking questions, open ended response questions, pricing questions, multiple select questions, grouping questions, and others) suffer from their own set of biases. Various other methods have been introduced to try to address these biases, such as a hybrid choice-based scaling method called MaxDif (a best/worst discrete choice method that is combined with a statistical model to extract latent respondent utility). These tools provide some benefits, but suffer from their own unique response biases and implementation challenges of their own (like choice overload, attribute order effects, asymmetric dominance, attribute simplification due to satisficing behaviors, increased response fatigue due to repetitive complex tasks, number-of-levels effects, and many others) as well as biases inherent in the models used to extract latent utility information from choice data due to the incompatibility of the models with the underlying preference and stochastic error structure assumed by the models. They also frequently do not yield data that can be intuitively explained to non-technical researchers, even after extensive analytical modeling.

At the same time that some researchers have been trying to create new and better survey interactions, methods and systems, other researchers have been trying to fix the problems inherent in existing survey instruments using statistical tools and methods. Entire publications, like the Journal of Survey Statistics and Methodology, exist primarily to provide ways to test, validate, and improve the statistical modeling of survey data. Again, researchers and academics have spent entire careers trying to eek out modest improvements in accuracy and quality of information gained from surveys. Many of the complex statistical processes are so detailed and difficult that the expertise to use them is beyond the scope of one of ordinary skill in the art. Instrumental variables techniques, multi-stage least squares, Bayesian networks, discriminant analysis, latent variable segmentation, and multi-faceted factor analysis are just a handful of statistical methodologies that have been developed to help mitigate some of the many problems inherent in standard survey questions.

In the past decade, since the invention of smartphones, a final new wave of innovation has made its way into surveys. Unfortunately—and in spite of the incredible capabilities enabled by smartphones and their embedded input/output devices—researchers have failed to achieve significant advances in the actual survey interactions, methods, and systems, although they have mostly succeeded in enabling the distribution of existing survey interactions through this new channel. Multi-billion dollar survey software companies (such as SurveyMonkey, Qualtrics, SPSS, and others) have invested in many tools and technologies for mobile devices, such as encryption tools to ensure the safety and security of information sent through the internet, integration with a wide variety of other technology tools (like Consumer Relationship Management tools and Human Resources tools) to make it easier to deploy surveys into those applications, integration with analytics and business intelligence platforms to efficiently execute conventional analytical processes and create dashboards that render that data graphically, and responsive design tools that can render standard questions in standard formats regardless of the device on which those survey questions are viewed.

Yet while millions of dollars and countless hours of research and development have enabled the cost-effective and rapid delivery of existing survey methods, both researchers and private companies have failed to create novel innovation in the interactions, methods and systems of surveys. For example, one of the "newest" survey interactions to become wildly popular in the field of survey research is the Net Promoter Score, a proprietary method developed by professors at Harvard Business School. [Reichheld, Frederick. "The One Number You Need to Know." *Harvard Business Review.* 2003.] The essential innovation of the Net Promoter Score was simply replacing the 5 or 7 point Likert scale with an 11 point scale (going from 0 to 10) and asking a specific question ("How likely would you be to recommend this product/service/brand/company to a friend or colleague?"). The responses are then recoded from the 11 point scale into a 3 point scale, wherein 0-6 is coded a "detractor", 7-8 is coded a "neutral", and 9-10 is coded a "promoter", and the Net Promotor Score equals the percentage of promoters minus the percentage of detractors. Billions of dollars worth of decisions and investments are made every year based on this metric. Entire companies and software platforms have sprung up that are specifically devoted to measuring and improving the Net Promoter Score. From the perspective of the field of survey research, this has been considered one of the greatest innovations in the past decade While innovation in survey interactions, methods and systems has stagnated, software engineers have made substantial advances in delivery through the use of online surveys, including: improvements in the time taken to field surveys to large numbers of respondents, ability to execute basic validation logic on responses in real time, ability to automate survey branching logic or question skip logic, and the ability to display images or videos to solicit survey responses, all while keeping the actual response interactions (i.e. the respondent interfaces for scale questions, rank questions, and other questions) the same. Additionally, extensive work has been done to address challenges with the difficulty obtaining properly balanced and validated samples of a target population. For example, U.S. Pat. No. 4,926, 255A (System for evaluation of response to broadcast transmissions), U.S. Pat. No. 8,290,810B2 (Realtime surveying within mobile sponsored content), and U.S. Pat. No. 8,731, 906B2 (Systems and methods for gathering research data).

Yet another set of efforts and innovations have contributed to multiple recent inventions that have focused on solving the problems of survey consistency and population validation specifically for surveys delivered on mobile computing devices. For example, Patent No. US20170180980A1 (Complex Computing Operation for Determining Suitability of Data Presentation on a Mobile Device) and US20150324811A1 (Scoring Tool for Research Surveys Deployed in a Mobile Environment) have proposed extensive methods and systems to assess whether a survey is suitable for delivery via a mobile device. These patent applications propose scoring methods and systems in which a survey is penalized based on projected length, use of grid or matrix questions, use of rich media content in questions, use of open-ended text responses, and other criteria. These efforts underscore just how difficult it has been for the industry to deliver effective surveys on mobile devices, in particular due to their limited screen space and the difficulty and tediousness of certain interactions (like typing large blocks of text into a free form text entry box).

While massive investments have been made, these have yielded few changes in the interactions, methods and systems used in surveys. Yet these types of innovations are now becoming more important than ever as the traditional value of surveys themselves is coming under grave threat.

SUMMARY OF THE EMBODIMENTS

In one embodiment, the invention provides a computer user interface for obtaining respondent response data for scale questions, the computer user interface produced on a mobile computing device, operated by the respondent, in communication with a server system and executing code establishing computer processes that include:
  causing by the server system presentation on a display of
    the mobile computing device to the respondent a stimulus in a context of an instruction asking the respondent to respond with a first effortful intuitive set of gestures to indicate a magnitude and directionality of a set of objectives; and
  in consequence of having received on the display of the
    mobile computing device a responding set of gestures indicating the magnitude and directionality of each member of the set of objectives, receiving, by the server system from the mobile computing device, data corresponding to the responding set of gestures as response data pertinent to the stimulus and associated with the respondent.

Optionally, the computer processes further include:

causing display of a representation of the response data on the display of the mobile computing device.

Alternatively or in addition, the computer processes further include: causing a gamified reaction by the mobile computing device:

Alternatively or in addition, the computer processes further include: causing a gamified reaction by the mobile computing device.

Alternatively or in addition, the computer processes further include: causing stimuli to be presented sequentially on the same screen or a set of related screens according to an algorithmically determined sequence that takes into account respondent response data captured earlier.

Alternatively or in addition, the computer processes further comprise configuring, by the server system, the display of the mobile computing device to receive a respondent input selected from the group consisting of:
 an effortful intuitive gesture made directly upon a stimulus that is presented on a screen;
 an effortful intuitive gesture made via a set of user computer user interface controls that are presented onscreen that pertain to the stimulus; and
 combinations thereof.

Alternatively or in addition, the computer processes further include: receiving on the display of the mobile computing device a responding set of gestures in which an individual gesture pertains to more than one objective, such that a direction of a swipe can be selected from the group consisting of vertically, horizontally, and combinations thereof, and wherein a vertical dimension pertains to a first objective and a horizontal dimension pertains to a second objective Alternatively or in addition, the computer processes further include: accessing by the server system a centralized datastore to record the respondent response data.

Alternatively or in addition, the computer processes further include:
 aggregating by the server system data from the centralized datastore that contains respondent response data; and
 applying by the server system a process selected from the group consisting of: numerical algorithms, statistical processes, and combinations thereof to aggregated data for a set of respondents to create derived metrics pertaining to a set selected from the group consisting of a set of respondents, a set of stimuli, a set of associated stimulus items, and combinations thereof.

Alternatively or in addition, the computer processes further include:
 determining by the server system a set of metrics that are derived from a set of surveys using a process selected from the group consisting of numerical algorithms, statistical processes, and combinations thereof; and
 characterizing by the server system the set of derived metrics to create a framework selected from the group consisting of an interpretive framework, a predictive framework, and combinations thereof.

In another embodiment, the invention provides a computer user interface for obtaining respondent response data for a grid question that uses a large set of rich media response items, the computer user interface produced on a mobile computing device, operated by the respondent, in communication with a server system and executing code establishing computer processes that include:
 causing by the server system presentation on a display of the mobile computing device to the respondent a set of stimuli on a set of screens presented in a determined sequence, each stimulus representing a child question of the grid question, in a context of an instruction asking the respondent to answer by selecting a set of rich media response items according to a specified objective that pertains to each stimulus, wherein the set of stimuli and set of rich media response items cannot be visually displayed in a grid on a single screen without impairing integrity of the stimuli; and
 in consequence of having received on the display of the mobile computing device a responding set of gestures indicating the set of rich media response items that is selected for a given stimulus, receiving, by the server system from the mobile computing device, data corresponding to the responding set of gestures as response data pertinent to the given stimulus and the set of selected rich media response items, and associated with the respondent.

Optionally, the computer processes further include:
 in consequence of having received on the display of the mobile computing device a responding second set of gestures indicating additional respondent response data associated with a second set of rich media response items that is selected for a given stimulus, receiving, by the server system from the mobile computing device, data corresponding to the responding second set of gestures as response data pertinent to the given stimulus and the second set of selected rich media response items, and associated with the respondent.

Alternatively or in addition, the computer processes further include: causing display of a representation of the response data on the display of the mobile computing device.

Alternatively or in addition, the computer processes further include: causing a gamified reaction by the mobile computing device.

Alternatively or in addition, the computer processes further comprise configuring by the server system presentation of stimuli in a manner selected from the group consisting of:
 causing a set of stimuli to be presented sequentially, wherein members of the set of stimuli include respondent response data captured earlier in a survey;
 causing a set of stimuli to be presented sequentially, wherein a sequence in which the stimuli is presented depends on respondent response data captured earlier in a survey;
and combinations thereof.

Alternatively or in addition, the computer processes further include advancing from one stimulus-focused screen to a next stimulus-focused screen based on criteria selected from the group consisting of passage of a certain amount of time, selection of a certain number of rich media response items, activation by the respondent of a control indicating readiness to proceed to the next stimulus-focused screen, and combinations thereof.

Alternatively or in addition, the computer processes further include: accessing by the server system a centralized datastore to record respondent response data.

Alternatively or in addition, the computer processes further include:
 aggregating by the server system data from the centralized datastore that contains respondent response data; and applying by the server system a process selected from the group consisting of numerical algorithms, statistical processes, and combinations thereof to the aggregated data for a set of respondents to create derived metrics pertaining to a set selected from the group consisting of a set of respondents, a set of stimuli, a set of associated stimulus items, and combinations thereof.

Alternatively or in addition, the computer processes further include:
determining by the computer system a set of metrics that are derived from a set of surveys using a process selected from the group consisting of numerical algorithms, statistical processes, and combinations thereof; and
characterizing the set of derived metrics to create a framework selected from the group consisting of an interpretive framework, a predictive framework, and combinations thereof.

In another embodiment, the invention provides a computer user interface for gathering respondent response data for a grouping question for a set of graphically rich stimuli that cannot be visibly displayed on a mobile computing device single screen simultaneously without impairing integrity of the stimuli, the computer user interface produced on a mobile computing device, operated by the respondent, in communication with a server system and executing code establishing computer processes that include:
causing by the server system presentation on a display of the mobile computing device to the respondent an original set of graphically rich stimuli on an extended screen, in a context of an instruction asking the respondent to respond with a set of gestures to select a set of smaller sets of the graphically rich stimuli, that is moved by moving the selected items into a grouping area such that the selected graphically rich stimuli items are is simultaneously visibly displayed on the single screen and remains visibly displayed on the single screen as the respondent navigates across the extended screen, wherein the grouping area is of a small size that cannot fit cause useful display of the selected set of smaller sets of graphically rich stimuli items without modification;
in consequence of having received on the display of the mobile computing device a responding set of gestures indicating the selection of the set of smaller sets of graphically rich stimuli, moving the selected graphically rich stimuli items from the original set into the set of smaller sets and replacing the selected graphically rich stimuli items with matching corresponding reduced form stimuli thereof that can be configured to fit into the grouping area; and
receiving, by the server system from the mobile computing device, data corresponding to the responding set of gestures and associated selected items set of smaller sets of graphically rich stimuli as response data pertinent to the graphically rich stimuli and associated with the respondent. Optionally, the computer processes further include gathering respondent response data for a group and rank question by:
ranking the reduced form stimuli within the selected set of smaller sets of stimuli in the grouping area in response to receiving a responding set of gestures from the respondent; and
storing data corresponding to the responding set of gestures as response data pertinent to the graphically rich stimuli and associated with the respondent.

Alternatively or in addition, the computer processes further include:
causing by the server system presentation temporarily on the display of the mobile computing device an extended form stimulus corresponding to a stimulus selected from the group consisting of a graphically rich stimulus, a reduced form stimulus, and combinations thereof in response to receiving a set of gestures from the respondent.

Alternatively or in addition, the computer processes further include:
configuring by the server system for displaying on the mobile computing device to the respondent a full set of graphically rich stimuli by a presentation in a manner selected from a group consisting of:
presenting to the respondent a stream of graphically rich stimuli that moves across the screen according to time increments;
presenting to the respondent sets of graphically rich stimuli that fit on a single screen, wherein the respondent can move the graphically rich stimuli from one set to another set by providing a set of gestures;
presenting to the respondent reduced form stimuli corresponding to the graphically rich stimuli, wherein the respondent can view a set of the graphically rich stimuli corresponding to a set of reduced form stimuli by providing a set of gestures; and
combinations thereof.

Alternatively or in addition, the computer processes further include:
configuring by the server the display of the mobile computing device to receive graphical gestures by the respondent in a mode a set of capabilities selected from the group consisting of:
moving a reduced form stimulus from one section of the grouping area signifying membership in a given selected set to another section of the grouping area signifying membership in another given selected set;
removing a reduced form stimulus from the grouping area and restoring its corresponding graphically rich stimulus to the original set of graphically rich stimuli; and
combinations thereof.

Alternatively or in addition, the computer processes further include: accessing by the server system a centralized datastore to record-respondent price sensitivity response data.

Alternatively or in addition, the computer processes further include:
aggregating data by the server system from a centralized datastore that contains respondent price sensitivity response data; and
applying by the server system a process selected from the group consisting of numerical algorithms, statistical processes, and combinations thereof aggregated data for a set of respondents to create derived metrics pertaining to a set selected from the group consisting of a set of respondents, a set of stimuli, a set of associated stimulus items, and
combinations thereof.

Alternatively or in addition, the computer processes further include:
determining by the server system a set of metrics that are derived from a set of surveys using a process selected from the group consisting of numerical algorithms, statistical processes, and combinations thereof; and characterizing the set of derived metrics to create a framework selected from the group consisting of an interpretive framework, a predictive framework, and combinations thereof.

In another embodiment, the invention provides a computer user interface for gathering respondent response data and a set of associated audiovisual responses to a question displaying a stimulus, the computer user interface produced on a mobile computing device, operated by the respondent, in communication with a server system and executing code establishing computer processes that include:

causing by the server system presentation on a display of the mobile computing device to a respondent a stimulus in the context of instructions to indicate a set of elements of the stimulus according to a set of objectives by a responding set of gestures;

in consequence of having received on the display of the mobile computing device the responding set of gestures indicating a set of elements of the stimulus, receiving from the respondent a set of audiovisual responses associated with the indicated set of elements using a recording mechanism in the mobile computing device;

receiving, by the server system from the mobile computing device, data corresponding to the responding set of gestures as respondent response data pertinent to the stimulus and associated with the respondent; and receiving, by a server system from the mobile computing device, data corresponding to the set of audiovisual responses as respondent response data pertinent to the stimulus and associated with the respondent response data and the respondent.

Optionally, the computer processes further include:

providing the respondent directions relating to a set of gestures, wherein each set of gestures is associated with a different objective;

receiving on the display of the mobile computing device a responding set of gestures indicating a set of elements of the stimulus pertaining to an associated objective;

receiving from the respondent a set of audiovisual responses associated with the indicated set of elements and pertaining to the associated objective using a recording mechanism in the mobile computing device;

storing data corresponding to the responding set of gestures as response data pertinent to the stimulus, pertaining to the associated objective, and associated with the respondent; and storing the set of audiovisual responses pertinent to the stimulus, pertaining to the associated objective, and associated with the respondent.

Alternatively or in addition, the computer processes further include:

providing the respondent control of the recording mechanism in the mobile computing device to influence a set of audiovisual responses associated with a set of stimuli, wherein the control of the recording mechanism is selected from the group consisting of starting recording, pausing recording, resuming recording, stopping recording, deleting a recording, deleting a portion of a recording, reviewing a recording, reviewing a portion of the recording, submitting a recording, submitting a portion of a recording, and combinations thereof.

Alternatively or in addition, the computer processes further include: causing presentation on a display of the mobile computing device to a respondent visual cues selected from the group consisting of:

visual cues signifying response data provided by the respondent pertaining to the stimulus;

visual cues signifying aspects of a set of audiovisual responses;

visual cues signifying a relationship between a particular set of respondent response data and a particular set of audiovisual responses; and combinations thereof.

Alternatively or in addition, the computer processes further include using a stimulus that is an assemblage of a set of stimuli selected by the respondent earlier in a survey.

Alternatively or in addition, the computer processes further include: accessing by the server system a centralized datastore that records respondent response data and audiovisual responses.

Alternatively or in addition, the computer processes further include:

using a process selected from the group consisting of machine learning, artificial intelligence algorithms, or combinations thereof to encode a set of audiovisual responses into a set of structured data fields that indicate aspects of the set of audiovisual responses Alternatively or in addition, the computer processes further include:

aggregating by the server system data from a centralized datastore that contains data selected from the group consisting of respondent response data, encoded structured data, and combinations thereof derived from audiovisual responses; and applying by the server system a process selected from the group consisting of numerical algorithms, statistical processes, and combinations thereof to aggregated data from a set of respondents to create derived metrics pertaining to a set selected from the group consisting of a set of respondents, a set of stimuli, a set of associated stimulus items, and combination thereof.

Alternatively or in addition, the computer processes further include:

determining by the server system a set of derived metrics that are derived from a set of surveys using a process selected from the group consisting of numerical algorithms, statistical processes, and combinations thereof; and characterizing by the server system the set of derived metrics to create a framework selected from the group consisting of an interpretive framework, a predictive framework, and combinations thereof.

In another embodiment, the invention provides a computer user interface for obtaining respondent price sensitivity response data for a pricing question, the computer user interface produced on a mobile computing device, operated by the respondent, in communication with a server system and executing code establishing computer processes that include:

causing by the server system presentation on a display of the mobile computing device to the respondent a set of stimuli with associated prices, wherein the prices begin at a certain value and incrementally change over time according to an algorithm, in a context of an instruction directing the respondent to select a set of stimuli when a price associated with each stimulus matches a particular objective; and in consequence of having received on the display of the mobile computing device a responding set of gestures indicating the selection of a set of stimuli at associated prices, receiving, by the server system from the mobile computing device, data corresponding to the responding set of gestures as response data pertinent to the stimuli and associated prices, and associated with the respondent.

Optionally, the computer processes further include algorithm that governs speed of incremental price changes incorporates a set of inputs selected from the group consisting of number of price changes that have occurred, amount of time that has passed, proximity to an initial starting price, proximity to an ending target price, number of stimuli not been selected, and combinations thereof.

Alternatively or in addition, the computer processes further include:

pausing incremental changing of prices associated with the stimuli by receiving on the display of the mobile computing device a responding set of gestures; and selecting a set of stimuli while the changing of prices is paused or to resuming the incremental changing of prices without selecting a set of stimuli.

Alternatively or in addition, the computer processes further include:

causing by the server system on the display of the computing device freezing of the associated price of each selected stimulus on the screen at a value that is present when the stimulus is selected; and configurating the display of the mobile computing device to operate in a manner causing the incremental price changes for stimuli that are not selected prior to their associated prices reaching a designated level to stop. Alternatively or in addition, the computer processes further include:

causing by server system presentation on the mobile computing device to the respondent a new instruction directing the respondent to select a set of stimuli when the price associated with each stimulus matches a new particular objective pertaining to an associated stimulus item that differs from the prior particular objective, wherein the associated price for each stimulus that was selected according to the prior directed objective beginning at the value at which it was frozen and incrementally changing over time according to an algorithm, in a context of the new instruction; and repeating a process similar to a process enacted in response to a prior instruction, and similarly receiving a responding set of gestures and storing data corresponding to this set of gestures.

Alternatively or in addition, the computer process further include:

accessing by the server system a centralized datastore that records respondent price sensitivity response data.

Alternatively or in addition, the computer processes further include:

aggregating by the server system data from the centralized datastore that contains respondent price sensitivity response data; and applying by the server system a process selected from the group consisting of numerical algorithms, statistical processes, and combinations thereof to aggregated data from a set of respondents to create derived metrics pertaining to one of a set selected from the group consisting of a set of respondents, a set of stimuli, a set of associated stimulus items, a set of associated prices, and combination thereof.

Alternatively or in addition, the computer processes further include:

determining by the server system a set of metrics that are derived from a set of surveys using a process selected from the group consisting of numerical algorithms, statistical processes, and combinations thereof; and characterizing by the server system the set of derived metrics to create a framework selected from the group consisting of an interpretive framework, a predictive framework, and combinations thereof.

In another embodiment, the invention provides a cognitively fluid computer user interface for obtaining respondent response data for a grid question, the computer user interface produced on a mobile computing device, operated by the respondent, in communication with a server system and executing code establishing computer processes comprising:

causing by the server system presentation on a display of the mobile computing device to the respondent a screen displaying instructions in the context of a set of partially obscured stimuli representing child questions of a grid question, the instructions corresponding to a first response item in the grid; and causing by the server system presentation on a display of the mobile computing device to the respondent a next screen displaying the unobscured set of stimuli; and in consequence of having received on the display of the mobile computing device a responding set of gestures indicating the set of stimuli that correspond to the given instructions on the prior screen, receiving, by the server system from the mobile computing device, data corresponding to the responding set of gestures as response data pertinent to the given response item and the set of selected stimuli, and associated with the respondent; and causing by the server system presentation on a display of the mobile computing device to the respondent a next screen displaying instructions in the context of a set of partially obscured stimuli representing child questions of a grid question, the instructions corresponding to a second response item in the grid; and causing by the server system presentation on a display of the mobile computing device to the respondent a next screen displaying the unobscured set of stimuli, of which stimuli that were selected on any prior screen are partially obscured and disabled; and in consequence of having received on the display of the mobile computing device a responding set of gestures indicating the set of stimuli that correspond to the given instructions on the prior screen, receiving, by the server system from the mobile computing device, data corresponding to the responding set of gestures as response data pertinent to the given response item and the set of selected stimuli, and associated with the respondent.

Alternatively or in addition, the computer processes further include: causing by the server system presentation on a display of the mobile computing device to the respondent one or more pairs of instruction and response screens, wherein each instruction screen displays instructions in the context of a set of partially obscured stimuli representing child questions of a grid question, the instructions corresponding to a different response item in the grid, and each response screen displays the unobscured set of stimuli, of which stimuli that were selected on any prior screen are partially obscured and disabled; and in consequence of having received on the display of the mobile computing device in a response screen a responding set of gestures indicating the set of stimuli that correspond to the given instructions on the prior screen, receiving, by the server system from the mobile computing device, data corresponding to the responding set of gestures as response data pertinent to the given response item and the set of selected stimuli, and associated with the respondent.

Alternatively or in addition, the computer processes further include: causing a gamified reaction by the mobile computing device.

Alternatively or in addition, the computer processes further comprise: configuring by the server system presentation of stimuli and response items in a manner selected from the group consisting of:
  causing a set of instruction screens and displays screens associated with a set of response items to be presented sequentially, in which the determination of which pairs of instruction screens and response screens are presented depends on respondent response data captured earlier in a survey; and
  causing a set of instruction screens and displays screens associated with a set of response items to be presented sequentially, in which the determination of the order of pairs of instruction screens and response screens depends on respondent response data captured earlier in a survey;
  and combinations thereof.

Alternatively or in addition, the computer processes further include: causing, by the server system, advancing from one screen to the next based on criteria selected from the group consisting of passage of a certain amount of time, selection of a certain number of stimuli, activation by the respondent of a control indicating readiness to proceed to the next stimulus-focused screen, and combinations thereof.

Alternatively or in addition, the computer processes further include:
  accessing by the server system a centralized datastore to record respondent response data.

In another embodiment, the invention provides a fast and intuitive computer user interface for obtaining respondent response data for a rank question with a large number of response items, the computer user interface produced on a mobile computing device, operated by the respondent, in communication with a server system and executing code establishing computer processes comprising:
  causing by the server system presentation on a display of the mobile computing device to the respondent a screen displaying of a set of stimuli representing response items for a rank question in a grid consisting of at least two rows and at least two columns; and
  in consequence of having received on the display of the mobile computing device a responding initial set of rapid intuitive gestures indicating a set of stimuli that should receive initial rankings without indicating an exact rank for each stimulus, causing by the server system on the display of the mobile computing device a set of gamified reactions that move the indicated stimuli into ranked positions on the screen such that a first indicated stimulus receives the top rank and subsequent indicated stimuli receive a rank just below the current lowest ranked stimulus; and
  in consequence of having received on the display of the mobile computing device a subsequent set of gestures, causing by the server system on the display of the mobile computing device a set of gamified reactions consisting of moving an indicated stimulus from an unranked position to a ranked position, moving an indicated stimulus from a ranked position to another ranked position, moving an indicated stimulus from a ranked position to an unranked position, and combinations thereof; and
  in consequence of causing on the display of the mobile computing device a change in the ranked position of a stimulus, causing an animation wherein the positions of other stimuli are altered in order to cognitively reinforce the new rankings of all of the stimuli; and
  in consequence of having received on the display of the mobile computing device a responding set of gestures indicating the ranking of stimuli, receiving, by the server system from the mobile computing device, data corresponding to the responding set of gestures as response data pertinent to the set of displayed stimuli, and associated with the respondent.

Alternatively or in addition, the computer processes further include:
  causing by the server system presentation on a display of the mobile computing device to the respondent an instruction screen in which the stimuli for the rank question are partially obscured and disabled, such that the display focuses respondent attention on the instructions while providing context; and
  removing the instructions and obscurement of the stimuli, and enabling the stimuli, such that the interface maximizes the area of a mobile computing device screen that can be used for the ranking activity while minimizing distraction.

Alternatively or in addition, the computer processes further include:
  causing a gamified reaction by the mobile computing device.

Alternatively or in addition, the computer processes further include:
  causing, by the server system, a set of limitations on respondent behavior from a group consisting of a limitation on the time spent on the ranking activity, a maximum on the number of ranked items, a minimum on the number of ranked items, a limit on the number of times that ranked items can be re-ranked, a limitation on the number of times that ranked items can be un-ranked, and any combination of these; and
  causing by the server system presentation on a display of the mobile computing device to the respondent a set of gamified interactions that communication and reinforce the set of limitations on respondent behavior.

Alternatively or in addition, the computer processes further include:
  accessing by the server system a centralized datastore to record respondent response data.

In another embodiment, the invention provides a computer user interface for gathering respondent response data for a rating scale question that uses an time based intuitive gesture in which the time a user spends engaged in the gesture directly correlates to a change in the scale rating, the computer user interface produced on a mobile computing device, operated by the respondent, in communication with a server system and executing code establishing computer processes that include:
  causing by the server system presentation on a display of the mobile computing device to the respondent a question that may include graphically rich stimuli, in a context of an instruction asking the respondent to respond by engaging in a set of gestures;
  in consequence of having received on the display of the mobile computing device a responding time based intuitive gesture, causing a gamified reaction that indicates an incremental change in a rating scale; and in consequence of the continuation of the gesture, causing the continuation of the gamified reaction to indicate a further change in the rating scale in proportion to the amount of time spent engaged in the time based intuitive gesture; and receiving, by the server system from the mobile computing device, data corresponding to the responding set of gestures as response data pertinent to the rating scale question and associated with the respondent.

Optionally, the computer processes further include, in response to additional time based intuitive gestures, causing a gamified reaction that indicates a further incremental change in the rating scale; and in consequence of the continuation of the gesture, causing the continuation of the gamified reaction to indicate a further change in the rating scale in proportion to the amount of time spent engaged in the time based intuitive gesture.

Alternatively or in addition, the computer processes further include: accessing by the server system a centralized datastore to record-respondent price sensitivity response data.

Alternatively or in addition, the computer processes further include:

aggregating data by the server system from a centralized datastore that contains respondent price sensitivity response data; and applying by the server system a process selected from the group consisting of numerical algorithms, statistical processes, and combinations thereof aggregated data for a set of respondents to create derived metrics pertaining to a set selected from the group consisting of a set of respondents, a set of stimuli, a set of associated stimulus items, and combinations thereof.

Alternatively or in addition, the computer processes further include:

determining by the server system a set of metrics that are derived from a set of surveys using a process selected from the group consisting of numerical algorithms, statistical processes, and combinations thereof; and characterizing the set of derived metrics to create a framework selected from the group consisting of an interpretive framework, a predictive framework, and combinations thereof.

In another embodiment, the invention provides a computer user interface and associated server system for gathering respondent response data and a set of associated audiovisual responses to a question, the computer user interface produced on a mobile computing device, operated by the respondent, in communication with a server system and executing code establishing computer processes comprising:

causing by the server system presentation on a display of the mobile computing device to a respondent an initial question that is prominently displayed and a follow-up question that is less prominently displayed; and in consequence of having received on the display of the mobile computing device a first responding gesture, initiating an audiovisual media stream recording by means of the mobile computing device; and continuing the audiovisual media stream recording until and after a second responding gesture is received on the display of the mobile computing device; and in consequence of having received on the display of the mobile computing device the second responding gesture, causing the initial question to cease to be displayed, the second question to become prominently displayed; and recording the time stamp of the second responding gesture as respondent response data; and continuing the audiovisual media stream recording until a third responding gesture is received on the display of the mobile computing device; and receiving, by the server system from the mobile computing device, time stamp data corresponding to the responding set of gestures; and receiving, by a server system from the mobile computing device, data corresponding to the audiovisual media stream and associated with the response data and the respondent; and using the time stamp data corresponding to the responding set of gestures to separate the content in the audiovisual media stream in accordance with the questions that were asked on the mobile computing device.

Alternatively or in addition, the invention further includes:

in consequence of having received on the display of the mobile computing device an additional responding gesture, causing a current prominently displayed question to cease to be displayed, causing an additional question that is currently displayed but not prominently displayed to to become prominently displayed, and causing an additional question to become displayed but not prominently displayed; and continuing the audiovisual media stream recording; and recording the time stamp of the responding gesture as respondent response data; and receiving, by the server system from the mobile computing device, time stamp data corresponding to the responding set of gestures; and receiving, by a server system from the mobile computing device, data corresponding to the audiovisual media stream and associated with the response data and the respondent; and using the time stamp data corresponding to the responding set of gestures to separate the content in the audiovisual media stream in accordance with the questions that were asked on the mobile computing device.

Alternatively or in addition, the invention further includes:

Displaying a prominent instruction and a less prominent initial question on the screen of the mobile computing device prior to beginning the recording of the audiovisual media stream; and in consequence of having received on the display of the mobile computing device a first responding gesture, causing the instructions to cease to be displayed, causing the initial question to be prominently displayed, and causing a second question to be displayed less prominently than the initial question; and initiating an audiovisual media stream recording by means of the mobile computing device.

Alternatively or in addition, the invention further includes:

accessing by the server system a centralized datastore that records respondent response data and audiovisual responses.

Alternatively or in addition, the invention further includes:
   For each of a set of two or more audiovisual responses that are derived from splitting the single media stream using the time stamps associated with the responding gestures, using a process selected from the group consisting of machine learning, artificial intelligence algorithms, or combinations thereof to encode into a set of structured data fields that indicate aspects of the set of audiovisual responses.

Alternatively or in addition, the invention further includes:
   computer user interface and associated server system for gathering respondent response data and a set of associated audiovisual responses to a question, the computer user interface produced on a mobile computing device, operated by the respondent, in communication with a server system and executing code establishing computer processes comprising:

Alternatively or in addition, the invention further includes:
   providing the respondent control of the recording mechanism in the mobile computing device to influence a set of audiovisual responses associated with a set of stimuli, wherein the control of the recording mechanism is selected from the group consisting of starting recording, pausing recording, resuming recording, stopping recording, deleting a recording, deleting a portion of a recording, reviewing a recording, reviewing a portion of the recording, submitting a recording, submitting a portion of a recording, and combinations thereof.

Alternatively or in addition, the invention further includes:
   causing presentation on a display of the mobile computing device to a respondent visual cues selected from the group consisting of:
   visual cues signifying response data provided by the respondent pertaining to the question;
   visual cues signifying aspects of a set of audiovisual responses;
   visual cues signifying a relationship between a particular set of respondent response data and a particular set of audiovisual responses; and
   combinations thereof.

In another embodiment, the invention provides a computer user interface for gathering respondent response data and a set of associated audiovisual responses to a question displaying a stimulus, the computer user interface produced on a mobile computing device, operated by the respondent, in communication with a server system and executing code establishing computer processes that include:
   causing by the server system presentation on a display of the mobile computing device to a respondent an audiovisual media stimulus in the context of instructions to indicate a set of temporal regions of the stimulus according to a set of objectives by a responding set of gestures;
   in consequence of having received on the display of the mobile computing device the responding set of gestures indicating a set of temporal regions of the stimulus, receiving from the respondent a set of audiovisual responses associated with the indicated set of temporal regions using a recording mechanism in the mobile computing device;
   receiving, by the server system from the mobile computing device, data corresponding to the responding set of gestures as respondent response data pertinent to the stimulus and associated with the respondent; and
   receiving, by a server system from the mobile computing device, data corresponding to the set of audiovisual responses as respondent response data pertinent to the stimulus and associated with the respondent response data and the respondent.

Optionally, the computer processes further include:
   providing the respondent directions relating to a set of gestures, wherein each set of gestures is associated with a different objective;
   receiving on the display of the mobile computing device a responding set of gestures indicating a set of temporal regions of the stimulus pertaining to an associated objective;
   receiving from the respondent a set of audiovisual responses associated with the indicated set of temporal regions and pertaining to the associated objective using a recording mechanism in the mobile computing device;
   storing data corresponding to the responding set of gestures as response data pertinent to the stimulus, pertaining to the associated objective, and associated with the respondent; and
   storing the set of audiovisual responses pertinent to the stimulus, pertaining to the associated objective, and associated with the respondent.

Alternatively or in addition, the computer processes further include:
   providing the respondent control of the recording mechanism in the mobile computing device to influence a set of audiovisual responses associated with a set of stimuli, wherein the control of the recording mechanism is selected from the group consisting of starting recording, pausing recording, resuming recording, stopping recording, deleting a recording, deleting a portion of a recording, reviewing a recording, reviewing a portion of the recording, submitting a recording, submitting a portion of a recording, and combinations thereof.

Alternatively or in addition, the computer processes further include:
   causing presentation on a display of the mobile computing device to a respondent visual cues selected from the group consisting of:
   visual cues signifying response data provided by the respondent pertaining to the stimulus;
   visual cues signifying aspects of a set of audiovisual responses;
   visual cues signifying a relationship between a particular set of respondent response data and a particular set of audiovisual responses; and
   combinations thereof.

Alternatively or in addition, the computer processes further include:
   accessing by the server system a centralized datastore that records respondent response data and audiovisual responses.

Alternatively or in addition, the computer processes further include using a process selected from the group consisting of machine learning, artificial intelligence algorithms, or combinations thereof to encode a set of audiovisual responses into a set of structured data fields that indicate aspects of the set of audiovisual responses.

Alternatively or in addition, the computer processes further include:
- aggregating by the server system data from a centralized datastore that contains data selected from the group consisting of respondent response data, encoded structured data, and combinations thereof derived from audiovisual responses; and
- applying by the server system a process selected from the group consisting of numerical algorithms, statistical processes, and combinations thereof to aggregated data from a set of respondents to create derived metrics pertaining to a set selected from the group consisting of a set of respondents, a set of stimuli, a set of associated temporal regions, and combination thereof.

Alternatively or in addition, the computer processes further include:
- determining by the server system a set of derived metrics that are derived from a set of surveys using a process selected from the group consisting of numerical algorithms, statistical processes, and combinations thereof; and
- characterizing by the server system the set of derived metrics to create a framework selected from the group consisting of an interpretive framework, a predictive framework, and combinations thereof.

BRIEF DESCRIPTION OF THE DRAWINGS

The following features of embodiments will be more readily understood by reference to the following detailed description, taken with reference to the accompanying drawings, in which:

FIG. 41 is an example of directions for a Tap and Talk Interface in accordance with an embodiment of the present invention, which is designed to identify components of a stimulus that a respondent reacts to in a particular way (in this example, liking or disliking) and gather audiovisual responses from the respondent explaining the reaction.

DETAILED DESCRIPTION OF SPECIFIC EMBODIMENTS

Figure 1:
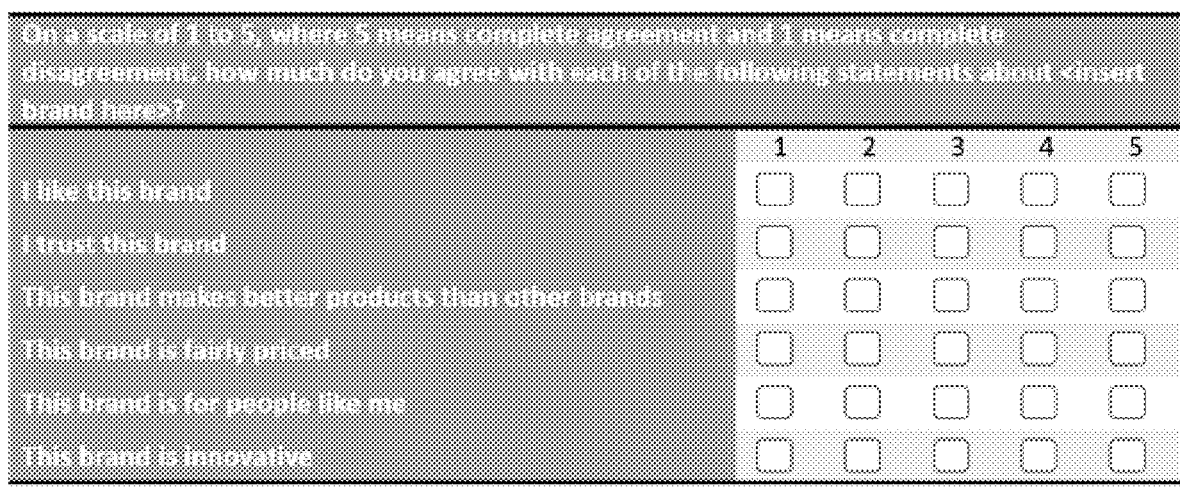
FIG. 1 is a typical grid or matrix question that is used in conventional surveys.

Definitions. As used in this description and the accompanying claims, the following terms shall have the meanings indicated, unless the context otherwise requires:

A "set" includes at least one member.

A "mobile computing device" is a smart phone or tablet, further comprising of a network connection, a touch sensitive display, a processor, and a storage medium.

A mobile computing device is "in communication" with a server system when the communication is selected from the group of synchronous, asynchronous, and combinations thereof.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "respondent" is an individual person who is providing responses to a survey.

"Response data" means data that is generated by or extracted from actions taken by a respondent in response to a survey or elements of a survey. For example, this data may include intended responses to questions as well as data extracted from a respondent's interactions with the mobile computing device, regardless of whether such data represents an intended response (such as delay times between instructions and actions, delay times between actions, speed of a swipe action, intensity of a swipe action, direction). The format of response data may vary, for example: binary, discrete outcome, multiple discrete outcome, open ended text, open ended numeric, continuous or semi-continuous telemetry data from a device, image, rich media.

"Price sensitivity response data" means response data that has aspects selected from the group of:
  indicating willingness to purchase from the group of an item, a service, and combinations thereof at a particular price;
  indicating intention to purchase from the group of an item, a service, and combinations thereof at a particular price;
  indicating the likely price at which a respondent would purchase from the group of an item, a service, and combinations;
  indicating the change in likelihood of purchasing from the group of an item, a service, and combinations that is related to a change in price;
  indicating the change in likely quantity purchased of an item selected from the group of a product or service or any combinations thereof that is related to a change in price; and
  combinations thereof.

An "audiovisual response" is a response from a respondent that can be encoded into file that contains a set selected from the group of: audio data, image data, movie data, and combinations thereof.

A "recording mechanism" is a set selected from the group of: microphone, camera, movie camera, and combinations thereof.

A "screen" of a display means a unit visual presentation that fits on a display of the mobile computing device.

An "extended screen" of a display means a unit visual presentation that is too large to fit on a display of a computing device, wherein a user can navigate across the unit visual presentation by means of interacting with the hosting device in order to view portions of the unit visual presentation (for example, by scrolling).

A "set of stimuli" may be presented on a single screen or on a series of related screens.

A "stimulus" is a representation of something that is intended to stimulate a response from a respondent. For example: one or more of an image, a block of text, a sequence of words, an audio recording, a video recording, an animated visual object.

An "associated stimulus item" is a set of things that is represented by a stimulus. For example: a brand, a product, a service, an advertisement, a communication, a person, an organization, an idea, a commercial offering, an activity.

A "reduced form stimulus" is a form of a corresponding stimulus with features selected from the group of: being abbreviated; being shrunken; being compressed; and combinations thereof. For example: a thumbnail version of a stimulus.

A "graphically rich stimulus" is a stimulus that incorporates an image with sufficient granularity such that the details of the image cannot be easily discerned by a viewer if the graphically rich stimulus is substantially reduced in image granularity.

An "extended form stimulus" is a form of a corresponding stimulus with features selected from the group of: containing additional related content; being enlarged; being expanded; increasing image granularity; playing a related audio file; playing a related movie file; enacting a related animation, and combinations thereof.

The "integrity of a stimulus" is an aspect of a stimulus such that it be easily perceived and understood in its entirety by most respondents for a typical survey on a typical mobile computing device, including all of the relevant details and aspects, within a particular presentation of the stimulus. The integrity of a stimulus is lost when it is presented in a manner that causes relevant details or aspects of the stimulus to be unable to be easily perceived or understood by a substantial minority (5% or more) of respondents in a typical survey on a typical mobile computing device. For example, reducing an image stimulus to a size or resolution that causes 5% or more respondents in a typical survey to be unable to see and understand relevant details or aspects of the stimulus would cause the loss of the integrity of the stimulus.

An "element" of a stimulus is a set selected from the group of: a location relating to the graphical aspect of a stimulus, a time relating to the temporal aspect of a stimulus, a defined area within the graphical aspect of a stimulus, a recognizable object within the graphical area of a stimulus, and combinations thereof. An element of a stimulus may translate across the forms of a stimulus. For example, the location relating to the graphical aspect of a stimulus may map to a corresponding location relating to the graphical aspect of one or more of a corresponding extended form stimulus and a corresponding reduced form stimulus.

An "objective" is a specific trait, perception, feeling, preference, association, belief, or specified goal pertaining to a category of items of which the stimulus is a member. For example, preference, liking, trust, willingness to purchase, relevance, uniqueness, association with a gender, association with a brand, association with a culture, belief that a brand or product performs well, etc.

An "effortful intuitive gesture" is a gesture that can be easily mastered by a typical young toddler (age 1 to 2), can be made with ease on a mobile computing device, and that can be repeated to indicate relative magnitude of a set of objectives. For example: swiping, tapping, shaking, tilting, etc. An effortful intuitive gesture may incorporate aspects of the gesture beyond repetition to further indicate valence or magnitude of a set of objectives, those aspects selected from the group of: speed of the gesture, intensity of the gesture, direction of the gesture, magnitude or length of the gesture, time between repeated gestures, and combinations thereof. Navigating and clicking with a computer mouse may not be an effortful intuitive gesture; the use of a mouse is typically not mastered by children until pre-school (age 3-4 or higher) and requires significant abstract thinking to map fine motor movements in one domain (a mouse on a surface) to movements of an icon in a different domain (a computer screen). Likewise, the use of a pencil, pen, stylus or similar writing instrument may not be an effortful intuitive gesture; such tools are not typically mastered till the age of 3-5 and require fine motor skills to translate formalized thoughts into an abstract symbol with socially specified meaning. An effortful intuitive gesture is expressive in nature and minimizes cognitive processing required to execute, thus reducing the likelihood of conscious processes asserting themselves in between pre-conscious thought processes (including impulses, feelings, perceptions, sentiments, associations, and emotions) and actions that create data to measure those pre-conscious thought processes.

A "time based intuitive gesture" is a gesture that can be easily mastered by a typical young toddler (age 1 to 2), can be made with ease on a mobile computing device, and that can be persisted to indicate relative magnitude of a set of objectives. For example: pressing and holding down a button, tilting a mobile computing device and holding it in place, sliding a button and holding it in place, etc. A time based intuitive gesture may incorporate aspects of the gesture beyond time to further indicate valence of a set of objectives, those aspects selected from the group of: speed of the gesture, intensity of the gesture, direction of the gesture, magnitude or length of the gesture, time between repeated gestures, and combinations thereof. Navigating and clicking with a computer mouse may not be an effortful intuitive gesture; the use of a mouse is typically not mastered by children until pre-school (age 3-4 or higher) and requires significant abstract thinking to map fine motor movements in one domain (a mouse on a surface) to movements of an icon in a different domain (a computer screen). Likewise, the use of a pencil, pen, stylus or similar writing instrument may not be an effortful intuitive gesture; such tools are not typically mastered till the age of 3-5 and require fine motor skills to translate formalized thoughts into an abstract symbol with socially specified meaning. A time based intuitive gesture is expressive in nature and consumes time from a respondent, thereby creating data to measure a respondent's depth of commitment to a more extreme response.

A "rapid intuitive gesture" is a gesture that can be easily mastered by a typical young toddler (age 1 to 2), can be made with ease on a mobile computing device, can be executed in 500 milliseconds or less by a typical person, and does not require interaction with multiple specific locations on a screen. Tapping, simple swiping, and double tapping can be rapid intuitive gestures. Dragging and dropping an object onscreen is not a rapid intuitive gesture since it takes more than 500 milliseconds and requires interacting with multiple specific locations on a screen. Navigating and clicking with a computer mouse may not be a rapid intuitive gesture; the use of a mouse is typically not mastered by children until pre-school (age 3-4 or higher) and requires significant abstract thinking to map fine motor movements in one domain (a mouse on a surface) to movements of an icon in a different domain (a computer screen). Likewise, the use of a pencil, pen, stylus or similar writing instrument is not a rapid intuitive gesture; such tools are not typically mastered till the age of 3-5 and require fine motor skills to translate formalized thoughts into an abstract symbol with socially specified meaning. An rapid intuitive gesture minimizes cognitive processing required to execute, thus reducing the likelihood of conscious processes asserting themselves in between pre-conscious thought processes (including impulses, feelings, perceptions, sentiments, associations, and emotions) and actions that create data to measure those pre-conscious thought processes.

A "gamified reaction" is an interaction initiated by the mobile computing device in reaction to a respondent's input to the device with the intended impact on the respondent selected from the group of: motivating a respondent, reinforcing a respondent's understanding of the objective, enhancing the respondent's understanding of the directions, stimulating a cognitive reward function within the respondent (for example, dopamine release), entertaining a respondent, enhancing a respondent's understanding of an activity involved in providing response data, enhancing a respondent's enjoyment of participating in the survey, changing a respondent's perception of time, altering a respondent's ability to consciously process stimuli presented in the survey, altering a respondent's ability to subconsciously process stimuli presented in the survey, altering a respondent's state of mind with respect to impulsivity or need for immediacy, and combinations thereof. A gamified reaction may utilize capabilities of the mobile computing device selected from the group of: a display, an audio output device, a vibrating motor, and combinations thereof.

A "derivative metric" is a quantification that is derived from a set of quantifiable values, typically using numerical algorithms or statistical processes, which perform an action selected from the group of summarizing the information contained in the quantifiable values, characterizing the information contained in the quantifiable values, and combinations thereof. For example: a mean, a median, a standard deviation, a mode, a maximum, a frequency, a duration, a distribution, etc.

An "interpretive framework" is a mapping of a set of derived metrics onto a set selected from the group of meanings, thresholds, implications, and combination thereof. One common example is: a set of benchmarking norms derived from historical distributions of derived metrics that provide business guidance relating to specific values for a particular set of derived metrics. Unlike a predictive framework, an interpretive framework does not necessarily predict outcomes.

A "predictive framework" is a set of algorithmic or mathematical mappings from of a set of derived metrics onto a set of predictions, wherein the predictions may relate to the future or to an outcome that an entity is trying to predict. A predictive framework is frequently trained on historical data. Common examples include: a statistical model to predict sales for a test product or service; a machine learning model to predict the success of a brand over time based on current brand affinity metrics; and a set of thresholds and heuristics the predict risk of brand atrophy. A predictive framework may or may not incorporate additional data (beyond a set of derived metrics) as an input to enhance a mapping of a set of derived metrics onto a set of predictions.

A "scale question" is a question for which data representing the answer can be recorded as a value on an ordinal or continuous scale. One common example is a 5 point Likert scale question, which is a question with possible answers of 1, 2, 3, 4, or 5, wherein the possible answers represent ordinal positions on a scale, and either the endpoints or all of the points on the scale are defined and described to a respondent. For example: "On a 5 point scale, where 5 means 'extremely likely" and 1 means "not at all likely", how likely are you to purchase this product?" A scale question may be presented to a respondent without specific instructions or text, so long as the answer structure conforms to the definition above. In addition, a scale question can have an answer that is not explicitly a value on an ordinal or continuous scale, as long as the data representing the answer can be recorded on an ordinal or continuous scale.

A "grid question" is a survey question structure (sometimes called a parent question structure) which contains a set of child questions, wherein the child questions share the same answer data structure, and the child questions are presented to the respondent in a manner that conveys that they are part of a group of questions with the same answer data structure. The most common type of grid question is a matrix question, which is frequently laid out on a single screen as a matrix wherein each row (or conversely each column) contains a question, and each column (or conversely each row) contains a possible answer field or answer value. Although frequently laid out as a matrix, the definition of a grid question does not require that a grid question is presented to the respondent as a matrix.

A "child question" is a question that is part of a grid question, that shares the same answer data structure as other child questions in the grid question, and that is presented to the respondent in a manner that conveys that it is one of a group of child questions with the same answer data structure.

A "rank question" is a question which pertains to a set of items, wherein data representing the answer can be recorded as a set of ordinal values that pertain to the set of items. For example, a rank question may ask a respondent to rank his or her top 3 brands out of 10 brands, and may record the answer as "1" for the top ranked item, "2" for the second ranked item, and "3" for the third ranked item.

A "partial rank question" is a rank question wherein only a subset of items that is smaller than the full set presented in the rank question are ranked.

A "multi-select question" is a question which pertains to a set of items, wherein data recording the answer indicates the selection of a set of items from the available set of items.

A "grouping question" is a question which pertains to a set of items and a set of groupings, wherein data recording the answer indicates for each grouping the set of items that was selected into that grouping.

A "group and rank question" is a grouping question wherein the data recording the answer also indicates the ranking of the items within each grouping.

A "grouping area" is an area of a screen that is designed to contain a set of groups of stimuli.

A "rich media response item" is an item that is presented to a respondent which maps onto a response value for a question, aspects of the item including a set selected from the group consisting of: image, animation, video, audio, and combinations thereof. A rich media response item may incorporate text or other features in addition to these aspects, provided that at least one of these aspects is present.

In the past decade alone, three exogenous trends have diminished the value of the insights from legacy surveys tools. The present invention helps researchers create improved insights, and its full value can be better appreciated in the context of these trends.

The first trend that has reduced the value of conventional survey methods and systems is a set of powerful streams of research in behavioral economics, psychometrics, and human psychology that have surfaced deep flaws with conventional survey approaches. The initially scattered and disorganized advances in these fields have been increasingly codified in lists of cognitive and behavioral biases that starkly lay bare the limits of stated response questions, and especially the types of formal questions that are typically asked in surveys. Seminal works in this field include Kahneman's *Thinking Fast and Slow* (Kahneman, *Thinking Fast and Slow*. Daniel. 2011. Farrar, Straus and Giroux, Dan Ariely's *Predictably Irrational* (Ariely, Daniel. *Predictably Irrational*. 2010. Harper Perennial), Levitt and Dubner's *Freakonomics* (Levitt, Steven and Stephen Dubner. *Freakonomics*. 2005. William Morrow), and Richard Thaler's *Misbehaving: The Making of Behavioral Economics* (Thaler, Richard. *Misbehaving: The Making of Behavioral Economics*. 2015. W.W. Norton & Company). This and other research has observed that human behavior is rarely rational. For example: people generally make sub-second decisions on minimal information (like facial features) that they then later rationalize, people are notoriously bad at assessing probability, people routinely discount time in a non-linear (hyperbolic) manner, people formulate allegedly "rationale" evaluations of things based on emotional feelings that they do not acknowledge (even to themselves), people make absolute decisions in a relative manner, people make major decisions based on short term emotional state of mind, people rely excessively on the opinions of others even when they do not acknowledge this (herding behavior), people subconsciously anchor or frame decisions even when presented with irrelevant information (like random numbers), and so forth. Confronted with overwhelming evidence of human irrationality, market research methods and systems have nonetheless continued to rely heavily on self-stated scale response systems and methods that explicitly deny these biases. There are some notable exceptions, such as U.S. Pat. No. 9,767,740 (Emotional Survey) which presents a respondent with an image or video under a severe time limit (under 1 second) followed by another severely time-limited response that is designed to prevent conscious cognitive reflection. These exceptions remain few and far between.

The second trend that has reduced the value of conventional survey methods and systems is the hypercompetitive nature of markets that now move at the speed of the internet, coupled with sophisticated providers of outsourced production capabilities. Brands no longer require vertically integrated production chains to rapidly deliver products, but can instead source materials, design a product, and deliver one to the market in record time. One major manifestation of this trend is the growing dominance of "store brands" that outsource product production, including new brands from retailers like Costco, Amazon, Kroger, and Walmart. Such "private label" brands now account for nearly 24% of total dollar value sales (and a higher percentage by weight since they generally are priced lower), and have been growing 500% faster than national brands. [Thakker, Krishna. "Mass retailer private label sales dominate national brands." *Grocery Dive*. Apr. 23, 2019.] Yet even the "high tech" space is affected: world-changing inventions (like the touch-screen iPhone) were copied within a short time frame of a couple years, with the copies often exceeding the original in terms of pure technical specifications. This dynamic has forced companies and other organizations to work harder to build competitive advantages through "softer" assets such as customer loyalty, brand advocacy, friendly service, reputation for innovation, membership groups with protected ecosystems, and other marketing priorities. Successfully competing has thus required that consumer insights teams dig much deeper than surface level observations that can reasonably approximate objectively measurable phenomena (like the horsepower of a car engine). Insights professionals now need to know what drives consumers and citizens to extremes of loyalty, what motivates them to abandon brands that they are generally not dissatisfied with, what types of "killer app" features would motivate them at a pre-conscious level, what they really think but cannot say due to social desirability bias or fear of repercussions, what exceeds expectations and creates customer delight, what drives emotional response and positive brand associations, and what generally influences decisions that we now know are often more emotional and intuitive than rational and deliberative. As the objective differentiation between products is compressed, the subjective differentiation between products and brands has become the marketing battlefield of the future. Legacy survey systems and methods are increasingly less useful on this battlefield.

The third trend that has reduced the value of conventional survey methods and systems is the growing sophistication of competing social research technologies like "big data" databases that collect and integrate passively collected behavioral data has further diminished the value of legacy survey systems and methods. The "bread and butter" uses of surveys from the latter 20th century often required the simple collection of information on readily observable and generally objective "facts". These types of measurements have been increasingly supplanted by databases that already contain this information and are ready for query on demand. We don't need to field an expensive survey to ask how many people own cars since we can gather that information through registration databases. We don't need to ask how many people own their homes outright or what the average home size is because we have databases that have aggregated this information from county records and other sources. Even critically important surveys, like the highly impactful Bureau of Labor Statistics Employment Survey, are increasingly challenged by other data sources that can be accessed earlier and more systematically, like the Challenger Job Cuts report which gathers filing data on layoffs or the ADP National Employment Payrolls Report that aggregates data from payroll software providers. As these legacy use cases for traditional surveys fade in value, the need for consistency with legacy measures diminishes relative to the need for new methods and systems to create impactful insights.

The upshot of all of these trends is that there has been a tremendous and growing need for improved survey interactions, methods, and systems for over a decade. This is particularly true for surveys that are delivered through the latest wave of technology, mobile computing devices. However, the survey research fields has almost completely failed to devise new interactions, methods and systems that simultaneously deal with the major limitations of these devices (like limited screen space) and also take full advantage of their unique capabilities.

Broadly, the embodiments of the present invention are a set of software user interfaces for surveys on mobile computing devices, and associated interactions, methods, systems, apparatus, software and analytical tools that gather improved data on mobile computing devices and create enhanced insights from this data. Although five named embodiments are discussed in this description, the present invention is in no way limited to these specific embodiments, and includes other related embodiments that would be apparent to one of ordinary skill in the art. The embodiments of the present invention have two primary benefits: they mitigate limitations due to the limited screen size of many mobile computing devices, and they take advantage of the integrated capabilities of these devices to gather better insights into the pre-conscious thought processes of respondents, including impulses, feelings, perceptions, sentiments, associations, and emotions.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Figure 2:
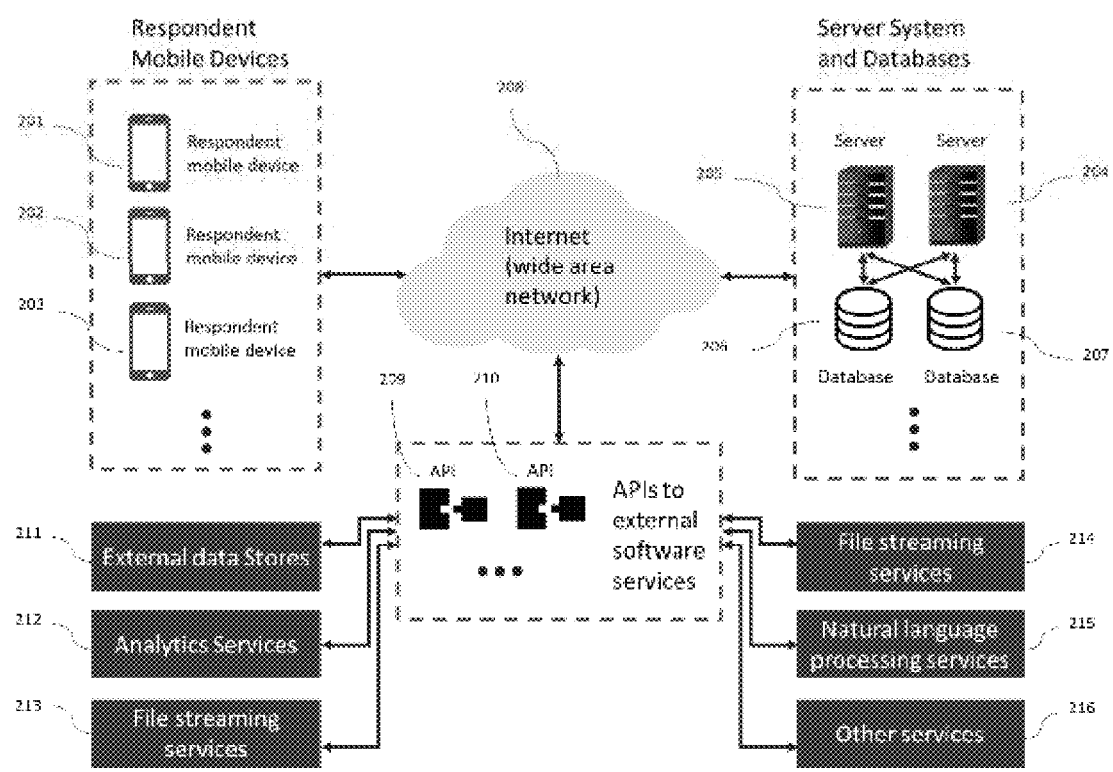
FIG. 2 is an example of a typical system configuration used in an embodiment of the present invention. In all figures, the icon with three dots indicates possible additional instances of an item in the figure.

Computer program logic implementing all or part of the functionality described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, Javascript, CSS, or HTML) for use with various operating systems or operating environments. One example system configuration is illustrated in FIG. 2, which shows several components that are connected through the internet. The respondents interact through their mobile devices 201, 202, 203, which may present interfaces embodied in software code. The software code might be executed within an internet browser (for example, in HTML 5, CSS, javascript, or other runtime executable code). The software code might alternatively be executed in a native mobile application, which can be implemented using a variety of software languages. The source code 301, 302, 303 may define and use various data structures 304, 305, 306 and communication messages or content 307, 308, 309. The source code may be in a computer executable form (e.g., via an interpreter), or the source code may be converted (e.g., via a translator, assembler, or compiler) into a computer executable form. The source code may be stored within another computer system and delivered when needed to a mobile computing device by this computer system, whereupon it may be interpreted and executed. In FIG. 2, for example, the software code to execute the present invention might be stored in the Server System in memory on the servers 204, 205, and in databases 206, 207 or in physical storage media until required. The code, as well as content to execute the code such as instructions, logic, configuration parameters, response items, and stimuli, might be transmitted to the mobile devices through a wide area network such as the internet 208 using protocols such as HTTP or HTTPS or another mechanism. One example is further described in FIG. 3. During execution, the present invention may communicate synchronously or asynchronously with the server system as needed. Additionally, the present invention may communicate with other systems to execute a variety of software services 211, 212, 213, 214, 215, 216, for instance by connecting to those services through an application program interface (or API) 209, 210. (Note that any reference to an "interface" should generally be considered referring to the present invention and not an API, unless specifically noted otherwise). Such an API might be exposed by another server system and require inputs and outputs to be exchanges in a particular format, such as XML, REST, or an alternative. The present invention may send data to the API for storage or processing, and may send downloadable code for execution on the mobile device 310, 311, 312, 313. Examples of such an interaction might include the mobile device receiving code and content for execution from a server system (right side), the mobile device causing the interface to be displayed, a respondent interacting with the interface and thus providing respondent response data, the interface sending a portion of that data to an software service API through the internet for processing (bottom), receiving further data from the software service API through the internet, causing further interactions with the respondent using this data, gathering further respondent response data, and then submitting data back to the original server system (right side) through the internet. Many variations on this generalized process are possible without changing the fundamental nature of the invention.

Figure 3:
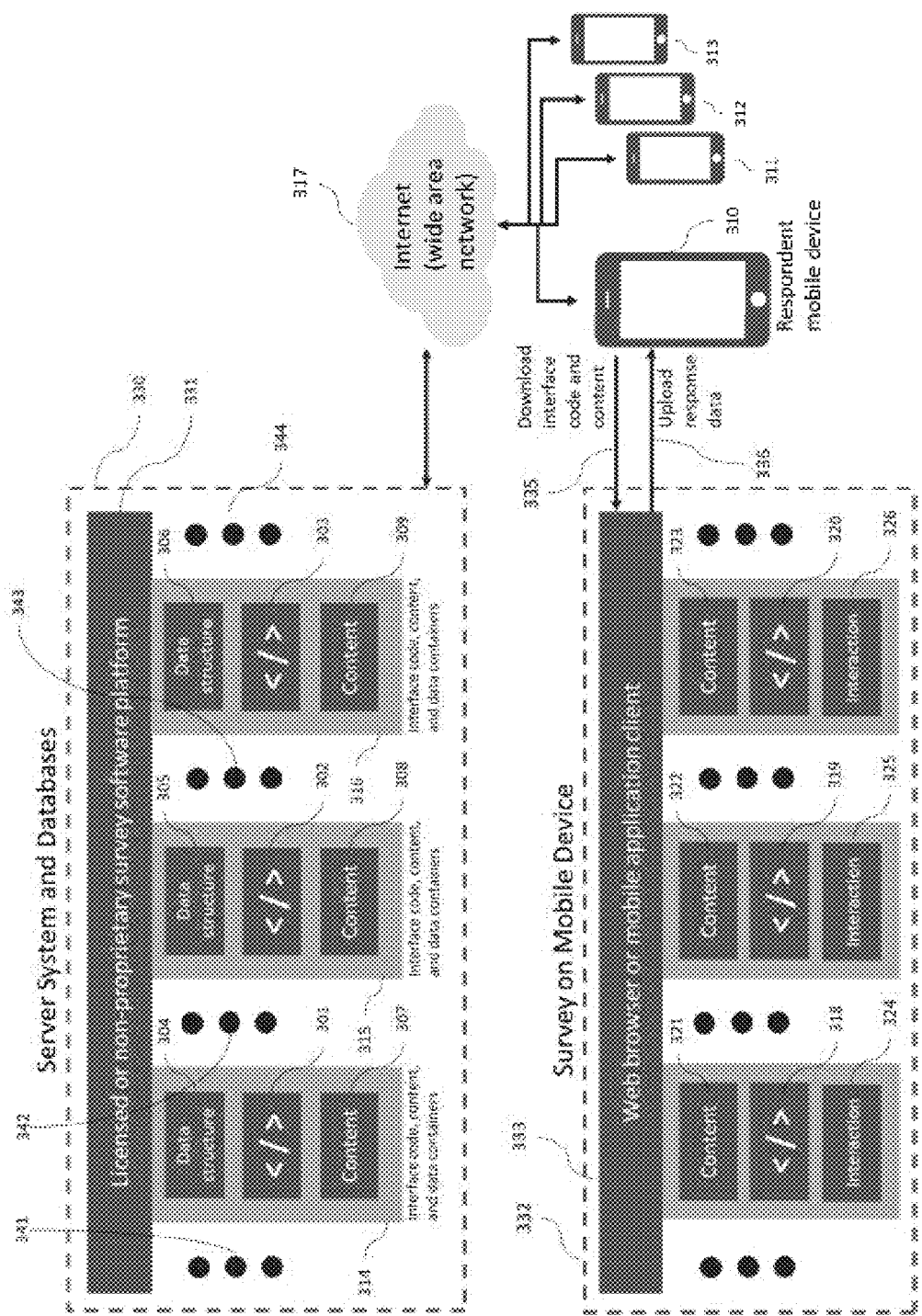
FIG. 3 is an example of a basic software process configuration used in an embodiment of the present invention which we call the Effortful Intuitive Gesture Scale Response Interface.

One example system to manage the source code on a survey software platform hosted in a server system, and deploy that source code and supporting content for a particular instance of the code for execution, is shown in FIG. 3. In the configuration of FIG. 3, the source code is held in a container on a licensed or non-proprietary survey software platform 331, which is configured on a server system coupled to databases 330. FIG. 3 shows three such containers 314, 315, 316, each having data structure 304 305, 360, interface source code 301, 302, 303, and content 307, 308, 309, including other survey questions and components 341, 342, 343, 344. Other configurations may host portions of the source code on other systems which are accessed when a piece of the code is executed. Many other configurations may be used without changing the nature of the present invention. The source code is delivered from the survey software platform via the internet 317 to a respondent mobile computing device 310, 311, 312, 313. The delivery mechanism may use a protocol such as HTTP or HTTPS, an application programming interface (API) such as XML or REST, or communication software shared by the server system and the mobile computing device. The containerized interface source code 318, 319, 320 and associated content 321, 322, 323 may be executed on a mobile web browser, a dedicated mobile application, or other hosting software 332, 333 on the mobile device. Upon receipt/download of the source code, associated content, and directions to implement the code 335, the hosting software on the mobile device uses the source code to execute the associated computer user interface interactions 324, 325, 326. During execution, the interface captures respondent interaction activity (e.g., gathers responses) from the respondent using an array of input devices that are native to most mobile computing devices, including a touch screen, a microphone, a video camera, a camera, an accelerometer, an infrared laser device, and combinations thereof. Response data is extracted from these interactions, transformed to match formats that can be stored in data structures connected to the interface, and uploaded 336 through the internet to the survey software platform or to another target location, such as an API connected to a software service. The survey software platform can then direct the user to a next component of a survey, which may include another embodiment of the present invention.

The computer program implementing all or part of the functionality previously described herein may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

FIG. 3 shows an example configuration for the software system described in FIG. 2 in relation to a single respondent mobile computing device. Many additional configurations may be used that do not change the essence of the present invention, and such configurations can involve other systems that are accessible through the internet. This figure shows the software process configuration as applied to a single mobile computing device, and can be replicated for other mobile computing devices that respondents use to participate in a survey. Notable, the present invention spans across multiple systems in various embodiments, and multiple embodiments can be incorporated into a single survey. Code that executes the interface is typically stored in an encapsulated format inside a survey platform, which may or may not be proprietary. A variety of survey platforms are suitable to host and deliver this code. The survey platform may manage multiple aspects of the survey delivery and respondent management, such as payment of participation incentives, mailing of reminders, and storing respondent response data in a database that is hosted on or connected a server system. In this example, code and content to execute the interface is delivered through the internet to a respondent's mobile computing device, whereupon the code is interpreted and executed by a software client such as an internet browser or mobile application. The interface then manages the interactions and captures response data, which is sent from the mobile computing device back up to a server system through the internet. Much of this data is sent back to the survey software platform where it is stored in a manner consistent with the data structures attached to the interface. Some of this data may be sent to other target locations or software services through APIs, depending on the need, and further processes can follow from there to return processed data back to the interface on the mobile device or to the survey platform for further action.

Embodiments of the present invention include presenting to a respondent on a mobile computing device user interface a set of response mechanisms, gathering responses from the respondent, recording these as respondent response data in a database, creating derived metrics from this data, and creating interpretive and predictive frameworks using data accumulated from a set of surveys.

Each of the named embodiments, variants of these named embodiments, and other embodiments that are not described herein but are apparent to one of ordinary skill in the art, may include a group consisting of:

Delivering a set of questions in a survey on a mobile computing device to a set of respondents;

Presenting to a respondent a set of directions, which may include a set of objectives;

Presenting to the respondent a set of stimuli in the context of a common set of directions and pertaining to a common set of objectives;

Providing the respondent with an available set of interactions on a software interface on a mobile computing device which, when executed by the respondent in a set of combinations or sequences, generate respondent response data;

receiving interactions from the respondent on the mobile computing device and storing respondent response data from these interactions on the device;

storing respondent response data and other metadata associated with the survey delivery in a database or other memory;

generating analytics results, including generating a textual or graphical summary of the respondent response data;

incorporating an embodiment into a survey of a plurality of respondents within a defined target group;

aggregating response data from a plurality of respondents, including a subset of any given plurality of respondents, to conduct analysis and create derived metrics;

aggregating response data and derived metrics from a plurality of respondents and a plurality of surveys to create interpretive frameworks and predictive frameworks;

developing business recommendations based on one or more of derived metrics, interpretive frameworks, and predictive frameworks; and combinations thereof.

Typical interpretive frameworks and predictive frameworks include the creation of derived metrics and the establishment of a database for those derived metrics. Such a database would contain historic information gathered from past surveys, including stimuli that were tested, the category of items and stimuli included in the survey, characteristics of the respondents, exogenous information about items (for example products, services, marketing campaigns, brands, and combinations thereof) associated with stimuli that is predictive of success (for example, distribution, advertising spend, awareness, duration in market, etc.), and exogenous information about items associated with stimuli that is indicative of success (such as sales, advertising response, household penetration, price premium, etc.). Such a database may be used for benchmarking derived metrics against historical norms or distributions. Standard methods may be used to establish relationships between derived metrics and other predictors and outcome metrics that are indicative of success, including trend analysis, multivariate regression analysis, machine learning tools, simulation methods, Bayesian prediction techniques, and artificial intelligence algorithms. Standard methods may also be used to characterize response to stimuli compared to a typical response to another set of stimuli that was tested in prior surveys to create norms or benchmarks. The set of comparable stimuli can be selected according a variety of methods, and historical norms or benchmarks may blind aspects of the stimuli they are based upon. Additional metrics may be derived to indicate likelihood or range of success based on any of the methods described above.

In one embodiment of the present invention, which we call the Effortful Intuitive Gesture Scale Response Interface, the responses to one or more stimuli may be ratings or scores (i.e. "scale responses") for one or more attributes of a stimulus, and the respondent responses are gathered using an interaction mechanism that requires a respondent to make one or more effortful intuitive gestures to indicate a strength and direction of response.

Figure 4:
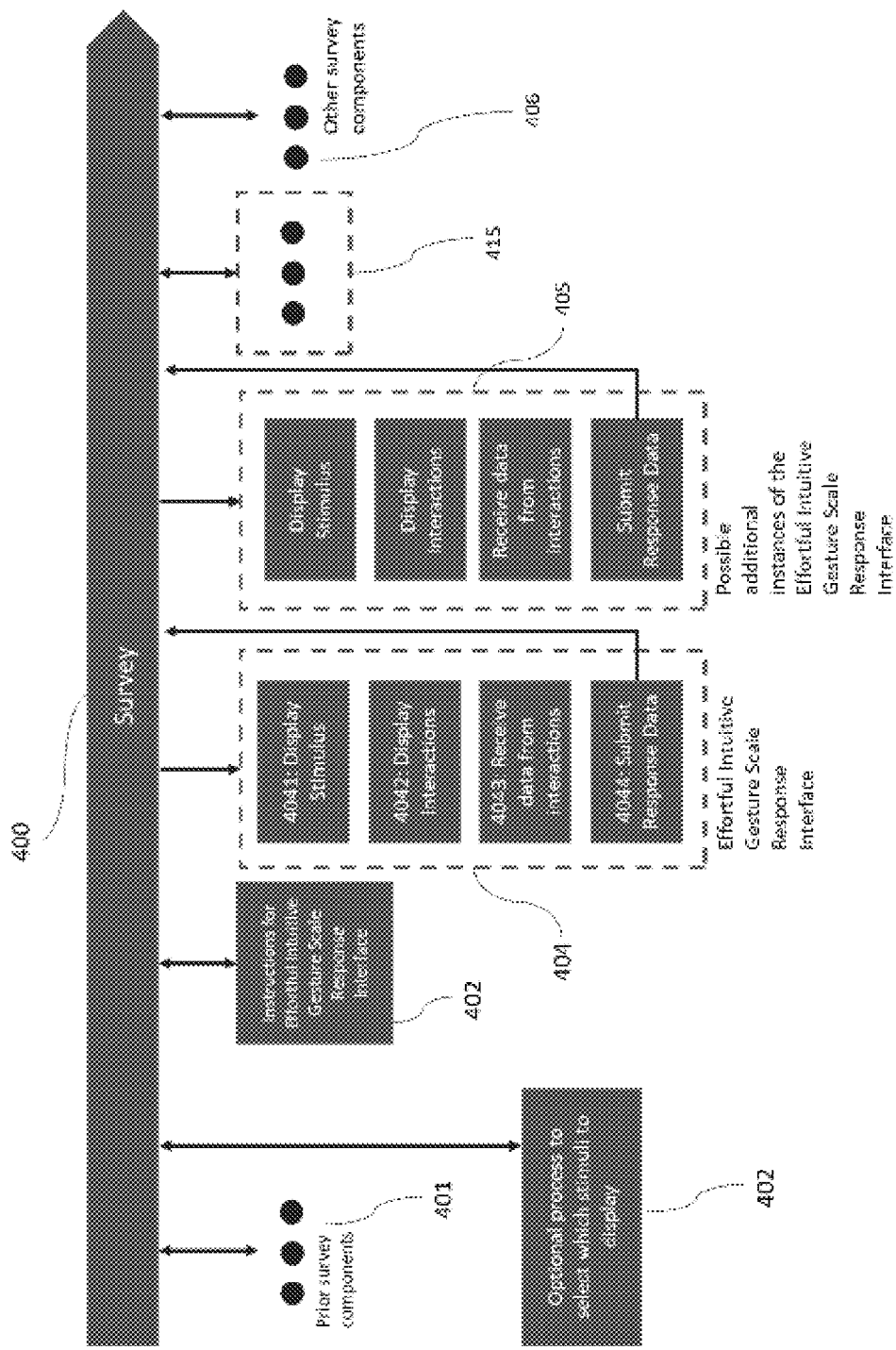
FIG. 4 is an example of a process for an Effortful Intuitive Gesture Scale Response Interface in accordance with an embodiment of the present invention, which is designed to gather scale response data using effortful intuitive gestures.

FIG. 4 illustrates an example process flow of this embodiment when it is embedded within a survey 400. In this example, a respondent may complete elements (components) of a survey 401 prior to engaging with the computer user interface. Various elements of that survey and responses to those elements may be used to select a set of stimuli to ask questions about 402. Such mechanisms to select questions to include are considered standard in the practice of survey creation. As such, the process flow may include an optional process to select which stimuli to display in a set of effortful intuitive gesture scale response interfaces. Before engaging with the Effortful Intuitive Gesture Scale Response Interface, a respondent typically receives an instruction screen (i.e. with instructions for the effortful intuitive gesture scale response interface) explaining how to interact with the forthcoming interface. The instructions may be shown as an overlay on the interface itself, or through other mechanisms 403. The respondent then engages a first instance of the interface 404 (which in FIG. 4 displays stimulus 4041, displays interactions 4042, receives data from interactions 4043, and submits response data 4044), and responds accordingly. The respondent may then engage further instances of the interface 405, 415, perhaps with one or more of different scale response attributes and different stimuli. The respondent may engage other questions or survey components 406 during the survey. As the respondent completes each instance of the interface, the interface receives interactions and respondent response data associated with those actions, and translate this data to a form which can be transmitted and stored in the survey system or another system that be accessed through the internet, for example through an API enabled software service. The interface then transmits the data and proceeds to either the next instance of the interface or to another component of the survey. Many variations on this process can exist without changing the nature of this embodiment of the present invention. For example, data may be captured locally on a mobile computing device for several instances of the interface at a time and then batch uploaded to a survey system, or the entire survey may be stored on a device and uploaded at a later time.

Figure 5:
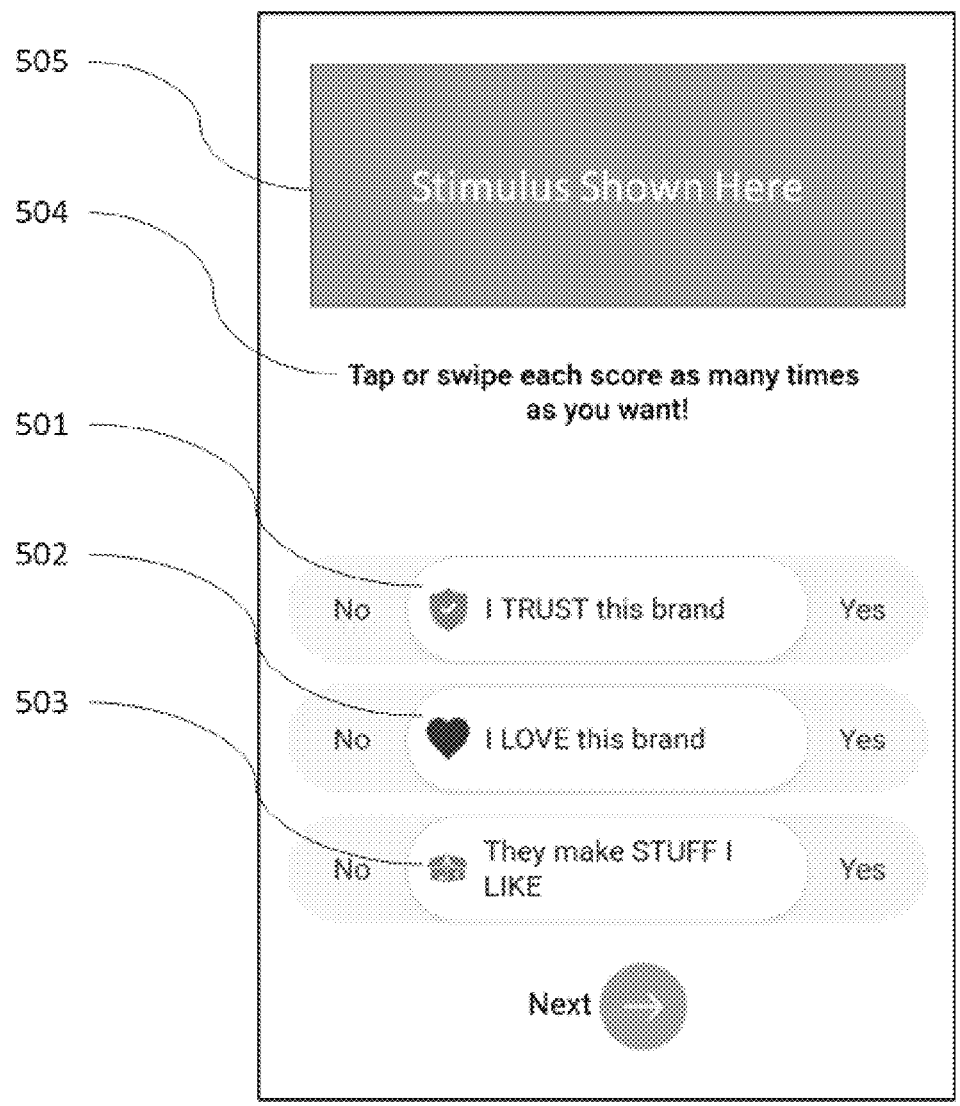
FIG. 5 is an example of a start state for an Effortful Intuitive Gesture Scale Response Interface in accordance with embodiment of the present invention, which is designed to gather scale response data using effortful intuitive gestures.

In the Effortful Intuitive Gesture Scale Response Interface in accordance with an embodiment of the present invention, the interface may provide feedback to a respondent, but does not provide directly accessible boundaries on a scale that can be selected by the respondent without the use of effortful intuitive gestures. FIG. 5, a starting screen, shows one example of this interface with a stimulus 505, instructions 504, and three dimensions 501, 502, 503. As noted, the full range of scores for any of these dimensions cannot be selected with a single interaction. By comparison, conventional interactions for gathering scale responses present the respondent with a scaled set of response options in which the values and boundaries are clearly defined, and any particular value of the scale can be selected with equal effort. FIG. 1 shows such a conventional example. Other examples of such conventional interactions include:

A fixed set of checkboxes or radio buttons for which the respondent must deliberately formulate a conscious response and then check a box, and in which each box can be selected with similar ease (an example of which is shown in FIG. 1)

A slider or line scale with anchored boundaries for which the respondent must deliberately formulate a conscious response and then select a position on the scale, and in which each position can be selected with similar ease A number-entry box for which the respondent must deliberately formulate a conscious response and then type in a numerical rating, and in which each numerical rating can be typed in with similar ease A drop-down list selector for which the respondent must deliberately formulate a conscious response and then select a rating from a drop-down list, and in which each numerical rating can be selected with similar ease The extensive flaws and biases associated with scaled response questions are well documented and described in the background.

Figure 6:
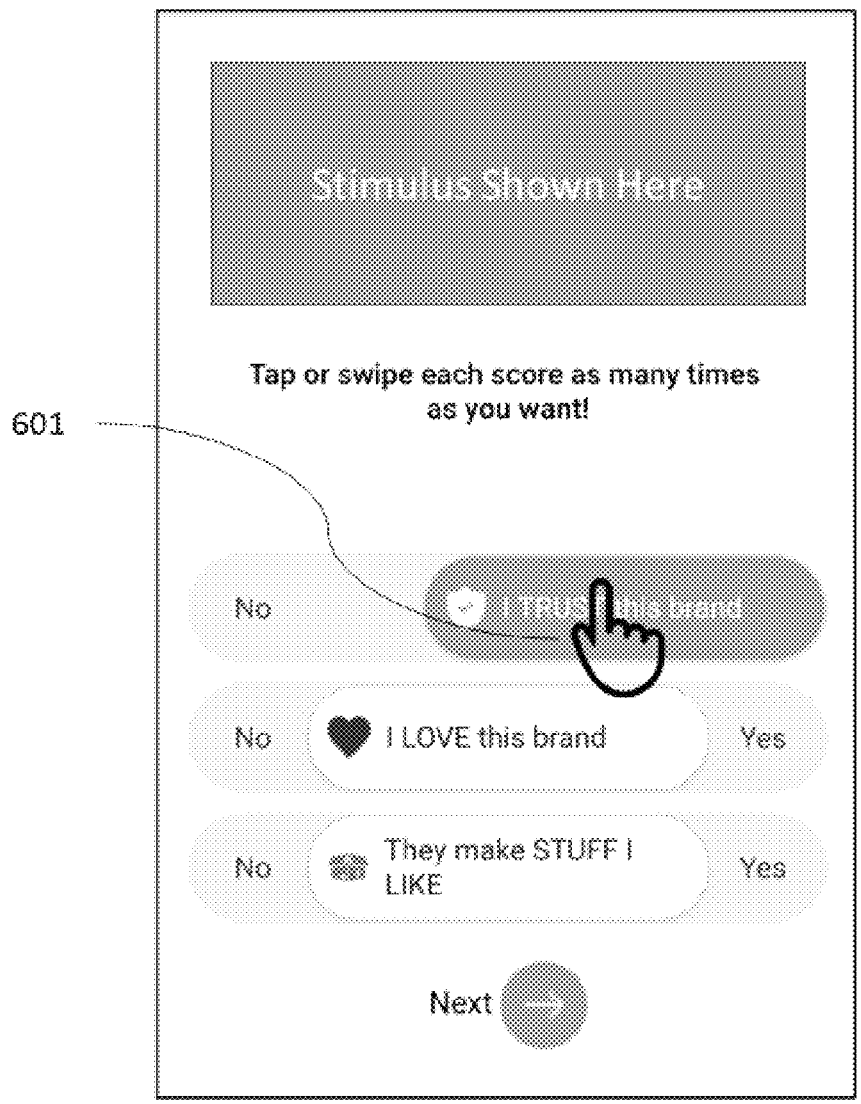
FIG. 6 is an example of a first gesture for an Effortful Intuitive Gesture Scale Response Interface used in an embodiment of the present invention.
Figure 7:
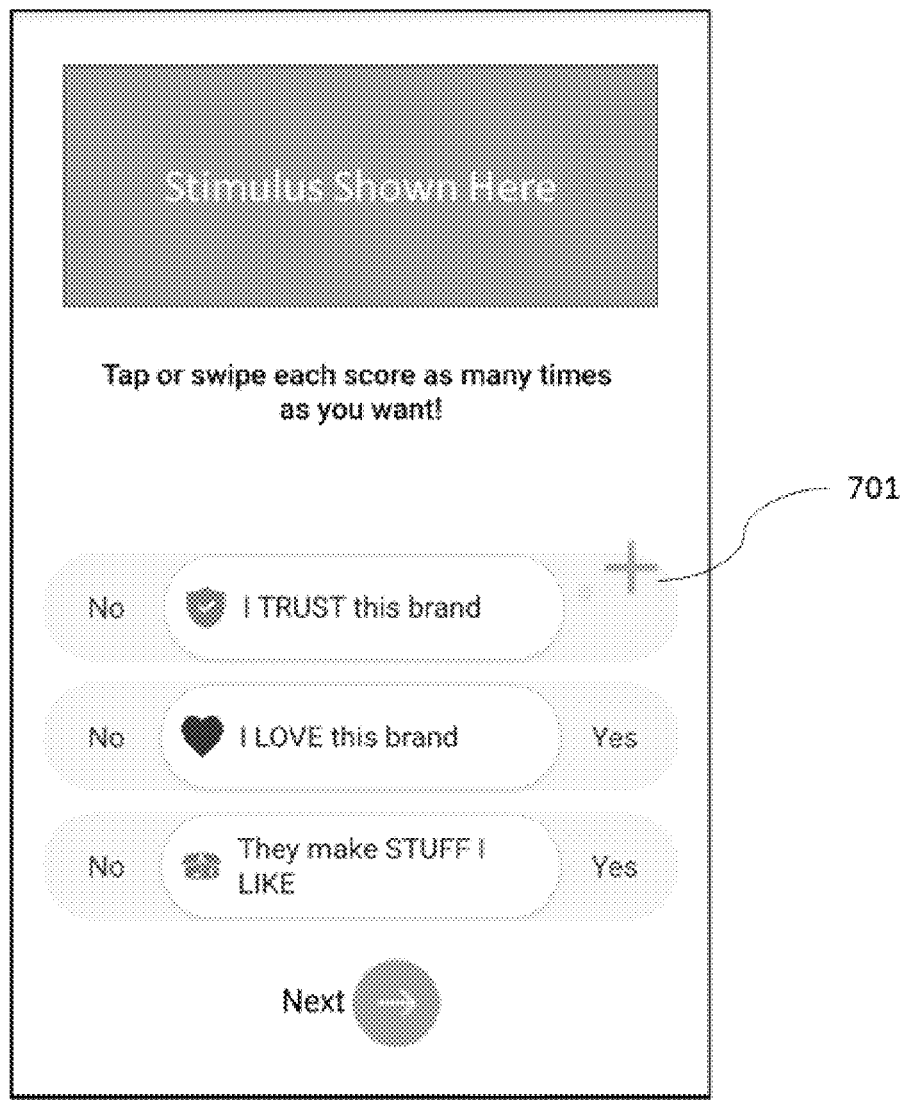
FIG. 7 is an example of a gamified reaction to the first gesture in an Effortful Intuitive Gesture Scale Response of FIG. 6, in which an animation indicates that the score for the first attribute has been incremented by one.
Figure 8:
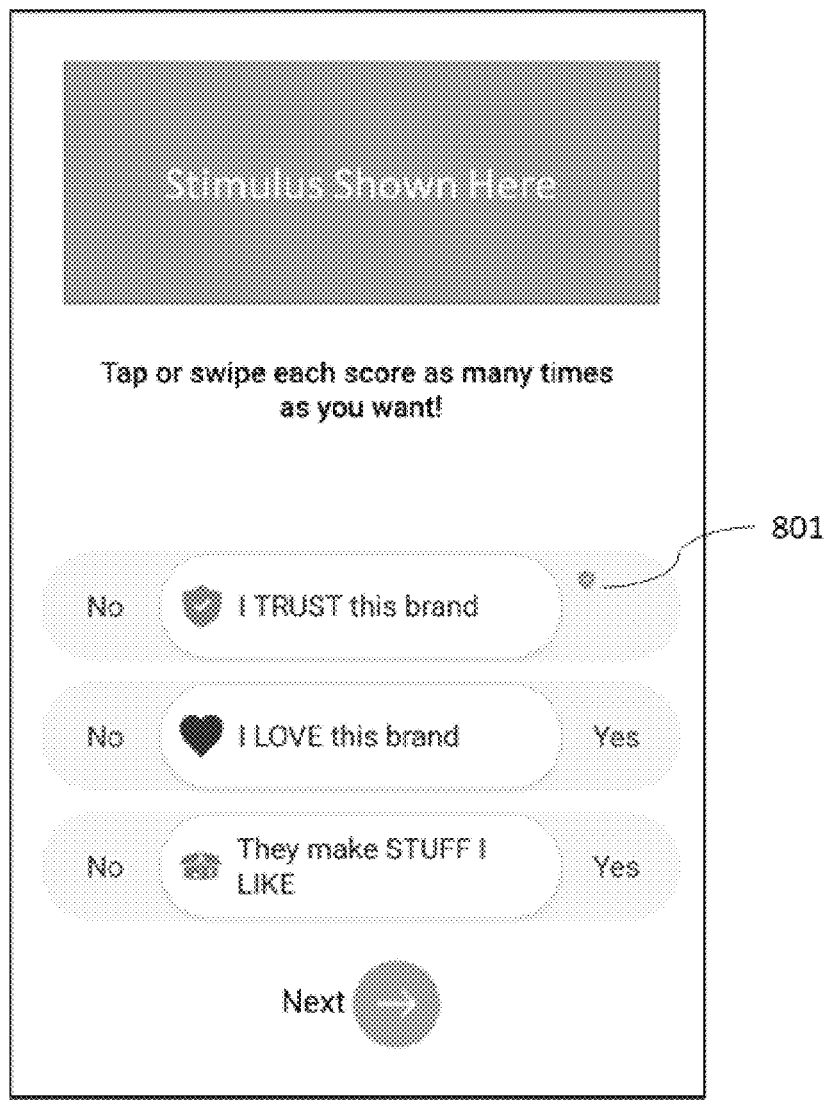
FIG. 8 is an example of an end state after a first gesture in an Effortful Intuitive Gesture Scale Response Interface in accordance with an embodiment of the present invention.

In the Effortful Intuitive Gesture Scale Response Interface in accordance with an embodiment of the present invention, scale response data are gathered by requiring respondents to physically express a response through a set of effortful intuitive gestures as defined in the Definitions section. Common examples are swiping, tilting, shaking, or tapping. FIG. 6 shows a user swiping to indicate a positive response. The hand icon 601 is not part of the interface, but merely indicates where a user might be touching and swiping the screen. FIG. 7 shows a gamified reaction to such a response 701. FIG. 8 shows a result 801 after the completion of the gamified response. The use of a computer mouse may not qualify as an effortful intuitive gesture for reasons described in the Definitions section. For example, if a respondent wants to indicate how much they like a brand, he or she may be asked to swipe repeatedly left (indicating disliking) or right (indicating liking). If the respondent wants to express a great deal of liking, he or she may need to execute the swipe several times, such as the example in FIG. 9 wherein the respondent has executed four effortful intuitive gestures expressing trust 901. Such an action is typically designed to be primitively expressive and thus a better measure of non-conscious responses (including impulses, feelings, perceptions, sentiments, associations, and emotions) to a stimulus. In the case of swiping, for example, the motion has been demonstrated to activate specific reward pathways in the human brain which trigger the release of dopamine at twice the rate of other types of actions that achieve the same result. [Yu, Christine. "What happens in the brain when we swipe right?" *Headspace.com blog*. Aug. 22, 2017.]

The Effortful Intuitive Gesture Scale Response Interface embodiment of the present invention is not limited to brands or products, but applies to many domains. Typical instructions for this embodiment of the present invention may include:

"Swipe right or left as many times as you want to tell us how much you trust or distrust <insert name of political candidate>."

"How likely are you to purchase this product? Swipe right as many times as you want to indicate a higher likelihood to buy it."

"How new and different is the <insert consumer product description> shown above? Swipe right as many times as you want to indicate how new and different is is."

In addition to the examples above, the Effortful Intuitive Gesture Scale Response Interface in accordance with an embodiment of the present invention, can include multiple scales on a single screen that pertain to a common stimulus, and can thereby be used to gathered respondent data that is consistent with a grid question data output structure. FIG. 5 through FIG. 15 provide examples in which three scale questions are asked for a given stimulus. Grid questions (defined above) generally rely on matrix presentations wherein each row represents a question, each column represents a response option, and the questions share the response options. Grid questions are frequently used to field batteries of scale response questions in the same survey. For example, a typical grid question may be presented to the respondent in a manner similar to that shown in FIG. 1.

Grid questions with scale responses suffer from even more problems than scale response questions alone, as described in the background. A grid of questions using the interface described in this embodiment of the present invention mitigates many of these problems. In one particular example of the Effortful Intuitive Gesture Scale Response Interface embodiment, shown in FIG. 5 through FIG. 15, respondents are much less likely to "straightline" responses (for instance, check the box for answer '4' on every question) or suffer from haloing (in which they subconsciously evaluate unrelated dimensions as being more similar due to a general "halo" effect of a brand) than under standard approaches because they would need to swipe four times for each child question (i.e. dimension). Instead, they are more likely to focus their swipes on statements they strongly agree with or disagree with, thus improving differentiation in responses within each grid. Likewise, respondents are more likely to provide stronger differentiation across multiple grid questions that compare different brands.

The use of effortful intuitive gestures to solicit responses to scale questions enables respondents to express views without cognitively reinforcing fixed boundaries (top and bottom), mitigates important biases (such as edge avoidance, extremism, haloing, and truncation), and engages respondents more thoroughly by employing natural physical gestures that help reduce the amount of formal cognitive processing involved in translating an emotional feeling or perception into a discrete number on a fixed number scale. As discussed in the definitions, an effortful intuitive gesture can be readily mastered by a young toddler and thus employs a different (and less formal) type of cognitive processing to translate pre-conscious thoughts (including impulses, feelings, perceptions, sentiments, associations, and emotions) into a numeric value, and then further translating that numeric value into a series of fine motor actions onto a page or device. The introduction of naturally expressive gestures has been shown to activate specific cognitive reward pathways (such as releasing dopamine) and reduce conscious processing time.

Figure 14:
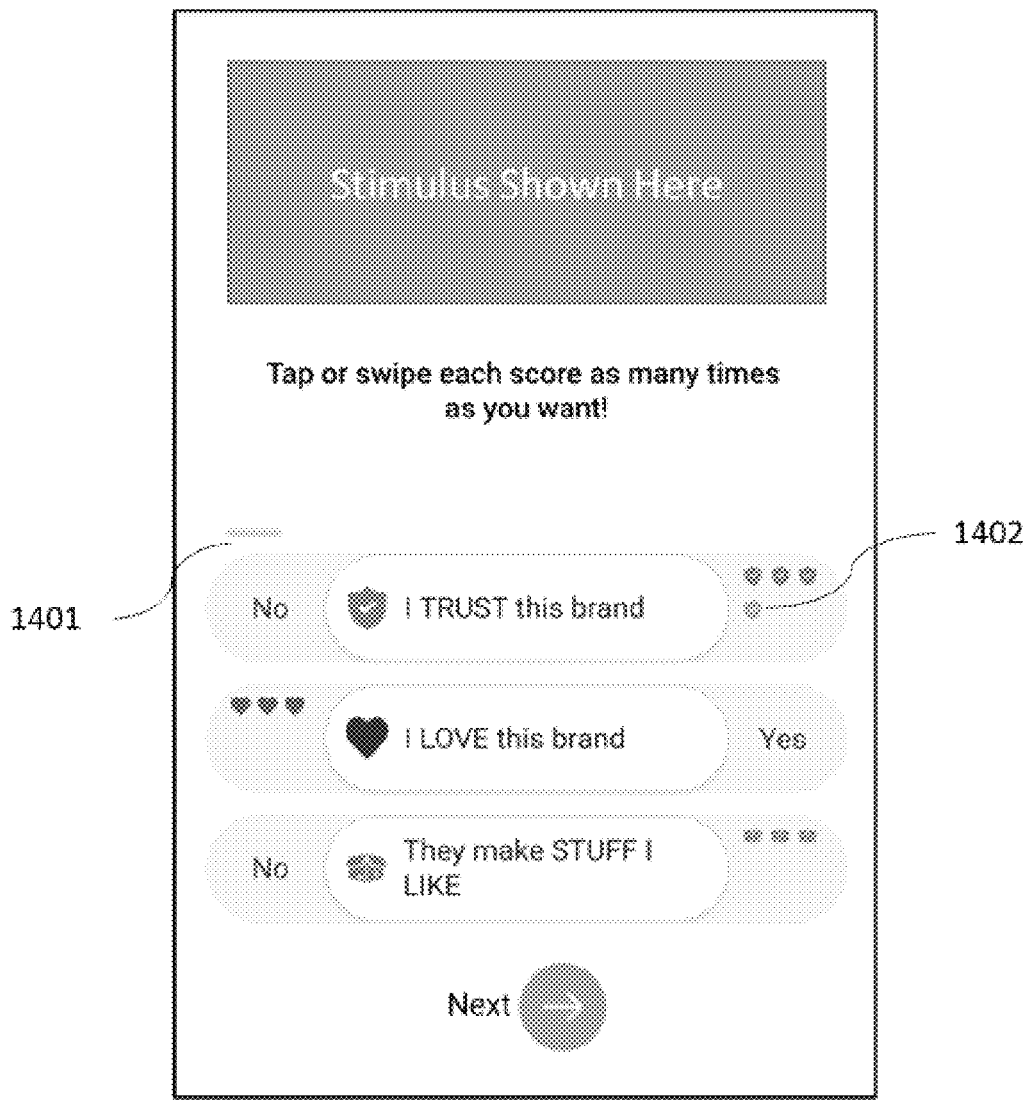
FIG. 14 is an example of a gamified reaction to a gesture in an Effortful Intuitive Gesture Scale Response Interface of FIG. 10 in accordance with an embodiment of the present invention, in which an animation indicates that the score for the first attribute has been decremented by one after the first attribute has received four positive responses.

In another example of the Effortful Intuitive Gesture Scale Response Interface in accordance with an embodiment of the present invention, the respondent interface can respond to a respondent's effortful intuitive gesture with a gamified reaction, such as an animation to positively or negatively reinforce the action. FIG. 7 and FIG. 14 show examples in which animated "+" and "−" symbols appear and float away in response to swipes. Although gamified reactions are not necessary to the present invention, such responses can further enhance the cognitive reward functions associated with expressing pre-conscious thoughts. This is only one example of the types of gamified reactions that could be used. There are innumerable other examples, such as: pulsing larger versions of an icon that fade, causing icons to zoom into the interface, displaying fireworks, emitting sounds, showing flashing colors on the screen, vibrating the mobile computing device, winking, and many others, including various combinations of these, which would be apparent to one of ordinary skill in the art.

Figure 9:
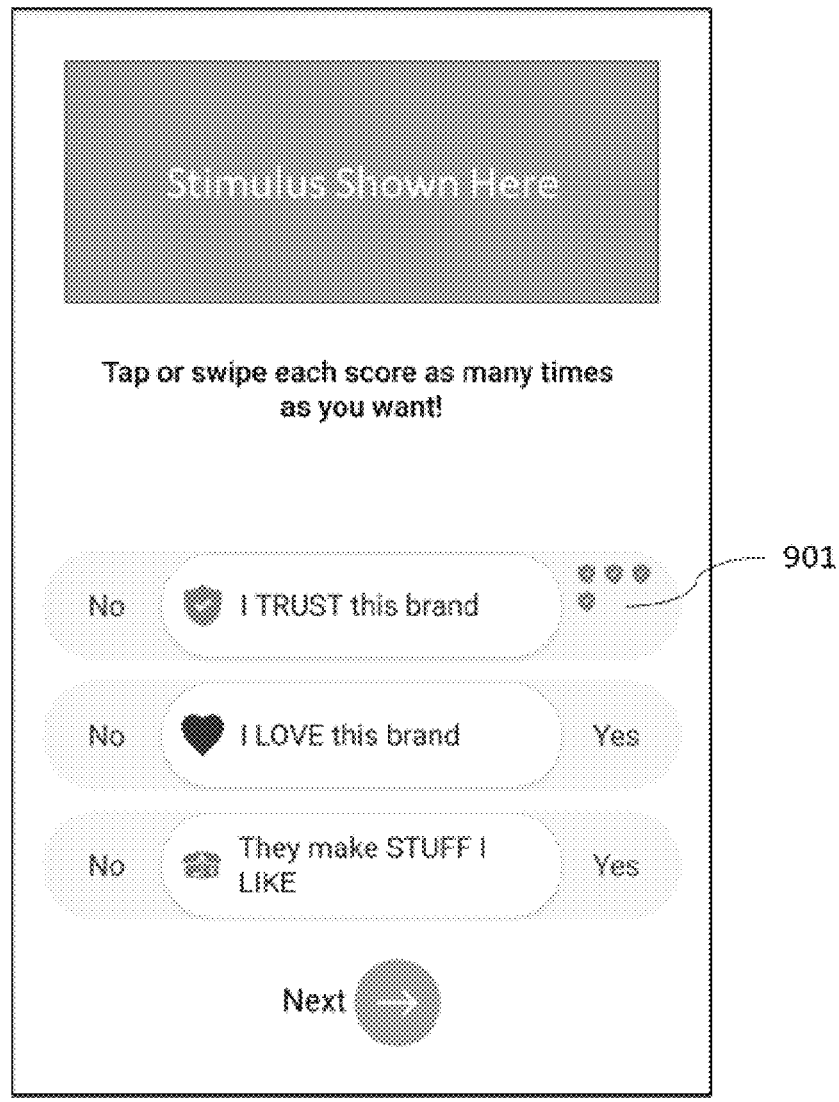
FIG. 9 is an example of an end state after a fourth gesture in an Effortful Intuitive Gesture Scale Response Interface in accordance with an embodiment of the present invention indicating trust for the brand.
Figure 10:
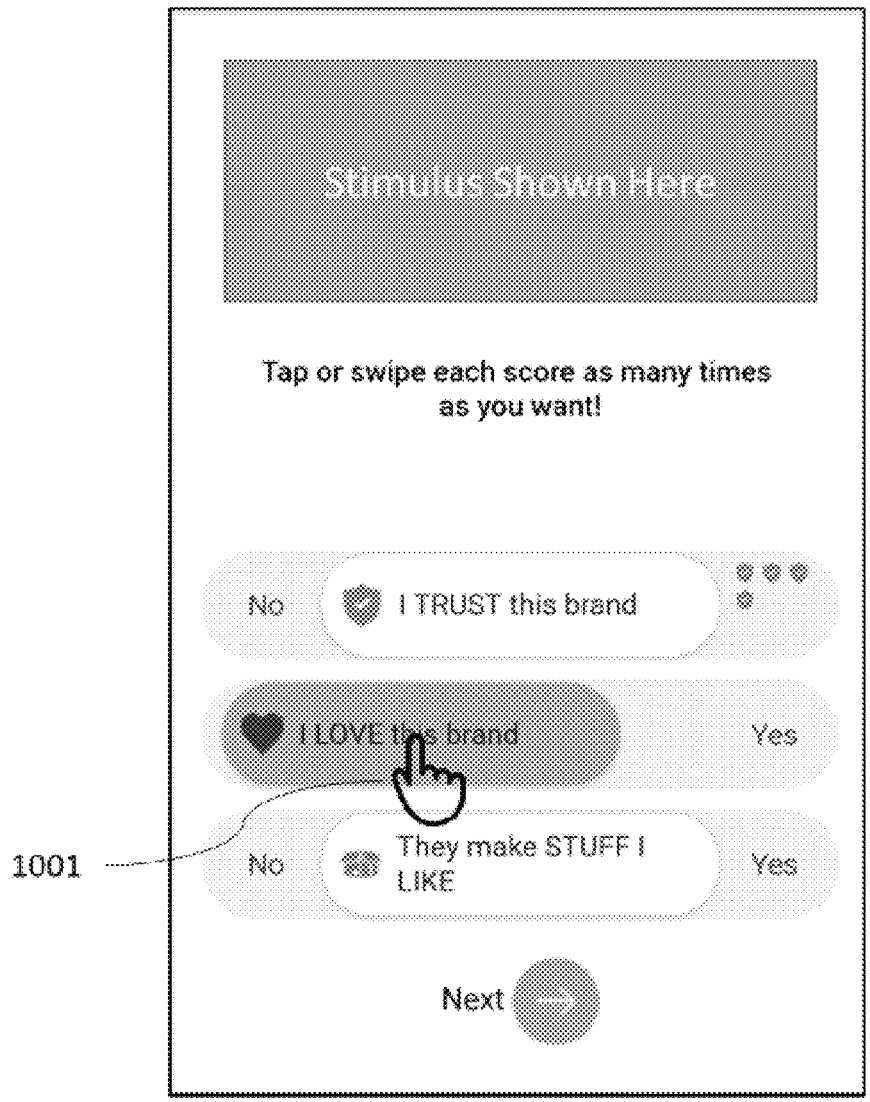
FIG. 10 is an example of an Effortful Intuitive Gesture Scale Response Interface in accordance with an embodiment of the present invention in which a respondent executing an effortful intuitive gesture is indicating a negative response on a second attribute.
Figure 11:
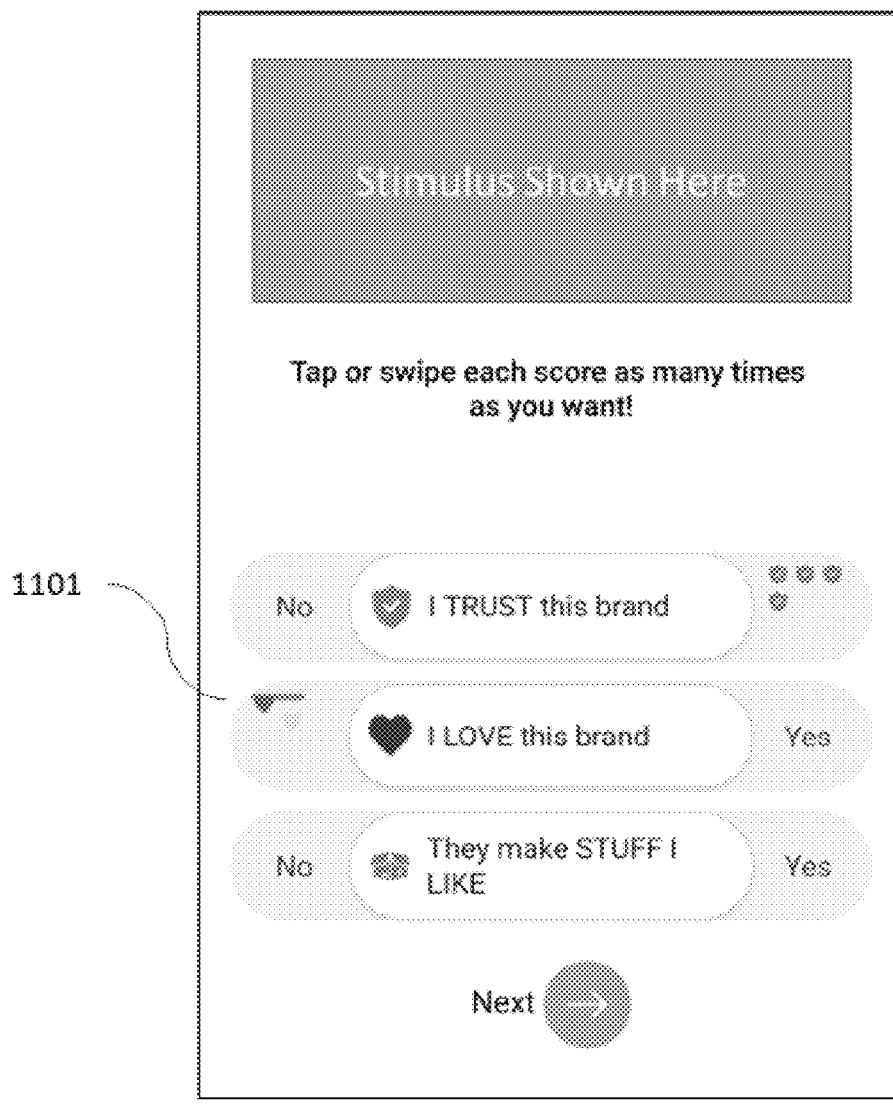
FIG. 11 is an example of a gamified reaction to a gesture in an Effortful Intuitive Gesture Scale Response Interface of FIG. 10, in which an animation indicates that the score for the second attribute has been decremented by one.
Figure 12:
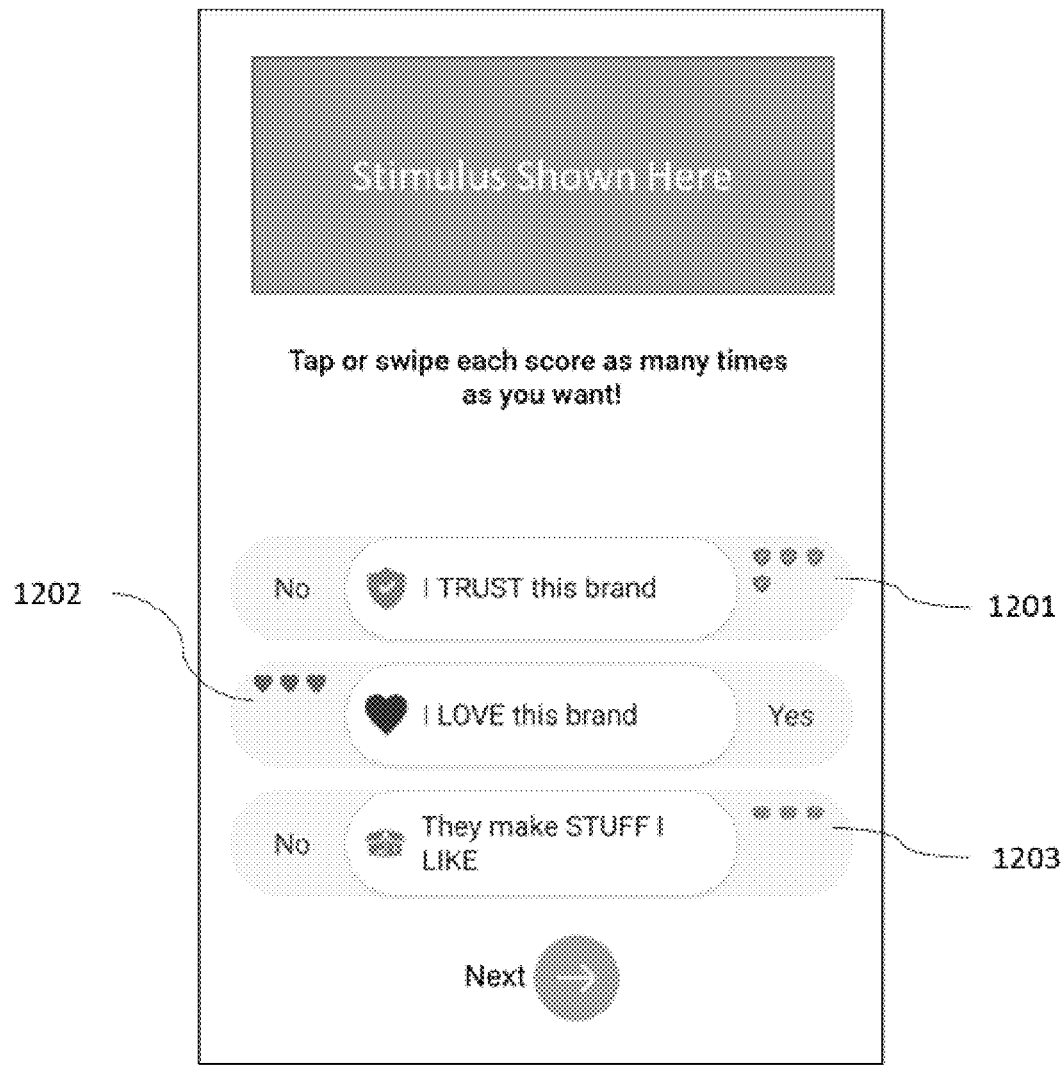
FIG. 12 is an example of an end state in an Effortful Intuitive Gesture Scale Response Interface in accordance with an embodiment of the present invention after the respondent has executed four gestures indicating positive response for the first attribute, three gestures indicating negative response for the second attribute, and three effortful intuitive gestures indicating a positive response on the third attribute.
Figure 13:
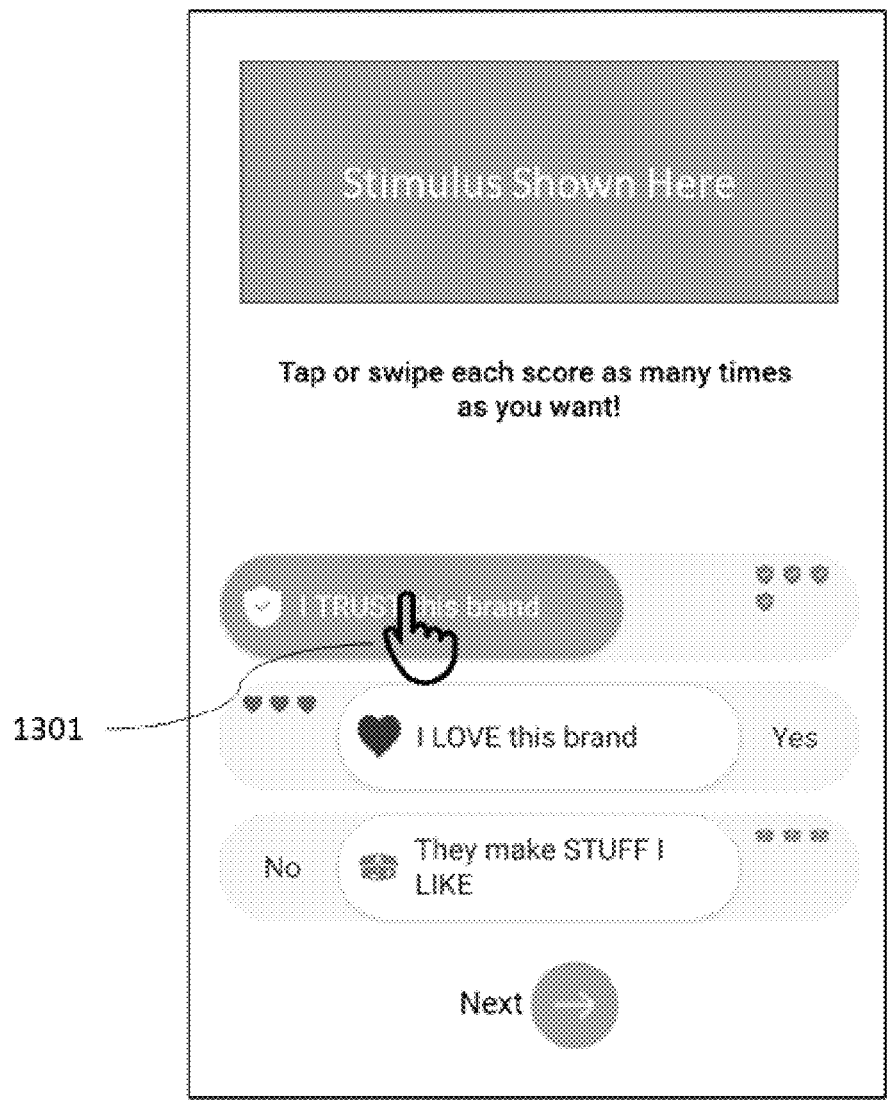
FIG. 13 is an example of an Effortful Intuitive Gesture Scale Response Interface in accordance with an embodiment of the present invention in which a respondent is executing an effortful intuitive gesture indicating a negative response on the first attribute after the first attribute has received previous positive responses.
Figure 15:
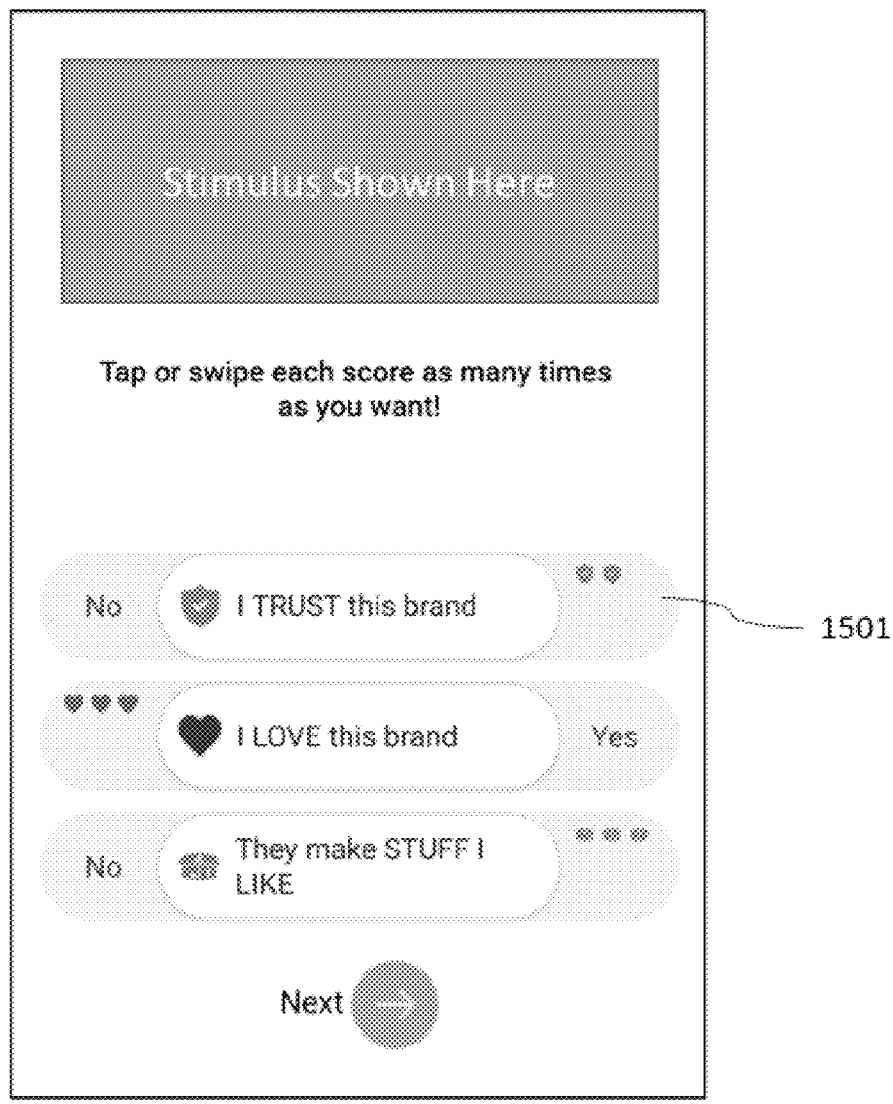
FIG. 15 is an example of an end state in an Effortful Intuitive Gesture Scale Response Interface in accordance with an embodiment of the present invention after a respondent has made two effortful intuitive gestures to decrement the score on the first attribute from the status observed in FIG. 12.

Continuing with the example of FIG. 5, the next several figures show a series of interactions and states for this example interface. FIG. 6 shows an initial positive swipe on the first dimension, with the hand icon indicating the respondent's gesture. FIG. 7 shows a gamified reaction to this gesture, in which a 'plus' sign appears, floats away, and is replaced by an icon indicating that the score has been incremented by one. FIG. 8 shows an end state after this first gesture 801. FIG. 9 shows an end state after four such positive gestures 901. In FIG. 8 and FIG. 9, the display is configured to reflect up to nine positive or nine negative effortful intuitive gestures, however the total permitted number of effortful intuitive gestures can be a different number (or even unlimited) without changing the nature of the invention. FIG. 10 shows a negative swipe on the second dimension with the hand icon indicating the respondent's gesture 1001. FIG. 11 shows a gamified reaction to the negative gesture 1101, in which a 'minus' icon appears, floats away, and is replaced by an icon that is shaded differently from the positive icon. FIG. 12 shows an example of an end state after the respondent has executed four effortful intuitive gestures indicating positive response for the first dimension 1201, three effortful intuitive gestures indicating negative response for the second dimension 1202, and three effortful intuitive gestures indicating a positive response on the third dimension 1203. FIG. 13 shows an example of a respondent executing a gesture 1301 to decrement the first dimension by one by swiping left after having given the stimulus four positive gestures for that dimension. FIG. 14 shows the gamified reaction 1401 in response to the action taken in FIG. 13, indicating the loss of an icon, which fades out from the right side of the dimension 1402. FIG. 15 shows an example of an end state after a respondent has made two effortful intuitive gestures to decrement the score on the first dimension 1501 from the status observed in FIG. 12.

In another embodiment of the present invention, which we call the Rich Media Grid Interface, respondent response data to a set of stimuli is gathered by means of a set of interactions in which the response options are rich media response items. The data structure of the respondent response data is similar to the data that may be gathered from a grid or matrix question. However, currently available interfaces for grid or matrix questions are entirely unable to handle large sets of rich media response items (like images), particularly in a situation in which the grid child questions are also represented by rich media stimuli.

Figure 16:
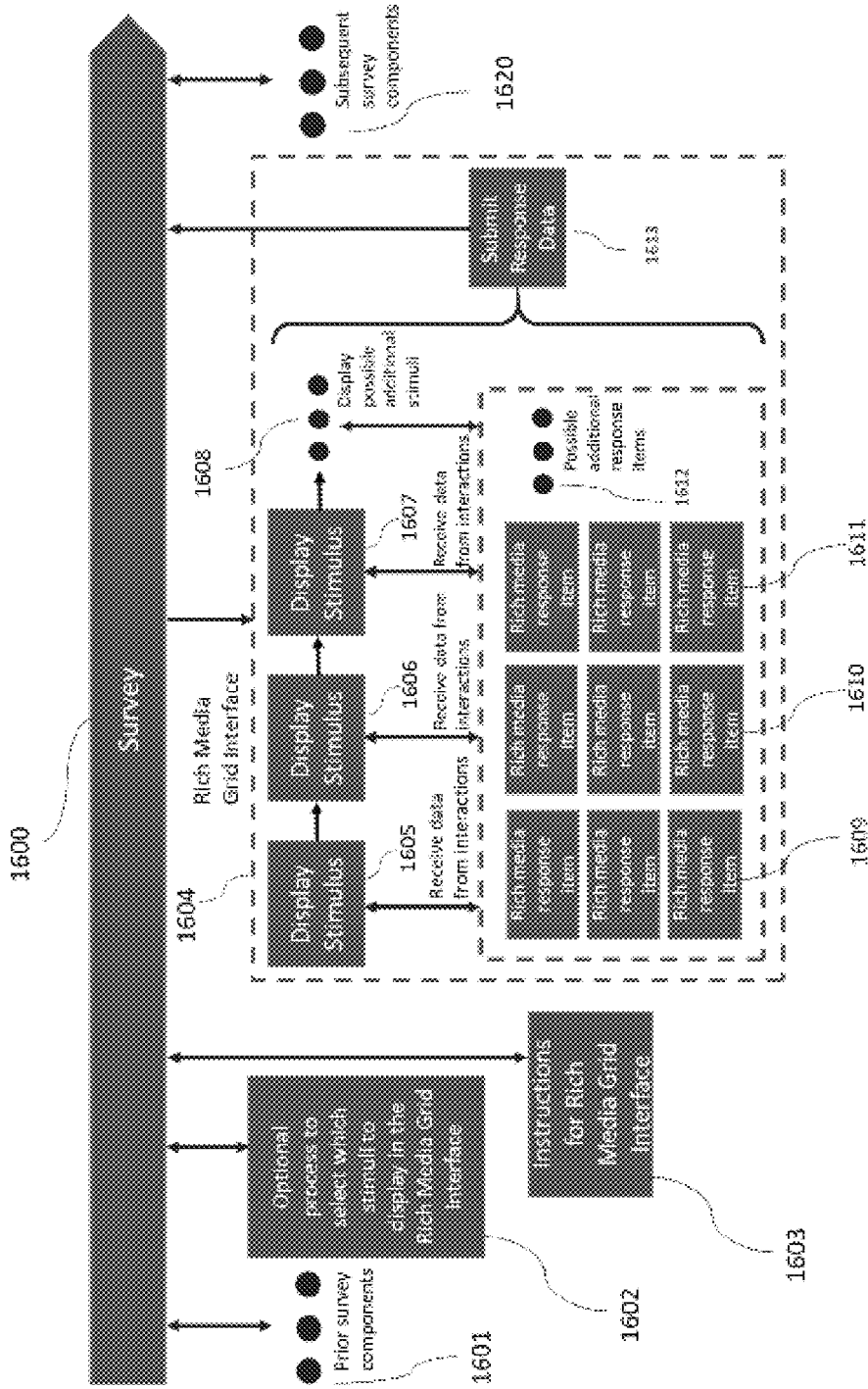
FIG. 16 is an example of a basic software process configuration used in an embodiment of the present invention which we call the Rich Media Grid Interface.

FIG. 16 illustrates an example process flow of this embodiment when it is embedded within a survey 1600. In this example, a respondent may complete elements (components) 1601 of a survey prior to engaging with the computer user interface. Various elements of that survey and responses to those elements may be used to select a set of stimuli to ask questions about. Such mechanisms to select questions to include are considered standard in the practice of survey creation. As such, the process flow may include an optional process 1602 to select which stimuli to display in a set of effortful intuitive gesture scale response interfaces.

Figure 17:
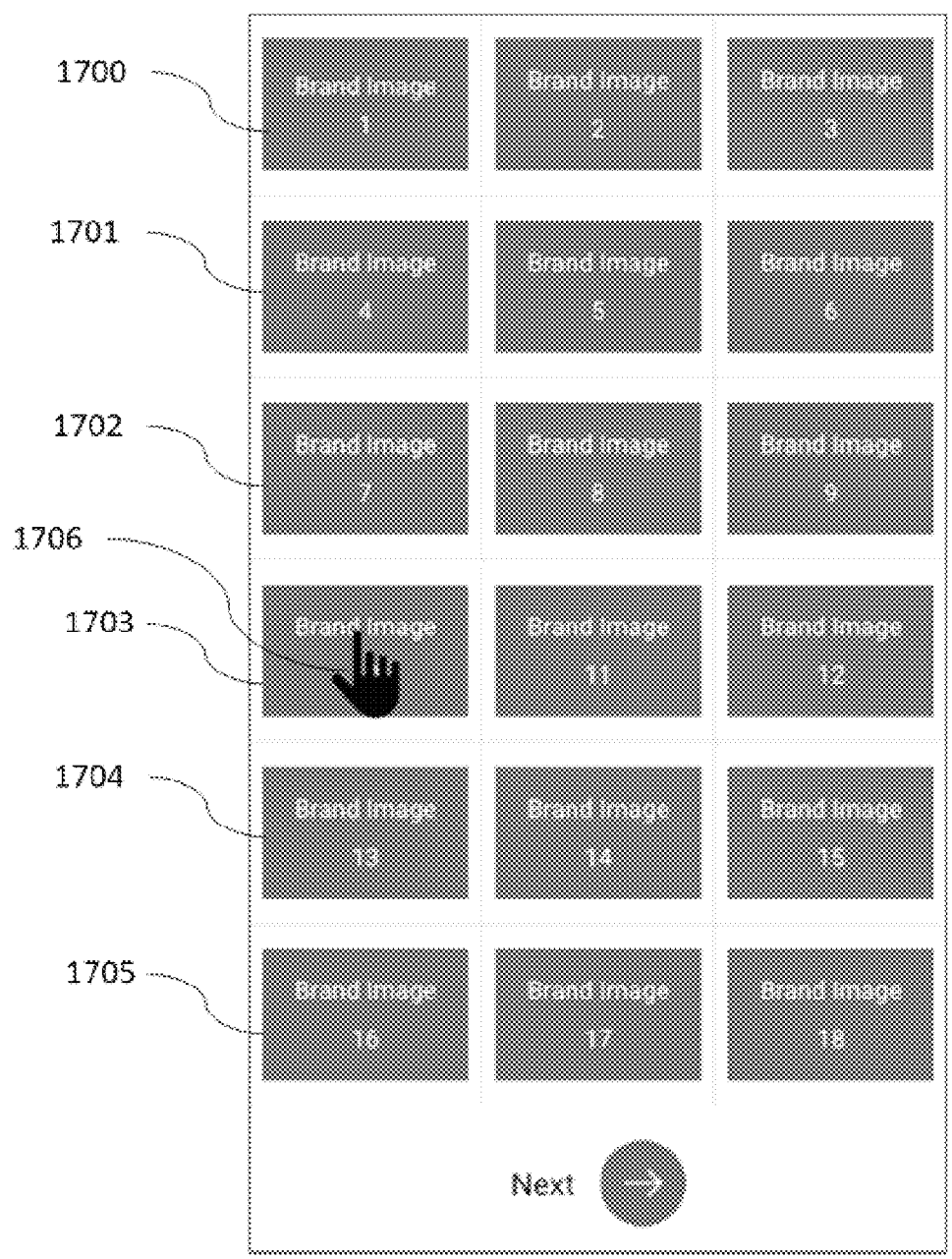
FIG. 17 is an example of a predecessor question for a Rich Media Grid Interface in accordance with an embodiment of the present invention which is designed to provide the efficient gathering of response data on a mobile computing device with limited screen space for a grid question that uses rich media stimuli in the questions and rich media response options. This predecessor question is an example of a question that may be used to select a subset of stimuli to indicate which questions to ask in the subsequent grid question.
Figure 18:
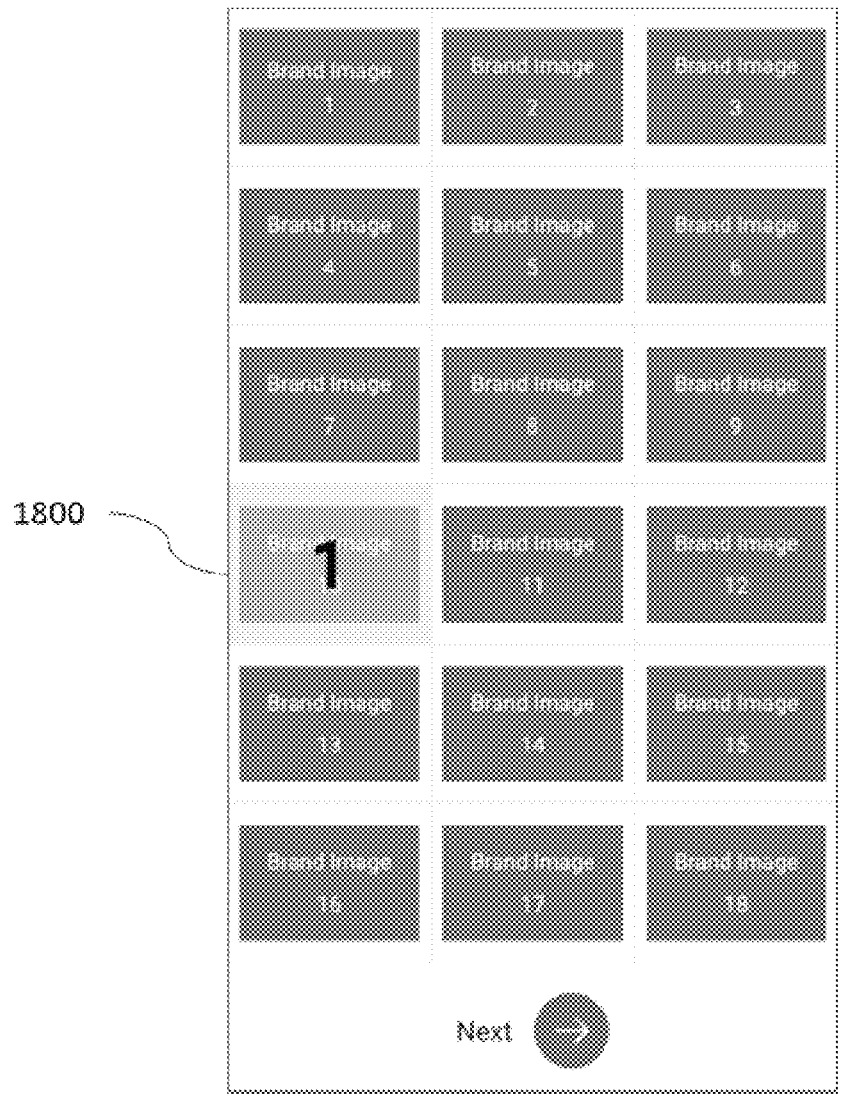
FIG. 18 is an example of a predecessor question for a Rich Media Grid Interface in accordance with an embodiment of the present invention with a first selection having been made.
Figure 19:
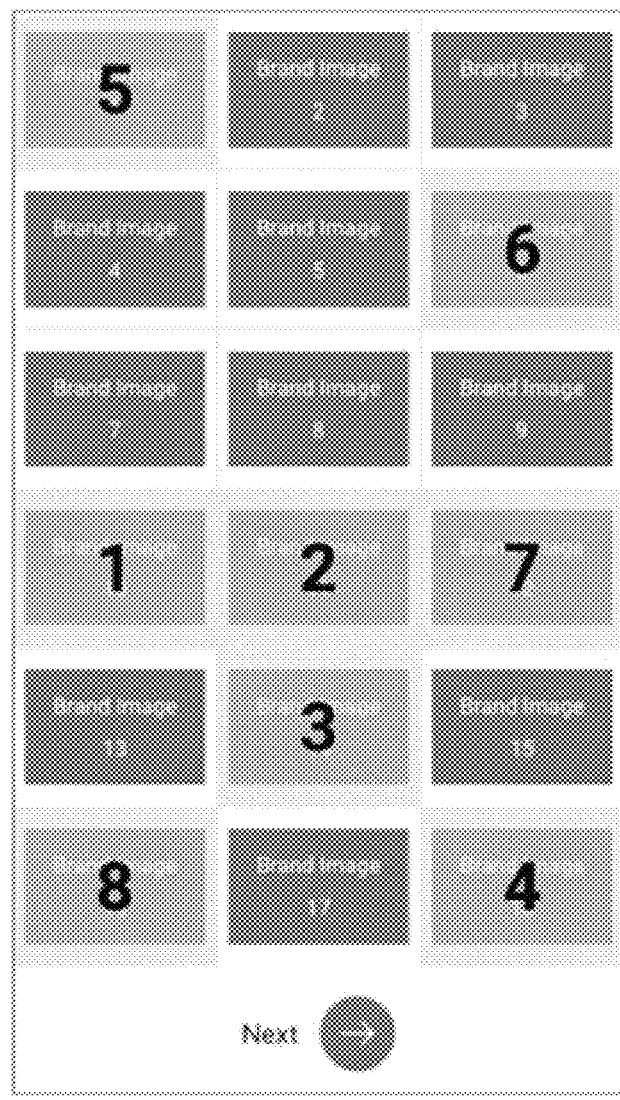
FIG. 19 is an example of a predecessor question for a Rich Media Grid Interface in accordance with an embodiment of the present invention with several selections having been made, and the rank order of those selections being shown.
Figure 20:
FIG. 20 is an example of instructions for a forthcoming grid question using a Rich Media Grid Interface in accordance with an embodiment of the present invention.

Before engaging with the rich media grid interface 1604, a respondent typically receives an instruction screen 1603 with instructions for the forthcoming interface. The respondent then engages the interface, which in FIG. 16 displays one or more stimuli 1605, 1606, 1607, 1608 and receives data from respondent selections of one or more rich media response items 1609, 610, 1611, 1612 to submit response data 1613. The interface receives interactions and respondent response data associated with those actions, and translates this data to a form which can be transmitted and stored in the survey system or another system that may be accessed through the internet, for example through an API enabled software service. Upon completion of the Rich Media Grid Interface the survey may continue with other survey elements 1620. FIGS. 17, 18, and 19 show an example of a predecessor question that is being used to select which stimuli (and thus, which associated child questions) to show in the example of the Rich Media Grid Interface. FIG. 17 shows a respondent selecting a stimulus 1706 from a set of stimuli including 1700, 1701, 1702, 1703, 1704, 1705 and other stimuli, with the hand icon indicating a touch gesture. FIG. 18 shows the predecessor question with the first stimulus being selected. FIG. 19 shows the predecessor question with eight stimuli selected, in which the numbers indicate the order of selection. Embodiments of the present invention provide many other mechanisms for selecting which child questions to show in a grid. A respondent may then receive an instruction screen explaining how to interact with the forthcoming interface, as shown in FIG. 20. The instructions may be shown as an overlay on the interface itself, or through other mechanisms. The respondent then engages a first instance of the interface 1604 and responds accordingly. The respondent may then engage further instances of the interface, perhaps with different scale response dimensions or different stimuli (associated with child questions) or both. As the respondent completes each instance of the interface, the interface receives interactions and respondent response data associated with those actions, and translate this data to a form which can be transmitted and stored in the survey system or another system that may be accessed through the internet, for example through an API enabled software service. The interface then transmits the data and proceeds to either the next instance of the interface or to another component of the survey. Many variations on this process can exist without changing the nature of this embodiment of the present invention. For example, data may be captured locally on a mobile computing device for several instances of the interface at a time and then batch uploaded to a survey system, or the entire survey may be stored on a device and uploaded at a later time.

Figure 21:
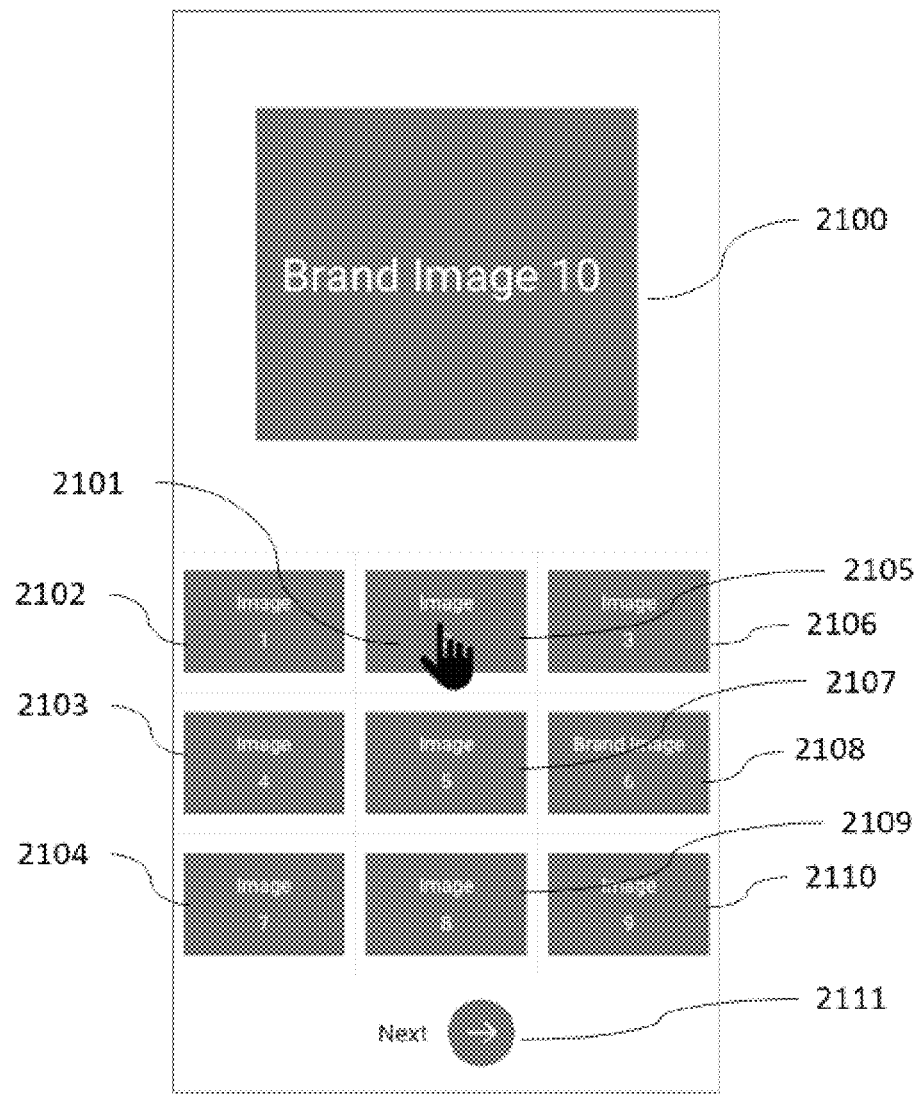
FIG. 21 is an example of a first child question in a grid question using a Rich Media Grid Interface in accordance with an embodiment of the present invention, in which a first stimulus (in this case, one of those selected from a predecessor question such as shown in FIGS. 17, 18, and 19) is shown and a user has been asked to select one or more images from a set of rich media response items below which he or she most closely associates with the stimulus.
Figure 22:
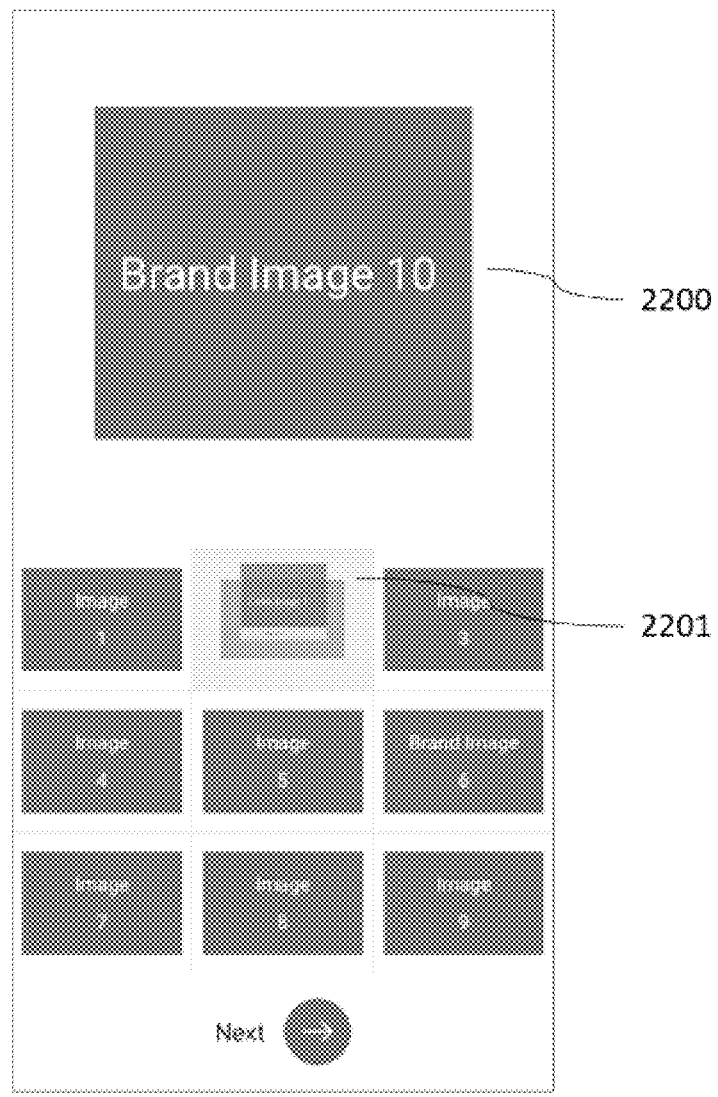
FIG. 22 is an example a Rich Media Grid Interface in accordance with an embodiment of the present invention in which a gamified reaction to a selection by the respondent displays an animation indicating that a first response item has been selected. In this example, the stimulus appears to fly into the response item and shrink, and fluidly vanish. Embodiments of the present invention may include other gamified reactions.
Figure 23:
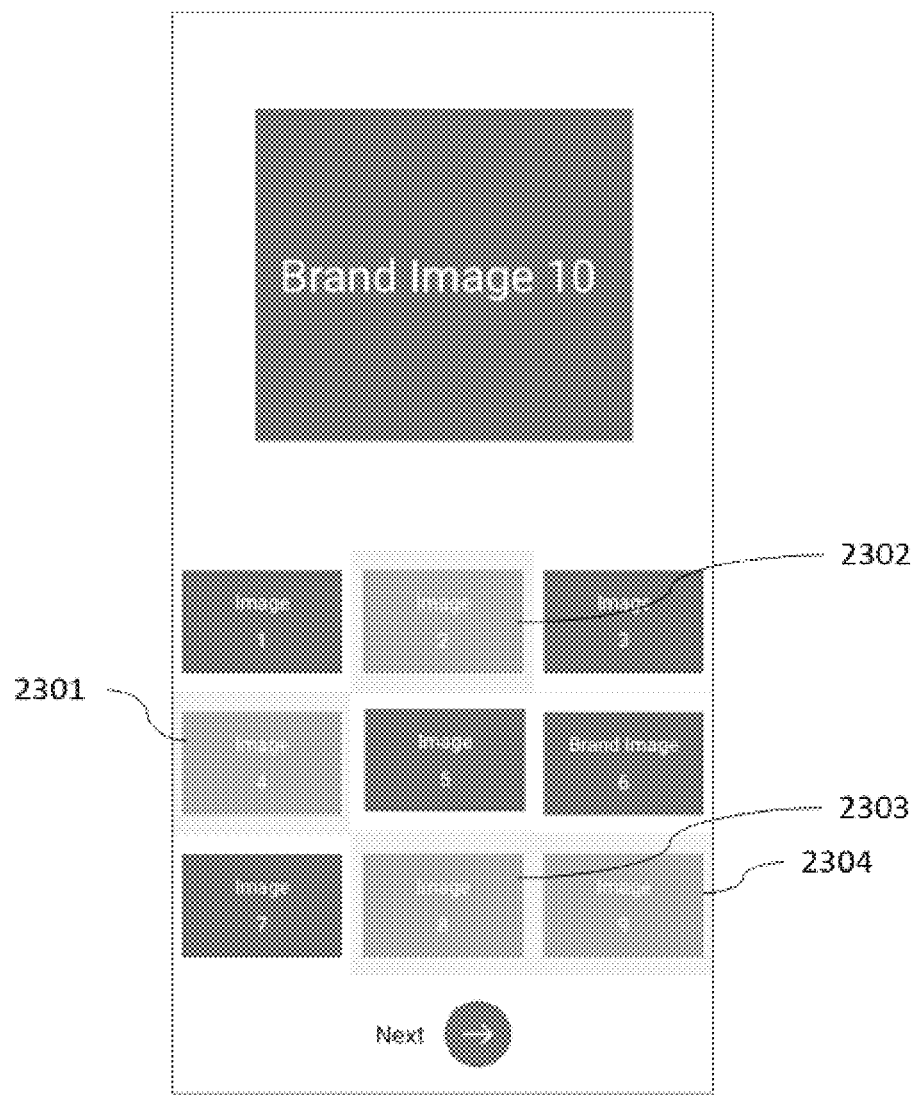
FIG. 23 is an example of a Rich Media Grid Interface in accordance with an embodiment of the present invention in which several rich media response items having been selected. In some variants of this embodiment, the number of selections allowed may be limited.

FIG. 21 shows an example of an initial screen for the Rich Media Grid Interface in accordance with an embodiment of the present invention, which presents a stimulus 2100 on the top of the screen and a set of interactions below the stimulus. The hand icon 2101 indicates a respondent selecting a rich media response item from a set of rich media response items 2102, 2103, 2104, 2105, 2106, 2107, 2108, 2109, 2110. FIG. 22 shows an example of a gamified reaction 2201 caused by the interface in response to the selection of a rich media response item pertaining to the stimulus 2200. In this example, the image is animated to appear as if it is flying into the rich media response item while shrinking and vanishing. Gamified reactions help keep respondents engaged and encourage responses without excess thought or rationalization. Many other gamified reactions may be used without changing the nature of the present invention. FIG. 23 shows an example of the interface after several rich media response items having been selected 2301, 2302, 2303, 2304. In some variants of this embodiment, the number of selections allowed may be limited. Also, the interface may advance from one screen to the next (and thus, from one child question to the next) using various mechanisms, such as mechanisms selected from the group consisting of: a 'Next' button 2111 may be present to enable advancement to the next child question in the grid, the screen may automatically advance to a next child question in the grid (represented by another stimulus) when a certain number of selections have been made, the screen may automatically advance to a next child question in a grid when a certain amount of time has passed, the screen may advance to a next child question in a grid when another gesture is executed (such as tilting the device), and combinations thereof.

Figure 24:
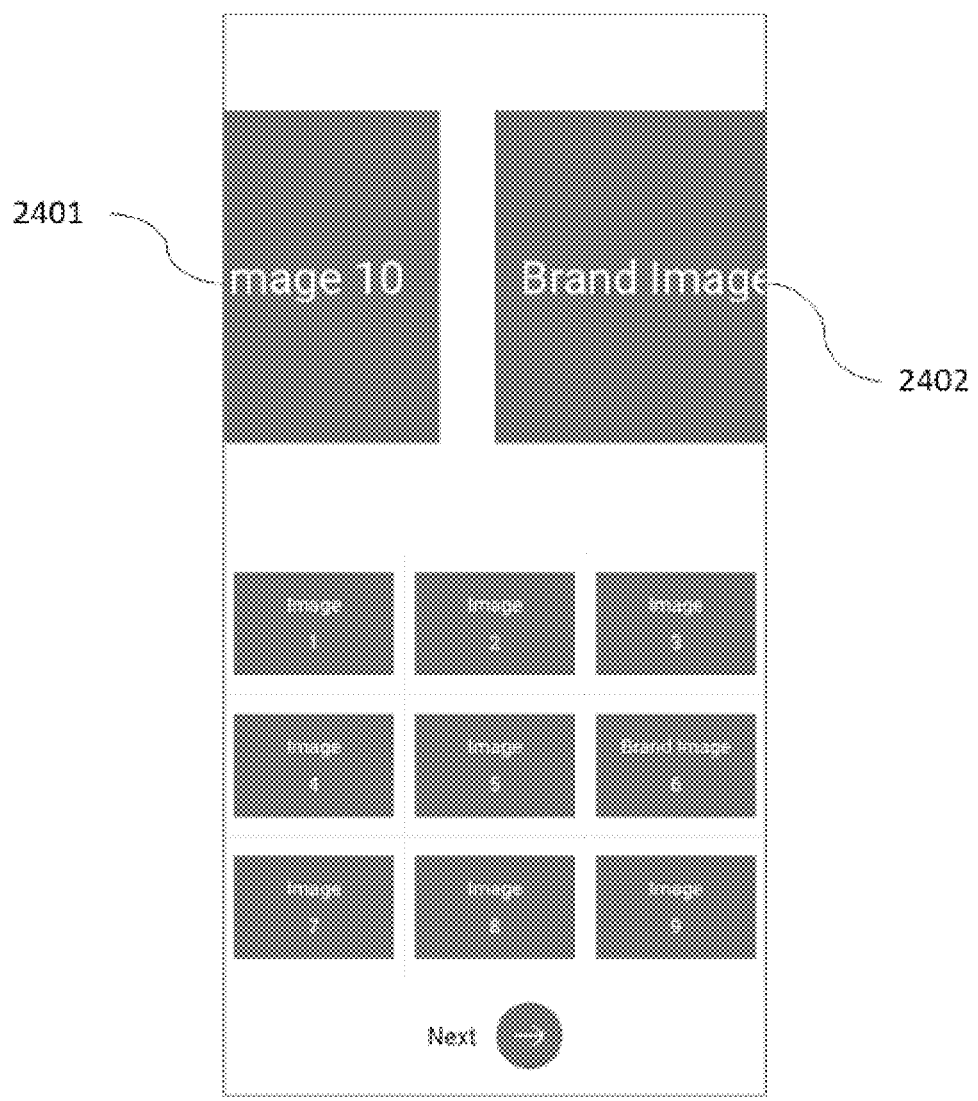
FIG. 24 is an example of a transition animation for a Rich Media Grid Interface in accordance with an embodiment of the present invention in which the child question in a grid, which is represented by one stimulus, is being advanced to another child question in the grid, which is represented by another stimulus.
Figure 25:
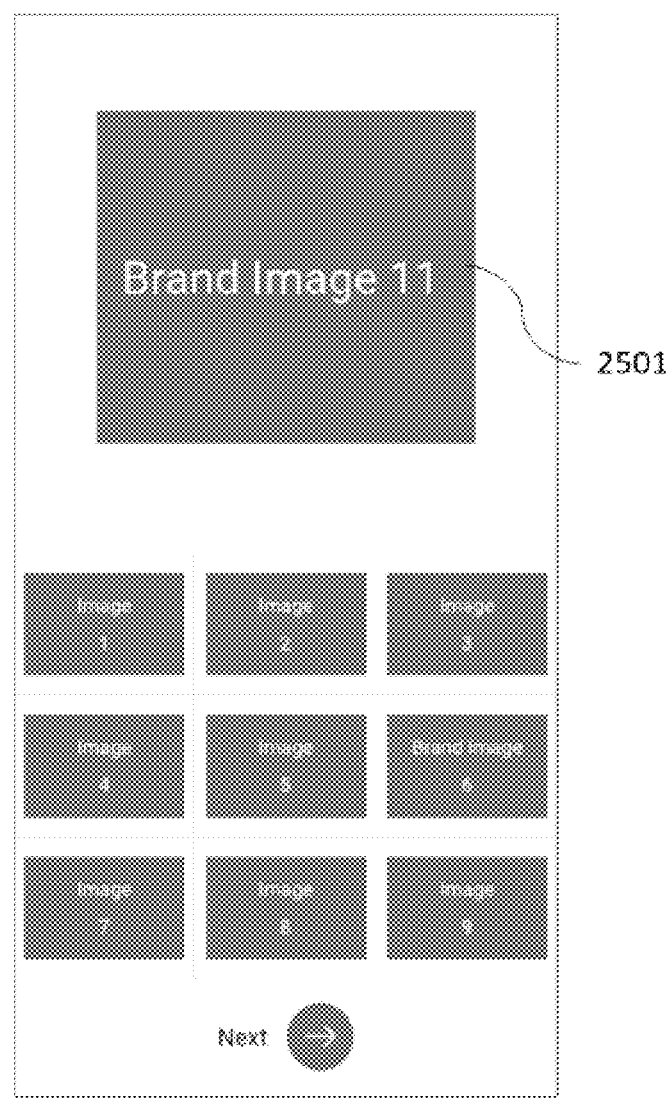
FIG. 25 is an example of a Rich Media Grid Interface in accordance with an embodiment of the present invention, which shows a second stimulus, representing the second child question in the grid.

When the interface advances from one stimulus to the next, an animation may be used to show the transition, as shown in FIG. 24, in which the stimulus associated with the completed child question 2401 is exiting the screen and a stimulus associated a next child question 2402 is entering the screen. FIG. 25 shows a next stimulus 2501 representing a next child question. The respondent continues to answer child questions for the grid question until all required child questions are answered. Data relating to the interactions are recorded as respondent response data pertinent to the stimuli and associated with the respondent. Respondent response data may be uploaded to a server system after the grid question is complete.

Many types of interactions to facilitate the creation of respondent response data using interactions with rich media response items may be used; the interface herein is simply one example. The response options remain the same for all the child questions in the grid question to ensure consistency in availability of response options. The consistency of the response options from one screen to the next results in data that is structurally identical to the data that could be gathered using a conventional grid matrix interface (as shown in FIG. 1) for a question, but relies on respondent interactions that are easily completed on a mobile computing device with limited screen space. In this example, a respondent could easily evaluate almost any number of stimuli (for example, celebrities) against over a dozen or more rich media response items (for example, brands), which would require extensive horizontal and vertical scrolling in any of the conventional grid or matrix interfaces. For example, a conventional grid or matrix interface with 20 celebrities representing child questions and 12 brands representing response items would involve 240 cells, require extensive scrolling both vertically and horizontally, and create extreme difficulty for a respondent to both navigate the grid and select appropriate responses items without error.

In one variant of the Rich Media Grid Interface in accordance with an embodiment of the present invention, which would automatically progress to the next stimuli after the selection of a single rich media response item, the respondent can answer the grid question extremely fluidly and rapidly. This helps minimize conscious processing of responses. For example, if the child questions were represented by stimuli and the rich media response items were brand icons, a respondent could easily navigate through a sequence of 20 or more celebrities at a rate of <1 celebrity per second, which is faster than most respondents could navigate large grids of questions with non-scale responses (i.e. responses that are not simply ordinal values) even if there was a very large screen that did not require scrolling.

A respondent could easily familiarize himself or herself with the available set of rich media response items, and then rapidly tap on a single brand for each celebrity with very minimal thought.

The examples of this embodiment discussed above are merely meant to show some possibilities of this mobile interface for grid questions that have rich media stimuli (as questions) and rich media response options. The array of response options may permit scrolling, may be randomized, or may integrate other display techniques. The respondent response data to each stimulus may be gathered by allowing the respondent to rapidly tap on one or more images, to perform an action selected from the group consisting of to select them, to rank them, and any combinations thereof. The respondent may also be asked to respond to the stimulus based on more than one objective. For example, the respondent may be asked to select the response item that he or she most closely associates with a stimulus, and then the one which he or she thinks other people most closely associate with a stimulus, and then repeat this process for the full sequence of stimuli. In this embodiment, a single question interface could efficiently and effectively gather respondent response data for a large set of multimedia stimuli for multiple objectives (such as rational interest and emotional liking, or social approval and personal interest) using a large number of rich media response options in a way that minimizes fatigue and response biases such as straight-lining, cultural interpretation of text, social acceptance bias, response order bias, and other biases.

The Rich Media Grid Interface in accordance with an embodiment of the present invention, may incorporate several other features to enhance the respondent experience. Extensive use of gamified interactions, such as animations and sounds, creates a highly engaging experience that reduces fatigue and helps elicit responses that capture preconscious thoughts. In the example above with celebrities and brands, when a brand is selected as the one that a celebrity is most likely to use, the brand may one or more of pulse (e.g. change in size or color), trigger an animation that causes the image of the celebrity to fly down into the brand while shrinking and fading, cause the mobile device to vibrate briefly, cause the stimulus rotating out of the screen and a new stimulus rotating into the screen. Several other gamified reactions may also be provided. In another example, a set of animations (such as a time clock or countdown) may be added to the interface to indicate one or more of how long the respondent has remaining to answer the grid question or some portion of the question, how many stimuli (e.g. celebrities) still need to be assigned to a rich media response item (e.g. a brand), etc. The use of gamified interactions also applies to other variants of this embodiment of the present invention.

The flow of the respondent experience in the Rich Media Grid Interface in accordance with an embodiment of the present invention, is critically important to the quality of the respondent response data that is gathered. The interface presents the sequence of stimuli as a singular organic experience wherein it is clearly communicated to the respondent that the responses to all of the stimuli are part of the same question. The use of gamified reactions helps minimize the feeling that the survey is work. The use of rich media stimuli (such as images) and rich media response items helps maximize System 1 (automatic, fast, unconscious) thinking and minimize system 2 (formal, slow, conscious) thinking.

In the Rich Media Grid Interface in accordance with an embodiment of the present invention, instructions or directions to the respondent often benefit from being framed in such a way that the true goal of the question is masked from the respondent. For example, a respondent may be asked to associate things with brands, such as celebrities, animals, characters, countries, or images of other people. These things may be selected to represent particular characteristics that the researcher is seeking to measure without asking directly about those characteristics. For example, the researcher may be seeking to understand perceptions about sensitive topics associated with a political candidate or brand, such as race, ethnicity, gender, age, or other topics. Respondents often self-censor (either consciously or unconsciously) when asked directly about sensitive topics. A researcher may thus create a set of rich media response items that show a variety of celebrities of different races, ethnicities, ages, and genders to help measure these perceptions without bias. Alternatively, a researcher may seek to measure characteristics that are difficult to put into words that most people understand. For example, a researcher may seek to understand which brands are associated with haute couture (elite fashion, often with a European flair), something that can easily be communicated in images even to respondents who are not familiar with the term.

One example of a use of the Rich Media Grid Interface in accordance with an embodiment of the present invention, could involve combining this embodiment with one or more other embodiments of the present invention. For example, a respondent may be asked to associate stimuli with rich media response items, and subsequently be shown a set of rich media response items that were associated with a brand (or vice versa) as a new stimulus, and instructed to explain why he or she made the associations.

Figure 26:
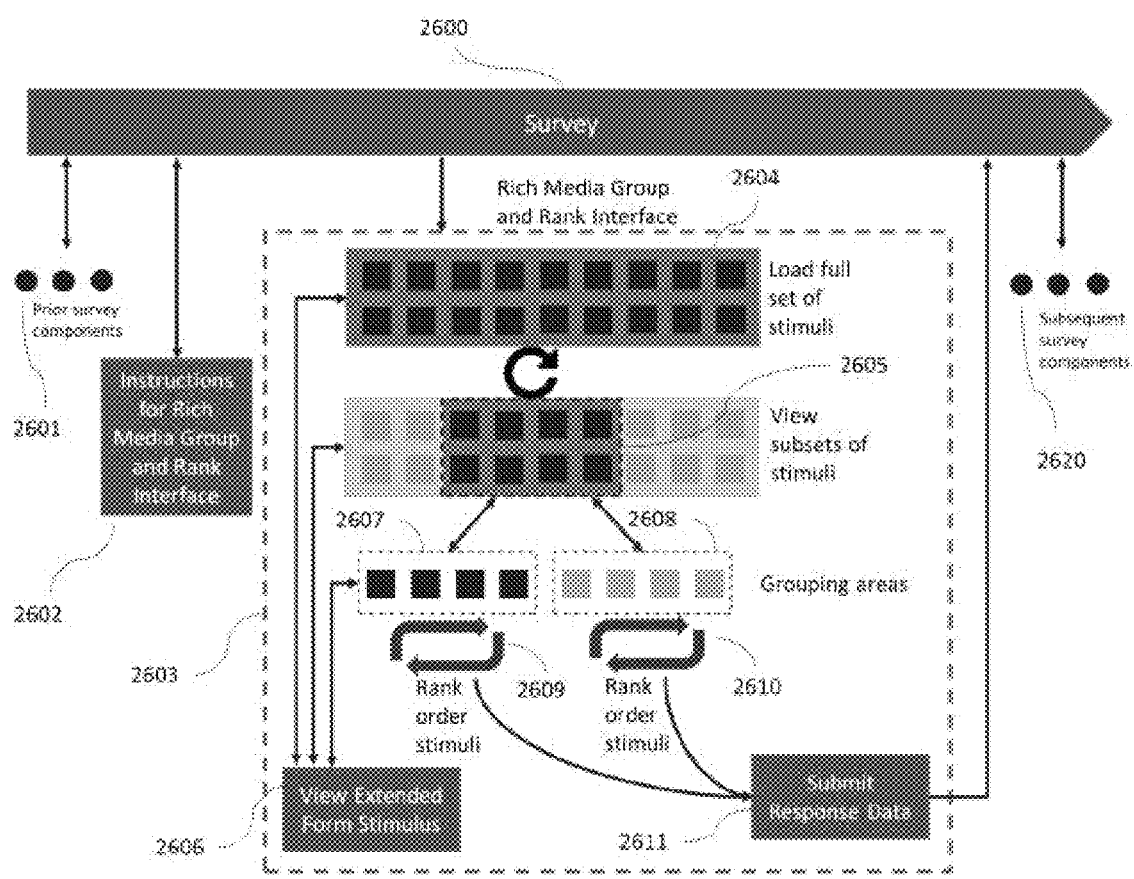
FIG. 26 is an example of a basic software process configuration used in an embodiment of the present invention which we call the Rich Media Group and Rank Interface, which is designed to gather response data selected from the group consisting of grouping response data, ranking response data, and combinations thereof for a large number of rich media stimuli.

In another embodiment of the present invention, which we call the Rich Media Group and Rank Interface, the interface enables the respondent to efficiently select and potentially rank a subset of rich media stimuli (such as images) from a larger set of rich media stimuli on a mobile computing device with a small screen, such as a smartphone or tablet. FIG. 26 illustrates an example process flow of this embodiment when it is embedded within a survey 2600. In this example, a respondent may complete elements (components) 2601 of a survey prior to engaging with the computer user interface. Before engaging with the Group and Rank Interface 2603, a respondent typically receives an instruction screen 2602 (i.e. with instructions for the Group and Rank Interface) explaining how to interact with the forthcoming interface. The instructions may be shown as an overlay on the interface itself, or through other mechanisms. In this embodiment, a full set of rich media stimuli 2604 cannot be displayed together on a single screen without losing the integrity of the stimuli, and so the stimuli are presented in subsets 2605 that can fit on the screen at one time. The full set may also be represented using reduced form versions of the stimuli (such as image thumbnails) that can be expanded through a set of interactions into standard stimuli or extended form stimuli 2606. The respondent can navigate through the full set of stimuli or reduced form versions thereof by interaction selected from the group consisting of swiping, tapping controls, dragging a control, tilting the device, shaking the device, another mechanism, and combinations thereof. Alternatively, the interface may move through the set of stimuli or versions thereof based on time, possibly giving the respondent a limited amount of time to review each stimuli or subset of stimuli or versions thereof, so as to limit the ability of the respondent to fully and consciously process the images prior to making decisions. The respondent might be able to expand and view the extended form version of a stimulus from different states of the interface. The set of stimuli may also be exposed to the respondent through a combination of time passing and respondent controls described above. Regardless of the mechanism for exposing stimuli, the stimuli or versions thereof can also be presented continuously as a stream that moves across the screen or in variable length subsets rather than as discrete subsets. Stimuli that are selected from the full set into a grouping area 2607, 2608 might be ranked or reordered 2609, 2610 by a respondent, perhaps at various states of the interface. The interface receives interactions and respondent response data associated with those actions, and translates this data to a form 2611 which can be transmitted and stored in the survey system or another system that may be accessed through the internet, for example through an API enabled software service. When the respondent has completed the interactions, the interface might send data back to the survey software, and continue with the remainder of the survey 2620.

Figure 27:
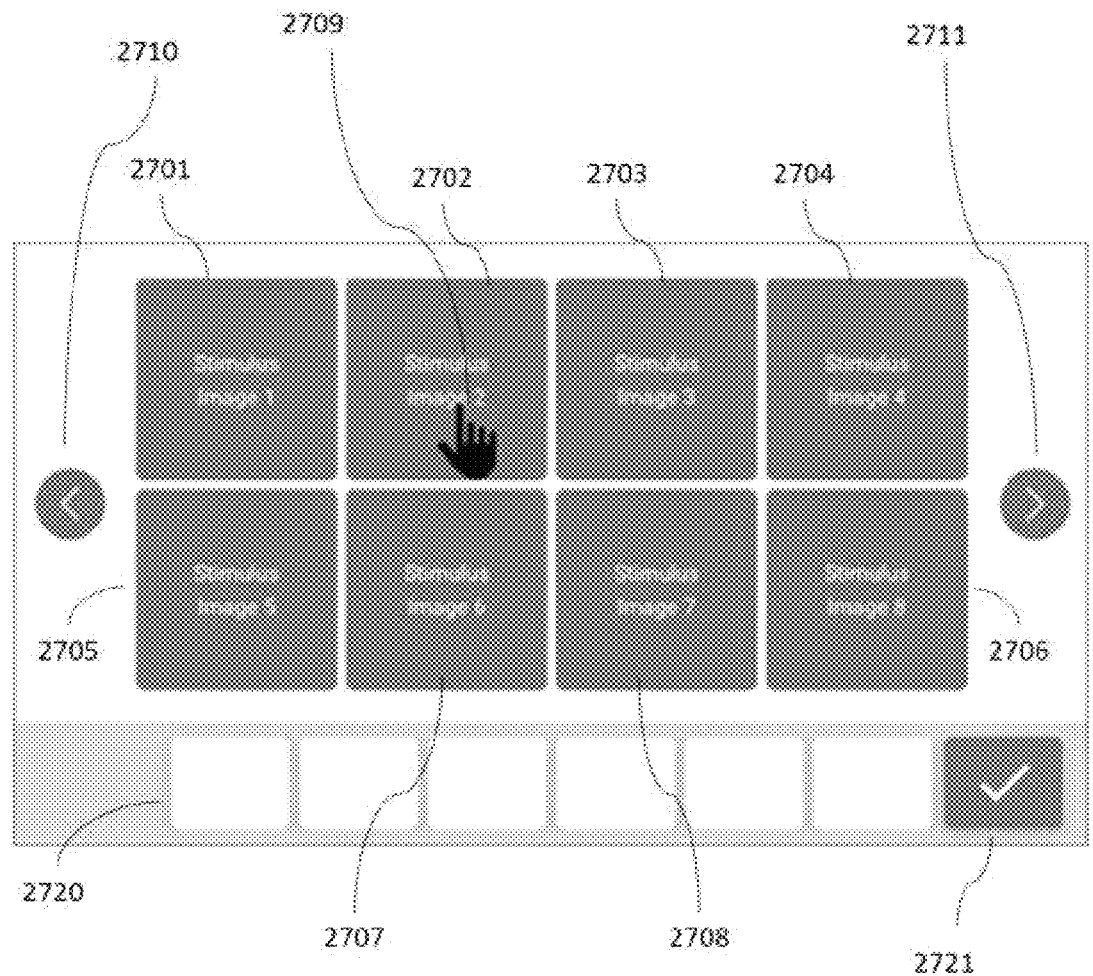
FIG. 27 is an example of a starting screen for the Rich Media Group and Rank Interface in accordance with an embodiment of the present invention. In this variant of the embodiment uses a landscape display. The hand icon indicates a selection the respondent is about to make.
Figure 28:
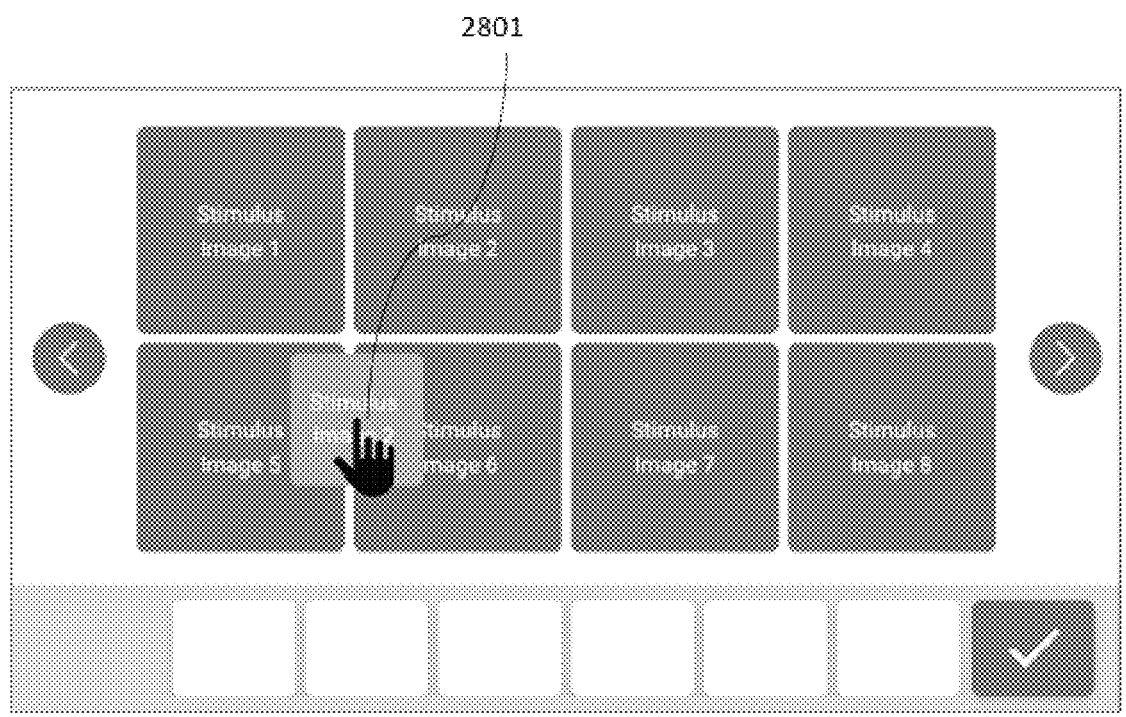
FIG. 28 is an example of a Rich Media Group and Rank Interface in accordance with an embodiment of the present invention, in which a respondent has grabbed a stimulus by pressing on the screen and is dragging the stimulus to a new position.
Figure 29:
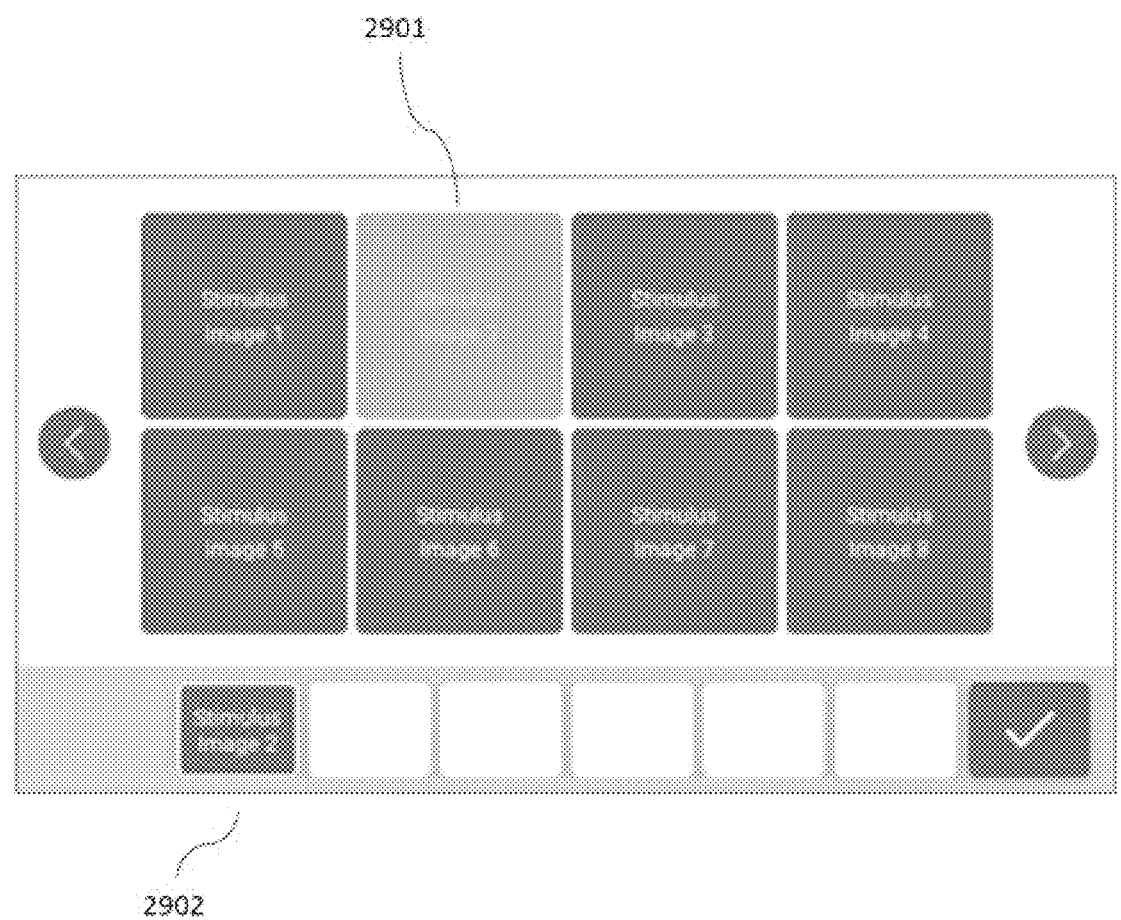
FIG. 29 is an example of a Rich Media Group and Rank Interface in accordance with an embodiment of the present invention, in which a respondent has moved a stimulus into the first position of the grouping area.

FIG. 27 shows an example of an initial screen of a Rich Media Group and Rank Interface in accordance with an embodiment of the present invention. The hand icon 2709 indicates where a respondent tapping a stimulus to make a selection. Eight stimuli are shown on the screen 2701, 2702, 2703, 2704, 2705, 2706, 2707, 2708, and the respondent has the option to tap arrows on the left 2710 and right 2711 to scroll to a view different set of eight stimuli that are available in a larger set of stimuli in the expanded screen. Many other mechanisms to view different sets of stimuli in the expanded screen could be used, such as swiping, streaming stimuli across the screen as time passes, dragging a slider, tapping icons that indicate subsets of stimuli, and so forth. These mechanisms can also be used in various combinations. The set of smaller boxes at the bottom of the screen 2720 is a grouping area. In this example, there is only one grouping area, but other variants of this embodiment could contain multiple grouping areas. The box with the check mark 2721 is a button to allow the respondent to proceed to the next component of the survey, but any number of buttons or advancement icons could be used in its place In addition to providing the respondent access to the set of stimuli, the interface also provides the respondent one or more areas on the screen to contain assigned groups of stimuli. These grouping areas are constantly presented on the screen, even as the respondent navigates through the full set of stimuli. The respondent can move a set of stimuli from the full set of rich stimuli into one of the grouping areas by means of a gesture, such as selected from the group of a swiping, touching and dragging, tapping, double-tapping, and combinations thereof. FIG. 28 shows an example of this, in which the hand icon 2801 indicates a respondent has grabbed a stimulus by touching it onscreen and is dragging it into a grouping area below by holding his or her finger on the screen while moving it into the grouping area. When a stimulus is moved from the full set of stimuli to a grouping area, the stimulus 2901 is disabled or removed and replaced by a reduced form version of that stimulus in the grouping area 2902. FIG. 29 shows an example of this. Other versions of the interface could allow the respondent to move a stimulus into a grouping area through other means, like swiping or double tapping to move the stimulus into the first open position in the grouping area. In this variant of the embodiment, the grabbed stimulus is represented by a reduced form version of the stimulus while it is being moved.

Figure 30:
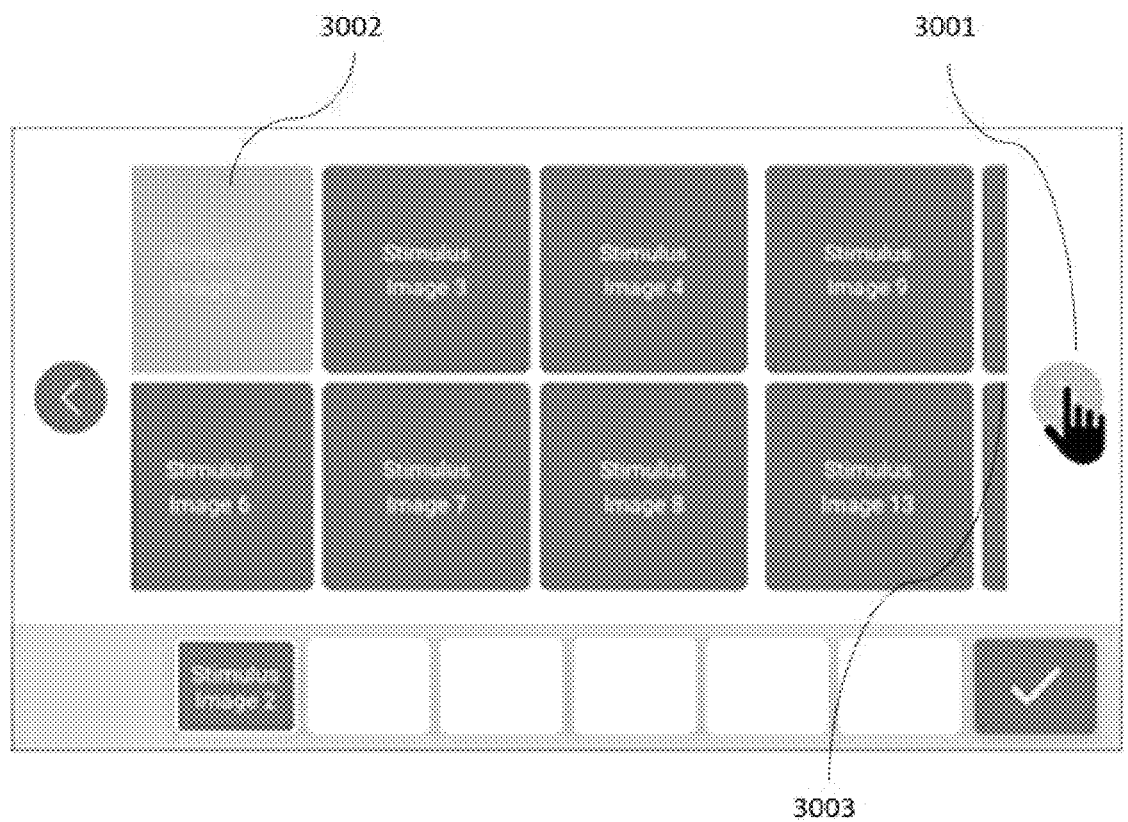
FIG. 30 is an example of a Rich Media Group and Rank Interface in accordance with an embodiment of the present invention, in which a respondent has tapped an arrow to view a new set of stimuli from the larger set of stimuli in the expanded screen, and an animation is showing a new set of eight stimuli sliding onto the screen for viewing.

FIG. 30 shows an example of a respondent having activated a control 3001 to change the set of stimuli shown onscreen 3002 to a new set of stimuli 3003 from the full set of stimuli 2604 that is on the extended screen. As noted above, other versions of the interface can shift the onscreen display from one set of stimuli to another set of stimuli from the full set on the extended screen through a range of mechanisms.

Figure 31:
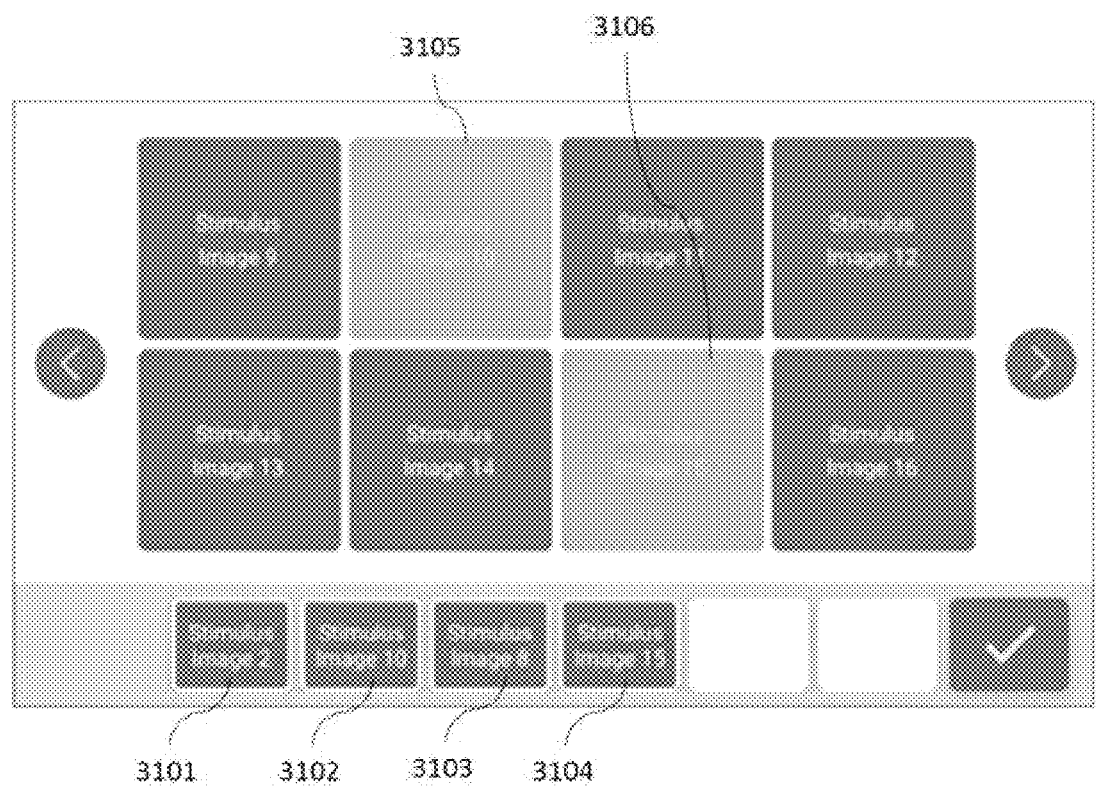
FIG. 31 is an example of a Rich Media Group and Rank Interface in accordance with an embodiment of the present invention, in which a new set of eight stimuli is being viewed, and a respondent has selected 4 stimuli from the larger set of stimuli on the expanded screen to include in the grouping area.

FIG. 31 shows an example of a respondent having selected multiple stimuli 3101, 3102, 3103, 3104 into the grouping area from the full set of stimuli on the extended screen, with two of those stimuli 3105, 3106 having been selected from stimuli in the current screen.

Figure 34:
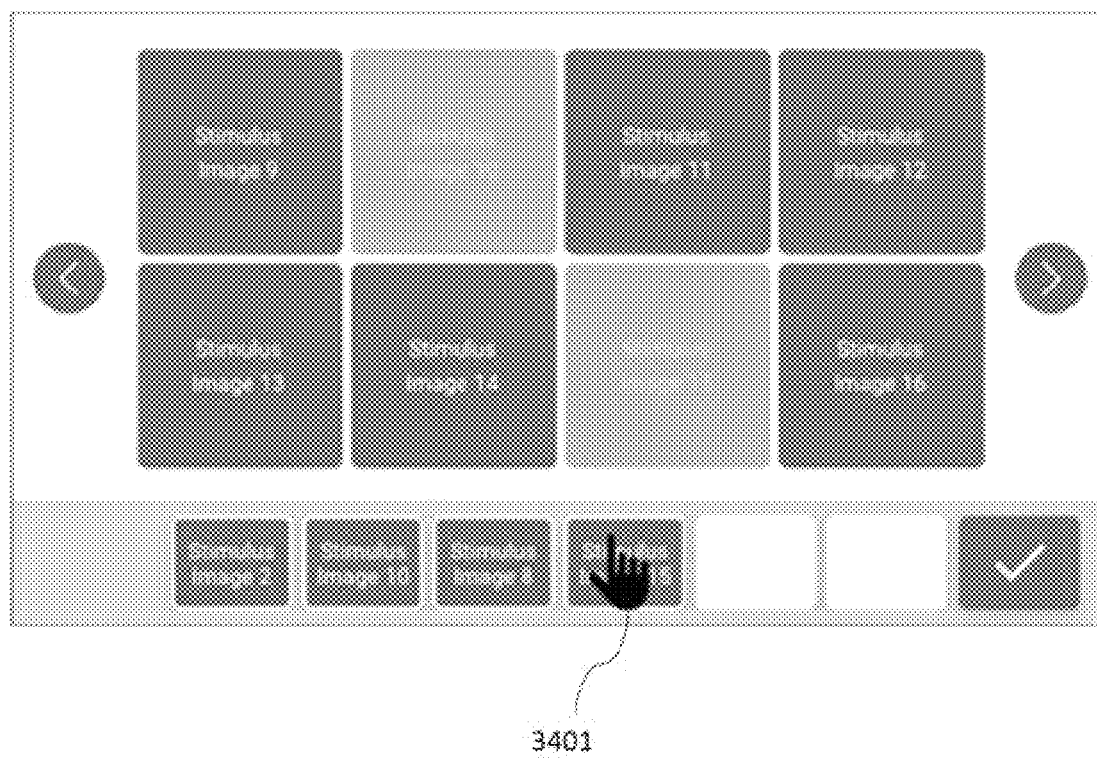
FIG. 34 is an example of a Rich Media Group and Rank Interface in accordance with an embodiment of the present invention, in which the hand icon indicates that a respondent is about to grab a reduced form stimulus in the grouping area by pressing on the screen.
Figure 35:
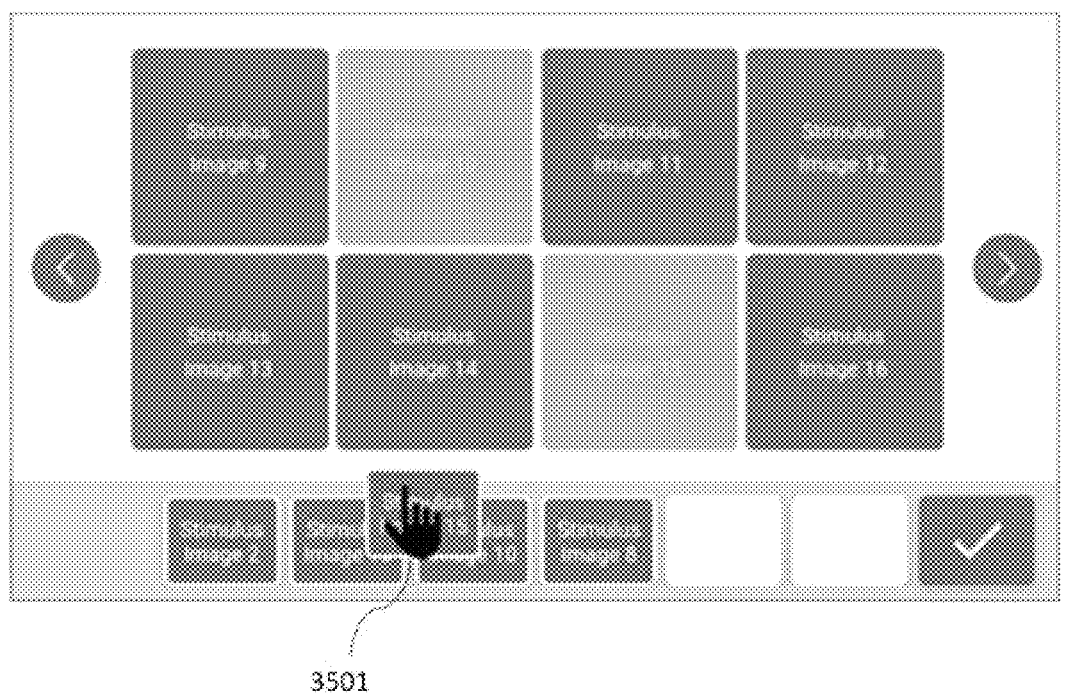
FIG. 35 is an example of a Rich Media Group and Rank Interface in accordance with an embodiment of the present invention, in which a respondent has grabbed a reduced form stimulus in the grouping area, and is repositioning it in the grouping area, for example to re-rank the stimuli.
Figure 36:
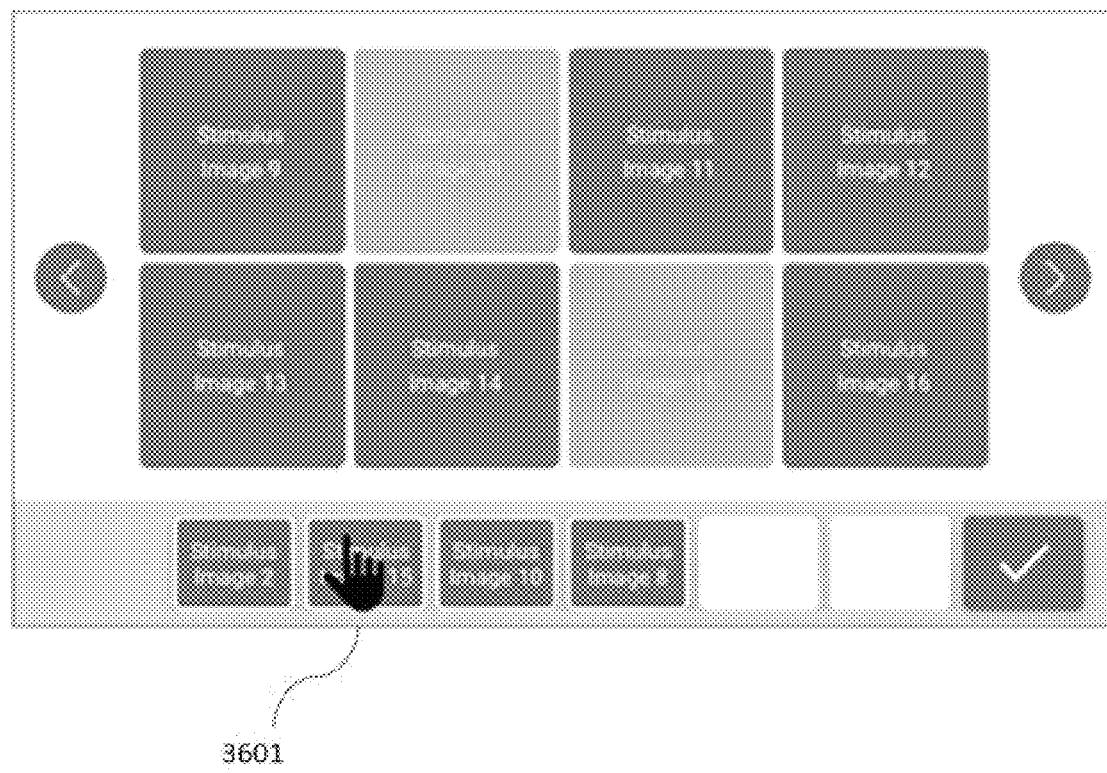
FIG. 36 is an example of a Rich Media Group and Rank Interface in accordance with an embodiment of the present invention, in which a respondent has changed the order of the set of reduced form stimuli in the grouping area.

In some variants of the Rich Media Group and Rank Interface in accordance with an embodiment of the present invention, the interface may enable the respondent to further manipulate the reduced form versions of the stimulus in one or more grouping areas. For example, the respondent may be enabled to do one or more of: move reduced form stimuli from one grouping area into another, rank stimuli within a grouping area, move reduced form stimuli from a grouping area back into the area originally containing the full set of stimuli. Typically, a respondent could rank or re-rank stimuli by grabbing 3401 and dragging 3501 a reduced form stimulus into a new position 3601 within a grouping area (as shown in FIGS. 34, 35, and 36), but the interface may provide other mechanisms to rank stimuli. For example, a respondent may double tap a stimulus to move it to first rank. As another example, the ranking of stimuli within the selected groupings may be done as a second phase of the interaction. In some variants of this embodiment, a reduced form stimulus that is removed from a selected grouping area may revert to the basic version of the stimulus. Also, in some variants of this embodiment, the reduced form stimuli may receive an initial ranking based on order of selection when they are initially moved into a grouping area.

Figure 37:
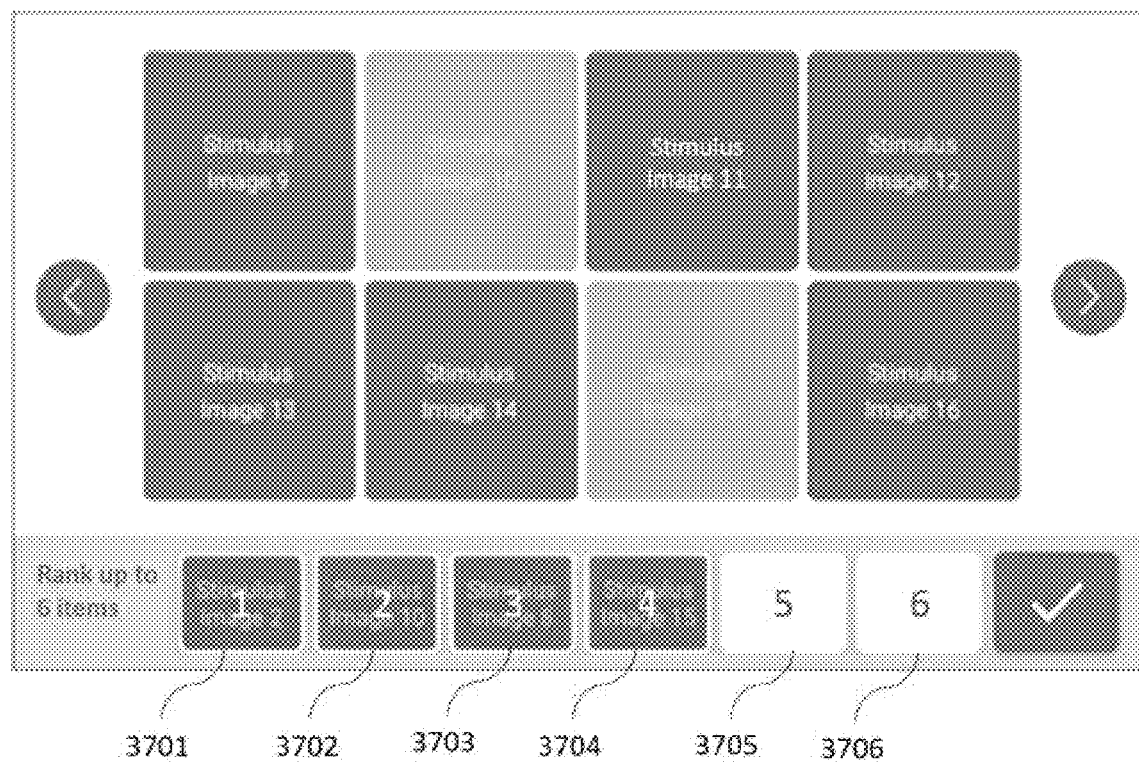
FIG. 37 is an example of a Rich Media Group and Rank Interface in accordance with an embodiment of the present invention, that is designed to gather ranking response data from a respondent on a set of selected stimuli in a grouping area. Additional directions, number labels on reduced form stimuli positions, and numbered semi-transparent overlays indicate the ranking of stimuli within the grouping area.

In some variants of the Rich Media Group and Rank Interface in accordance with an embodiment of the present invention, the interface may include labels indicating the ranks associated with the positions in a grouping area, an example of which is shown in FIG. 37. In this example, the first four ranked positions 3701, 3702, 3703, 3704 are full and the remaining two 3705, 3706 are empty.

Figure 32:
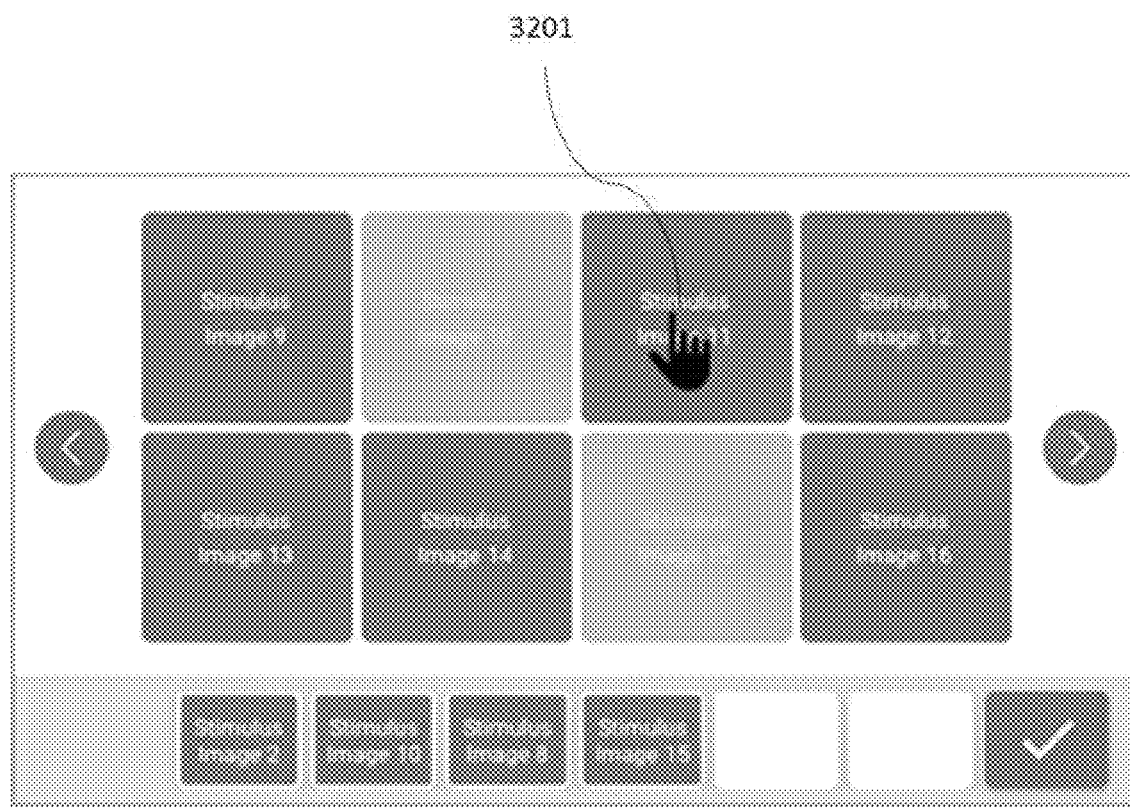
FIG. 32 is an example of a Rich Media Group and Rank Interface in accordance with an embodiment of the present invention, in which a respondent is tapping a stimulus in order to view an extended form version of the stimulus. Embodiments of the present invention may include other interactions to select a stimulus for viewing an extended form version, such as double tapping.
Figure 33:
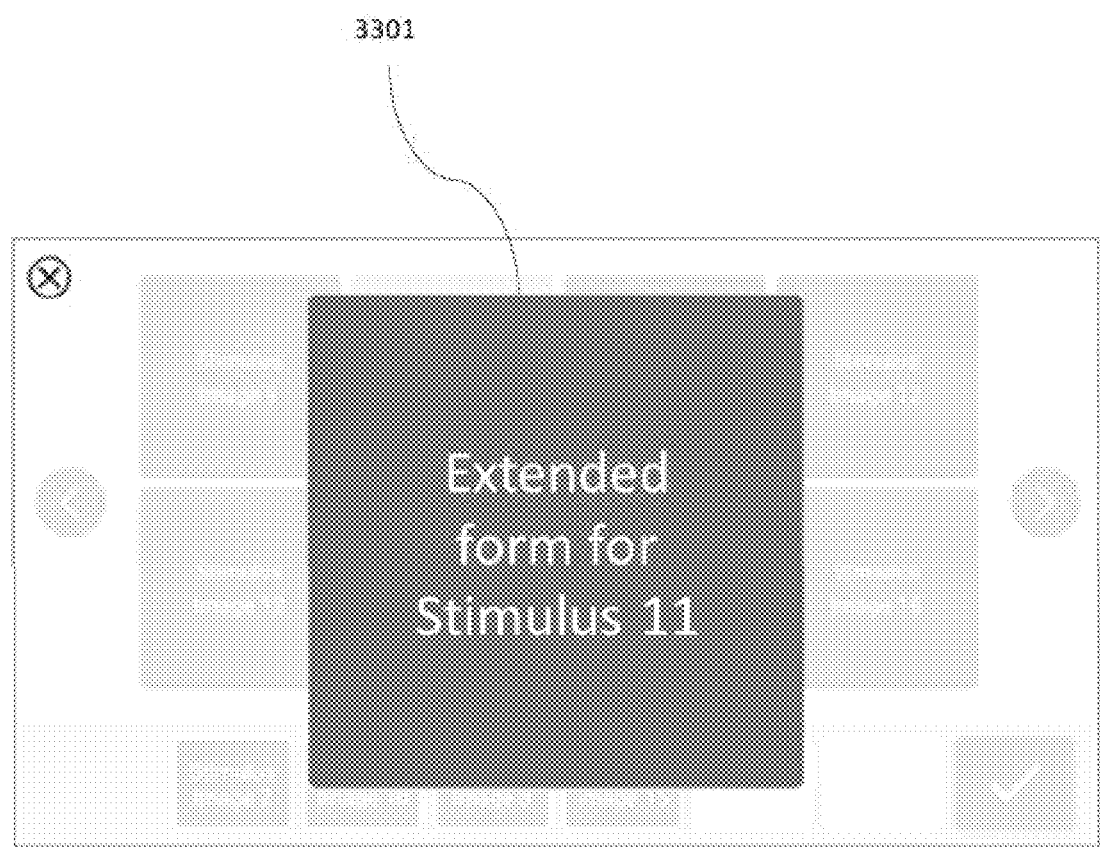
FIG. 33 is an example of a Rich Media Group and Rank Interface in accordance with an embodiment of the present invention, in which an extended form version of a stimulus is being displayed. The remainder of the screen is deemphasized by a semitransparent overlay, and the screen can be closed by tapping or selecting the 'X' icon. Alternate variants of this embodiment could permit other interactions from this screen, such as enabling the respondent to double tap the extended form version of the stimulus to add it to the next open position in the grouping area.

In some variants of the Rich Media Group and Rank Interface in accordance with an embodiment of the present invention, the respondent can tap or otherwise activate 3201 a stimulus or reduced form version thereof to display an extended version of the stimulus 3301 which may contain additional content that is not presented or visible on the original stimulus or another version thereof, an example of which is shown in FIGS. 32 and 33. The extended form stimulus may simply be an enlarged version of the image, or may be a different image that shows another representation of the thing that the stimulus is intended to represent. For example, if the stimulus was an image of a scene in a movie, the extended form of the stimulus may contain text describing the scene or may even show a brief animation of the scene. The respondent can exit the view of the extended form version of the stimulus, or may have the ability to select it into the grouping area using a button or action enabled in the interface.

In some variants of this embodiment, the interface may enable the respondent to select the extended form of the stimulus directly into a grouping area, or move the stimulus from a grouping area back to the area that originally contained the full set of stimuli. To accomplish this, a respondent might tap, double-tap, swipe, drag-and-drop, or otherwise select a stimulus or version thereof.

In some variants of the Rich Media Group and Rank Interface in accordance with an embodiment of the present invention, the respondent response data generated by the interactions described above (including action timing, taps, swipes, and so forth) may be incorporated into further analysis, including analysis to determine pre-conscious processing, conscious processing, and self-censorship. In addition, the selected subsets of stimuli or versions thereof may be incorporated into further analysis, or used to dynamically create a new stimulus that can be used as an input into other embodiments of this patent In one example of the Rich Media Group and Rank Interface in accordance with an embodiment of the present invention, the respondent may be directed to select a specific number of images from a full set of images that best represents how they feel about a brand. Other common instructions include directing respondents to select a set of images that best represents the type of person they are, the images that they most closely associate with a product, or the images that they would want to see associated with a brand. Although the figures noted above show only one grouping, other variants of this embodiment may direct respondents to select multiple sets of images, for example: one set of images that represents what the respondent likes most about a brand, and one set that represents what the respondent dislikes most about a brand. Respondents may instead be directed to split the stimuli into 2 or more groups or categories based on unspecified criteria. The respondent may also move the reduced form stimulus out of the grouping area and back into the larger set of available stimuli at the top of the screen, or into another grouping area if such an area were available. Other interactions to enable a respondent to remove a stimulus from a grouping area are may be used, such as tapping or double tapping it. Actions would need to be reconciled: for example, if tapping a stimulus opens the extended form view, then this interaction cannot also select stimuli into or remove stimuli from a grouping area.

Figure 38:
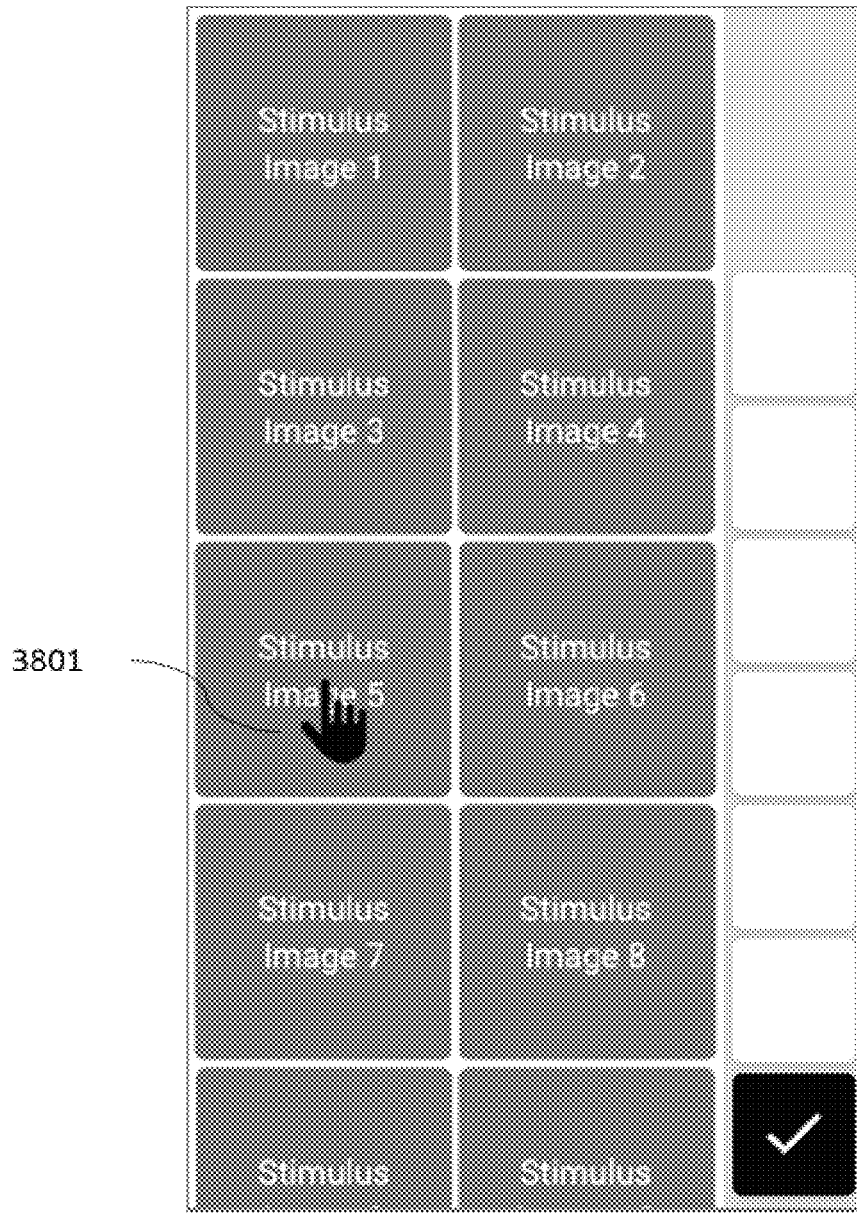
FIG. 38 is an example of a Rich Media Group and Rank Interface in accordance with an embodiment of the present invention, that uses a portrait layout.
Figure 39:
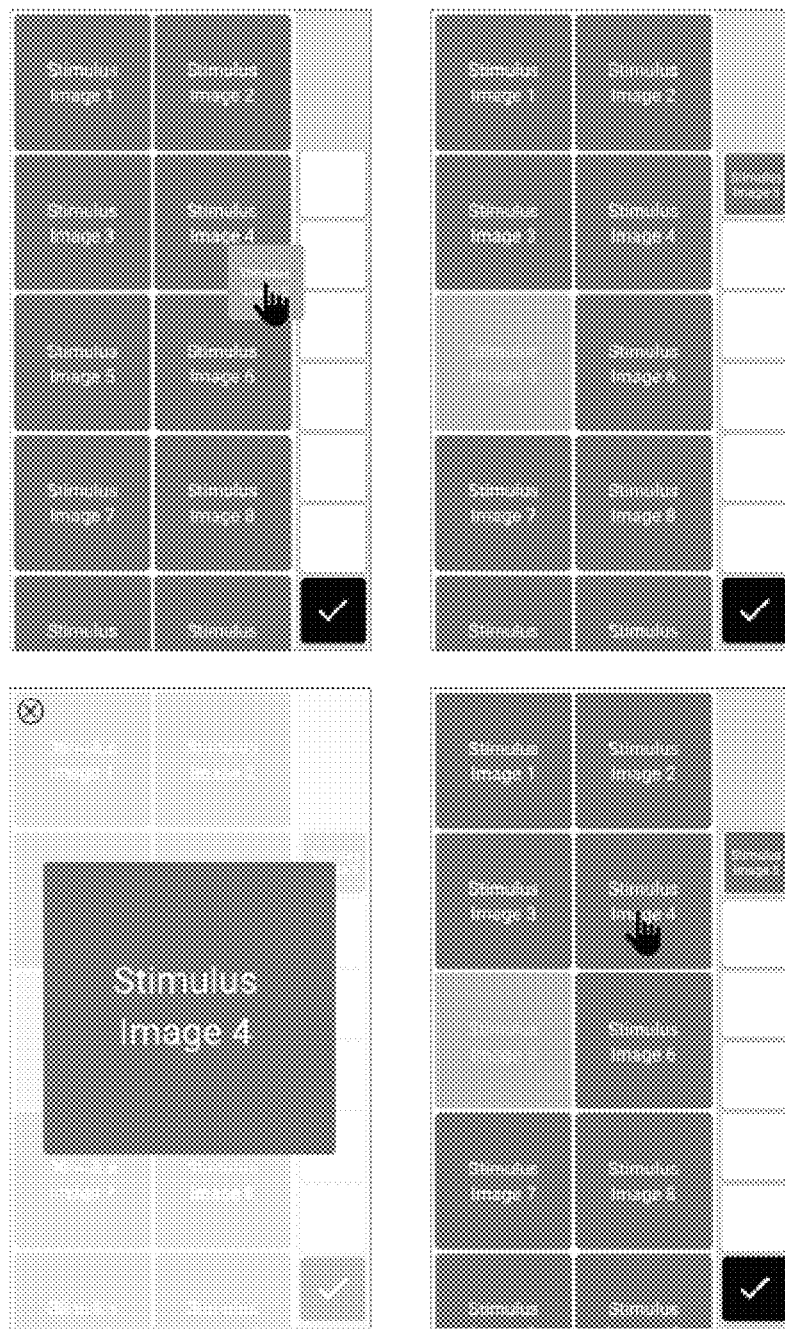
FIG. 39 shows a sampling of illustrations of an example Rich Media Group and Rank Interface in accordance with an embodiment of the present invention, that uses a portrait layout, which provides similar functionality to the prior example that uses a landscape layout.

FIG. 38 shows an example of a Rich Media Group and Rank Interface in accordance with an embodiment of the present invention, that uses a vertical ("portrait") layout rather than a horizontal ("landscape") layout. This version has an identical range of functionalities as the version that uses the landscape view. Notably, this figure shows an example of this embodiment of the present invention in which a respondent can view other sets of stimuli from the full set in the expanded screen by swiping 3801 up or down to scroll rather than tapping an arrow. FIG. 39 shows an example set of sample screens from this variant of this embodiment of the interface that have similar capabilities as the horizontal screens shown in other figures for this interface, but use a vertical (portrait) layout.

Further continuing with these examples, data generated by the respondent's interactions is recorded as respondent response data. This data includes at a minimum the selections made by the respondent, but can also include data selected from the group consisting of rankings, changes in selections, changes in rankings, timings associated with actions, the number of times an extended form stimulus was viewed, swipe speed, swipe intensity, speed of interactions requiring dragging a stimulus, other data associated with the respondent's interactions, and combinations thereof.

Figure 40:
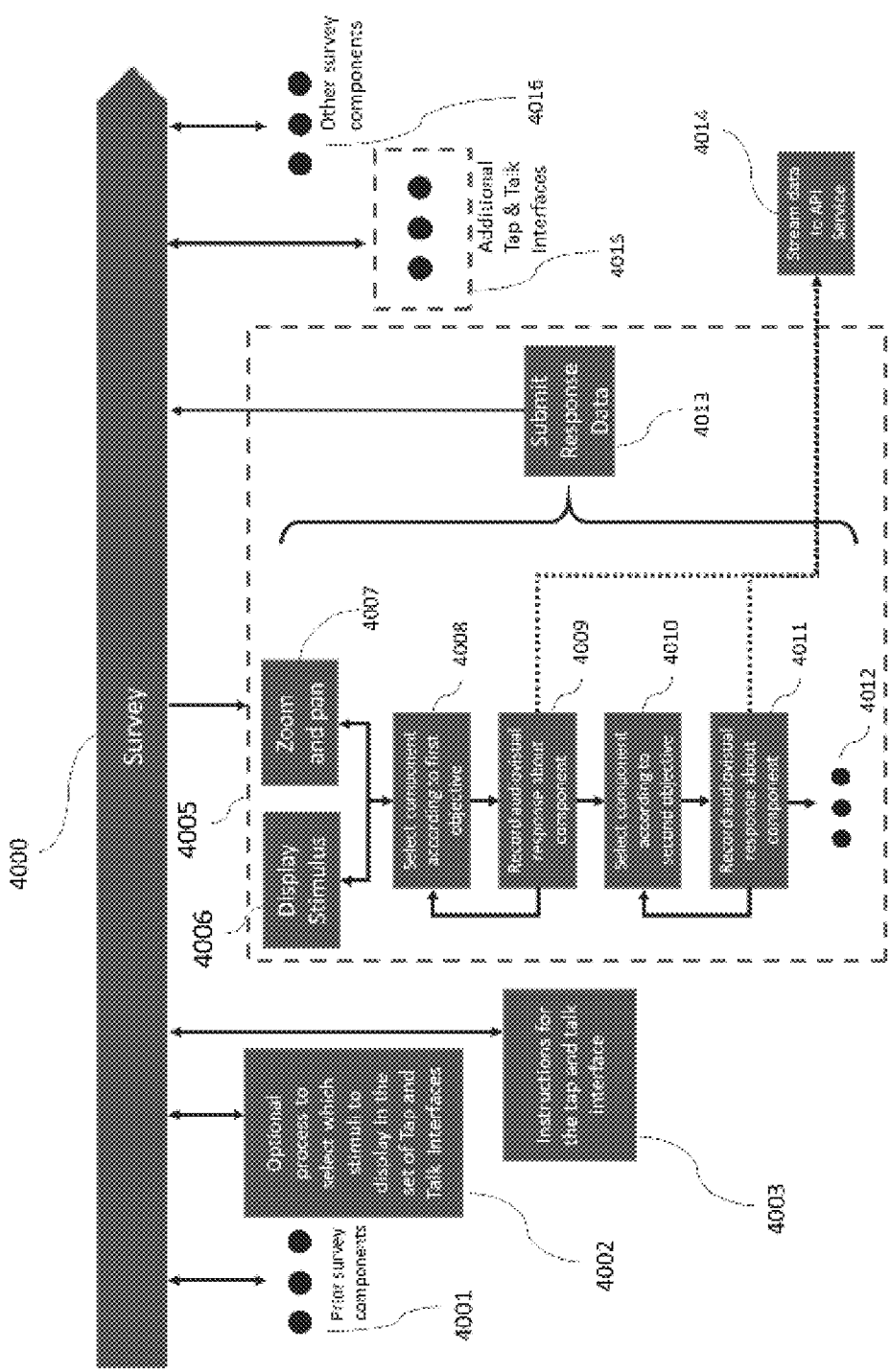
FIG. 40 is an example of a basic software process configuration used in an embodiment of the present invention which we call the Tap and Talk Interface, which is designed to identify components of a stimulus that a respondent reacts to in a particular way (in this example, liking or disliking) and gather audiovisual responses from the respondent explaining the reaction.

In another embodiment of the present invention, which we call the Tap and Talk Interface, a stimulus is presented to a respondent who is directed to select an area or component of the stimulus according to an objective, and then explain why the selection was made using an audiovisual response (as defined in the Definitions). FIG. 40 illustrates an example process flow of this embodiment when it is embedded within a survey 4000. In this example, a respondent may complete elements of a survey 4001 before engaging a Tap and Talk Interface 4005. Various elements 4002 of that survey and responses to those elements may be used to select a set of stimuli to ask questions about. Such mechanisms to select questions to include are considered standard in the practice of survey creation. Before engaging with the Tap and Talk Interface, a respondent typically receives an instruction screen 4003 explaining how to interact with the forthcoming interface, an example of which is shown in FIG. 41. The instructions may alternatively be shown as an overlay on the interface itself, or through other mechanisms. Within the Tap and Talk Interface, the respondent may interact with the stimulus 4006 in a variety of ways, including but not limited to zooming and panning 4007, to select one or more components according to one or more objectives 4008, 4010, 4012, and to record audiovisual responses pertaining to the selected components 4009, 4011, 4012. The interface receives interactions and respondent response data associated with those actions, and translates this data to a form which can be transmitted and stored in the survey system or another system that may be accessed through the internet, for example through an API enabled software service. Response data may be sent to the survey software, perhaps in a server system, after the respondent is done. Further, response data (including audiovisual responses) may be sent to the survey software or another destination before the respondent has completed all interactions with the interface. For example, the interface may record respondent response data resulting from touch interactions and accumulate this data for submission 4013 to survey software which is hosted in a server system at the end of the respondent's interactions with the interface, but might stream audiovisual responses to an API 4014 that is hosted in another server system. Data sent to multiple locations might be later aggregated using a variety of mechanisms. For example, audiovisual data might be streamed to a server as part of a single file that contains multiple responses, and then split into separate files based on time stamps associated with various respondent interactions in response to objectives. Innumerable methods can be used to store and manage data gathered from this interface without changing the fundamental nature of the invention. After the respondent has completed the questions in the Tap and Talk Interface, he or she might proceed to another instance of the interface 4015 or continue to other components of the survey 4016.

Figure 42:
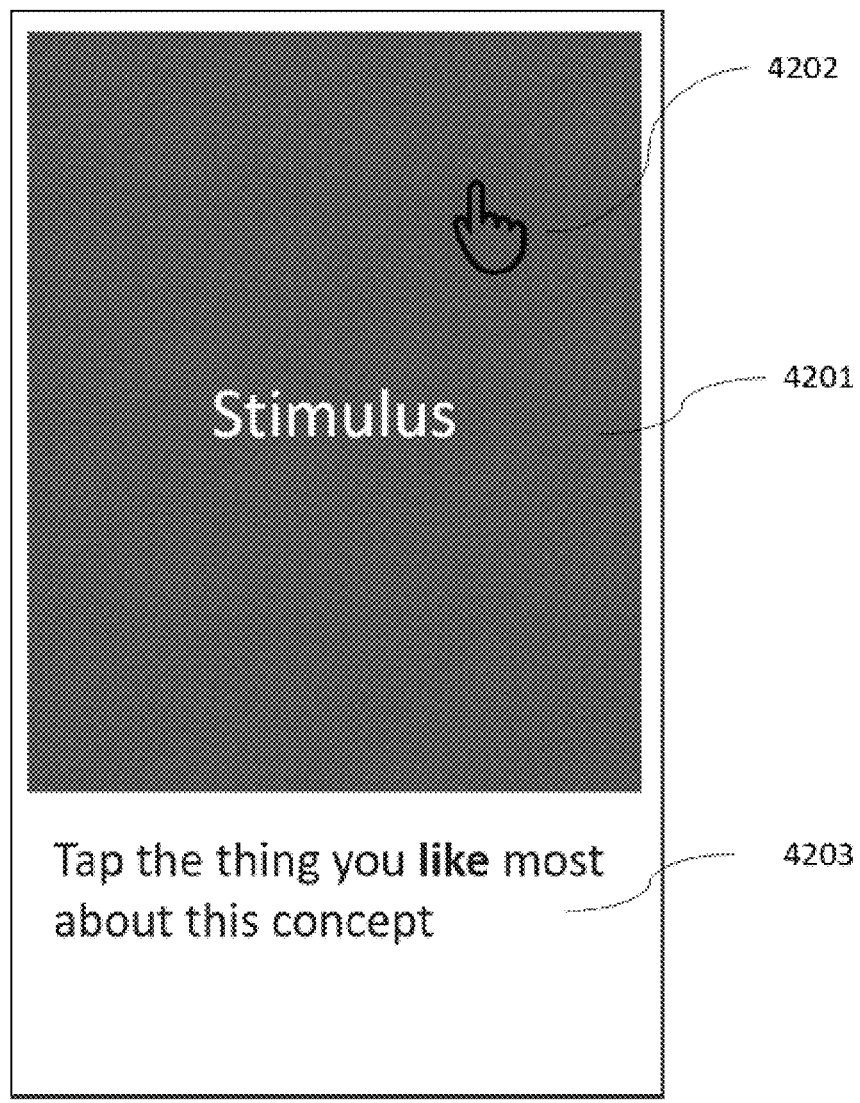
FIG. 42 is an example of a first screen for a Tap and Talk Interface in accordance with an embodiment of the present invention. The hand icon indicates an area of the stimulus that the respondent is about to select by tapping.

FIG. 42 shows an example of an initial screen of a Tap and Talk Interface in accordance with an embodiment of the present invention. In this example, the respondent is shown a stimulus 4201 that is an image of a new product with directions 4203 to tap on the area of the image 4202 that he or she likes the most, then to create an audio or video recording that explains why he or she selected that area. The respondent may be directed to do one or more of: identify multiple components of the stimulus according to an objective, to identify components of the stimulus according to multiple objectives, and combinations thereof. For example, a respondent may be directed to select one or more areas of a stimulus that he or she likes and to comment on each of those, then to select one or more areas of a stimulus he or she dislikes and to comment on each those areas. As another example, the respondent may be asked to indicate specific aspects of the stimulus that meet some requested objectives, such as triggering a respondent perception or emotional response (such as happiness, sadness, hunger, attraction, economic value, uniqueness, or some other criteria). A respondent may engage with multiple instances of this embodiment in a survey, possibly in sequence and sharing the same set of general instructions. Although the example Figures of the Tap and Talk Interface show a respondent selecting one area of a stimulus at a time and then recording an audio or audiovisual response pertaining to that area before selecting another area, other variations of this embodiment area contemplated herein where a respondent records continuously while tapping different areas of a stimulus according to one or more objectives.

For each component or location selected by the respondent, the interface may enable the respondent to indicate his or her intensity of response using an intuitive gesture that does not require the respondent to leave the stimulus. For example, the respondent interface may enable the respondent to tap the same spot on an image repeatedly, to press the spot for a longer duration, or to indicate intensity of response through a pop-up widget that is overlaid on the stimulus. Such a pop-up widget would present additional micro-interactions that could be as simple as selecting an option (i.e. a scale response or one of a set of available icons). Alternatively, and instead of a pop-up widget, the main interface may utilize interactions such as one or more of repeated swiping, fast swiping, high tactile pressure, swipe length, tap intensity, tap frequency, shaking the device, and tap speed to assess intensity of response.

Alternatively, the respondent may be directed to indicate the component or location on a stimulus that he or she notices or reacts to most intensely, regardless of the directionality of the reaction (i.e. regardless of liking or disliking, value or lack of value, etc.). The respondent may then be presented with a pop-up widget overlaying the stimulus which enables the respondent to indicate both intensity and directionality of the response. Such a pop-up widget would present additional micro-interactions that could be as simple as selecting an option (i.e. a scale response or one of a set of available icons). Alternatively, and instead of a pop-up widget, the main interface may utilize interactions such as one or more of repeated swiping, fast swiping, high tactile pressure, swipe length, tap intensity, tap frequency, shaking the device, and tap speed to assess intensity of response.

The respondent's commentary on his or her selections, or explanation of his or her actions, is gathered through one or more multimedia input/output devices, such as a microphone, touchscreen, camera, or biofeedback input device. The respondent's audiovisual response may also be encoded into text or another medium using machine learning methods, may be in near real time, may be grouped or tagged (for instance, using semantic tagging) based on analysis using machine learning or artificial intelligence tools, may be scored (for instance, using sentiment analysis to assign a sentiment score), and may be displayed back to the respondent on the interface for editing or confirmation.

In the Tap and Talk Interface in accordance with an embodiment of the present invention, the interface may enable the respondent to magnify or zoom in on the stimulus or a portion of the stimulus, and select a component of the stimulus on the magnified or zoomed in display.

In the Tap and Talk Interface in accordance with an embodiment of the present invention, the interface may enable the respondent to one or more of view a stimulus that is an animation or video file, listen to a stimulus that is an audio file, select a set of times or frames according to a set of objectives, and record an audiovisual response for each of the components of the stimulus that are selected and to explain the reason for each selection. In this version of the embodiment of the present invention, the interface may enable a respondent to pause an animation or video file and select a component within a paused frame in the same manner that a respondent may select a component of an image, and to comment upon his or her selection in the same manner.

In one variant of the Tap and Talk Interface in accordance with an embodiment of the present invention, a respondent is initially given directions on how to interact, and then shown a sequence of stimuli wherein the respondent is able to select components of the stimuli according to the set of objectives for each stimuli, and record an audiovisual response each zone of each stimulus selected.

Figure 43:
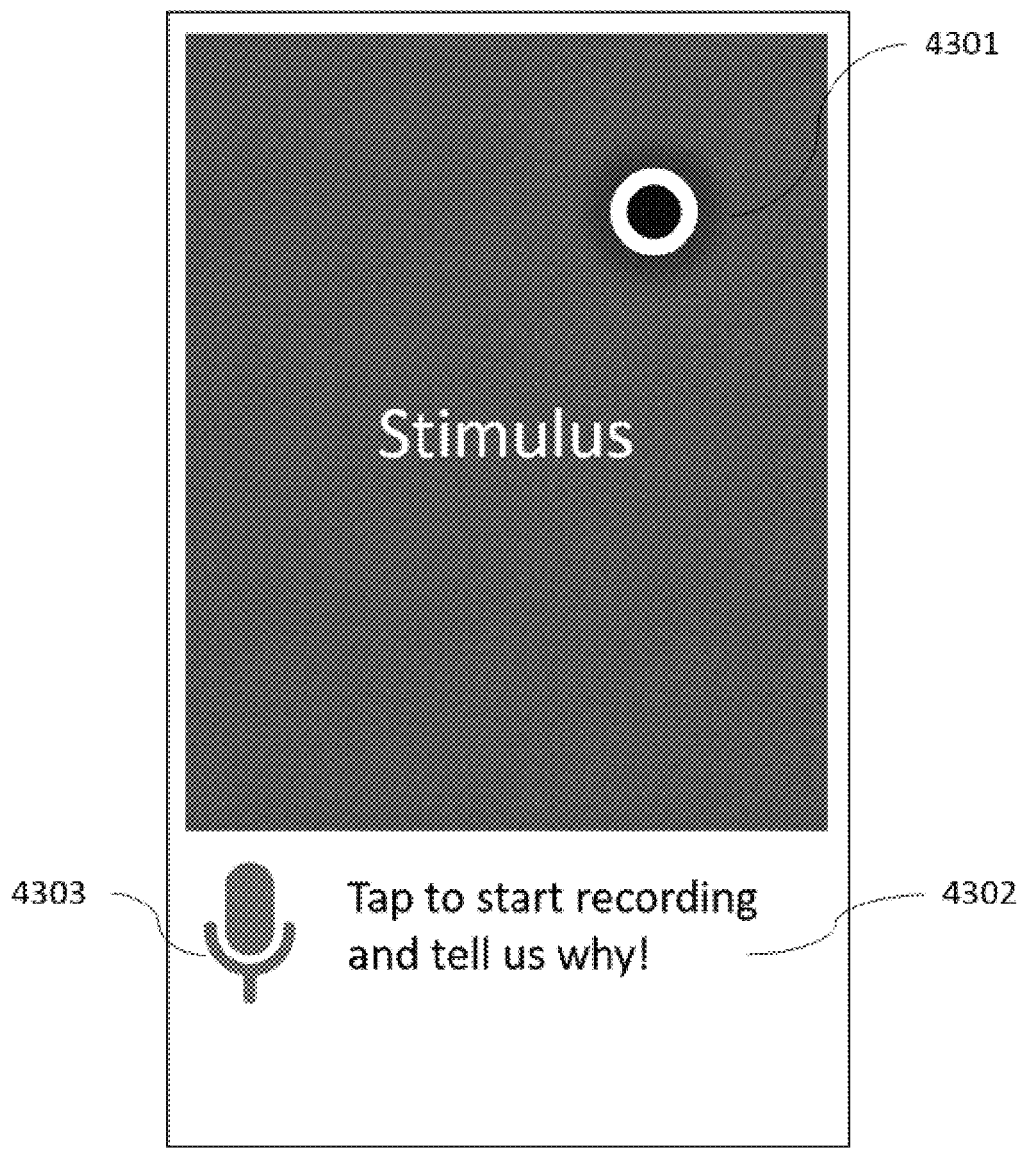
FIG. 43 is an example a Tap and Talk Interface in accordance with an embodiment of the present invention, wherein the respondent has selected a location on the stimulus that he or she likes, and the interface directs the respondent to tap an icon to initiate a recording and explain why.
Figure 44:
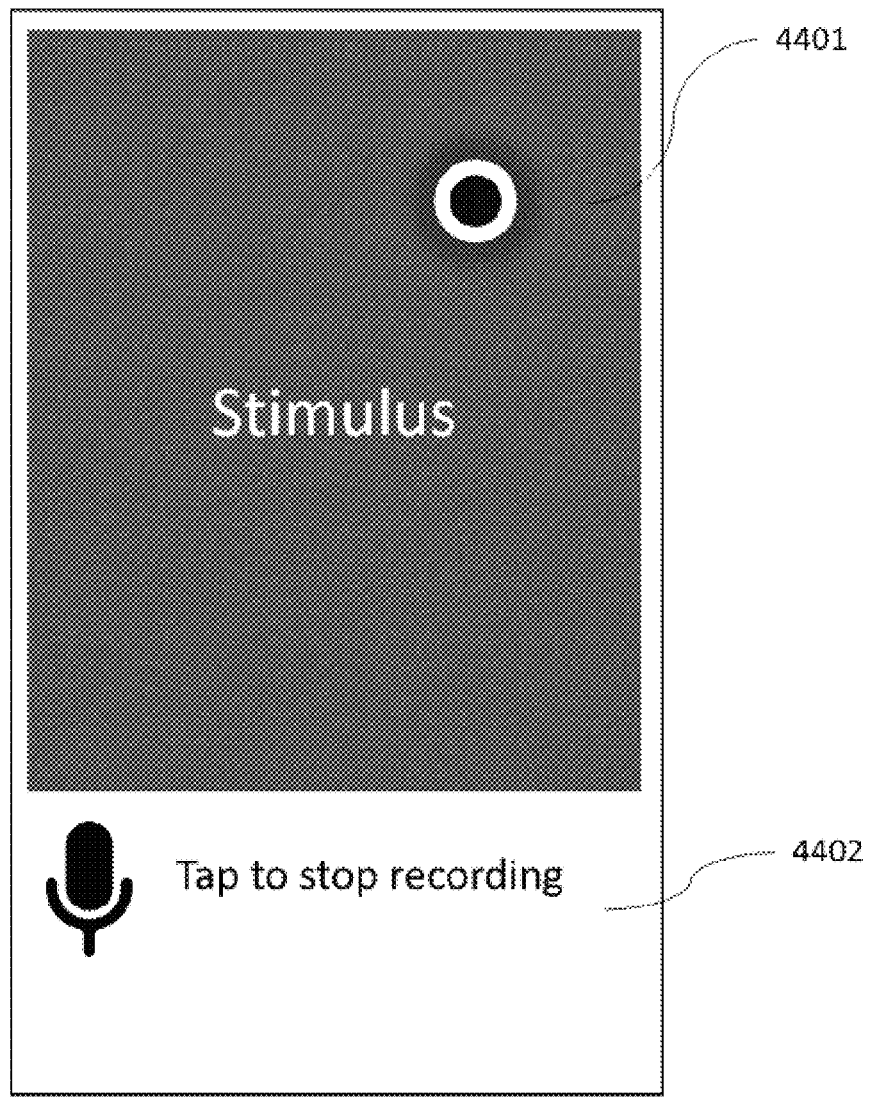
FIG. 44 is an example a Tap and Talk Interface in accordance with an embodiment of the present invention, wherein the respondent has created an audiovisual recording and can tap an icon to stop and submit the recording. In this example, animation would be used to indicate to the user that the recording is active until it is stopped.

One example of the Tap and Talk Interface in accordance with an embodiment of the present invention, is shown in FIG. 42 through FIG. 56. In this example, the respondent is instructed that he or she will be shown an image (such as an image of a new product or new product concept), and can zoom in on the image if desired (for example, to read text that is difficult to read). FIG. 42 shows an example of an initial screen. The respondent receives further instructions 4203 on the screen to tap an area 4202 of the stimulus 4201 that he or she likes the most. Upon tapping an area, the interface would display a screen similar to FIG. 43, which indicates the area selected 4301 and directions 4302 to the respondent to record a recording explaining the reason for his or her selection by tapping a start icon 4303. Tapping the icon starts the recording. In other variants of this embodiment, the recording may automatically initiate after the respondent selects the component of the stimulus that he or she likes, and the automatic initiation may be after a brief pause or countdown. When the recording is active, animation (such as pulsing zones or icons) 4401 emphasizes the area of the stimulus the respondent is commenting about and the respondent is presented with directions 4402 and icons to pause or stop the recording, as shown in FIG. 44. In one variant of this embodiment, if the respondent taps the pause icon, the recording is stopped and the respondent may be presented with icons to resume the recording, to redo the recording, or to submit the recording and continue.

Figure 45:
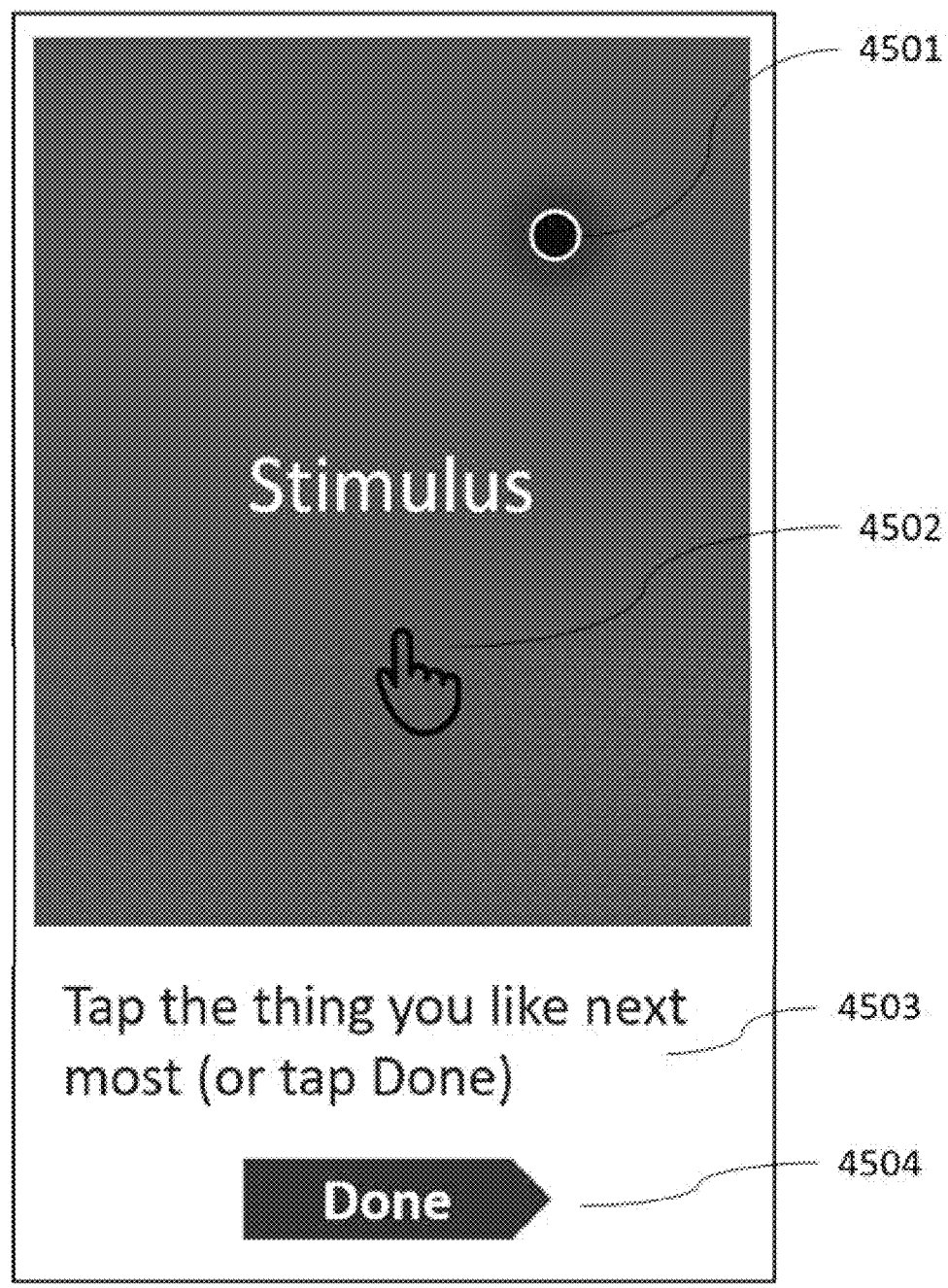
FIG. 45 is an example a Tap and Talk Interface in accordance with an embodiment of the present invention, wherein the respondent is given an opportunity to select a second-most-liked component of the stimulus or to indicate that there are no other areas that he or she likes and to proceed to the next phase. In this example, the respondent selects another location on the stimulus he or she likes.
Figure 46:
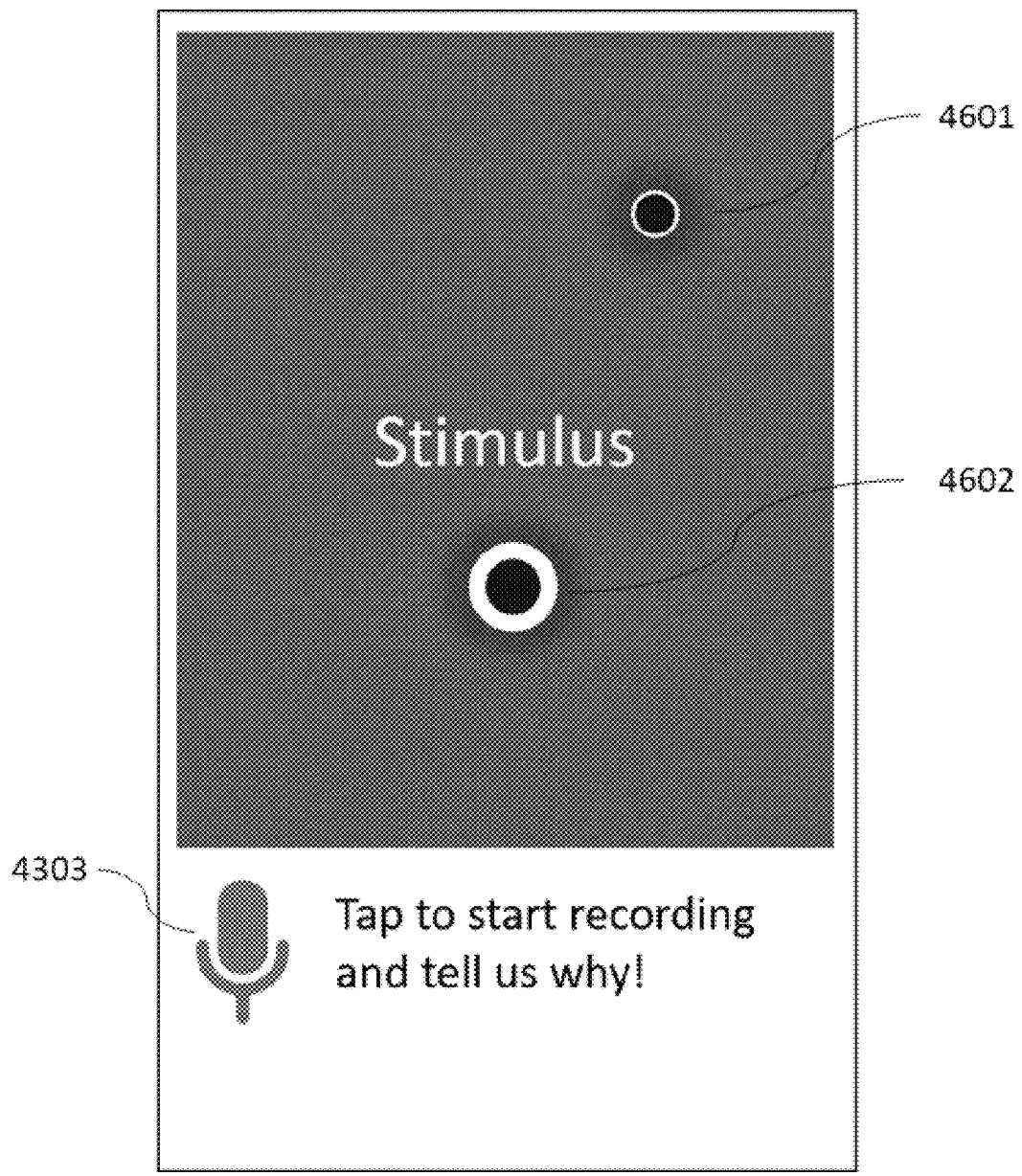
FIG. 46 is an example a Tap and Talk Interface in accordance with an embodiment of the present invention, wherein the respondent has selected a second location on the stimulus that he or she likes, and the interface directs the respondent to tap an icon to initiate a recording and explain why.
Figure 47:
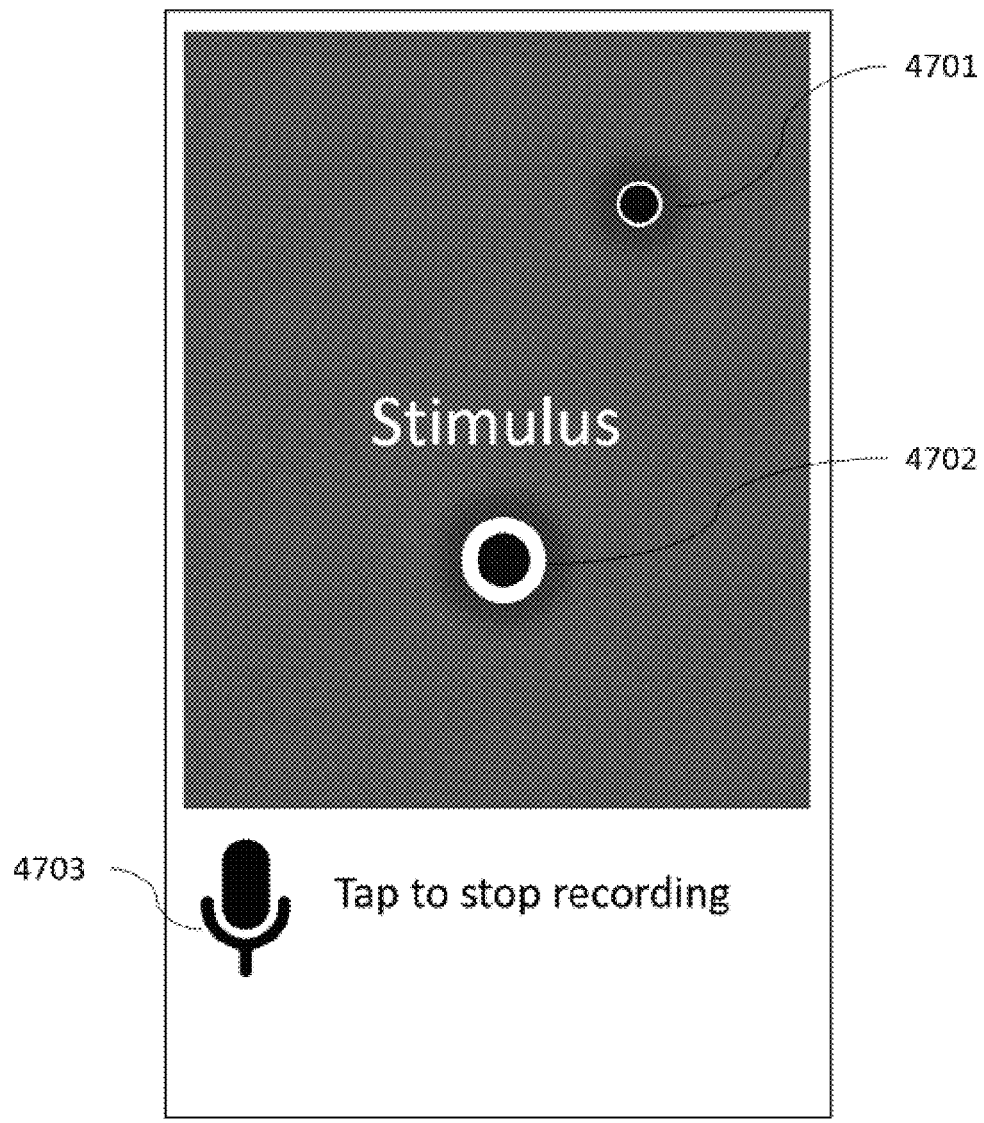
FIG. 47 is an example a Tap and Talk Interface in accordance with an embodiment of the present invention, wherein the respondent has recorded an audiovisual response explaining the reason for his or her selection. As in prior figures, embodiments of the present invention include other interactions.

Continuing with the above example, the respondent is then directed 4503 to select another area 4502 of the stimulus he or she likes second most in the manner described above or may elect to continue 4504 without making such a selection, as shown in FIG. 45. The prior selected area would be remain marked by an icon. 4504 If the respondent selects a second area 4602, as in FIG. 46, the respondent may be asked to record an audiovisual response explaining the reason for the selection in the same manner as described above and tap an icon 4603 to indicate completion (FIG. 47), and then to continue. As described above, other interactions may be used in other variants of this embodiment. Notably in FIG. 46 and FIG. 47, the earlier selection is now represented by a different (in this example, smaller) icon 4601, 4701 than the current selection to reinforce the focus of the respondent. The most recent selection (which is the subject of the recording) is represented by a full-sized icon 4602, 4702. This example of the embodiment may also indicate the current selection through animation or color, such as a pulsing icon that helps indicate that the recording is active and applies to the second selection. After the completion of the recording, the respondent would tap an icon 4703 to end the recording and the interface might then offer the respondent further opportunities to select areas of the stimulus that he or she likes and to record explanations. Variants of the interface may limit the number of selections and recordings, or other aspects of the respondent responses such as the length of recordings.

Figure 48:
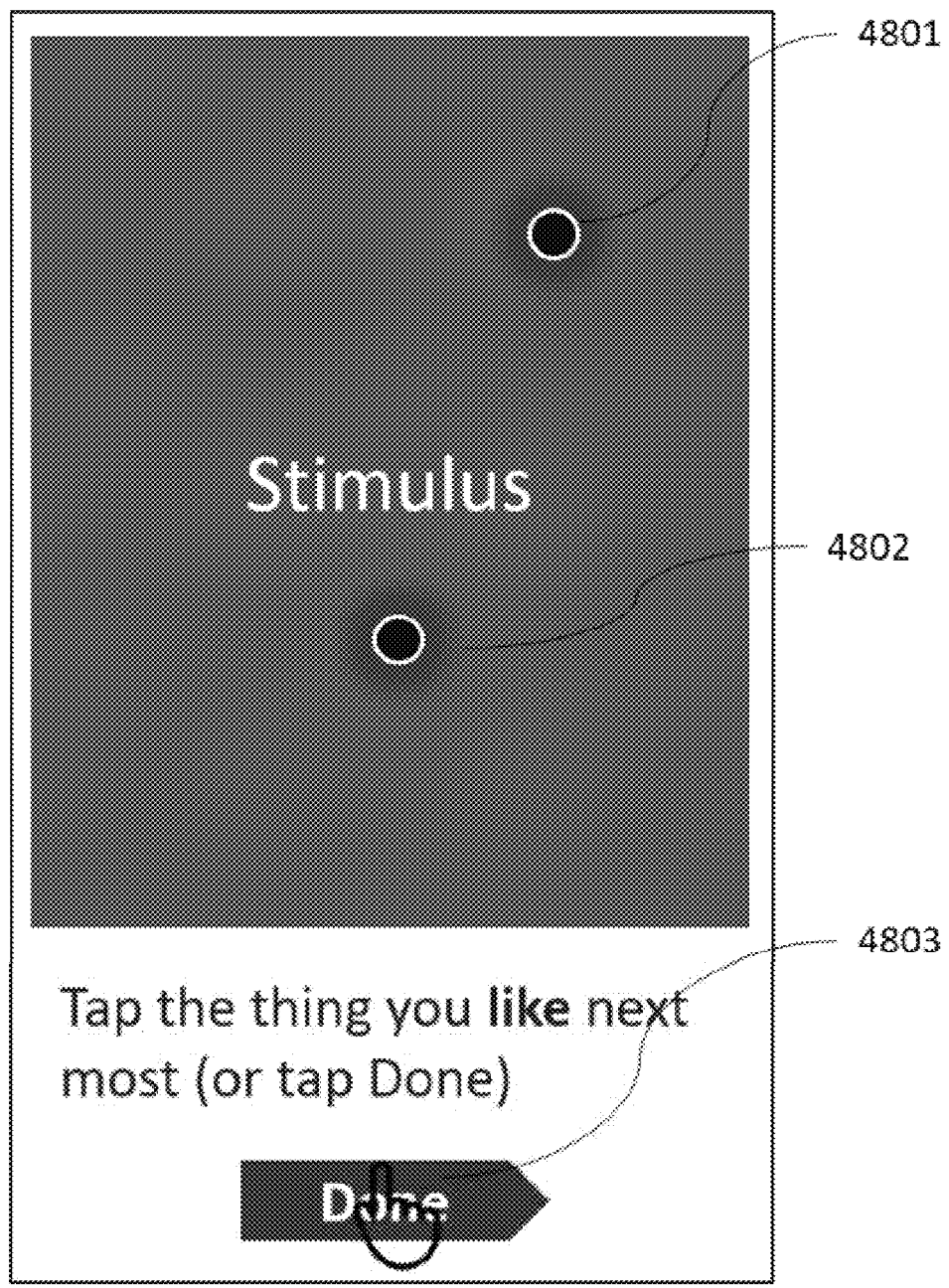
FIG. 48 is an example a Tap and Talk Interface in accordance with an embodiment of the present invention, wherein the respondent has selected two components of the stimulus he or she likes and is being asked if there are additional components he or she likes. In this example, the hand icon indicates that the respondent is selecting the Done button.
Figure 49:
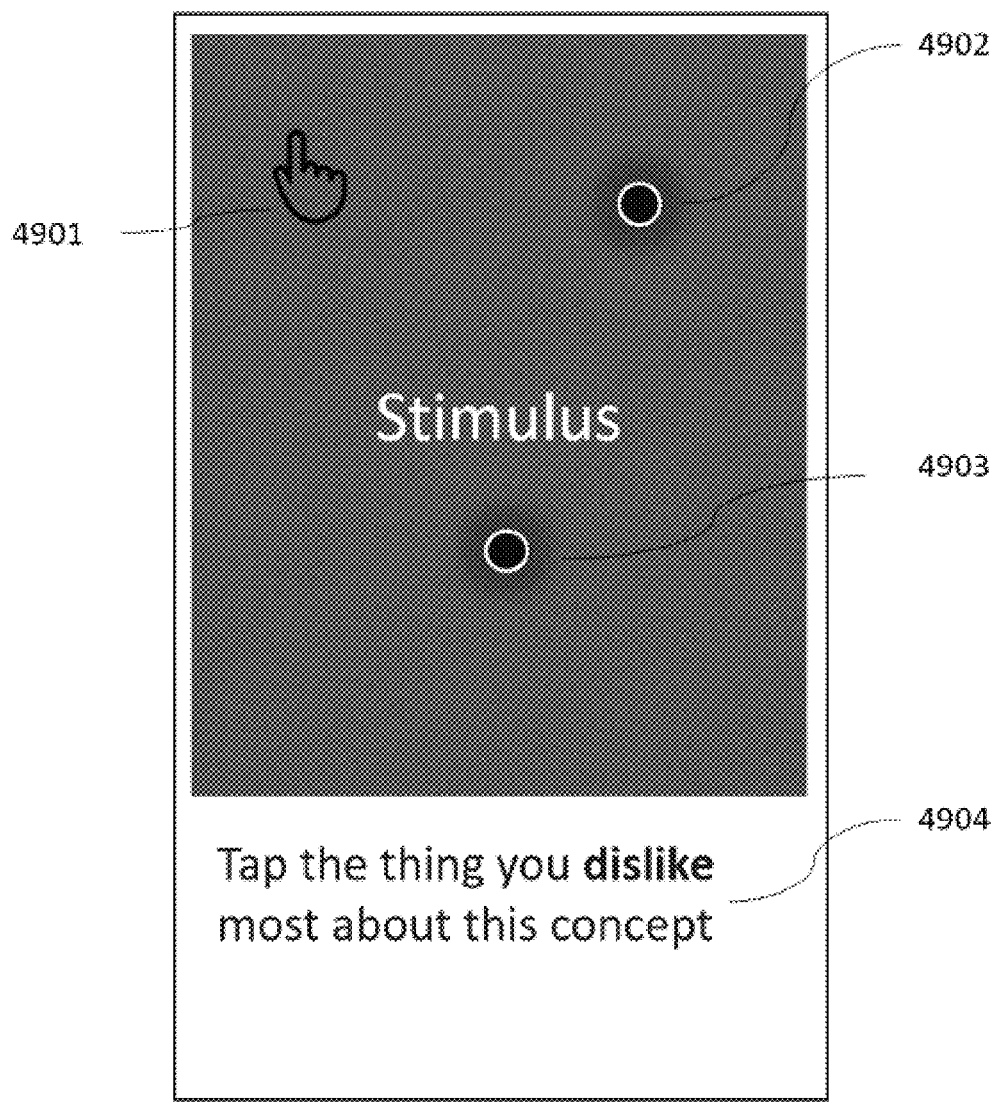
FIG. 49 is an example a Tap and Talk Interface in accordance with an embodiment of the present invention, wherein the respondent is being asked to select a component of the stimulus according to a second objective, in this case an area of the stimulus that he or she dislikes the most. The hand icon indicates the location on the stimulus that he or she selects.
Figure 50:
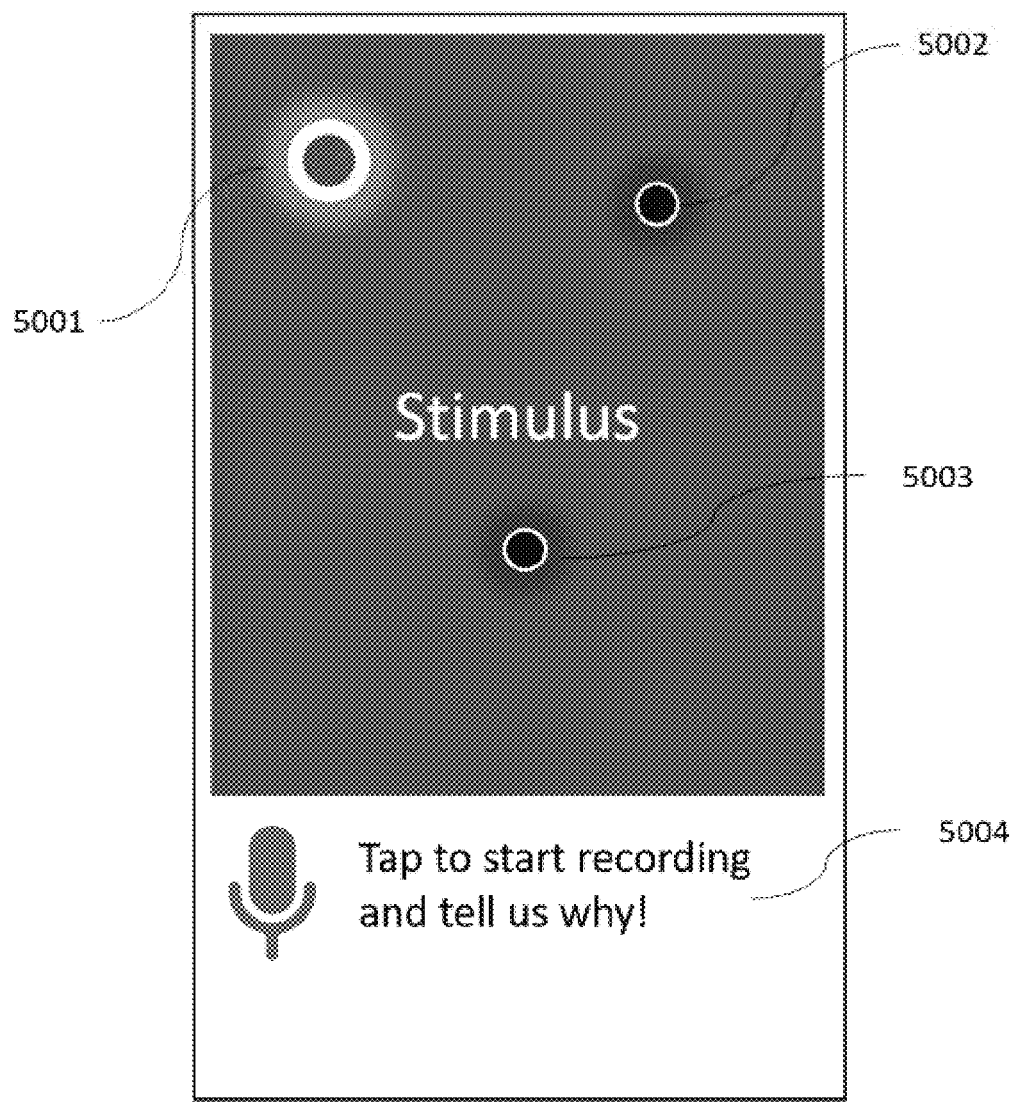
FIG. 50 is an example a Tap and Talk Interface in accordance with an embodiment of the present invention, wherein the respondent has selected a location on the stimulus that he or she dislikes, and the interface directs the respondent to tap an icon to initiate a recording and explain why.
Figure 51:
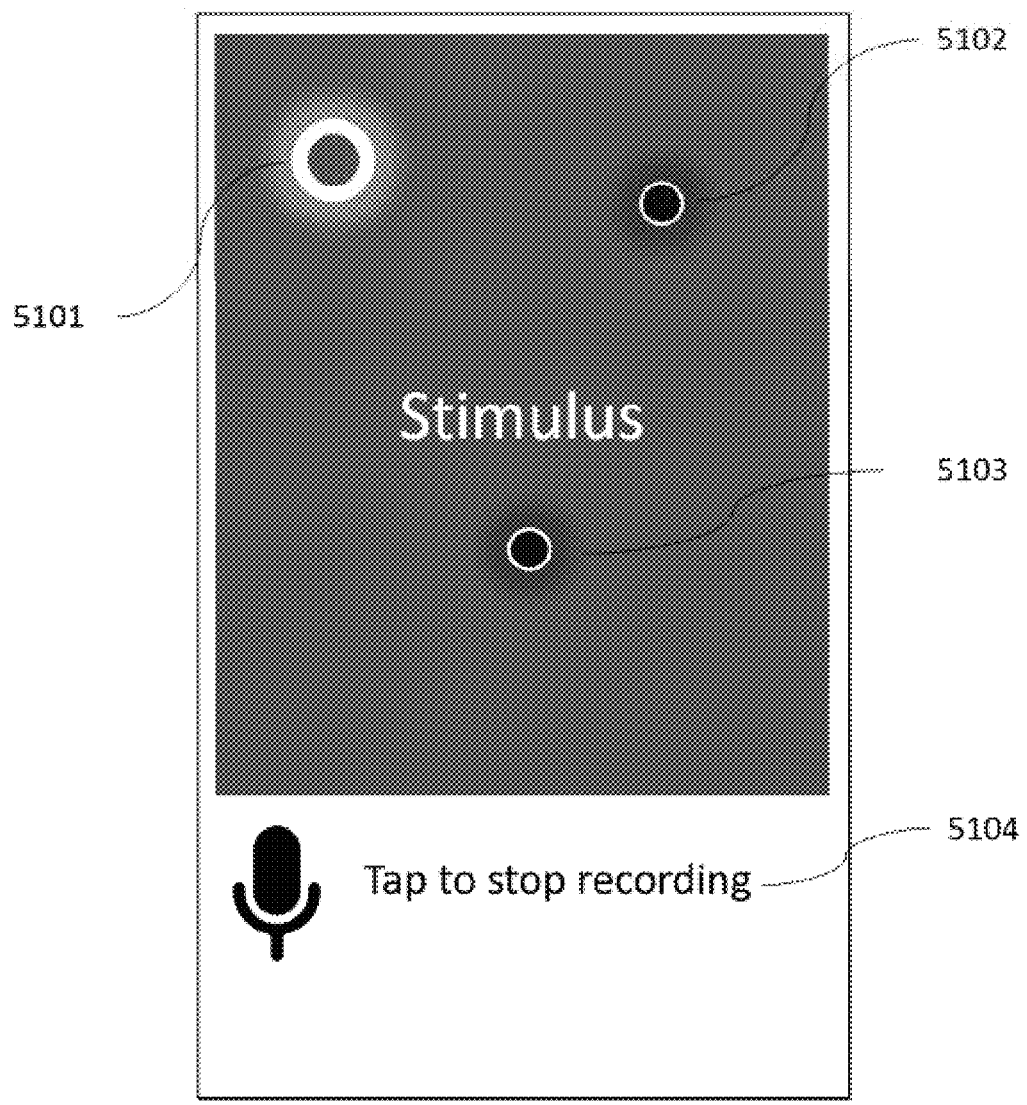
FIG. 51 is an example a Tap and Talk Interface in accordance with an embodiment of the present invention, wherein the respondent has created an audiovisual recording and can tap an icon to stop and submit the recording. In this example, animation would be used to indicate to the user that the recording is active until it is stopped. As described above, other interactions are may be used in other variants of this embodiment.
Figure 52:
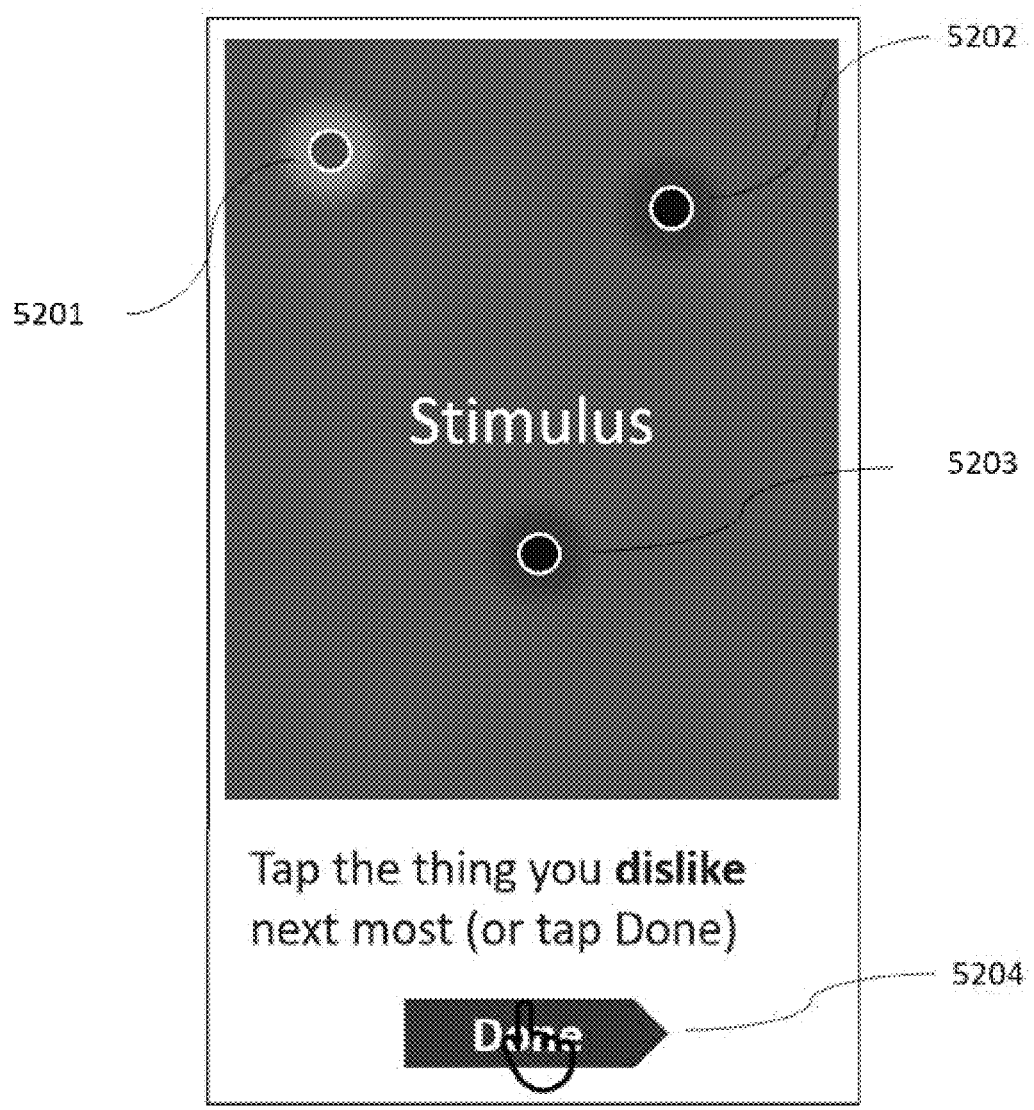
FIG. 52 is an example a Tap and Talk Interface in accordance with an embodiment of the present invention, wherein the respondent has created an audiovisual recording associated with a component of the stimulus that he or she dislikes the most, and can tap an icon to stop and submit the recording.

Continuing with the above example, FIG. 48 shows the respondent indicating that he or she is done 4803 after indicating two areas 4801, 4802 of the stimulus that he or she likes. In this example, he or she may then be directed 4904 to select an area of the stimulus he or she dislikes the most, as shown in FIG. 49, wherein a respondent is selecting an area 4901 he or she dislikes the most while other icons 4902, 4903 indicate prior selections pertaining to one or more previous objectives. As noted earlier, the interface may direct the respondent to select components of the stimulus according to a wide range of objectives; liking and disliking are simply for illustrating the example. In other variants of this embodiment, the interface may allow the respondent to indicate there are no components of the stimulus meeting the objective. Then the respondent may be asked to record an audiovisual response explaining the reason for the selection in the same manner as described above, as shown in FIG. 50. Notably, the icon 5001 indicating the selection for the second objective differs in color in this example from the icons 5002, 5003 that indicate the selections for the first objective; in other versions, other differences in icons could be used. When the respondent has started 5004 the recording, a screen similar to FIG. 51 might be shown in which the recently selected icon 5101 pulses to help focus the respondent's attention. Icons indicating prior selections 5102, 5103 might remain visible or be partially or fully obscured. When the respondent indicates completion of the recording 5104 of the explanation for the respondent's selection, the respondent may then be given additional opportunities to select an area of the stimulus he or she dislikes next most and to record an audiovisual response explaining the reason for the selection in the same manner as described above. In the example in FIG. 52, wherein icons showing the recently selected area 5201 of the Stimulus and prior selections 5202, 5203 may continue to be shown, the respondent indicates he or she is done 5204 and continues. The respondent may then be sent to another instance of the Tap and Talk Interface, in accordance with an embodiment of the present invention.

Figure 53:
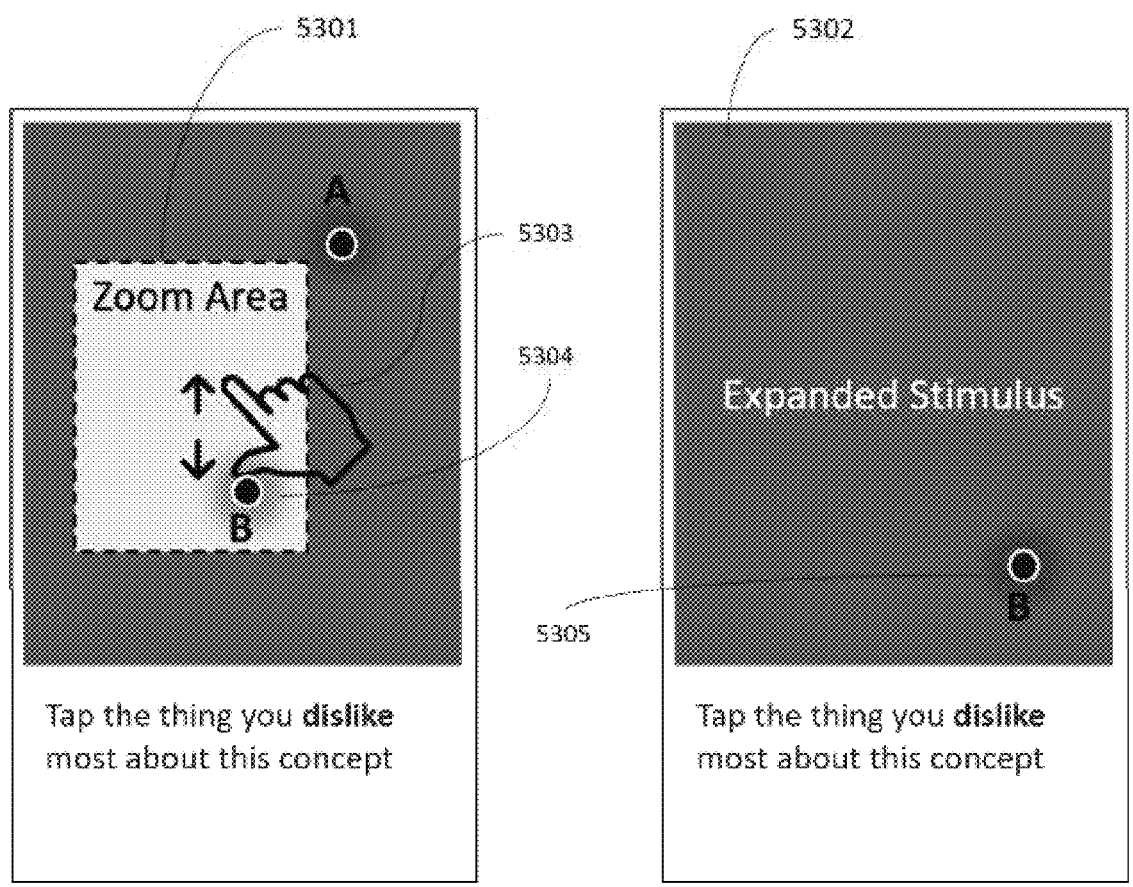
FIG. 53 is an example a Tap and Talk Interface in accordance with an embodiment of the present invention, wherein the respondent is zooming in on the stimulus to see a section more closely or clearly.
Figure 54:
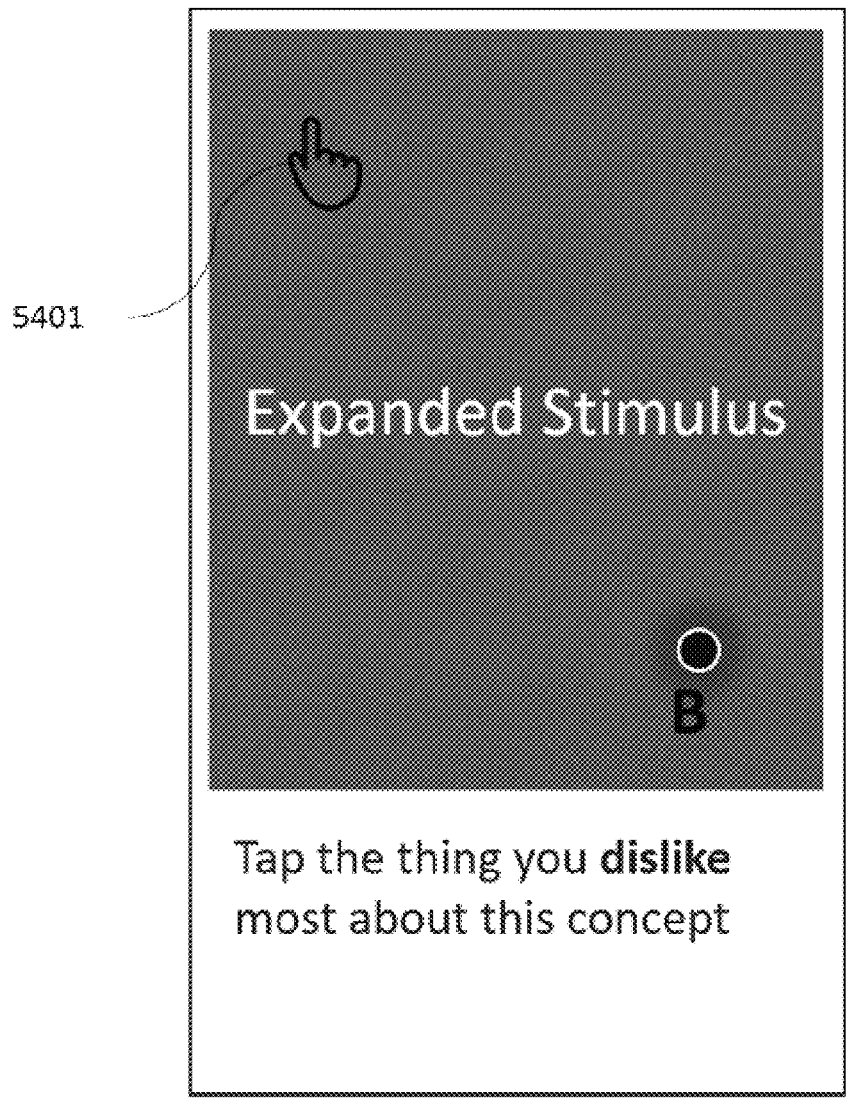
FIG. 54 is an example a Tap and Talk Interface in accordance with an embodiment of the present invention, wherein the respondent is selecting an area on the Expanded Stimulus that he or she dislikes the most (as indicated by the hand icon).
Figure 55:
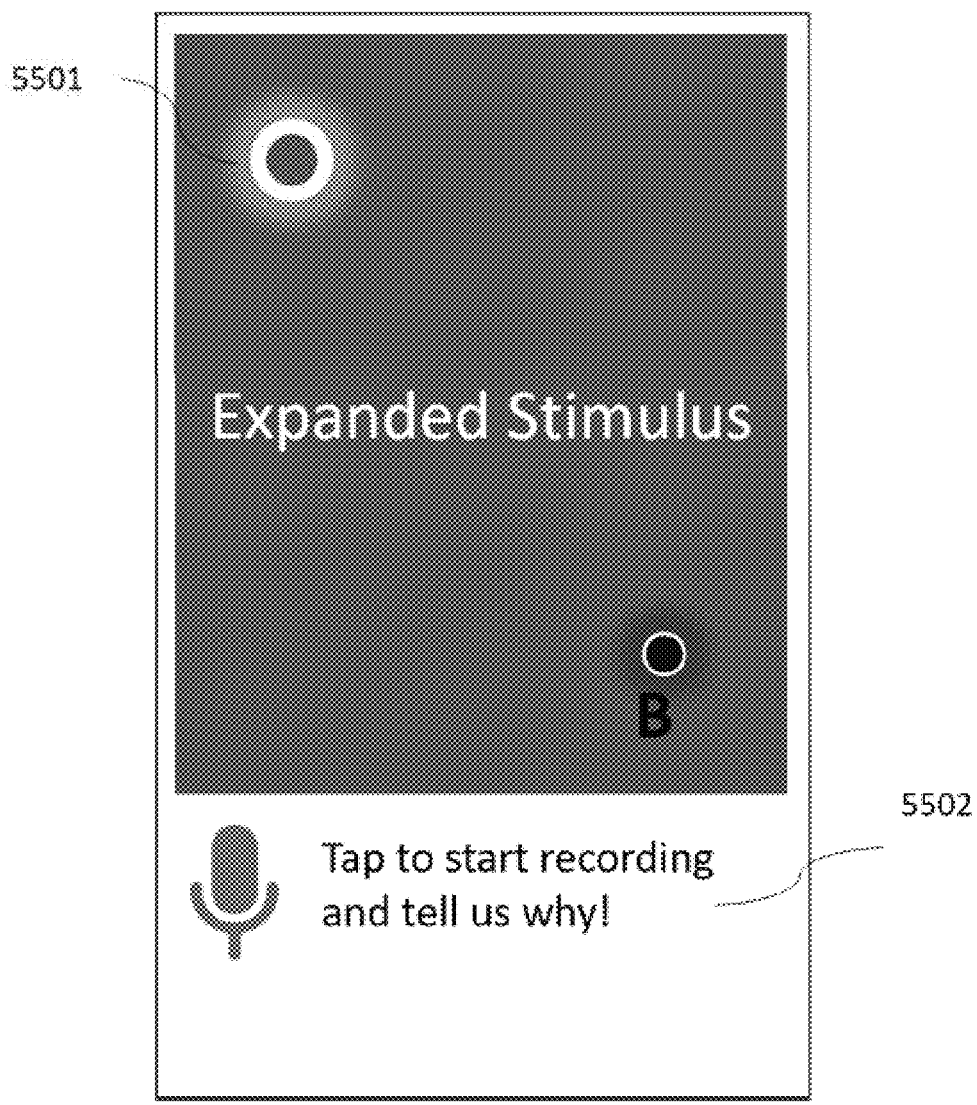
FIG. 55 is an example a Tap and Talk Interface, in accordance with an embodiment of the present invention, wherein the respondent has selected an area on the Expanded Stimulus that he or she dislikes and is being directed to tap the microphone icon to begin recording an audiovisual response explaining why.
Figure 56:
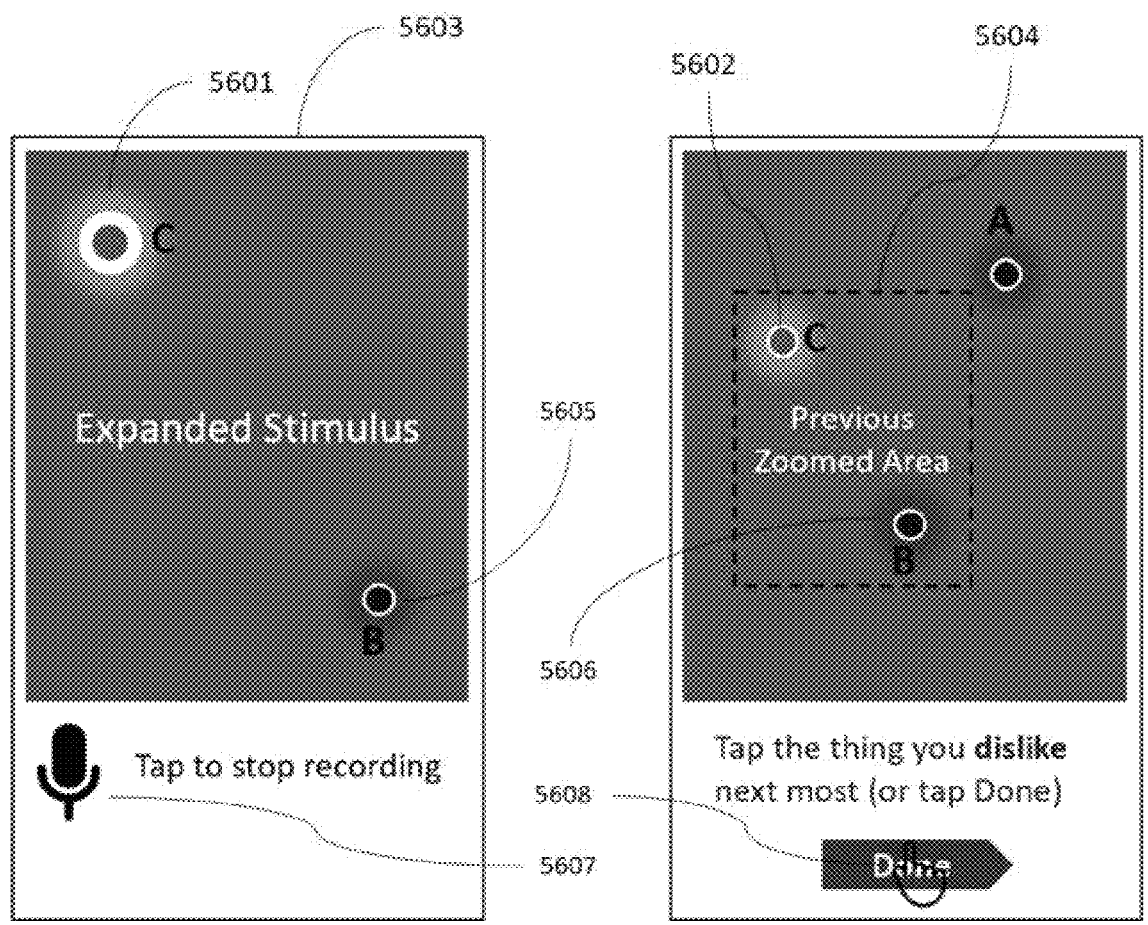
FIG. 56 is an example a Tap and Talk Interface in accordance with an embodiment of the present invention, wherein the respondent has recorded an audiovisual response associated with a selected an area on the Expanded Stimulus that he or she dislikes the most.

In one example of the Tap and Talk Interface in accordance with an embodiment of the present invention, shown in FIG. 53, the interface may enable the respondent to zoom or magnify areas of the stimulus through a gesture, such as a two finger spreading gesture 5303. The interface may further receive gestures while in the zoomed mode to indicate a selection of a component according to an objective. The two-finger icon on the left side of the FIG. 5303 indicates the use of a standard two-finger zoom interaction to select and expand the area the respondent wishes to inspect in this example. The area labeled Zoom Area on the left side 5301 maps to the Expanded Stimulus on the right side 5302. In this example, the respondent has already selected two areas on the stimulus that he or she likes the most, and is now being asked to indicate a component he or she dislikes the most. In the zoomed area, icons indicating prior selections are mapped from the original stimulus. Since the prior selection labeled 'A' 5306 is not within the Zoomed Area, it does not appear in the Expanded Stimulus. The prior selection 'B' 5304 is mapped to the appropriate coordinates 5305 in the Expanded Stimulus. The example continues in FIG. 54, wherein the hand icon 5401 indicates a location on the Expanded Stimulus that the respondent is selecting by tapping, and in FIG. 55 wherein the respondent is directed 5502 to tap the microphone icon to explain the selection 5501. FIG. 55 is similar to FIG. 50, except that only the Expanded Stimulus is visible, which represents the zoomed-in area of the full stimulus. Further continuing with this example, FIG. 56 shows a two-screen sequence in which the respondent taps the microphone icon 5607 again to indicate completion of the audiovisual recording and the interface reverts back to the normally sized stimulus. Upon indicating completion of the response by the respondent tapping the icon to stop the recording, the screen which shows the zoomed-in area of the stimulus 5603 may zoom back out to show the normally sized stimulus 5604, and the respondent may be asked to select a next component of the stimulus that he or she dislikes the most, or to indicate that he or she is Done 5608. The reversion of the screen might be animated in any number of ways. The dashed box in the right side 5603 of FIG. 56 shows the area of the stimulus corresponding to the zoomed area 5604 that was shown in the Expanded Stimulus, and the selected locations from that Expanded Stimulus 5601, 5605 are mapped back to corresponding locations 5602, 5606 on the normally sized stimulus. When the screen zooms out, the Expanded Stimulus maps into the Previous Zoomed Area. In this example, the selection marked 'B' 5605 is restored to its original position 5606 on the normally sized stimulus, and the new selection marked 'C' 5601 is mapped to the appropriate coordinates 5602 on the normally sized stimulus. It should be noted that although the example of zooming was applied at a particular point in the sequence, this embodiment of the present invention may incorporate an ability to zoom into a rich media stimulus at any point in a sequence of events in the interface. Several mechanisms for managing zooming into a stimulus and interaction with an Expanded Stimulus may be implemented that do not change the essence of this embodiment of the present invention.

In one variant of the Tap and Talk Interface in accordance with an embodiment of the present invention, a stimulus can include a set of images that were selected by the respondent in a set of survey questions earlier in the survey or by logic that uses responses to such a set of questions. In such a variant, the set of earlier survey questions may include another embodiment of the present invention. For example, the respondent may first respond to a survey question in which the respondent is presented several images (for example, 30 to 40 images) in a Group and Rank Interface according to an embodiment of the present invention described above, and in which the respondent selects a subset of those images that he or she associates most with a stimulus. For example, if a stimulus showed a brand, the respondent may then be asked to one or more of (i) tap an area of the composite image that he or she particularly likes about the associated brand imagery and to explain why, and (ii) tap an area of the composite image he or she particularly dislikes and which communicates and intense dislike about the associated brand and explain why. Further, the respondent may be permitted to indicate a response that is directed to the entirety of the composite image, and to record an audiovisual response indicating a general explanation for why he or she selected the particular images to represent the brand. The combination of these multiple embodiments of the present invention through connecting logic and sequencing causes the interface to gather data that indicates an initial "fast-thinking" response using images that do not require articulating thoughts, feelings or perceptions in words (thus reducing fatigue and various biases), and then cognitively primes the respondent to justify the selection of those images. The use of audiovisual responses helps enhance the quality, quantity, and accuracy of data in the open-ended response by using an easier and more natural activity for the respondent than typing text into an entry box on the small screen of a mobile computing device.

Further continuing with the Tap and Talk Interface embodiment, data generated by the respondent's interactions are recorded as respondent response data. This data includes at a minimum the selections made by the respondent and the respondent's associated audiovisual responses, but can also include data selected from the group consisting of timings associated with actions, the number of times a stimulus was magnified or zoomed, the number of times an audiovisual response was replaced, other data associated with the respondent's interactions, and combinations thereof.

Figure 57:
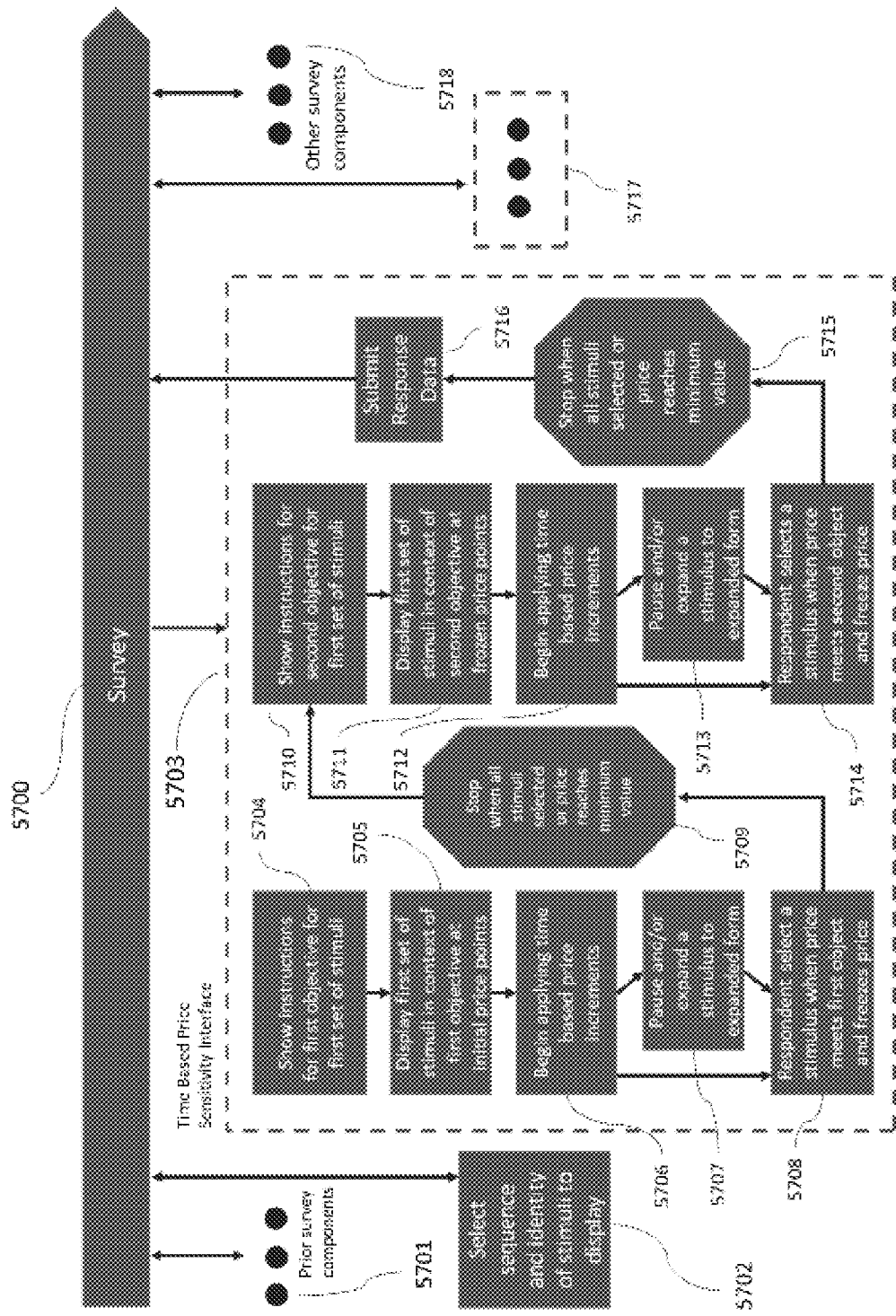
FIG. 57 is an example of a basic software process configuration used in an embodiment of the present invention which we call the Time Based Price Sensitivity Interface, which is designed to gather price sensitivity information for a set of products.
Figure 58:
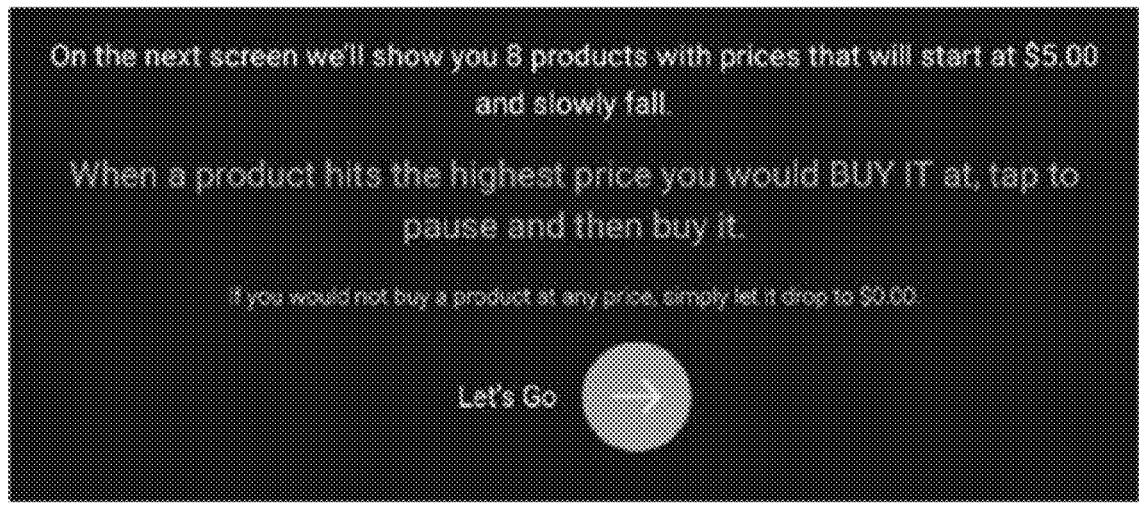
FIG. 58 is an example of instructions for a Time Based Price Sensitivity Interface in accordance with an embodiment of the present invention, which is designed to gather price sensitivity information for a set of products.
Figure 59:
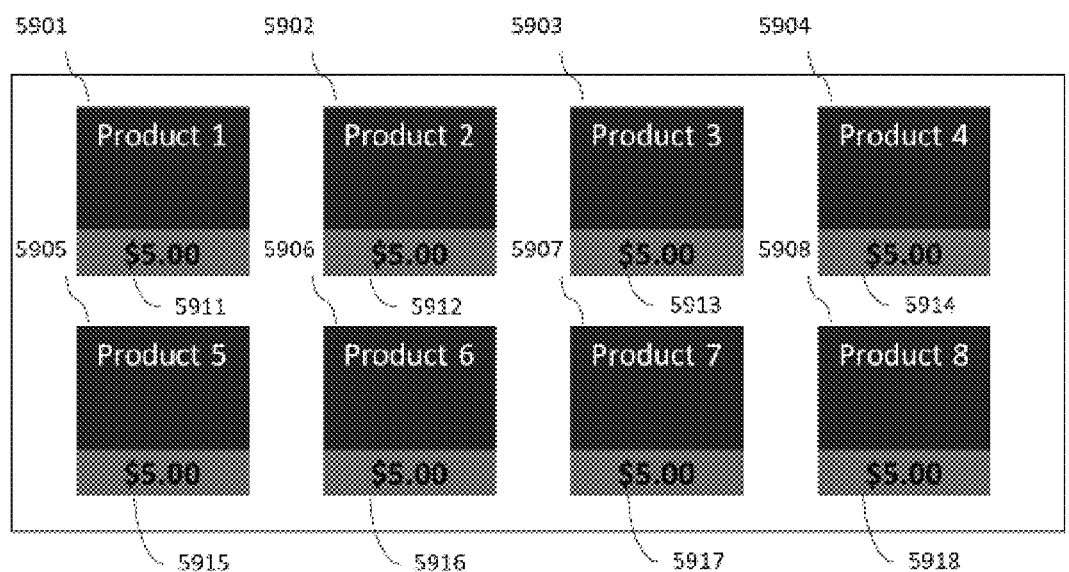
FIG. 59 is an example of an initial screen for a Time Based Price Sensitivity Interface in accordance with an embodiment of the present invention, in which the initial price for all of the products is set at $5.00.

In another embodiment of the present invention, which we call the Time Based Price Sensitivity Interface, the interface is used to gather data on price sensitivity from respondents. FIG. 57 shows an example process for this embodiment. In this example, a respondent may complete elements (components) 5701 of a survey 5700 prior to engaging with the interface. Various elements of that survey and responses to those elements, as well as a variety of algorithms to ensure an efficient design of experiment 5702, may be used to select a set of stimuli to include in the interface. Such mechanisms and algorithms to select questions or items to include are considered standard in the practice of survey creation and experimental design. Before engaging with the Time Based Price Sensitivity Interface 5703, a respondent typically receives an instruction screen 5704, 5710 explaining how to interact with the forthcoming interface. The instructions may be shown as an overlay on the interface itself, or through other mechanisms. The respondent then engages a first instance of the interface and responds accordingly. The respondent may then engage further instances of the interface, perhaps with one or more of different objectives given to the respondent and different stimuli. As the respondent completes each instance of the interface, the interface receives interactions and respondent response data associated with those actions, and translates this data to a form which can be transmitted and stored in the survey system or another system that may be accessed through the internet, for example through an API enabled software service. The interface then transmits the data 5716 and proceeds to either the next instance of the interface 5717 or to another component of the survey 5718. Many variations on this process can exist without changing the nature of this embodiment of the present invention. For example, data may be captured locally on a mobile computing device for several instances of the interface at a time and then batch uploaded to a survey system, or the entire survey may be stored on a device and uploaded at a later time.

In an example of the Time Based Price Sensitivity Interface in accordance with an embodiment of the present invention, a set of stimuli (such as product or package images) is displayed onscreen (either in one set or a sequence of sets that are selected algorithmically) 5705, 5711 and each stimulus is accompanied by a price which changes over time 5706, 5712. For example, a virtual "shelf" of a set of products may be shown with prices that start at a specified level and then decrease or increase over time. A respondent is asked to select the first price shown for each product at which he or she would purchase the product.

In one variant of the Time Based Price Sensitivity Interface embodiment in accordance with an embodiment of the present invention, the interface captures the maximum price at which the respondent would buy each product 5708, 5714. The rate of decrease in the price is structured to create a tradeoff for the respondent between their own personal time and the price the respondent would agree to pay. This helps avoid an inherent tendency for self-stated survey methods to understate actual willingness to pay. In addition, this method rapidly identifies "cheating" respondents who are rushing through a survey merely to receive an incentive.

In the Time Based Price Sensitivity Interface in accordance with an embodiment of the present invention, the rate at which prices change may vary over the course of the interaction. For example, prices may display at a starting price and then begin to change in increments towards an ending price. For example, the speed of price changes could be calibrated one or more of proportionately based on time passed, number of price increments that have passed, proximity to endpoints, etc.

The interactions in the Time Based Price Sensitivity Interface in accordance with an embodiment of the present invention, efficiently gather respondent price sensitivity data and respondent willingness to pay data on several products at the same time in a manner that is user friendly and easy to complete on a mobile computing device. A respondent can assess several (at least 8) stimuli showing products or services simultaneously simply by waiting for time to pass and the price to fall to a level at which he or should would purchase the product or service represented. By contrast, a standard open-ended pricing method like Van Westendorp's method would require the respondent to select and type in 32 open ended numeric response values with decimals into 32 small text boxes on a mobile device, which is certain to yield poor quality responses due to fatigue, errors and frustration (even ignoring the many economic behavioral assumptions that are violated). In addition, this embodiment of the present invention can provide competitive context to respondents (without specific preset price points that create anchoring bias) by showing competing products and services and asking for the user to make selections in that context, unlike Van Westendorp's method which shows one concept at a time.

This variant of the Time Based Price Sensitivity Interface in accordance with an embodiment of the present invention, also mitigates many of the challenges of discrete choice based methods and models, while providing many of the benefits of these methods including contextual category awareness and passive selection of the stimulus without the need to manually type in text or numeric data.

In another variant of the Time Based Price Sensitivity Interface in accordance with an embodiment of the present invention, the prices may start low and increase. In such a variant, for example, the respondent may be directed to select each product when it reaches a price at which the respondent would no longer be willing to buy it. As another example, the survey may direct a respondent to indicate the first (and thus lowest) price at which he or she would be willing to sell something or accept an impairment of some sort. For example, the respondent may be asked to select the minimum discount he or she would need in order to give up access to a live customer service agent and rely only on online or automated help systems for a software product.

In another variant of the Time Based Price Sensitivity Interface in accordance with an embodiment of the present invention, the prices may cease to decrease (or increase) after a certain price point is met. The interface may then assume that the respondent is unwilling to purchase (or sell) an item at a reasonable price.

In another variant of the Time Based Price Sensitivity Interface in accordance with an embodiment of the present invention, when a stimulus is selected (or the maximum or minimum price point has been reached), the associated price freezes 5708, 5714. When all the prices are frozen 5709, 5715, the screen may advance to the next screen.

In another variant of the Time Based Price Sensitivity Interface in accordance with an embodiment of the present invention, the respondent may pause 5707, 5713 the price decline by selecting a control on the interface.

In another variant of the Time Based Price Sensitivity Interface in accordance with an embodiment of the present invention, the respondent may tap on or otherwise select a stimulus to expand into an extended form version of the stimulus. This action may also pause the incremental changes in price. The respondent may then close the extended form version of the stimulus to return to the main screen (which might resume incremental price changes), or may indicate that he or she would purchase the item at the currently specified price, and then return to the main screen.

In another variant of the Time Based Price Sensitivity Interface in accordance with an embodiment of the present invention, when the prices for all of the stimuli on a screen have been frozen, the respondent may be presented with a second set of instructions directing the respondent to review the same products and select stimuli when the price points have reached a level that meets a second criteria or objective. Then the respondent would be returned to the screen with the stimuli all shown with associated frozen prices, and the prices would begin to incrementally change. In this second screen, the price initially associated with each stimulus may start at the level at which it was frozen on the previous screen, or may start at another level, or may start at a level that is determined according to an algorithm or rule that incorporates prior respondent selections. The respondent would then repeat the activities and interactions described above as the prices incrementally change.

Figure 60:
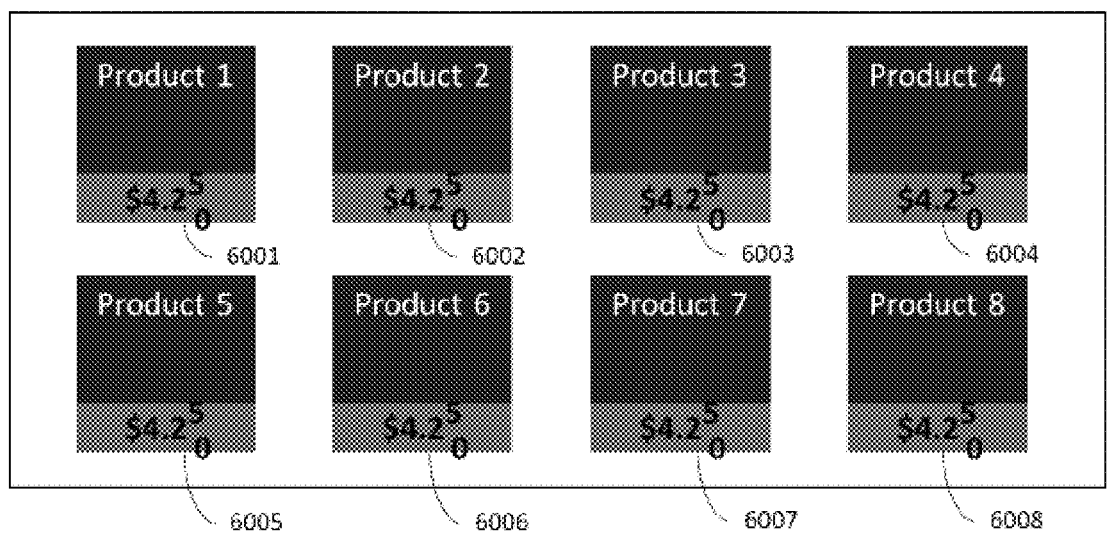
FIG. 60 is an example of an animation for a Time Based Price Sensitivity Interface in accordance with an embodiment of the present invention, showing the prices declining. In this example, the price increment is $0.05, and prices are in the process of declining from $4.25 to $4.20.

An example of the Time Based Price Sensitivity Interface in accordance with an embodiment of the present invention is shown in FIG. 58 through FIG. 69. This example first presents instructions (FIG. 58) to a respondent indicating that he or she will be shown a set of 8 products on the next page at a particular price which will then start to drop, and to select each product when it reaches the price at which he or she would purchase it. The instructions could be shown in a variety of alternate ways, such as using an onscreen pop-up. The respondent may then be shown a screen, such as on FIG. 59, with multiple products 5901, 5902, 5903, 5904, 5905, 5906, 5907, 5908 and their associated prices 5911, 5912, 5913, 5914, 5915, 5916, 5917, 5918, which in this example includes 8 products starting at $5.00. After a brief pause (about 1 to 2 seconds) to allow the respondent to orient him or herself, the prices begin to decline in increments, which in this example are of $0.05, with each incremental reduction taking a certain time, which in this example is about 700 milliseconds. FIG. 60 shows an example of a screen with the prices in the middle of a transition animation 6001, 6002, 6003, 6004, 6005, 6006, 6007, 6008 which is reducing the prices from $4.25 to $4.20. The initial price, termination price, increment of price change, acceleration of price changes, animation time, and other parameters may be selected to be appropriate for the products or services in the survey. Typically, the initial price would be somewhat higher (30% to 50%) than the highest expected value that may be paid for the most expensive product. For example, if the most expensive product was expected to be priced at $3.50, then the initial price may begin at $5.00. This helps avoid biasing the respondent toward a particular price point, and allows the respondent some extra time to orient him or herself as the prices are declining. The price increment would typically be selected to enable enough granularity to assess price sensitivity at the desired level without overly burdening the respondent. The timing of the incremental changes would typically be selected so as to create some cognitive pressure on the respondent without creating excess stress (for example, between 500 milliseconds and 2 seconds). The visual display and animation of the falling prices may use one of a range of displays, such as a display mimicking a price placard (in which a card is flipped to reveal a new price), an odometer (in which the number rotate out to reveal new numbers), etc. FIG. 60 shows an animation similar to an old-style odometer.

Figure 61:
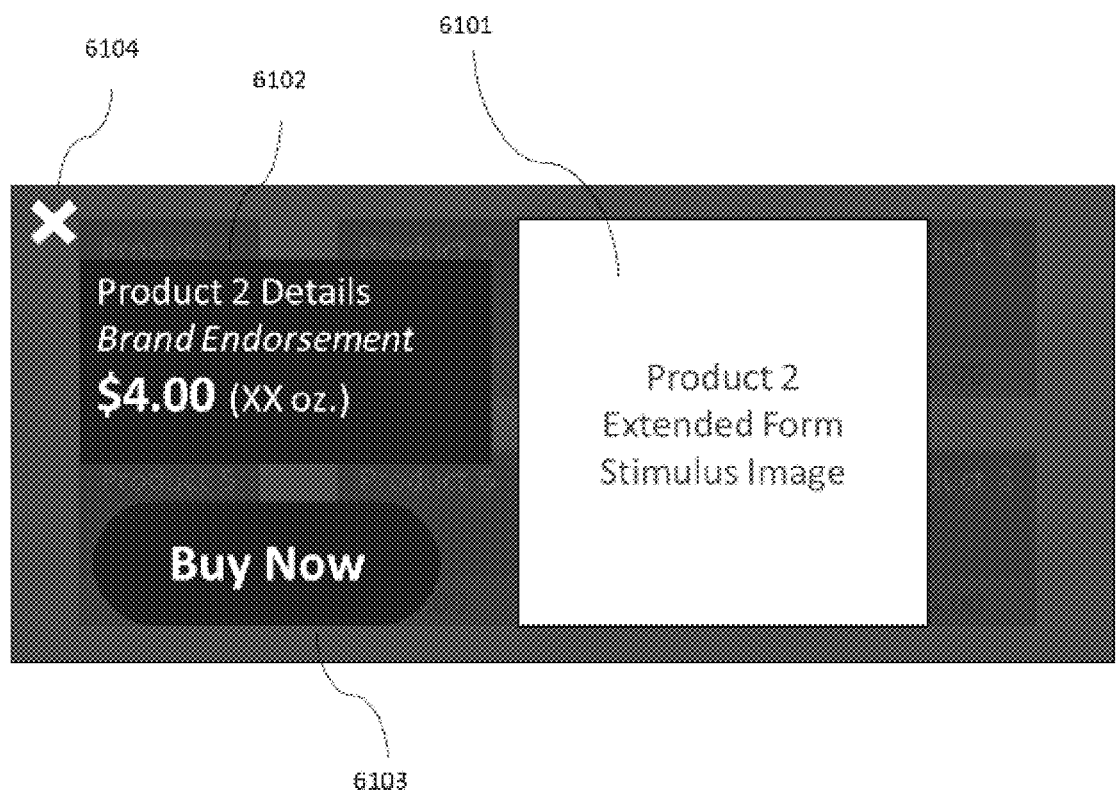
FIG. 61 is an example of an animation for a Time Based Price Sensitivity Interface in accordance with an embodiment of the present invention, showing a product that is selected for consideration, in which the selected product is represented by an extended form stimulus and additional information about the product is displayed.
Figure 62:
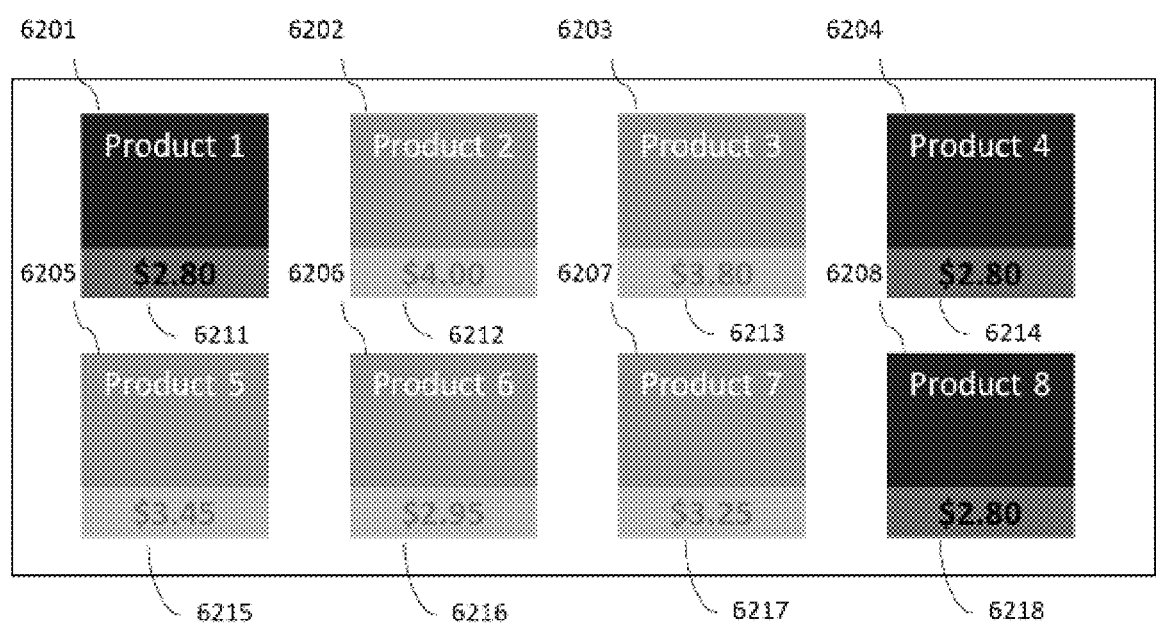
FIG. 62 is an example of a Time Based Price Sensitivity Interface in accordance with an embodiment of the present invention, that shows five products that have been selected at various price points, and three products that have not yet been selected, and in which the current price for the unselected products is $2.80.
Figure 63:
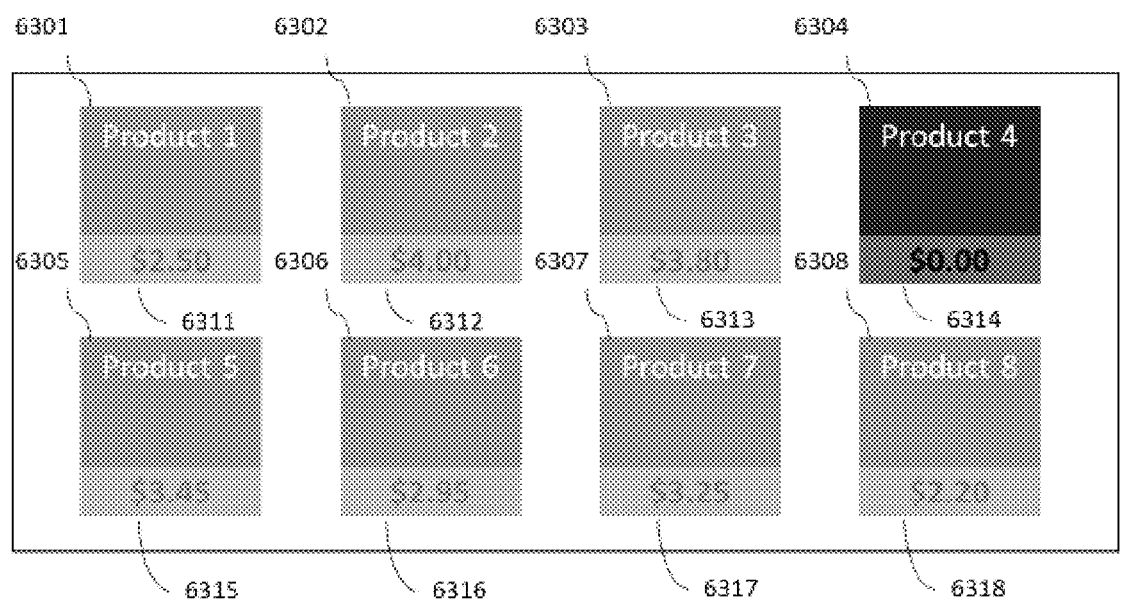
FIG. 63 is an example of a Time Based Price Sensitivity Interface in accordance with an embodiment of the present invention, in which all products have either been selected at a particular price or fallen to a termination price (in this case, $0.00).
Figure 64:
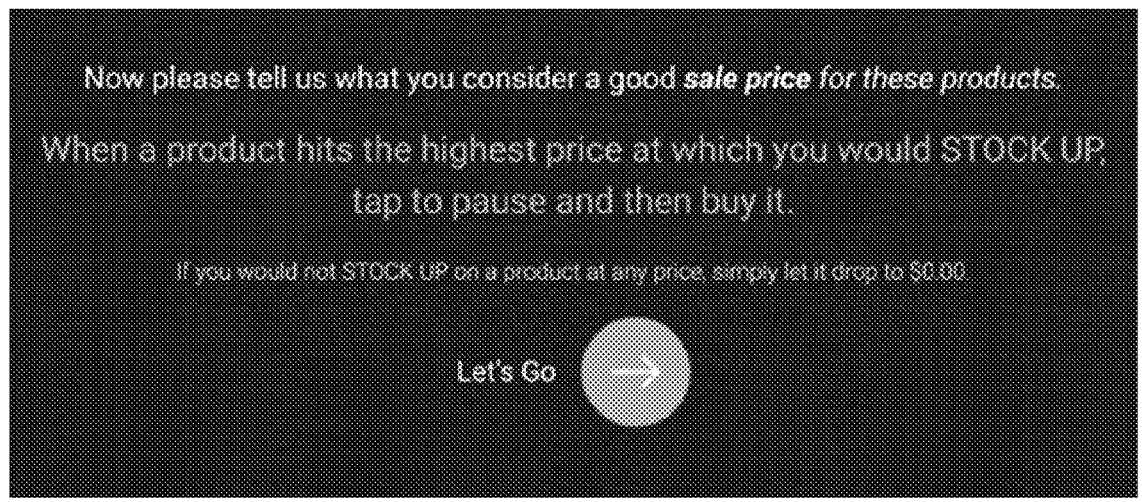
FIG. 64 is an example of instructions for a Time Based Price Sensitivity Interface in accordance with an embodiment of the present invention, pertaining to a second objective relating to the same set of stimuli from the prior screen. In this example, the respondent is directed to select a product when the price reaches the level at which the respondent would stock up on the product.
Figure 65:
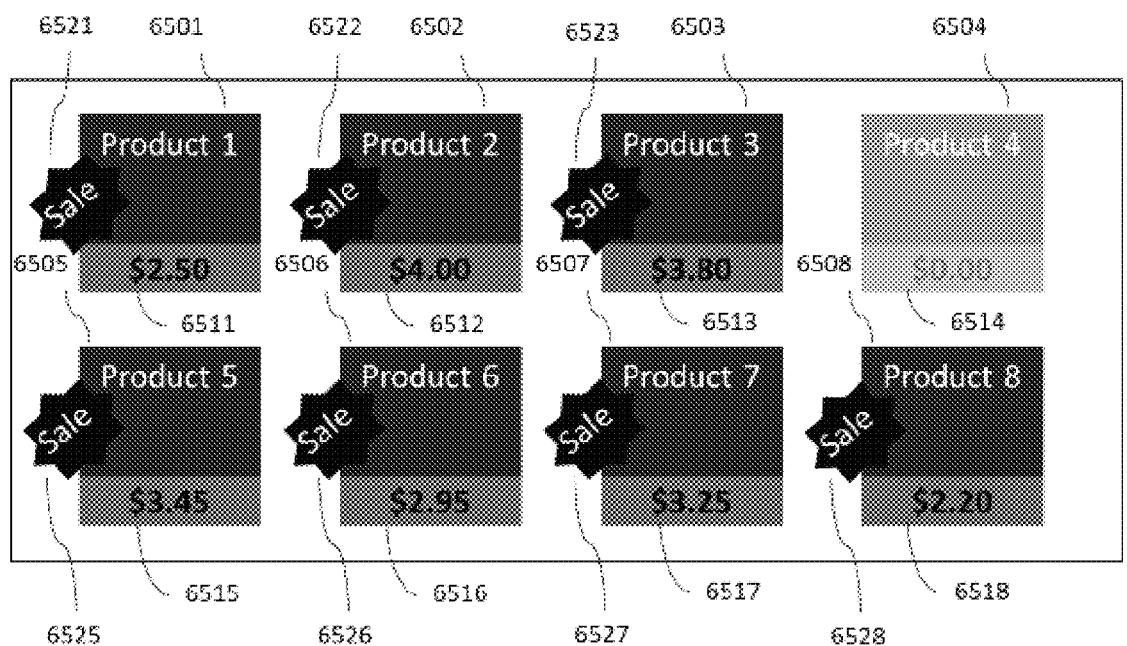
FIG. 65 is an example of a starting screen for a second phase in a Time Based Price Sensitivity Interface in accordance with an embodiment of the present invention, in which the objective is to identify the prices at which respondents would stock up on each product. In this example, the prices start at the ending prices that were frozen in the prior screen (that is, the highest price at which the respondent would purchase each product), and one product is not available because it was never selected in the first phase.

Continuing with this example, when the respondent taps on a stimulus, the price declines pause and an extended form version of the stimulus 6101, 6102 appears (FIG. 61). The stimulus shown in this example is an enlarged version of the basic stimulus with some additional text on the side, but in other examples it may include other information. For example, it may show the front and back of a package even though the basic stimulus only shows the front, or it may show additional information such as one or more of nutrition information, endorsements, advertising claims, and other relevant content. The extended form stimulus may be closed by tapping on the 'X' in the corner 6104 or elsewhere on the screen, or the respondent can select the "Purchase" button 6103 to indicate he or she would purchase it at the stated price, after which the extended form stimulus screen closes. When the screen closes, the incremental price reductions resume after a brief pause. If the respondent selected "Purchase", the price associated with the selected stimulus freezes, and the stimulus may shaded or desaturated to indicate that it has already been selected. FIG. 62 shows an example of several products having been selected 6202, 6203, 6205, 6206, 6207 at different price points 6212, 6213, 6215, 6216, 6217. Three of the products have not yet been selected 6201, 6204, 6208, and the price points 6211, 6214, 6218 are continuing to fall. If any price reaches a $0.00 level, the respondent is assumed to be uninterested in the product at any price, and the stimulus is disabled and shaded or desaturated. Although a $0.00 level is used as the ending price in this example, this can be varied, and may be selected to be a price level at which the product could not possibly be offered for sale even when deeply discounted. As the prices change, the speed of price changes might also change, for example one or more of speeding up as there are fewer remaining products to consider, and speeding up as time passes. When all selected stimuli 6301, 6302, 6303, 6305, 6306, 6307, 6308 are frozen at associated prices 6311, 6312, 6313, 6315, 6316, 6317, 6318 or have reached the ending threshold 6304, 6314, which is $0.00 in this example as shown in the example in FIG. 63, the screen may advance to a next set of instructions for a phase II. Continuing with this example, FIG. 64 shows an example next set of instructions that directs respondents to select those same products that were previously shown when the associated priced reaches a second objective, which in this example is a level at which the respondent would stock up on the product. Then the respondent is shown a similar screen to the prior screen with the same products as shown in FIG. 65, except the associated prices 6511, 6512, 6513, 6515, 6516, 6517, 6518 for previously selected products 6501, 6502, 6503, 6505, 6506, 6507, 6508 start at the level at which they were previously frozen and might be displayed with graphics than indicate a sale price 6521, 6522, 6523, 6525, 6526, 6527, 6528. The language on the screen showing the extended form version of the stimulus might be changed from "Purchase" to "Stock up!" or a similar message to reinforce the new objective.

Figure 66:
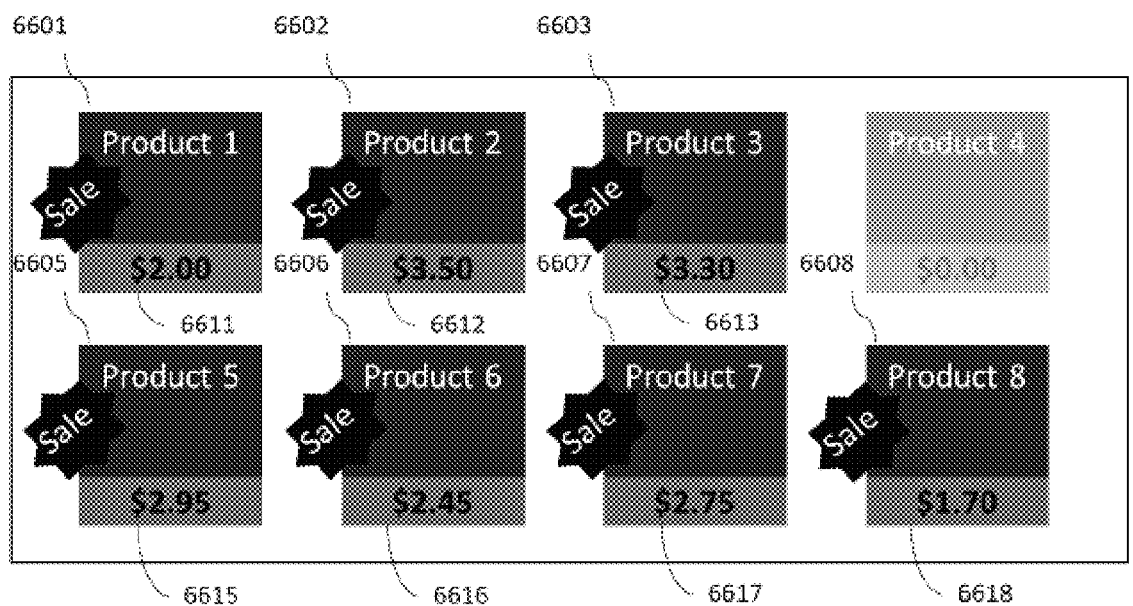
FIG. 66 is an example of a second phase in a Time Based Price Sensitivity Interface in accordance with an embodiment of the present invention, in which prices have dropped $0.50 (ten increments of $0.05) from the starting price for the second phase.
Figure 67:
FIG. 67 is an example of a Time Based Price Sensitivity Interface in accordance with an embodiment of the present invention, in which the respondent has selected one item to magnify and review. Additional information about the product is shown, and an extended form stimulus is used to represent the product.
Figure 68:
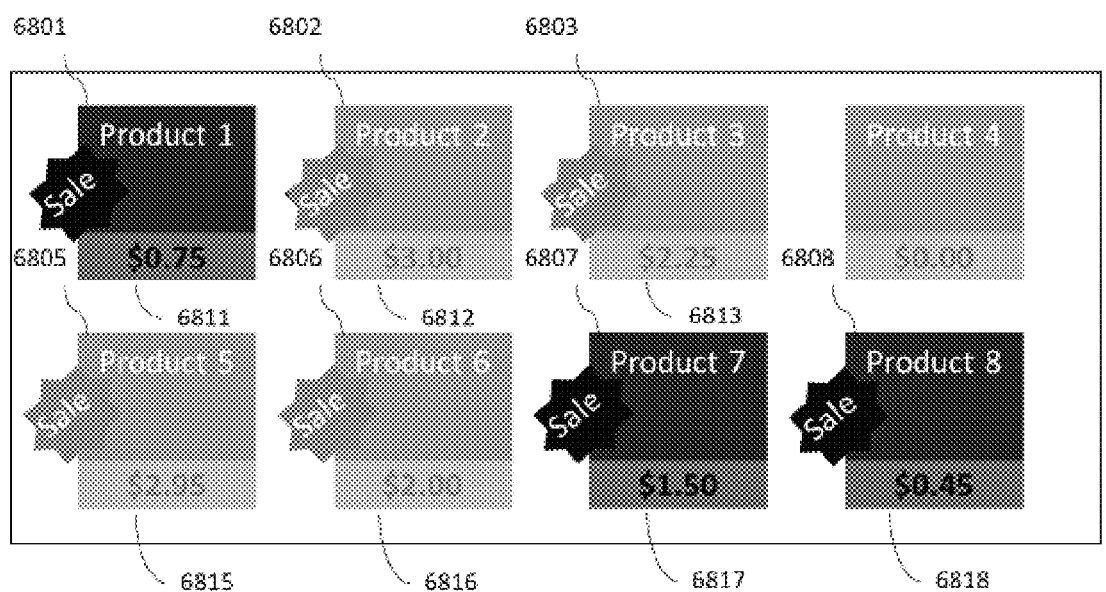
FIG. 68 is an example of a second phase of a Time Based Price Sensitivity Interface in accordance with an embodiment of the present invention, in which the respondent has indicated that he or she would stock up on four of the products available at specified prices, and in which three products have not yet been selected and prices have declined by $1.75 from the starting prices of the second phase.
Figure 69:
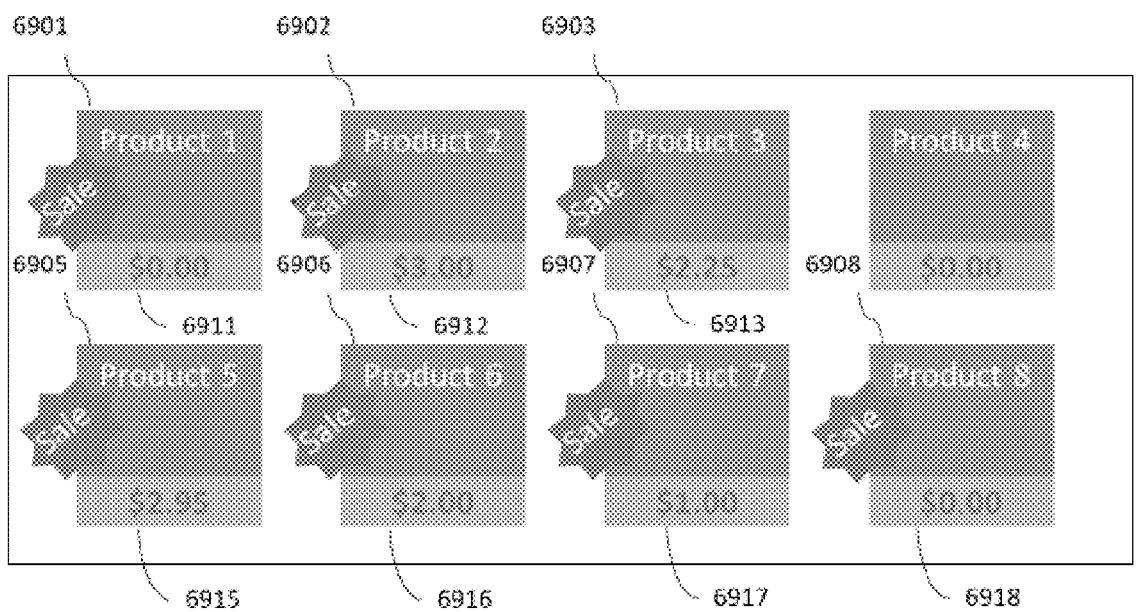
FIG. 69 is an example showing an ending state for a second phase of a Time Based Price Sensitivity Interface in accordance with an embodiment of the present invention, in which all products have either been selected and the associated stock up prices have been frozen, or have not been selected and the associated prices for those products have reached the termination price (in this example, $0.00).

Additional information is added to the display (such as a sale flag or violator) to indicate that the products are now on sale or being offered at a discount which is temporary. In this example, graphics have been used to reinforce the objective (Stock Up) by indicating that the prices shown are indicative of a sale. Those stimuli that were not selected in the first phase 6504 and their associated prices 6514 which reached the ending threshold are disabled, and shaded or desaturated to indicate they cannot be selected. After a brief pause, prices start to decline in increments at a certain speed, which in this example are increments of $0.05 at a rate of 700 milliseconds, and the speed may change over time. The respondent can then repeat the interactions described in phase 1 to indicate for each stimulus the price at which he or she would stock up on the product shown. FIG. 66 shows an example in which prices 6611, 6612, 6613, 6615, 6616, 6617, 6618 for the active stimuli 6601, 6602, 6603, 6605, 6606, 6607, 6608 have dropped $0.50 (ten increments of $0.05) from the starting price for the second phase. FIG. 67 shows an example in which the respondent has selected a product to review and is viewing an extended form stimulus 6701, 6702. As in the first phase example, the prices are frozen. The respondent can either close the screen 6704 and proceed or select the Stock Up button 6703 to indicate that he or she would stock up on the product at the price shown. FIG. 68 continues this example, with the respondent having indicated that he or she would stock up on four of the products 6802, 6803, 6805, 6806 available at certain specified prices 6812, 6813, 6815, 6816, in which three products have not yet been selected 6801, 6807, 6808, and in which prices on unselected items 6811, 6817, 6818 have declined by $1.75 from the starting prices of the second phase. FIG. 69 shows an example of an ending state for the second phase, in which all products that were previously selected in phase 1 have either been selected 6902, 6903, 6905, 6906, 6907, 6908 and the associated stock up prices 6912, 6913, 6915, 6916, 6917, 6918 have been frozen, or have not been selected 6901 and the associated prices 6911 for those products have reached the termination price (in this example, $0.00).

In the Time Based Price Sensitivity Interface in accordance with an embodiment of the present invention, any sequence may be repeated with a new set of stimuli to gather data for this set of stimuli. Data may be combined from across all the screens to conduct analysis and reporting. The sets and sequences of stimuli shown may be selected according to an algorithm to improve the quality and coverage of data gathered within a given respondent's survey and across multiple respondents' surveys.

Further continuing with the Time Based Price Sensitivity Interface in accordance with an embodiment of the present invention, data generated by the respondent's interactions are recorded as respondent response data. This data includes at a minimum the selections made by the respondent and the price associated with the stimuli when the selections were made, but can also include timings associated with actions, the number of times a stimulus was viewed in extended form, the number of times the changing of prices was paused, other data associated with the respondent's interactions, and any combinations thereof.

Specific methods and systems are provided for analyzing respondent response data generated through the Time Based Price Sensitivity Interface in accordance with an embodiment of the present invention, creating a set of derived metrics, and presenting analysis derived from the associated data. Methods and systems for analysis and presentation may be selected from a group consisting of:

calculating the cumulative distribution of the percentage of respondents that indicate a price point for a given objective and associated stimulus that is below (or above) each number in the distribution, for example, a curve that indicates for each price point, what percentage of respondents would be willing to purchase a product at or below that price point;

estimating a demand curve for a set of products using the cumulative distribution described above;

smoothing the cumulative distribution according to one of many parametric or non-parametric smoothing methods, such as a loess smoother, kernel density smoother, moving average estimator, latent variable model, or similar method;

weighting the data and resulting analysis based on specific factors, such as a user's measured category consumption or estimated category consumption;

"slicing" data by creating a subset of respondents and conducting analysis for that subset of respondents;

combining data for multiple objectives, such as purchasing and stocking up, based on a specified weight for each objective to create a projected demand curve;

calibrating data or derived metrics using data from external sources to enhance accuracy and validity. A variety of calibration techniques may be used herein, including point anchors and loss-minimization functions, which may be combined with optimization techniques like gradient descent methods or robust search optimizers;

incorporating business data into analysis to provide business recommendations. For example, incorporating total and marginal cost data on a product along with the estimated demand curve in order to estimate a profit curve;

measuring or estimating switching potential across products by assessing each respondent's next-best-product when the price for the most preferred product exceeds the maximum price the respondent would be willing to pay;

estimating or projecting a market structure based on measured or estimated switching potential for a set of respondents;

estimating, possibly through simulation or non-parametric heuristic methods, the degree of noise (such as variance, standard deviation, or mean absolute deviation) associated with any derived metric that is created using data gathered in this embodiment and other embodiments; and combinations thereof.

In one embodiment of the present invention, which we call the Sequential Response Grid Interface, a grid question is presented to a respondent as a sequence of instruction screens and corresponding response screens pertaining to a set of objects. Each of the scale response items for the grid question are presented as separate screens, in order, and the child questions in the grid question are presented as objects on a response screen. The instruction screens direct the respondent to indicate which child question objects meet a particular condition for a scale response item corresponding to the subsequent response screen.

Figure 70:
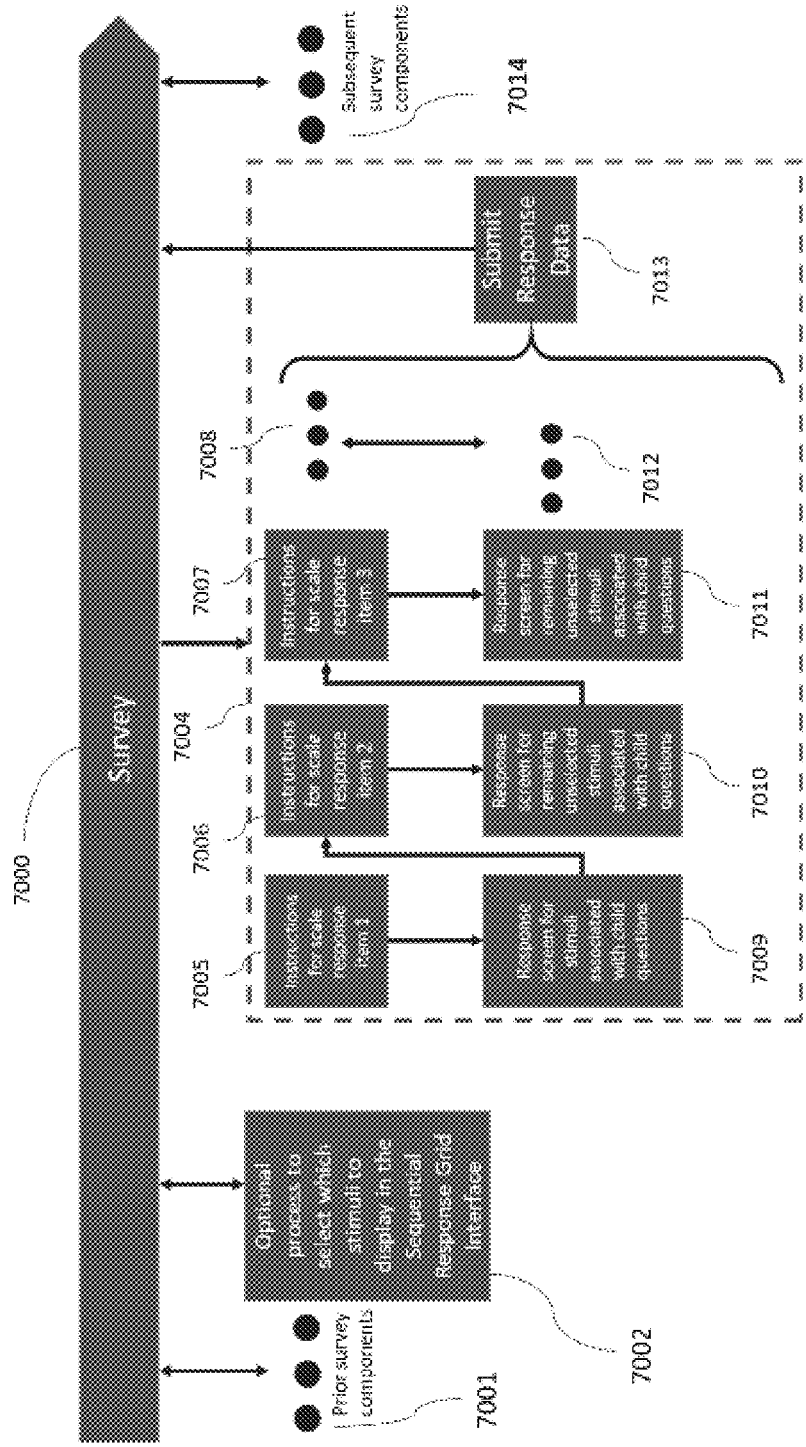
FIG. 70 is an example of a basic software process configuration used in an embodiment of the present invention which we call the Sequential Response Grid Interface, which is designed to gather price sensitivity information for a set of products.

FIG. 70 illustrates an example process flow of this embodiment when it is embedded within a survey 7000. In this example, a respondent may complete elements (components) 7001 of a survey prior to engaging with the computer user interface. Various elements of that survey and responses to those elements may be used to select 7002 a set of child questions to include in the Sequential Response Grid Interface 7004. Such mechanisms to select questions to include are considered standard in the practice of survey creation. Consistent with standard practice in survey creation, the order of the stimuli may be randomized or partially randomized prior to displaying the grid question. The respondent is then presented a first instruction screen 7005, which from the respondent's perspective may seem like a separate question but is in fact an instruction to select stimuli that represent child questions in a grid question according to a set of objectives. Then respondent is presented a response screen 7009, in which stimuli conforming to the instructions on the prior screen are selected. Then the respondent is presented a second instruction screen 7006 directing the respondent to select stimuli that represent child questions in a grid question. Then the respondent is presented a second response screen 7010 in which stimuli selected on the prior screen are visually excluded and disabled, and in which remaining stimuli are in the same position as previously displayed, and in which those stimuli can be selected by the respondent in a manner conforming to the instructions on the prior screen. Additional instruction screens 7007, 7008 and corresponding response screens 7011, 7012 may follow, until all stimuli are selected or there are no more instruction screens pertaining to response items in the grid question. In cases where a grid question would normally require that a respondent must select each stimulus once and only once across all of the response items, or conversely that each response item can be applied once and only once to each child question, a Sequential Response Grid Interface may elect not to display screens associated with the last response item in the response item set since any stimuli that were not selected for any of the prior response items would necessarily need to be selected for the final response item. In such cases, the remaining stimuli could be automatically selected by the Sequential Response Grid Interface for the final response item without displaying the instruction screen and response screen for the last response item. The interface then submits respondent response data to the survey software 7013 and the respondent may proceed to other elements 7014 of the survey, which may include additional instances of the present invention.

Figure 71:
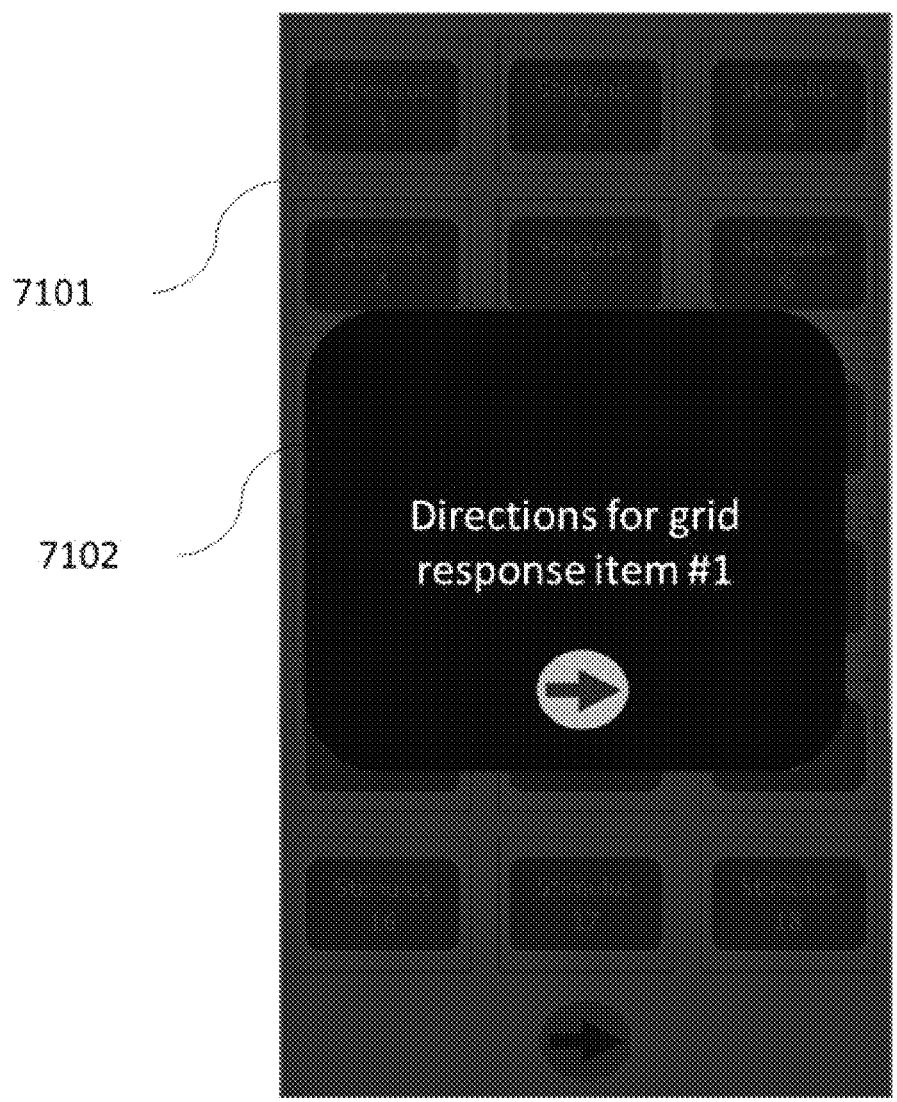
FIG. 71 is an example showing an initial instruction screen for a Sequential Response Grid Interface in accordance with an embodiment of the present invention, in which initial instructions are presented as directions to select all stimuli that meet a certain condition. The stimuli associated with the instructions are partially obscured in order to focus respondent attention on the instructions while providing context.

FIG. 71 shows an initial instruction screen in which the instructions 7102 are presented as directions to select all stimuli that meet a certain condition. The stimuli associated with the instructions are partially obscured 7101 in order to focus respondent attention on the instructions while providing context. Other mechanisms for showing instructions are possibly without changing the fundamental nature of this embodiment of the invention. For example: the stimuli could be hidden completely, the instructions might scroll across or down the screen, or the instructions might be included above the question responses. Instructions might also be accessible from the response screens by tapping an object onscreen to expand or review the prior instructions.

Figure 72:
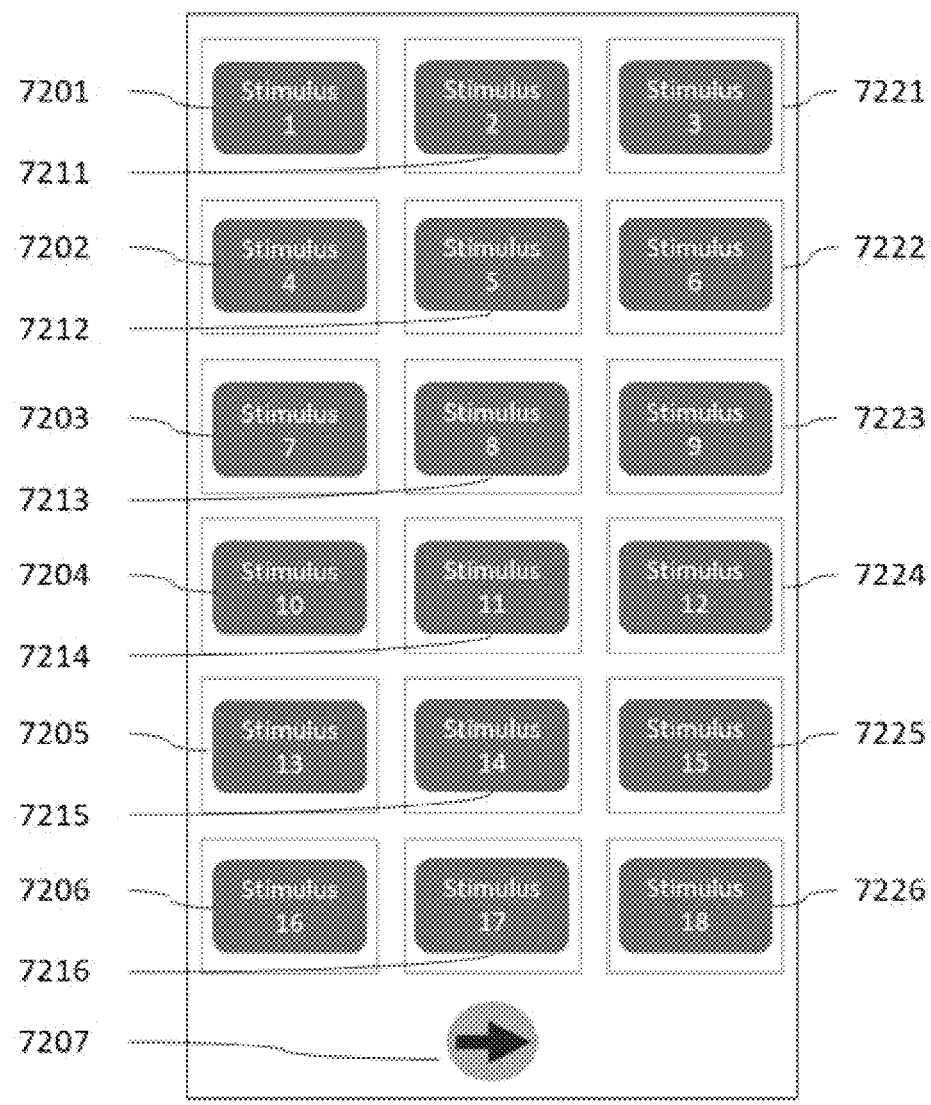
FIG. 72 is an example showing an initial response screen for a Sequential Response Grid Interface in accordance with an embodiment of the present invention, in which a respondent can select the stimuli that meet the condition outlined in the prior instruction screen.

FIG. 72 shows an initial response screen in which a respondent can select the stimuli that meet the condition outlined in the prior instruction screen from amongst a grid of stimuli 7201, 7202, 7203, 7304, 7205, 7211, 7212, 7213, 7214, 7215, 7221, 7222, 7223, 7224, 7225, and then advance to a next screen 7207.

Figure 73:
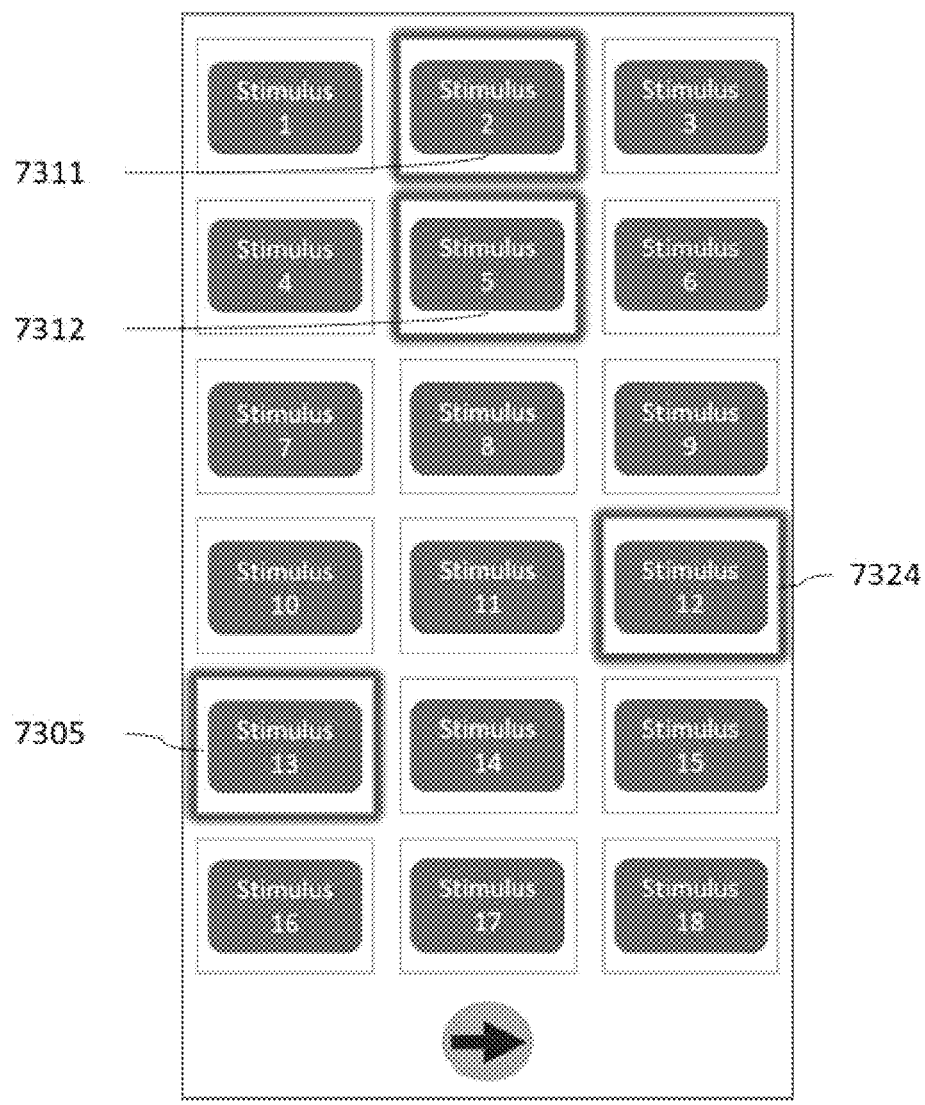
FIG. 73 is an example showing an initial response screen for a Sequential Response Grid Interface in accordance with an embodiment of the present invention, in which several stimuli have been selected.

FIG. 73 shows an initial response screen in which several stimuli have been selected 7311, 7312, 7305, 7324.

Figure 74:
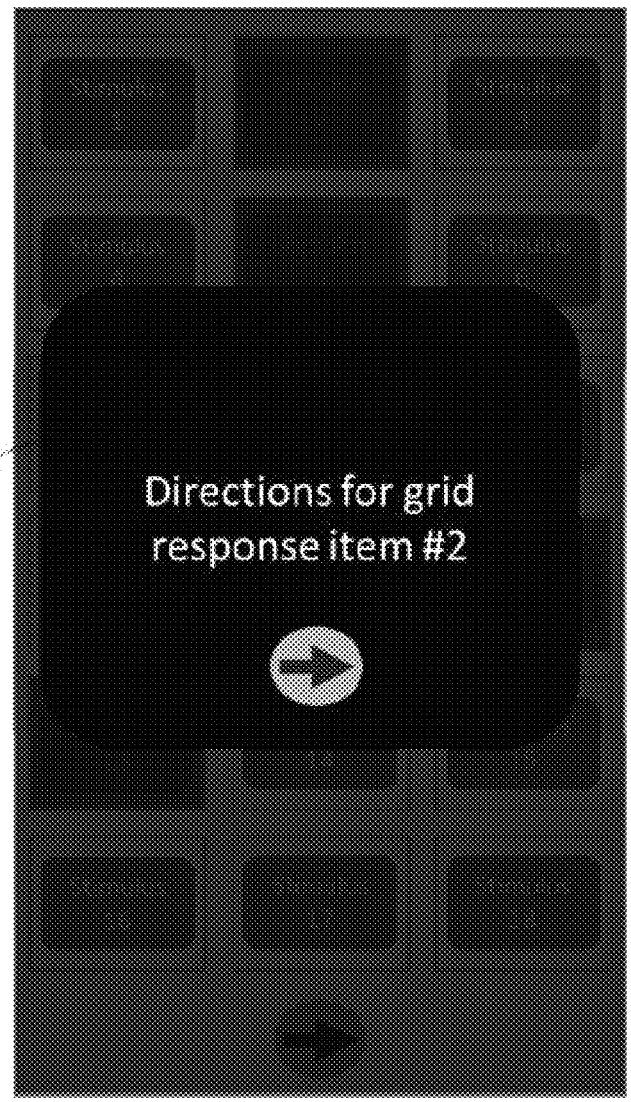
FIG. 74 is an example showing a second instruction screen for a Sequential Response Grid Interface in accordance with an embodiment of the present invention, in which the instructions pertaining to the second response item for the grid question are displayed.

FIG. 74 shows a second instruction screen in which the instructions 7401 pertaining to the second response item for the grid question are displayed.

Figure 75:
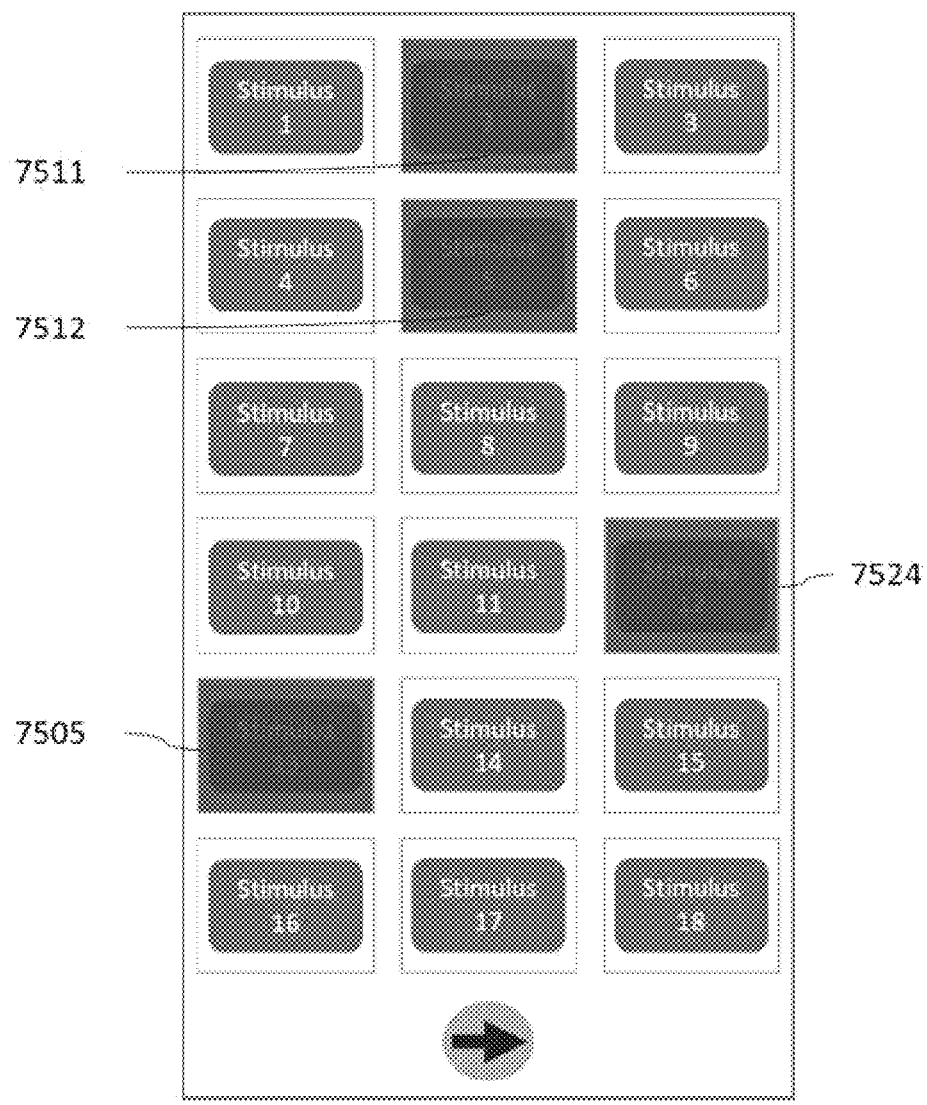
FIG. 75 is an example showing a second response screen for a Sequential Response Grid Interface in accordance with an embodiment of the present invention, in which a respondent can select the stimuli that meet the condition outlined in the prior instruction screen, and in which several stimuli have been visually excluded and disabled because they were selected on a prior response screen.

FIG. 75 shows a second response screen in which a respondent can select the stimuli that meet the condition outlined in the prior instruction screen, and in which several stimuli have been visually excluded and disabled 7511, 7512, 7505, 7524 because they were selected on a prior response screen.

Figure 76:
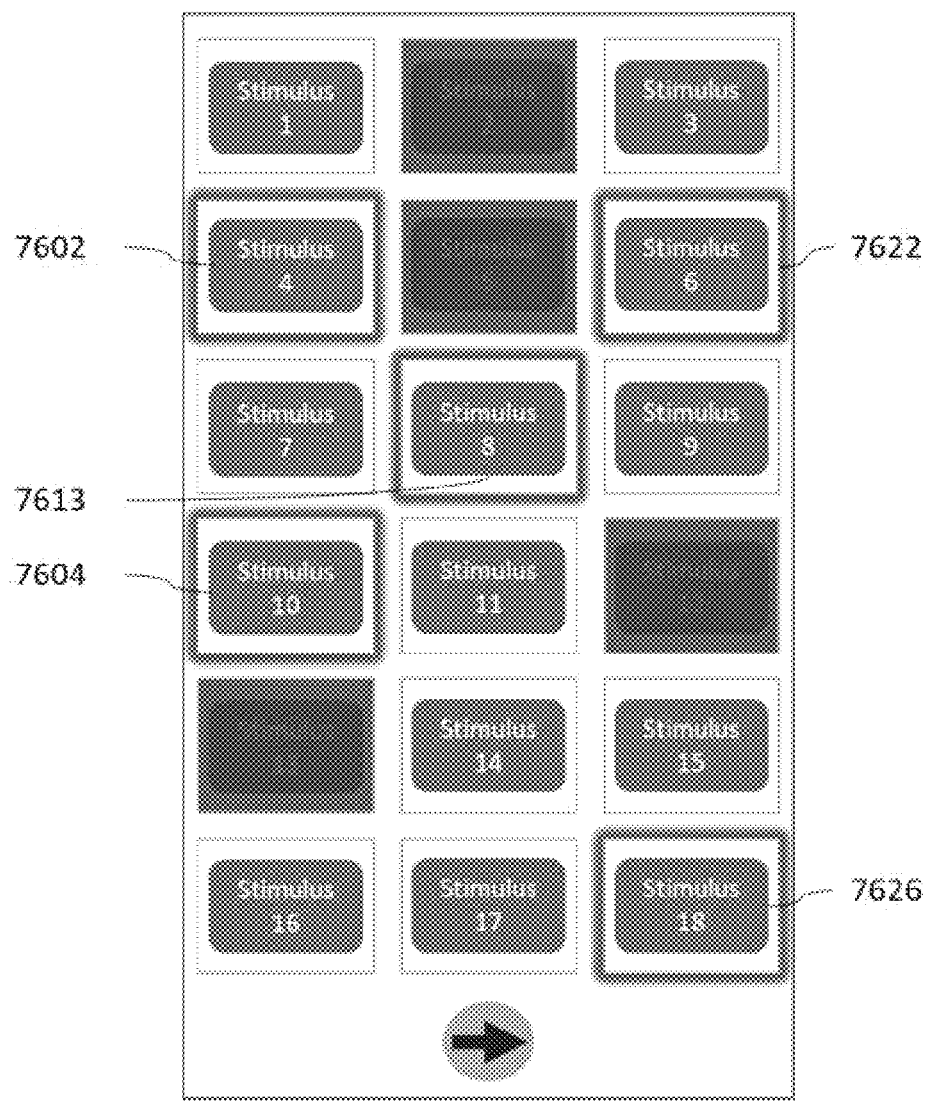
FIG. 76 is an example showing an initial response screen for a Sequential Response Grid Interface in accordance with an embodiment of the present invention, in which a respondent has selected several stimuli that meet the condition outlined in the prior instruction screen, and in which several other stimuli have been visually excluded and disabled because they were selected on a prior response screen.

FIG. 76 shows a second response screen in which a respondent has selected several stimuli 7602, 7622, 7613, 7604, 7626 that meet the condition outlined in the prior instruction screen, and in which several other stimuli have been visually excluded and disabled because they were selected on a prior response screen.

In some variants of the Sequential Response Grid Interface, a respondent viewing a response screen may be able to view instructions corresponding to that screen, either through a persistent overlay or by interacting with the screen in a manner to review the instructions. For example, the respondent may be able to swipe or tap a question mark icon to review the instructions.

In some variants of the Sequential Response Grid Interface, a respondent may be constrained in the selections on any given response screen. For example, a respondent may be required to select at least a certain number of stimuli, limited to selecting a maximum of a certain number of stimuli, or both.

The flow of the respondent experience in the Sequential Response Grid Interface in accordance with an embodiment of the present invention, is critically important to the quality of the respondent response data that is gathered. The interface presents the sequence of instructions screens and response screens as a singular organic experience wherein it is clearly apparent to the respondent that all of the screens in the sequence are part of the same question. Thus, for example, stimuli that were selected on prior response screens are visually retained (but disabled and deemphasized) on subsequent response screens. Alternatively, stimuli that were selected on prior response screens might be blanked out, but the exact position of other stimuli would remain the same. In addition, the sequence is optimized to maintain a linear cognitive flow and mental focus while still ensuring that all instructions are presented in context to avoid confusion. Merely creating a cascade of questions in which subsequent questions exclude responses based on earlier questions does not constitute a grid question, even though it could be constructed to yield data that is similar in structure to a Sequential Response Grid Interface. For example, a cascade of questions in which subsequent questions exclude responses based on earlier questions would not retain the exact positionality of the stimuli; such mechanisms close gaps, reorder stimuli, or both, and are thus not true grid questions in which the layout is fixed.

As an example of the Sequential Response Grid Interface, a researcher may desire to know how much a respondent respects several political candidates. In a standard grid question, the respondent would see a matrix with political candidates (the child questions) on the rows and statements (the response items) on the columns, and radio buttons or check boxes in each cell. For example, the response items might be: "I respect the candidate a great deal", "I moderately respect the candidate", and "I do not respect the candidate at all". For all of the reasons discussed in the background, such standard displays of grid questions are extremely unreliable and especially prone to challenges when deployed through mobile device interfaces. The Sequential Response Grid Interface would first present the respondent with a screen showing several semi-visible candidates to offer context along with instructions directing the respondent to select all candidates that the respondent respects a great deal. On the next screen the respondent would select these candidates. Then on the third screen the respondent would see an instruction screen overlaid on top of the partially obscured political candidates directing the respondent to select candidates that the respondent moderately respects. On the next the respondent would see the same candidates, with the one previously selected partially obscured and disabled, and would be able to select candidates that he or she moderately respected. Finally, since there are only three response items and they are mutually exclusive and collectively exhaustive, the Sequential Response Grid Interface might skip the last response item and assume that the respondent does not respect any of the unselected candidates. Alternatively, the Sequential Response Grid Interface might follow up with an instruction screen and response screen for the third response item, "I do not respect the candidate at all", and the researcher could interpret any unselected political candidates appropriately (for example, as indicating a respondent has no opinion on the candidate).

In one embodiment of the present invention, which we call the Intuitive Multicolumn Rank Interface, a rank question is presented to a respondent in a manner that permits extremely rapid review and ranking of a large number of items, un-ranking of those items, and re-ranking of those items. The rapid interactions using intuitive gestures, followed by dopamine-stimulating aminations and gamified reactions, encourage the expression of preconscious preferences that are difficult to ascertain using slower or more complex ranking mechanisms. Simultaneously, the finer-grained intuitive interactions enable refinement of an initially expressed ranking to quickly repair mistakes and mitigate respondent frustration. Gamified reactions, such as sliding animations, reinforce the ordinality of the ranking in a multi-row, multi-column interface in which the ranks might otherwise be confusing while maximizing the efficient use of space.

Figure 77:
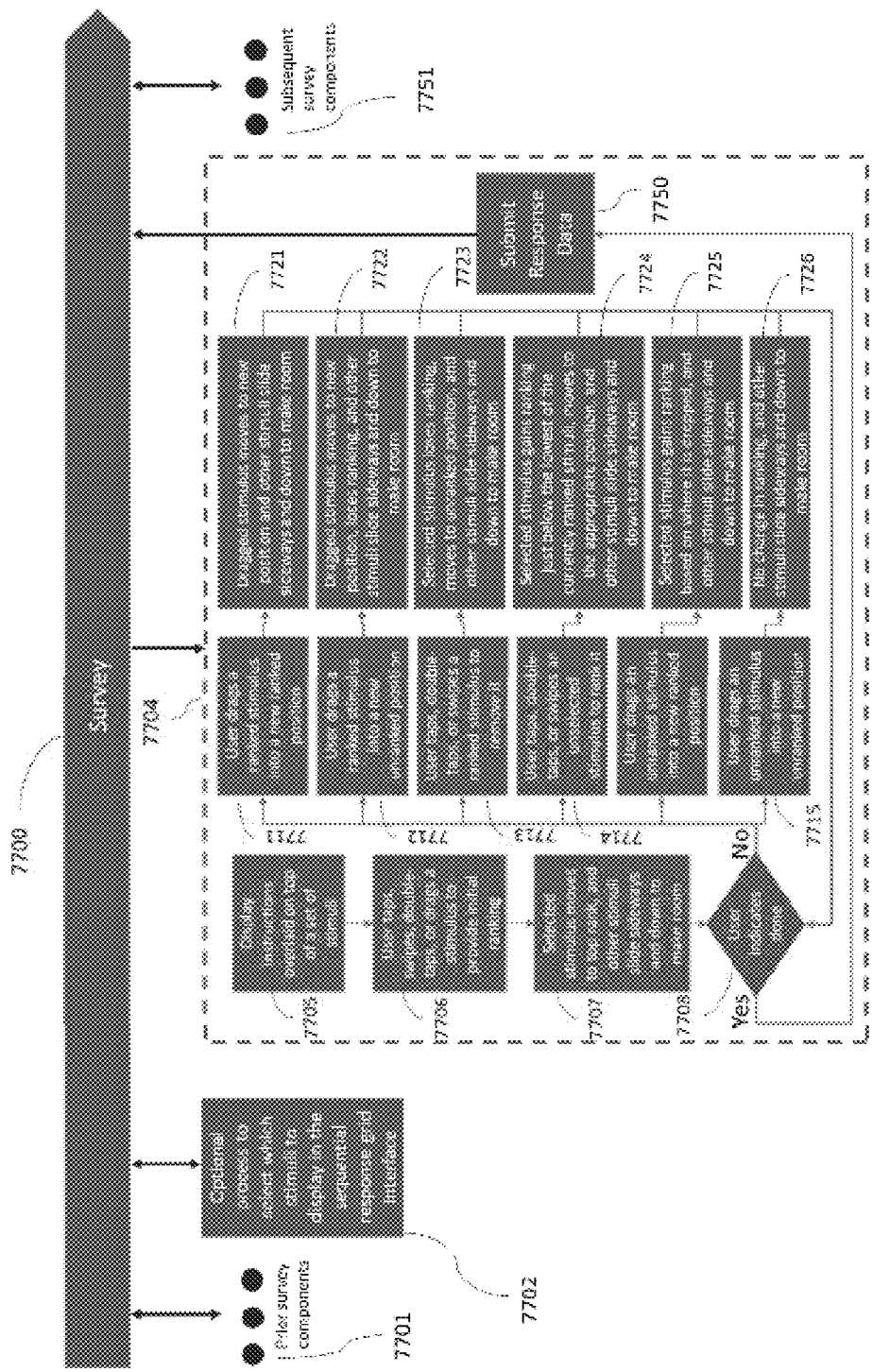
FIG. 77 is an example of a basic software process configuration used in an embodiment of the present invention which we call the Intuitive Multicolumn Rank Interface, which is designed to rapidly and intuitively enable respondents to rank large sets of items.
Figure 78:
FIG. 78 is an example showing an initial instruction screen for a Intuitive Multicolumn Rank Interface in accordance with an embodiment of the present invention, in which initial instructions are presented and the stimuli associated with the instructions are partially obscured in order to focus respondent attention on the instructions while providing context.

FIG. 77 illustrates an example process flow of this embodiment when it is embedded within a survey 7700. In this example, a respondent may complete elements (components) 7701 of a survey prior to engaging with the computer user interface. Various elements of that survey and responses to those elements 7702 may be used to select a set of stimuli to include in the Intuitive Multicolumn Rank Interface 7704. Such mechanisms to select response items to include are considered standard in the practice of survey creation. Consistent with standard practice in survey creation, the order of the stimuli may be randomized or partially randomized prior to displaying the rank question. The respondent is then presented an instruction screen 7705, which may display the instructions in the context of a set of partially obscured stimuli that will be the focus of the ranking task. An example of this is provided in FIG. 78, showing instructions 7801 as a popup and semitransparent overlay 7802 on top of the rest of the screen to focus respondent attention on the instructions. From this screen, the respondent may execute one of multiple gestures to indicate a first selection. For example, a respondent might swipe a stimulus up, tap it, double tap it, or drag it into a first rank position. After the first stimulus is ranked, the interface might enable a respondent to execute one of multiple gestures with different potential outcomes to rank additional stimuli, un-rank stimuli, re-rank stimuli, or otherwise shift stimuli around. The interface might respond to such gestures with animations to indicate the result of the action and provide positive feedback to the respondent. When a respondent has fully expressed a preference ranking, the respondent might indicate completion and proceed to the next step in the survey.

The power of the Intuitive Multicolumn Rank Interface resides in the incorporation of an extremely rapid selection mechanism to provide an initial fast ranking, a grid array of small stimuli (with multiple columns and rows), animation that enables intuitive understanding of the ranking interactions and efficient utilization of space on a small screen device, and backup interaction mechanisms that enable un-ranking and changes to ranking. Examples of these interactions are shown in FIGS. 79, 80, 81, 82, 83, 84, 85, and 86.

Figure 79:
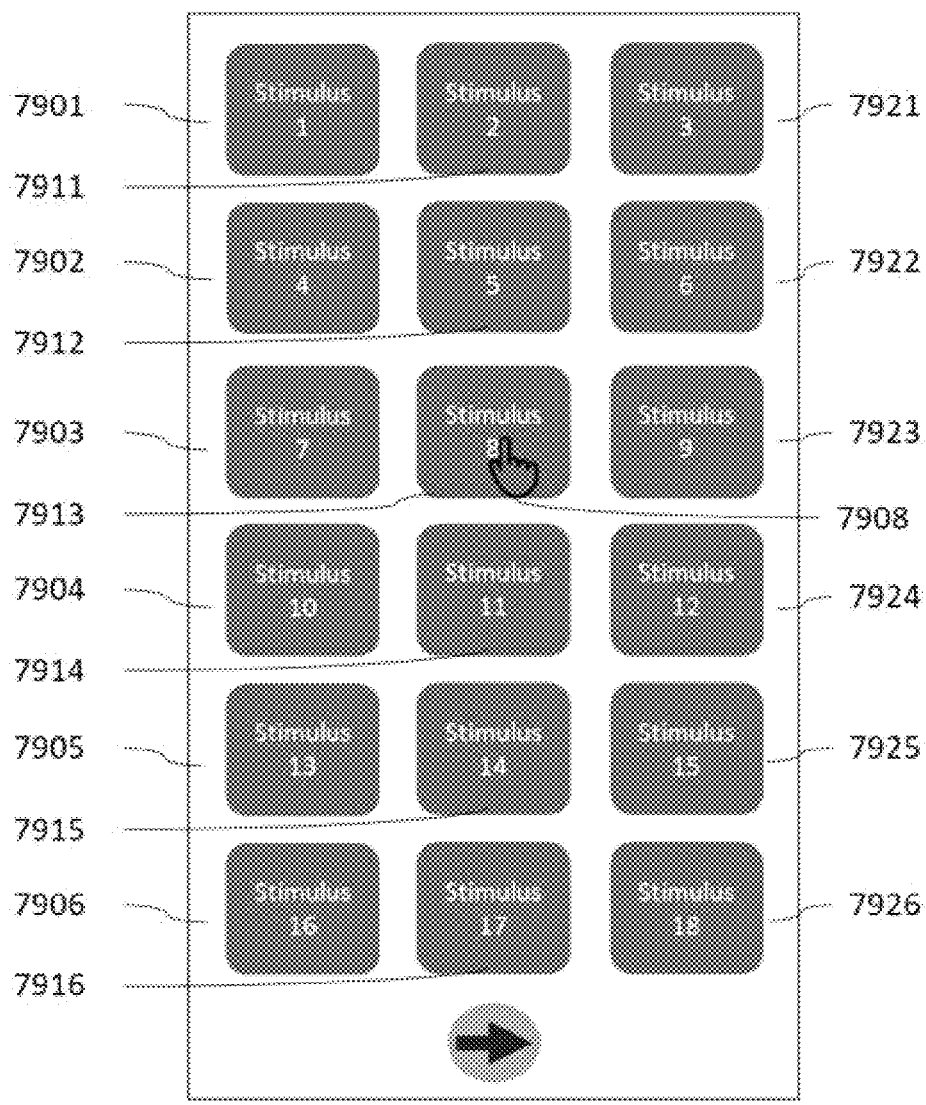
FIG. 79 is an example of an Intuitive Multicolumn Rank Interface in accordance with an embodiment of the present invention, in which no stimulus has been selected, and that hand icon indicates that a respondent is about to select a stimulus, perhaps by tapping, double tapping, or swiping.
Figure 80:
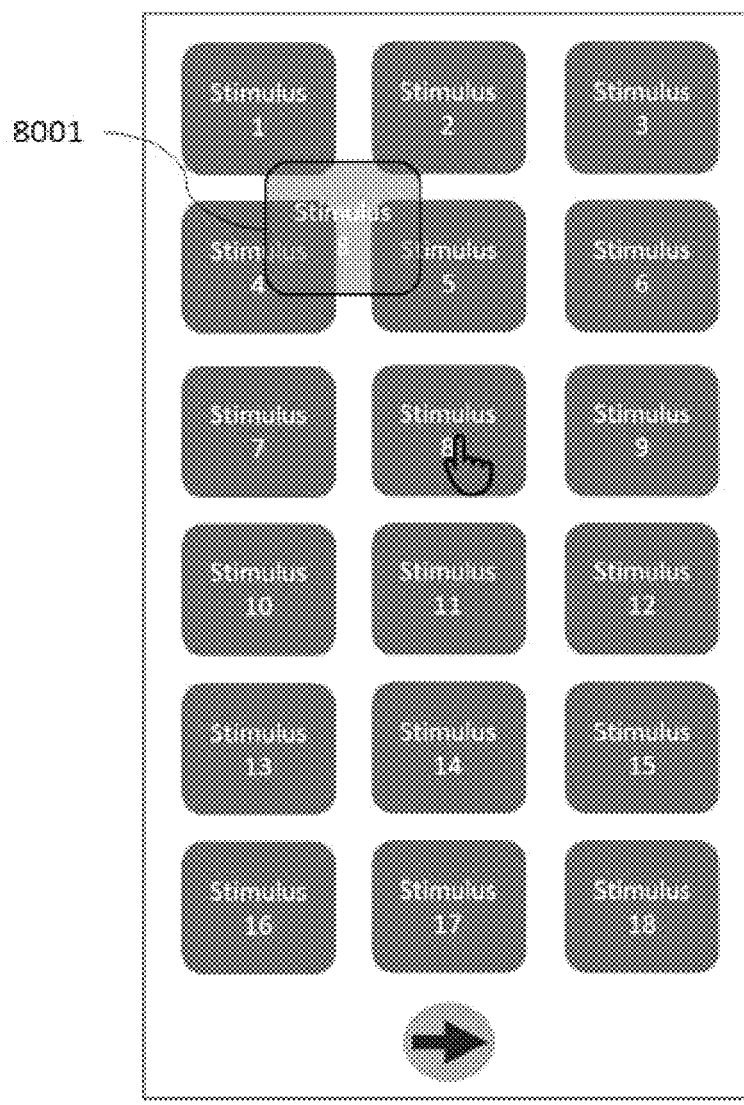
FIG. 80 is an example of an Intuitive Multicolumn Rank Interface in accordance with an embodiment of the present invention, in which an unranked stimulus has been selected and an animation is being executed in response.
Figure 81:
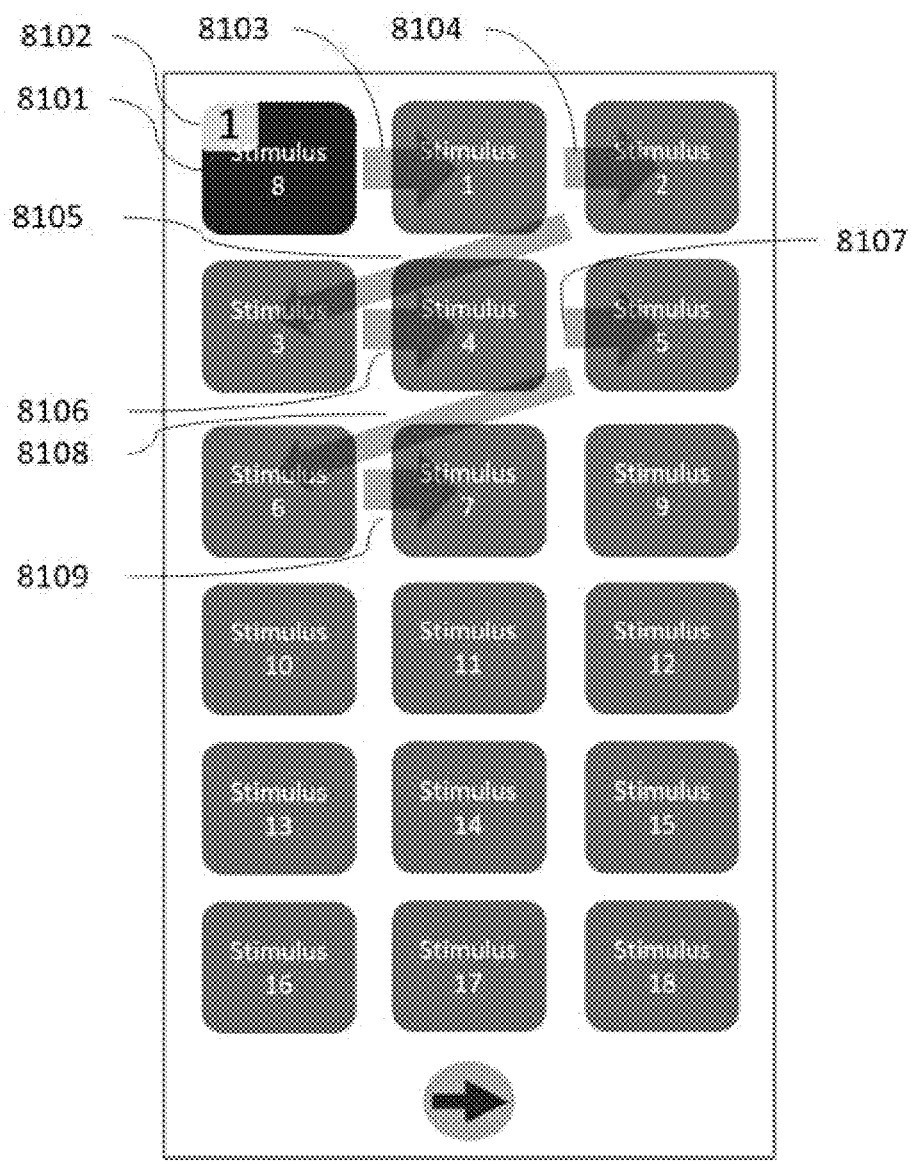
FIG. 81 is an example of an Intuitive Multicolumn Rank Interface in accordance with an embodiment of the present invention, in which one stimulus has been selected and moved to a first rank position, and in which translucent arrows indicate possible motion paths that unranked stimuli might have taken to slide sideways or down to make room.

In FIG. 79, for example, an Intuitive Multicolumn Rank Interface might enable an initial selection from a set of stimuli 7901, 7902, 7903, 7904, 7905, 7906, 7911, 7912, 7913, 7914, 7915, 7916, 7921, 7922, 7923, 7924, 7925, 7926, with a simple tap or upward swipe 7908. An initial selection would be followed by an animation to avoid respondent confusion, the beginning 8001 of which is shown in FIG. 80. In this example animation, the stimulus that is selected 8101 is positioned in front of the first position 8102 and all stimuli that were above the selected stimuli are shifted down and across 8103, 8104, 8105, 8106, 8107, 8108, 8109 to make room for the newly ranked stimulus, as shown in FIG. 81 by the translucent arrows. The animation provides a very tactile feel and could be supported by additional gamified reactions such as sound, pulsing, or vibration. The sliding animation also reinforces the ordinality of the positions with regard to the rank order.

Figure 82:
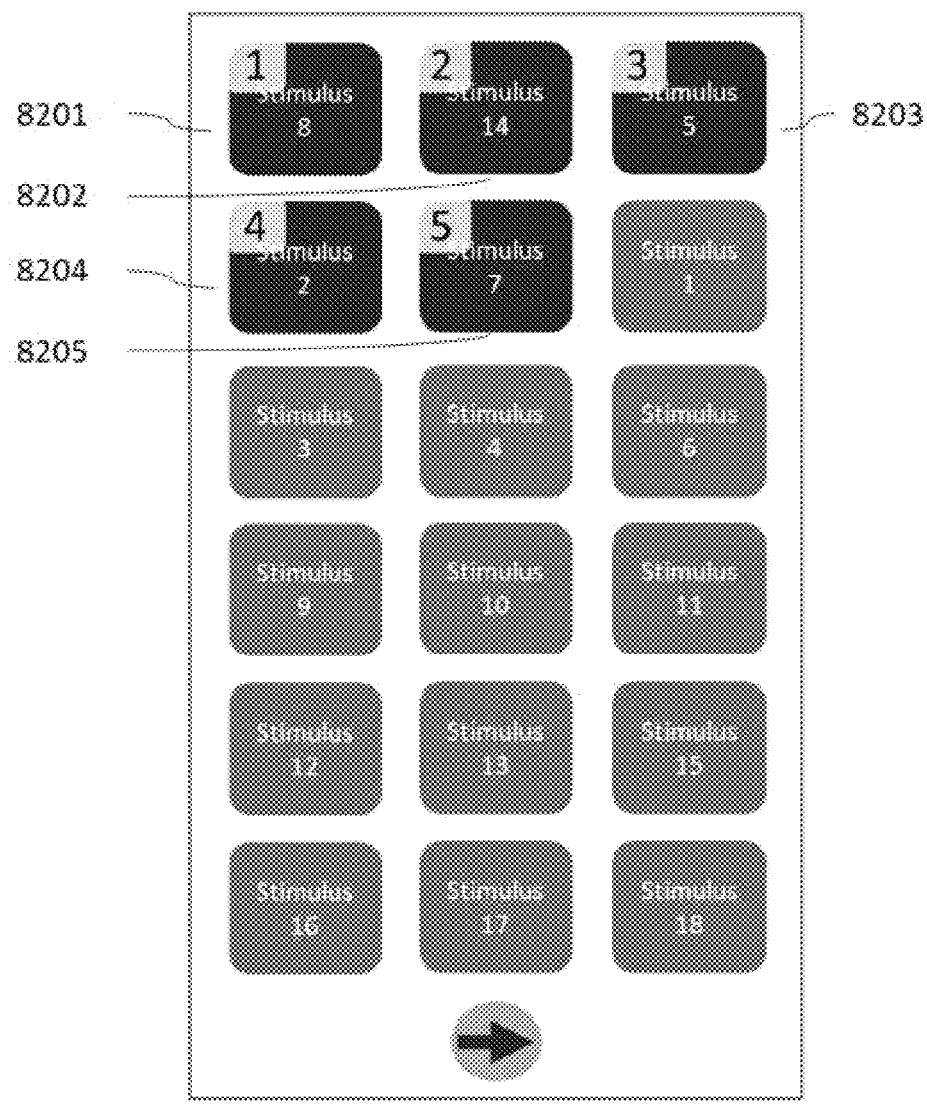
FIG. 82 is an example of an Intuitive Multicolumn Rank Interface in accordance with an embodiment of the present invention, in which several stimuli have been selected and ranked.

FIG. 82 shows an example of an Intuitive Multicolumn Rank Interface in which five stimuli have been ranked 8201, 8202, 8203, 8204, 8205, which a respondent could have indicated within just a few seconds by rapidly tapping or swiping five stimuli. Alternatively, a respondent might have selected these stimuli through a combination of intuitive interactions.

Figure 83:
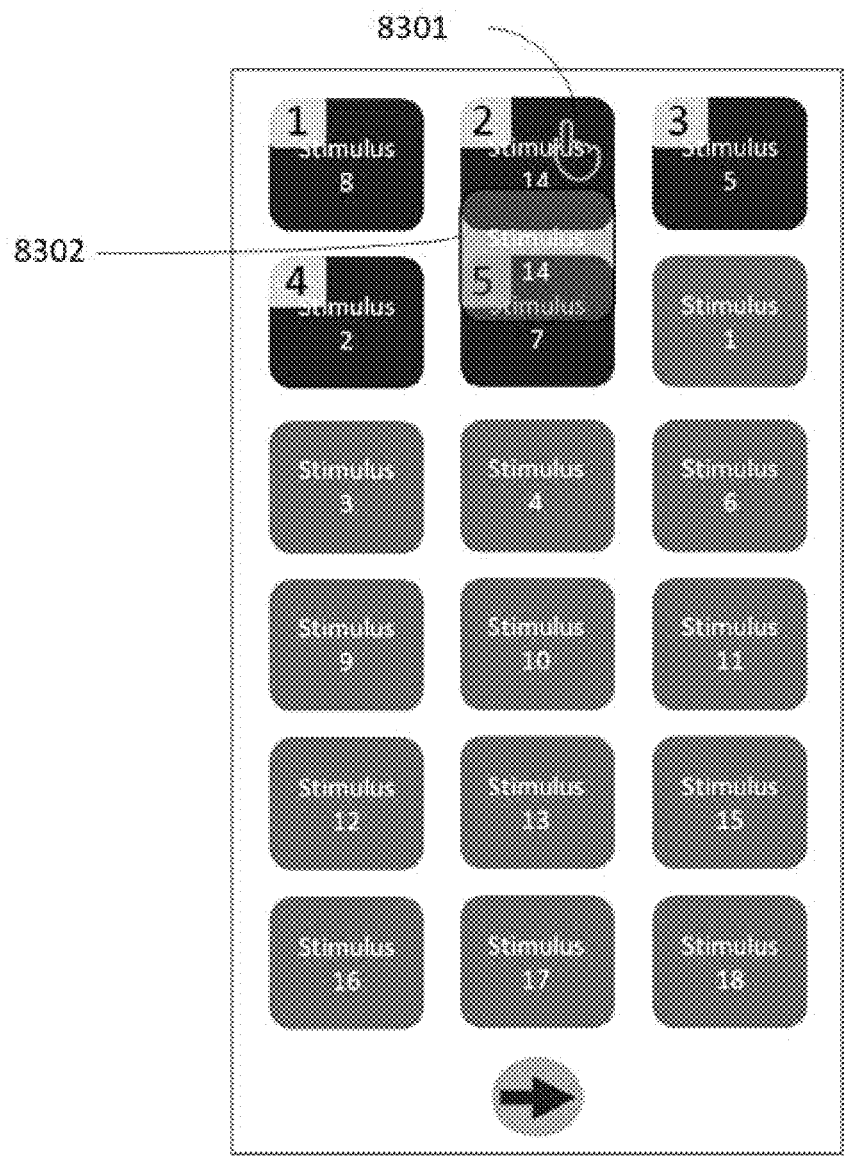
FIG. 83 is an example of an Intuitive Multicolumn Rank Interface in accordance with an embodiment of the present invention, in which the hand indicates that a respondent has selected a ranked stimulus to be unranked, perhaps by tapping, double tapping, or swiping.
Figure 84:
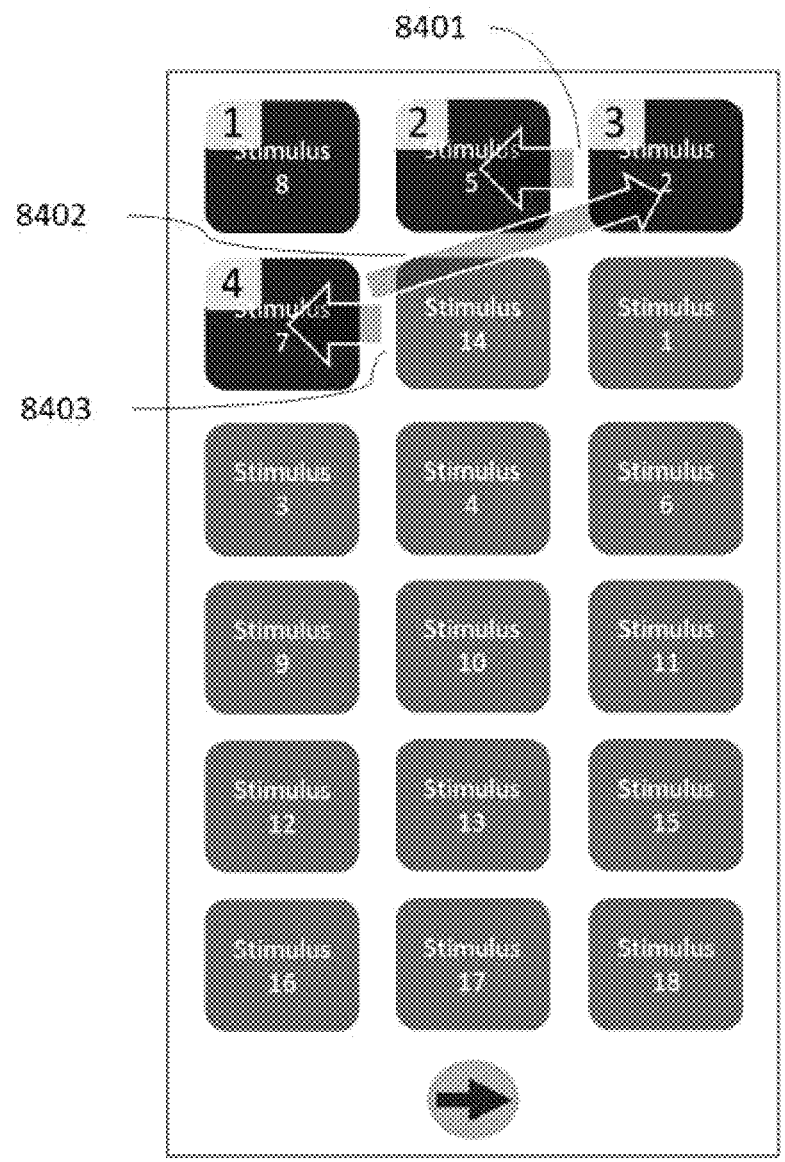
FIG. 84 is an example of an Intuitive Multicolumn Rank Interface in accordance with an embodiment of the present invention, in which a previously ranked stimulus has been unranked and moved to a position just after the lowest of the ranked stimuli. The translucent arrows indicate possible motion paths that ranked stimuli might have taken to close up the gap left by removing the ranked item.

FIG. 83 shows an example of an Intuitive Multicolumn Rank Interface in which a respondent has selected a ranked stimulus for removal, as indicated by the hand icon. This might be done by tapping 8301 or down-swiping 8302 a ranked stimulus. FIG. 84 shows the results of such a gesture, including examples of possible motion paths 8401, 8402, 8403 for other ranked stimuli that are elevated in rank by the removal of an item ranked higher. In some versions of this interface, a similar result might have been achieved by dragging or swiping a ranked item downward.

Figure 85:
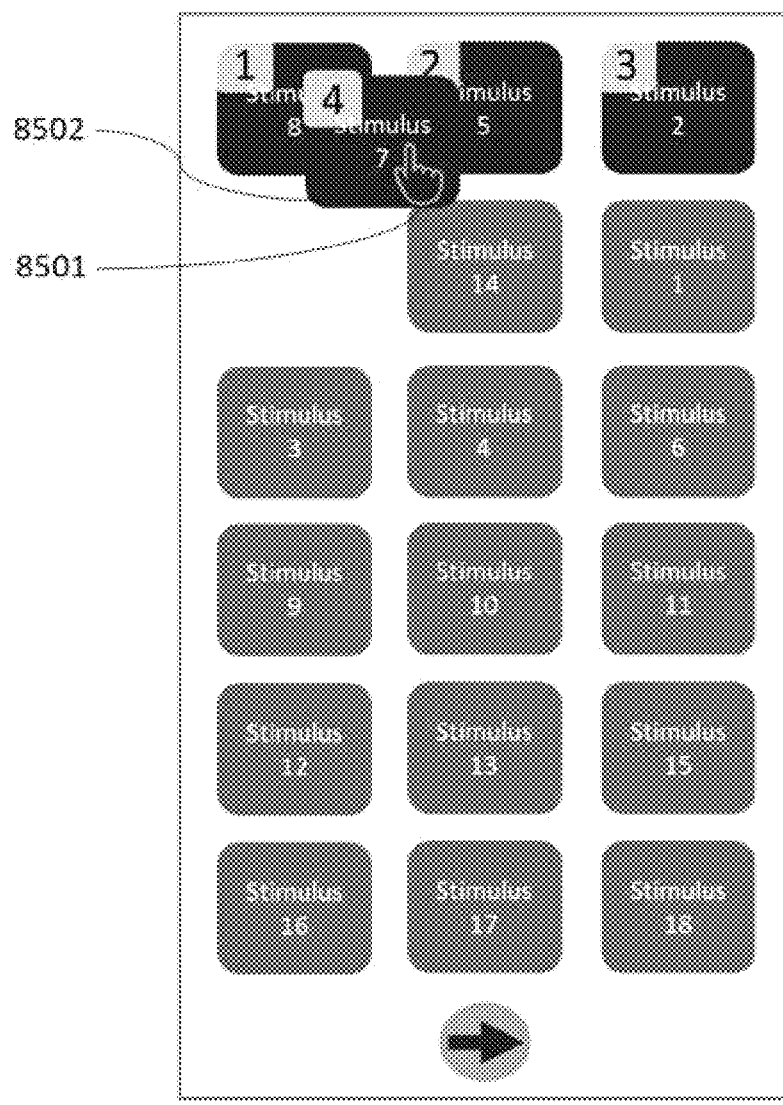
FIG. 85 is an example of an Intuitive Multicolumn Rank Interface in accordance with an embodiment of the present invention, in which the hand icon indicates a respondent is dragging and dropping a ranked stimulus into a new rank position.
Figure 86:
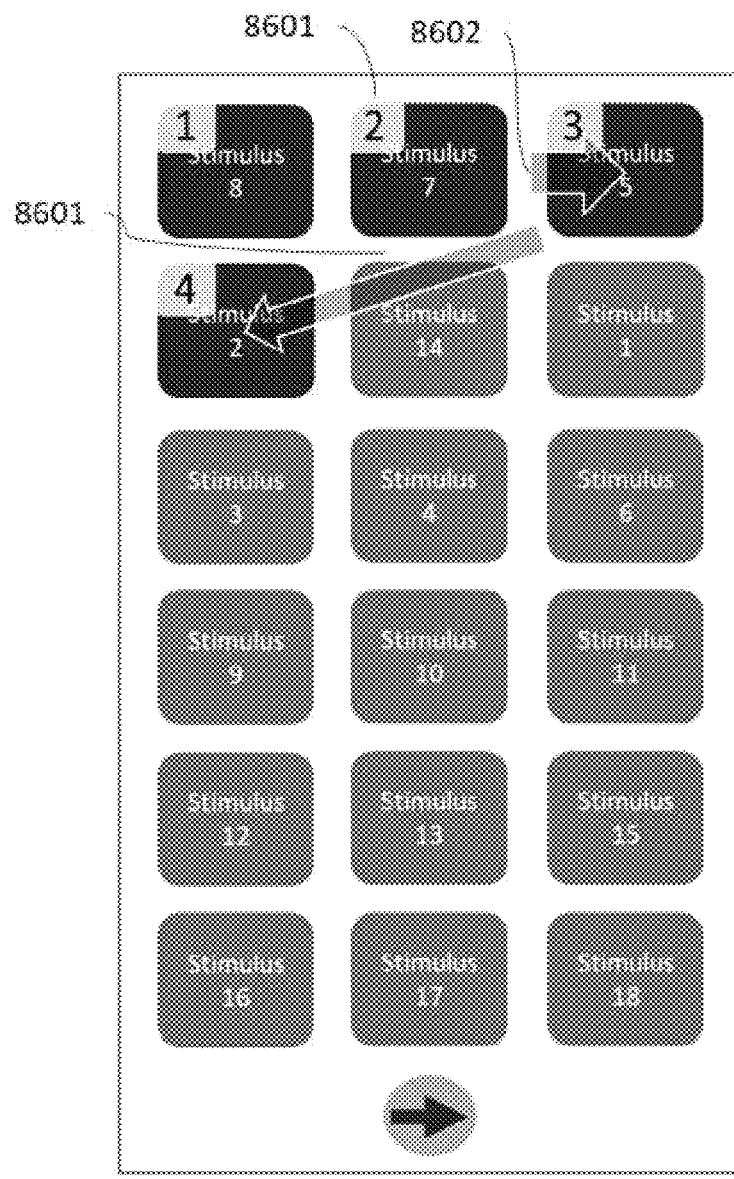
FIG. 86 is an example of an Intuitive Multicolumn Rank Interface in accordance with an embodiment of the present invention, in which the dragged stimulus in FIG. 85 has been released and the new rank has been applied, and in which translucent arrows indicate possible motion paths that ranked stimuli might have taken to slide sideways or down to make room.

FIG. 85 shows an example of an Intuitive Multicolumn Rank Interface in which the hand icon 8501 indicates a respondent is dragging and dropping a ranked stimulus 8502 into a new rank position. This mechanism allows finer grained control of precise ranking while still efficiently using the space on a small screened mobile device. FIG. 86 shows the result of such a gesture, in which the dragged stimulus in FIG. 85 has been released and the new rank 8601 has been applied, and in which translucent arrows 8602, 8603 indicate possible motion paths that ranked stimuli might have taken to slide sideways or down to make room.

In some variants of the Intuitive Multicolumn Rank Interface, a respondent may not have access to all of the interactions shown in FIG. 77. For example, the respondent may not be able to drag an unranked stimulus into another unranked position. The non-inclusion of a subset of interactions does not change the essence of this embodiment, which is: the enablement and reinforcement of intuitive ultra-rapid ranking of a large set of stimuli, in order to encourage pre-conscious decision making while still enabling correction of rank errors through other intuitive interactions.

In some variants of the Intuitive Multicolumn Rank Interface, instructions may be presented in a manner other than that depicted in FIG. 78 without changing the essence of the invention. For example, instructions may be presented at the top of the screen, on a prior screen, in a slide-out panel, in a fixed location, or through many other mechanisms.

In some variants of the Intuitive Multicolumn Rank Interface, limits may be placed on the number of ranked items, the number of re-rankings that are permitted, the time permitted to be spent by respondents interacting with the interface, or any combination of these. For example, a version of the interface may require between 3 and 6 total items to be ranked, and might limit the response time to 30 seconds. Indicators may be provided to reinforce the limitations, such as a timer or token counter. In some cases, a Next button might not be shown or might be disabled until a condition is met.

In one embodiment of the present invention, which we call the Intuitive Time Dependent Rating Interface, a rating scale question is presented to a respondent in a manner that requires the respondent to commit time to increase or possibly decrease a rating. Unlike standard rating scale questions, assigning a more extreme rating requires a respondent to commit additional time to signal the depth of commitment. Many rating scales can be used, including unnumbered scales, scales with different numbers, positive only scales, scales that use both positive and negative numbers, scales that include images or emoticons, and combinations thereof. Scales could be labeled, unlabeled, or partially labeled. To initiative a change in a scale, a respondent must activate a control using a time-based intuitive gesture. The interface then initiates a gamified reaction to reinforce the activity and modifies the scale. The respondent may continue engaging in the time based intuitive gesture, which will cause the interface to continue the gamified reaction and modifying the scale until the respondent ceases to engage in the gesture or the scale reaches its most extreme value.

Figure 87:
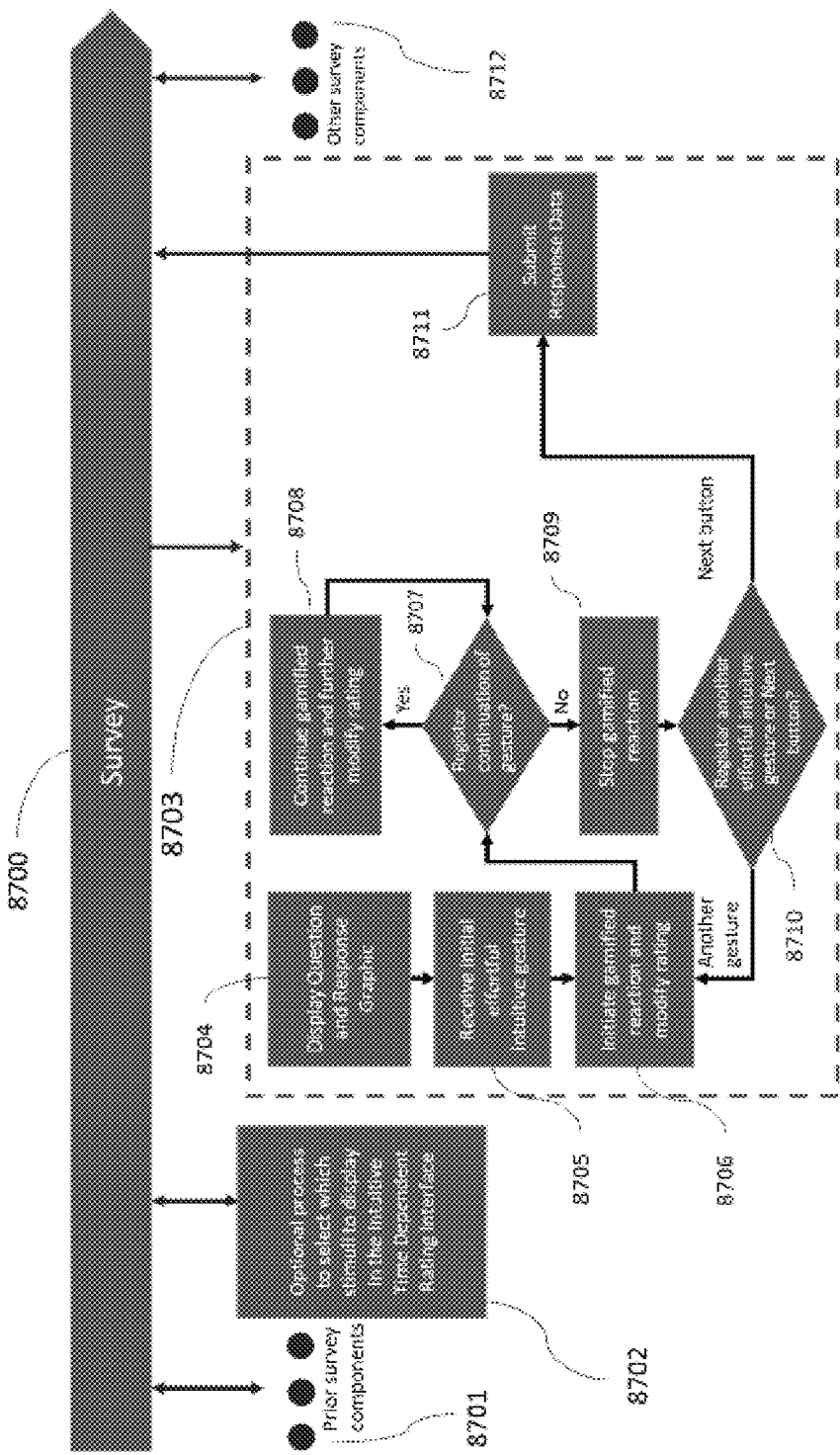
FIG. 87 is an example of a basic software process configuration used in an embodiment of the present invention which we call the Intuitive Time Dependent Rating Interface, which is designed to capture a respondent's underlying sentiment toward a thing or perception of an experience or set of experiences with improved accuracy.

FIG. 87 illustrates an example process flow of this embodiment when it is embedded within a survey 8700. In this example, a respondent may complete elements (components) 8701 of a survey prior to engaging with the computer user interface 8703. Various elements of that survey and responses to those elements 8702 may be used to modify the question the respondent is asked. Such mechanisms are considered standard in the practice of survey creation. The Intuitive Time Dependent Rating Interface displays instructions 8704 that may also display a relevant stimulus and the respondent initiates an intuitive gesture that the interface receives 8705. The interface initiates a gamified reaction and begins to modify the rating 8706. If the respondent continues the gesture, the device registers the continuation 8707 and continues the gamified reaction and further modifies the rating 8708. If the device does not register continuation of the gesture, the gamified reaction ceases 8709. The device might then register initiation of another intuitive gesture 8710 and repeat the cycle, or allow the respondent to complete the question, submit the respondent interactions as response data 8711, and proceed to the next component of the survey which may include additional instances of the present invention.

Figure 88:
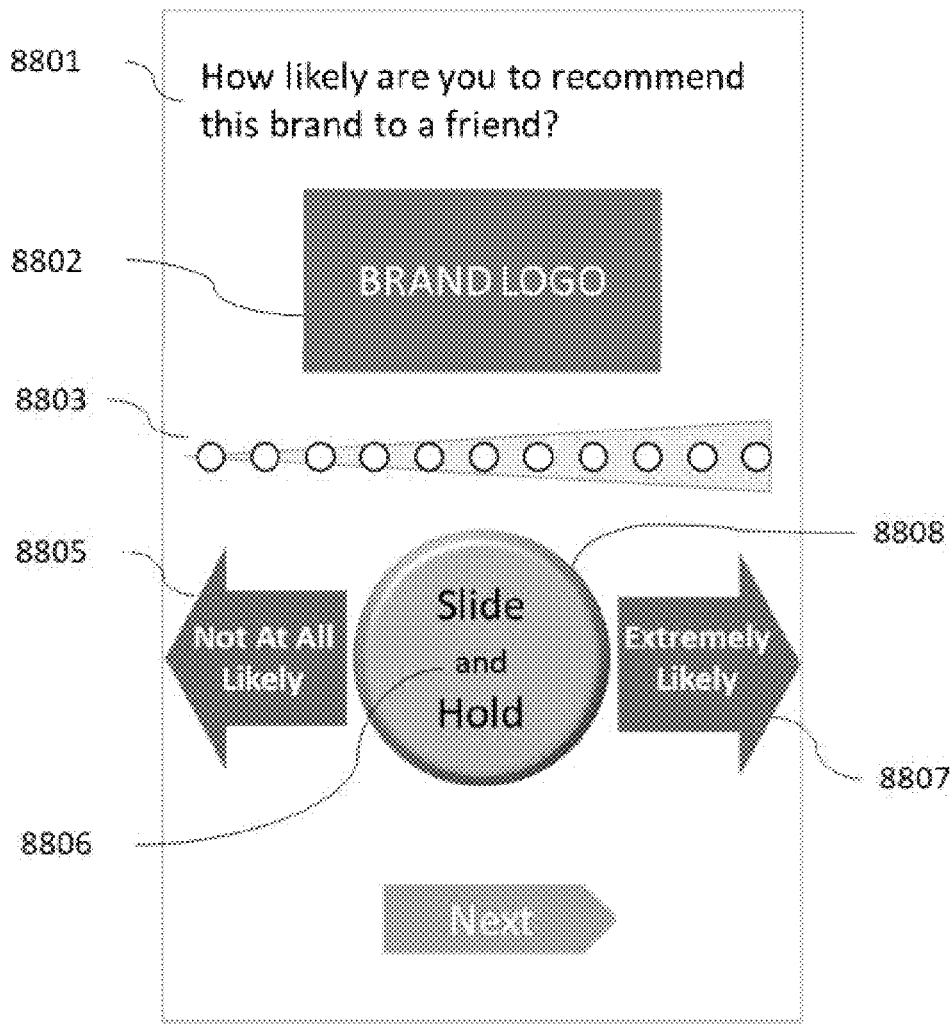
FIG. 88 is an example of an Intuitive Time Dependent Rating Interface in accordance with an embodiment of the present invention, as it might be presented initially to a respondent.
Figure 89:
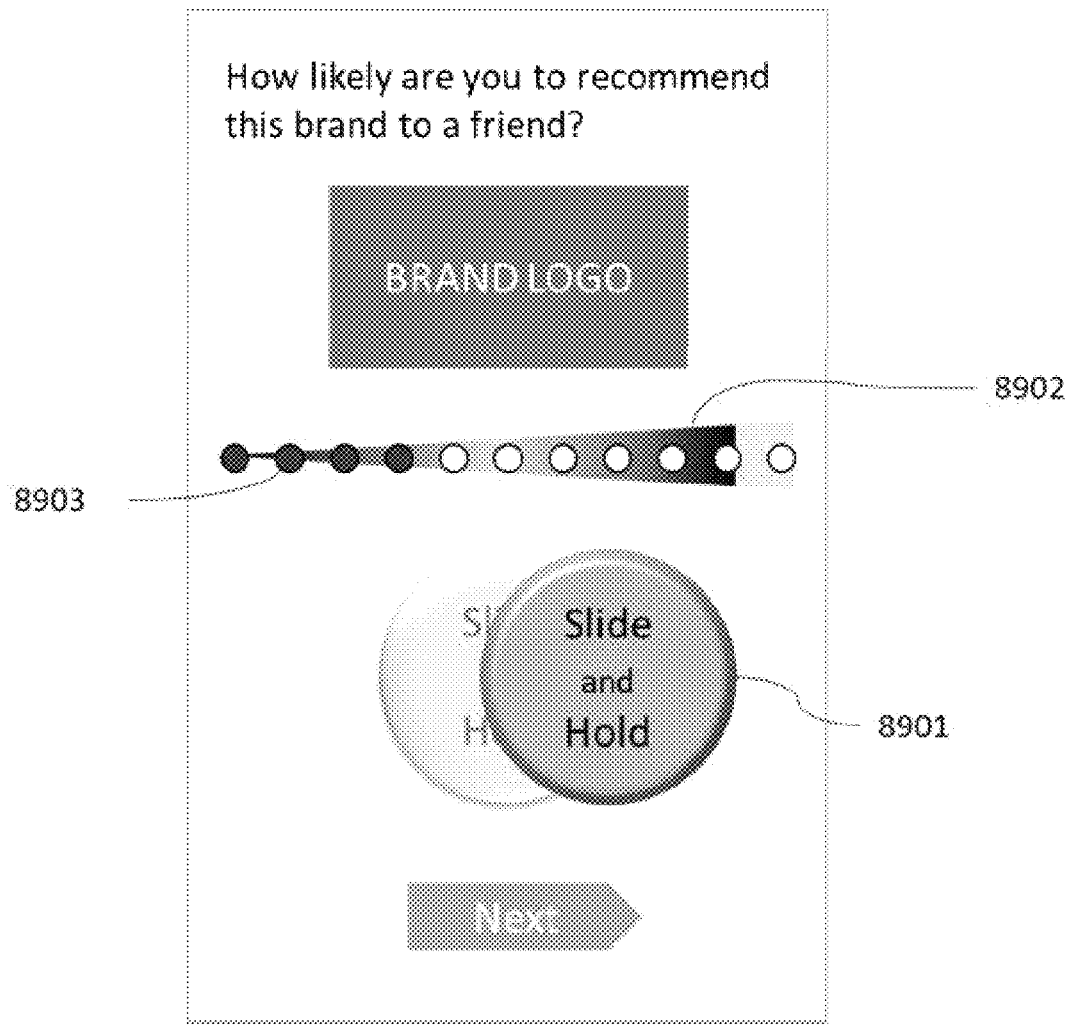
FIG. 89 is an example of an Intuitive Time Dependent Rating Interface in accordance with an embodiment of the present invention, as it might appear after a respondent has slid the control button to the right and held it down for a period of time.

An example of an Intuitive Time Dependent Rating Interface embodiment is presented in FIG. 88. In this example, the rating scale 8803 is displayed as a set of 11 pips atop a horizontal bar which is wider on one end than the other, but it could be presented in many other ways, such as using a dial rating, odometer style rating, simple numbers, a broken bar, pips, stars, combinations of these, or one of many other mechanisms commonly used. The question contains text 8801 and a graphical stimulus 8802. The scale may be labeled, unlabeled, or partially labeled. The button 8808 in this example can be slid to the right to increase the rating or to the left to decrease it. The directions to activate the scale may be presented with words and graphics 8805, 8806, 8807. In FIG. 89, a respondent has slid the control button 8901 to the right and is holding it down. A gamified reaction is engaged by the interface displaying animation that causes the rating scale to pulse 8902 to the right as it increases in value. In this example, as the pulsing animation continues, pips are lit up 8903 to indicate the current rating. The gamified reaction continues until the respondent releases the button. The respondent might then proceed to the next step of the survey or manipulate the control button further.

Figure 90:
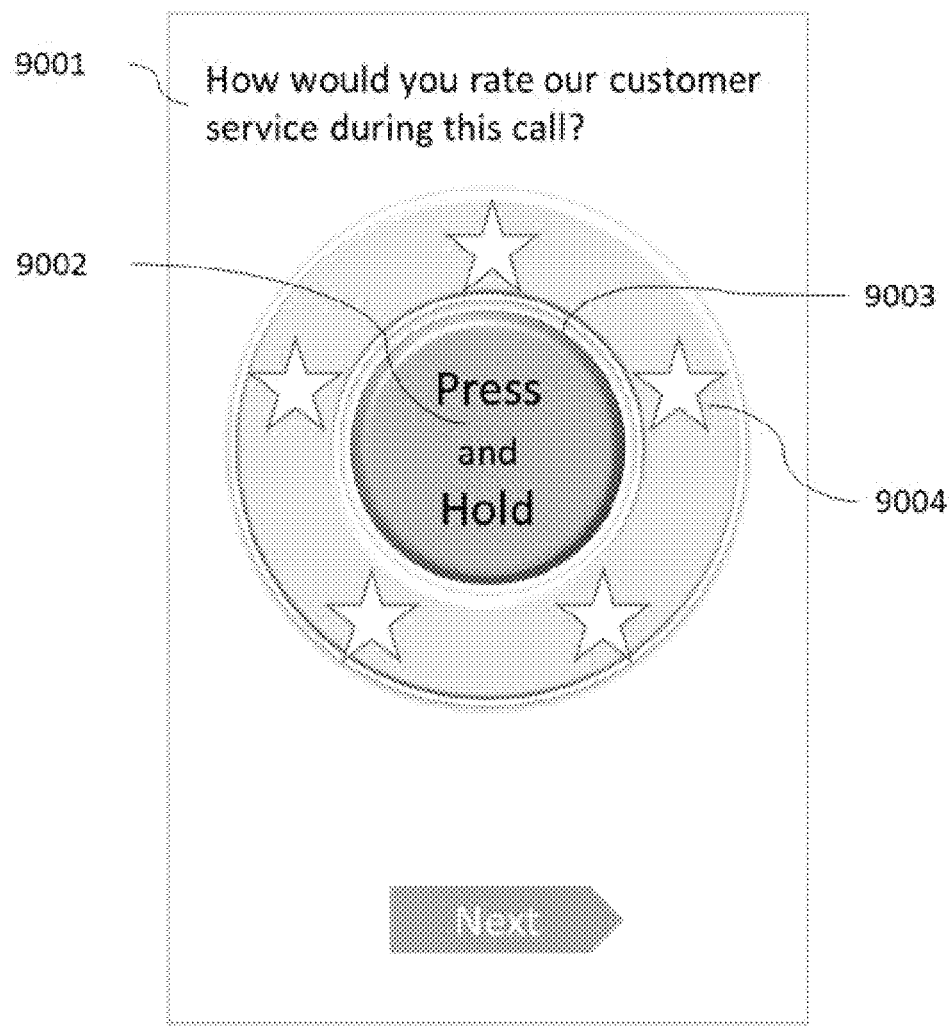
FIG. 90 is another example of an Intuitive Time Dependent Rating Interface in accordance with an embodiment of the present invention, as it might be presented initially to a respondent.
Figure 91:
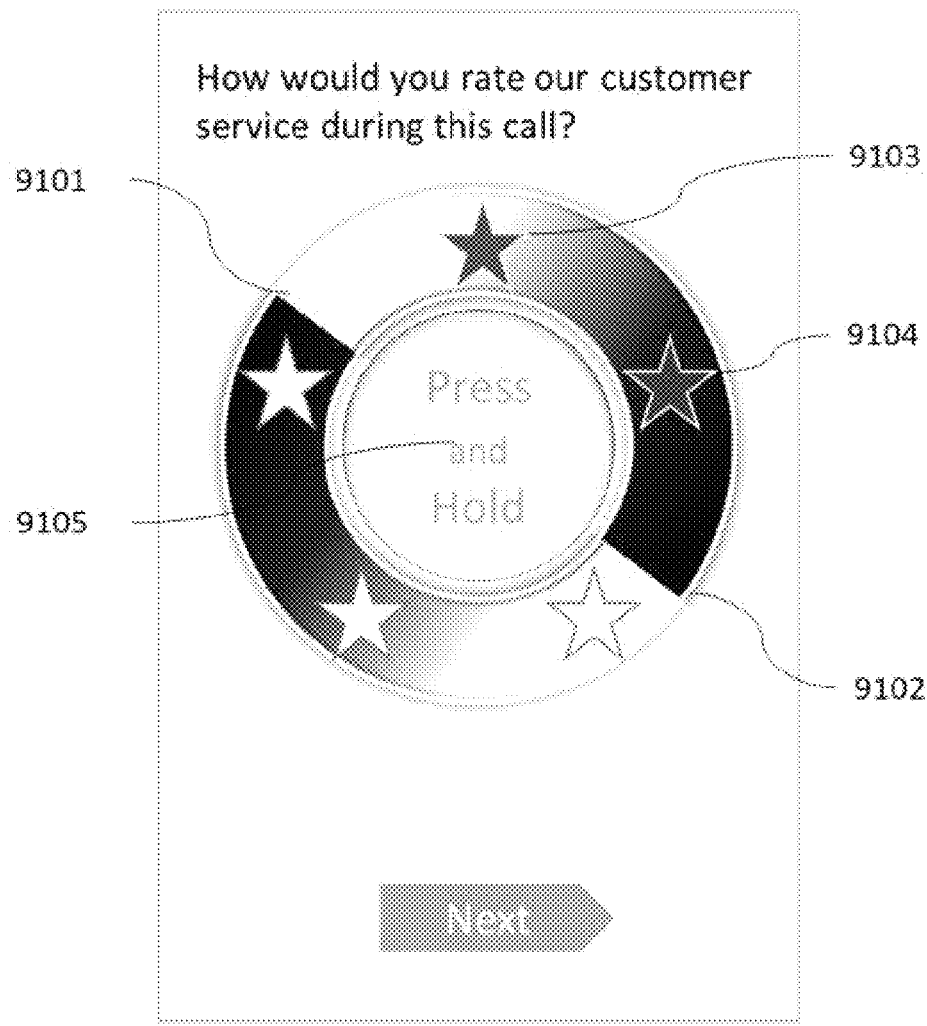
FIG. 91 is another example of an Intuitive Time Dependent Rating Interface in accordance with an embodiment of the present invention, as it might appear after a respondent pressed and held down the control button for a period of time.

Another example of an Intuitive Time Dependent Rating Interface embodiment is presented in FIG. 90. In this example, the question is only text 9001 and the rating scale is displayed as a set of stars 9004 that are arrayed in a circle around a control button 9003, but the rating scale could be presented in many other ways, such as using a dial rating, odometer style rating, simple numbers, a broken bar, pips, or one of many other mechanisms commonly used. The stars in this example are initially unfilled. The button can be pressed as directed in the text 9002 and held down to increase the rating. In FIG. 91, a respondent has pressed the control button 9105 and is holding it down. A fast, gamified reaction 9101, 9102 is engaged by the interface displaying animation that causes pulses to travel in a circle around the control button. In this figure, two of the stars 9104, 9104 have been lit up to indicate the current rating. The gamified reaction continues until the respondent releases the button. While the button remains pressed, the stars sequentially fill up. When the respondent releases the button, the gamified reaction ceases. The respondent might then proceed to the next step of the survey or manipulate the control button further. Controls may also be introduced or modified, such as adding a reset button or modifying a control to reverse the direction of the fast, gamified reaction animation and the rating adjustment.

In one embodiment of the present invention, which we call the Continuous Segmented Media Recording Interface, a set of two or more questions is presented to a respondent in a manner in which one of the questions is clearly prominent, and other questions are less prominent, in order to indicate that the first question is relevant and other questions will follow up on the first question. For example, the first question may be bolded and on top, and the second question faded and below and possibly in smaller font. Alternatively, an instruction might be shown instead of an initial question. The respondent is directed or encouraged to initiate a recording, such as a voice or audiovisual recording, in order to answer the question.

Figure 93:
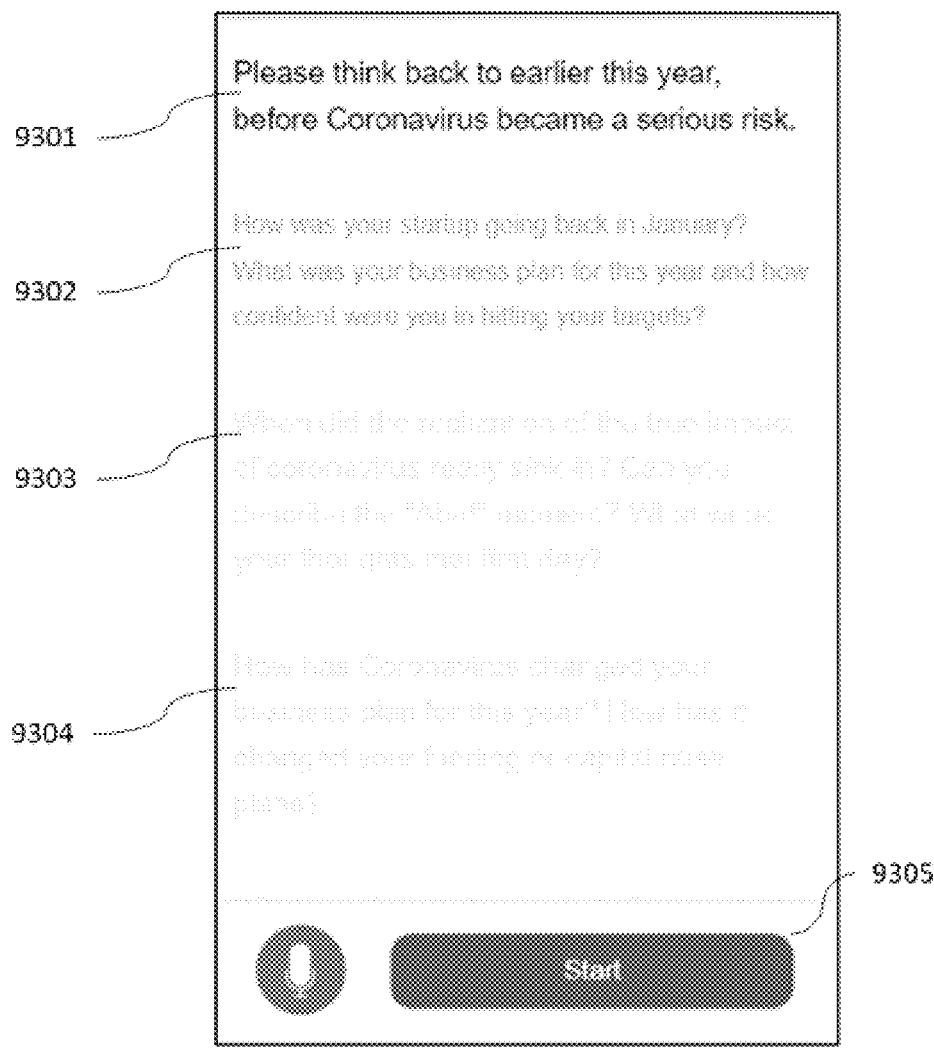
FIG. 93 is an example of a first screen of a Continuous Segmented Media Recording Interface in accordance with an embodiment of the present invention, in which an optional direction is presented prominently, an initial question is presented in a less prominent position, and a third question is presented in an even less prominent position.
Figure 94:
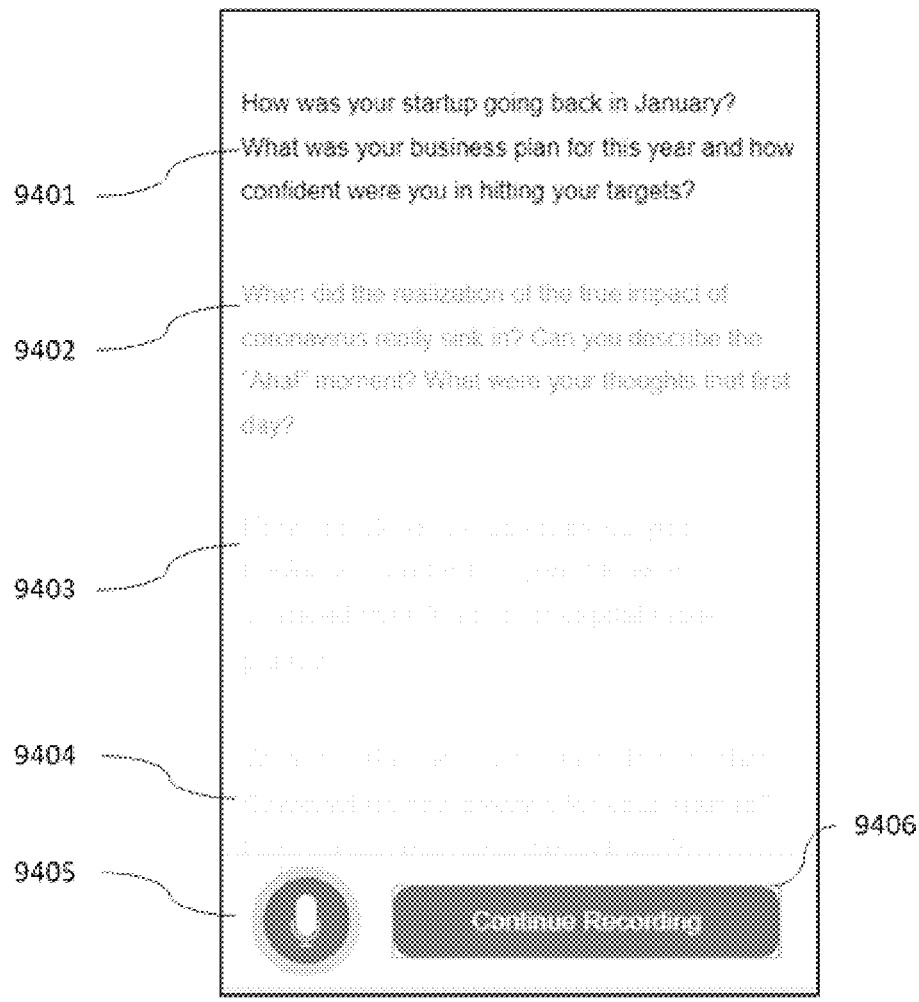
FIG. 94 is an example of a Continuous Segmented Media Recording Interface in accordance with an embodiment of the present invention, in which a mobile device has initiated recording and is continuing to record to a media stream.
Figure 95:
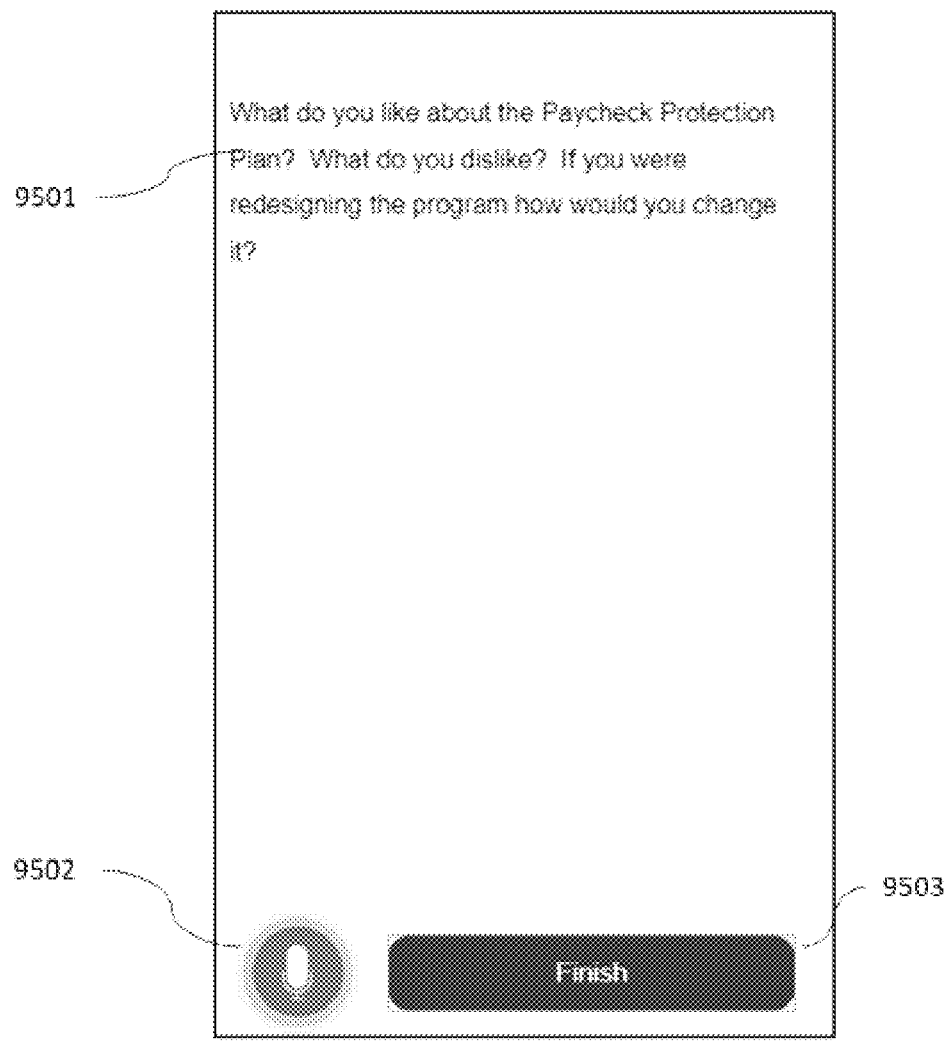
FIG. 95 is an example of a Continuous Segmented Media Recording Interface in accordance with an embodiment of the present invention, displaying a final question, and in which a mobile device is continuing to record to the media stream.
Figure 96:
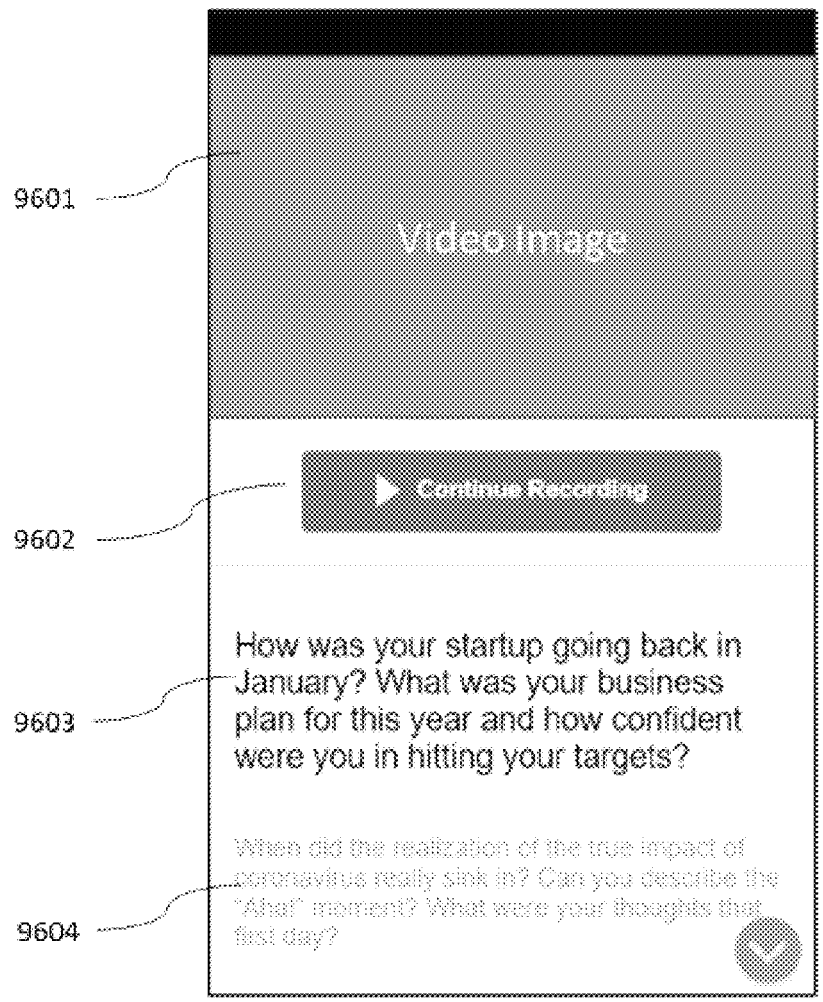
FIG. 96 is another example of a Continuous Segmented Media Recording Interface in accordance with an embodiment of the present invention, which records audio visual information while displaying the video portion onscreen, and in which a recording to the media stream has been initiated and is ongoing.
Figure 97:
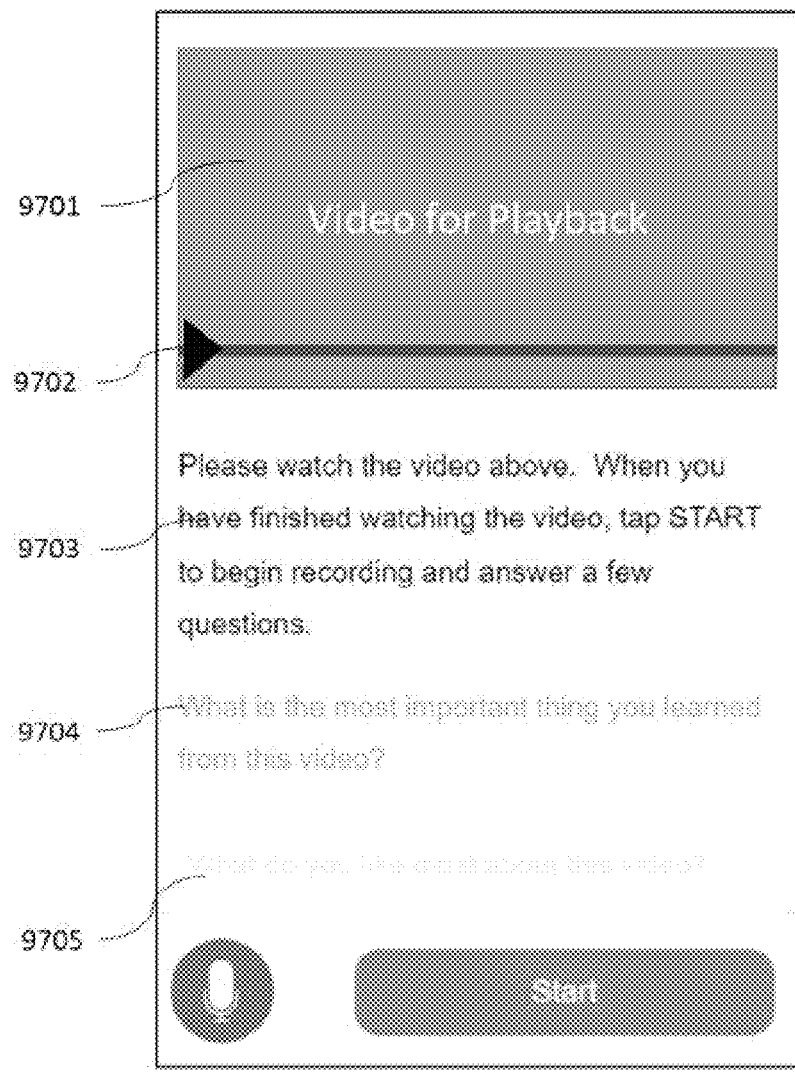
FIG. 97 is another example of a Continuous Segmented Media Recording Interface in accordance with an embodiment of the present invention, which displays rich media as part of the question content.

In one variant of the Continuous Segmented Media Recording Interface in accordance with an embodiment of the present invention, as shown in FIG. 93, the primary instructions 9301 are presented prominently, and subsequent instructions and questions 9302, 9303, 9304 are presented less prominently in a manner to indicate they are not immediately accessible. When the recording is initiated 9305, the mobile device begins to record the audio or audiovisual response to a media stream or may immediately advance to the next question prior to beginning the recording. FIG. 94 shows an example of this interface while it is recording an audio response in which the initial direction or question 9301 has left the screen and the first partially obscured question 9302 has moved into the prominent position 9401, and in which additional obscured questions 9303, 9304 have moved into slightly higher positions 9402, 9403 and a new partially obscured question has entered the queue 9404. In this figure, a pulsing icon 9405 indicates ongoing recording until a respondent advances by selecting a button 9406. FIG. 95 shows an example of this interface when the last question in the queue 9501 is in the dominant position, an icon is pulsing to indicate active recording, and the user may complete the recording by selecting a button 9503. FIG. 96 shows an example of this interface which is recording a video response 9601 from the respondent. The active question 9603 will be removed from the interface when the respondent indicates he or she is continuing 9602, and will be replaced by the next question in queue 9604. FIG. 97 shows another example of this interface in which the stimulus is a video 9701 that the respondent must view, perhaps by using controls 9702. Again, the active question is in the prominent position 9703 and two other questions 9704, 9705 are in queue and partially obscured.

If an instruction is shown on the initial screen 9205, the interface may advance to the first question immediately when a respondent indicates to start recording. To advance to the first question, the interface causes the instruction to leave the screen, for example by sliding up and off the screen or fading away, and the mobile device begins recording to a media stream.

If an instruction is not shown on the initial screen, the interface may begin recording to a media stream without advancing away from the initial question.

When the respondent indicates completion of the response to the initial question, the interface advances to the next question and the mobile device continues to record the media stream. This might be done by sliding the initial question off screen or causing it to fade away. The second question then replaces the first question to become the prominent focal question, and the respondent can continue the audio or audiovisual response without needing to reinitiate a media stream recording.

When the respondent indicates completion of the second question, the Continuous Segmented Media Recording Interface may transition to a third question by causing the second question to leave the screen and the third question to become prominently displayed as the focal question. Any such number of questions might thus be asked and answered within a single media stream, until the last question is arrived at, whereupon the respondent is given the ability to end the media stream. An example of such a last screen is shown in FIG. 95.

Figure 92:
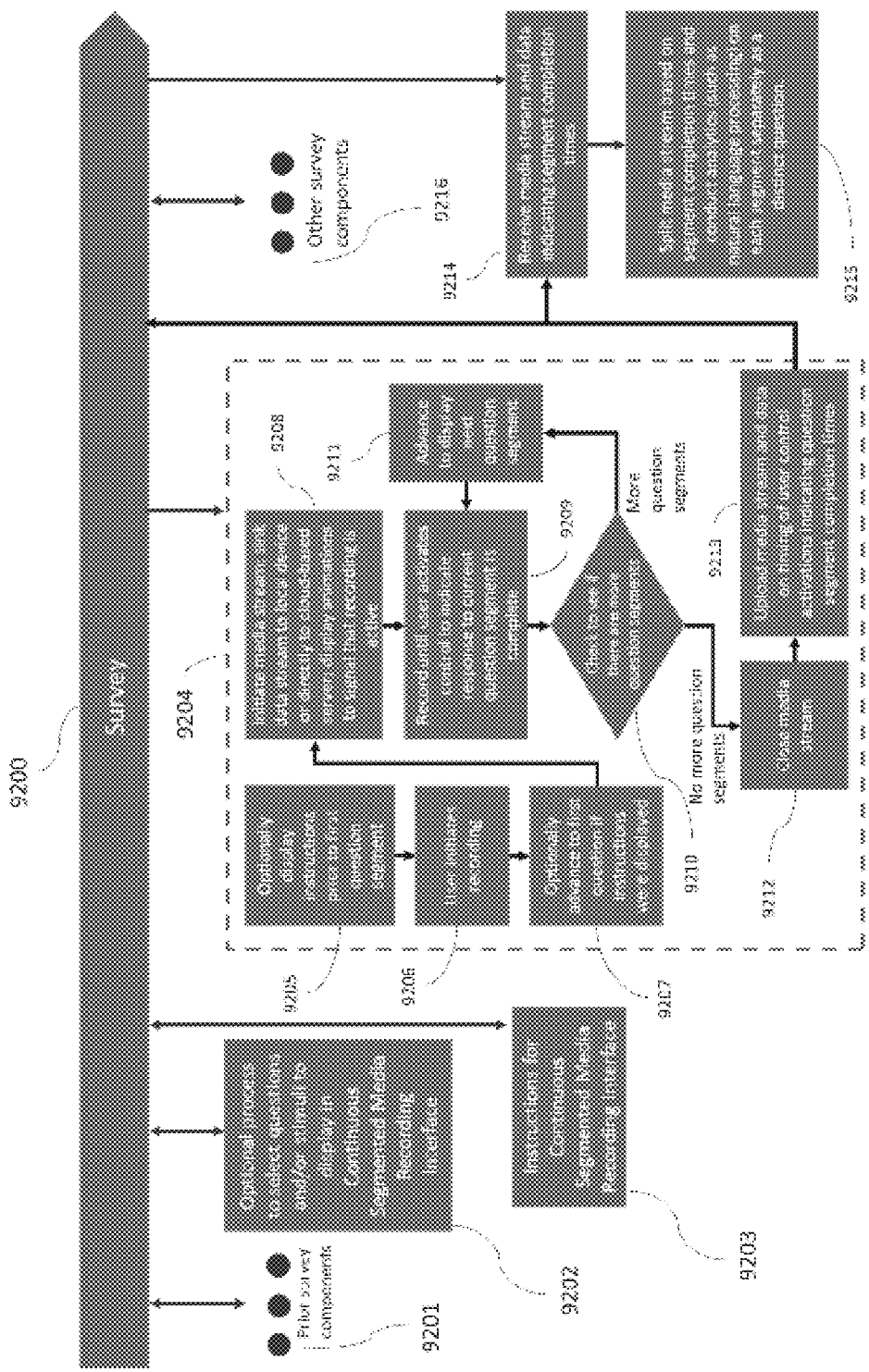
FIG. 92 is an example of a basic software process configuration used in an embodiment of the present invention which we call the Continuous Segmented Media Recording Interface, which is designed to capture audio, video or audiovisual responses to a set of two or more questions in a single media stream without pausing the stream or breaking the respondent's response flow.

FIG. 92 illustrates an example process flow in accordance with one variant of the Continuous Segmented Media Recording Interface when it is embedded within a survey. In this example, a respondent may complete elements (components) 9201 of a survey 9200 prior to engaging with the Continuous Segmented Media Recording interface 9204. Various elements of that survey and responses to those elements may be used to modify the questions the respondent is asked 9202. The respondent might be presented a separate instruction screen 9203 or popup before entering the interface. Such mechanisms are considered standard in the practice of survey creation. If the respondent is presented instructions in place of the first question 9205, the instructions may be removed when the recording is initiated 9206 and the interface may advance to the first question 9207. When the respondent is answering the questions displayed in the interface, the mobile device either records the answers to a local media stream on the device, or streams them directly to a server, or both 9208. The user indicates readiness to continue 9209 when he or she is finished answering the focal question. The interface also records the time stamps associated with the respondent's actions during the interface, especially the time of starting the recording, the time for completing each of the questions, and the time for completing the entire set of questions. The interface checks to see if there are additional questions in queue 9210 and if so advances to the next question, moving it into the focal position. If there are no more questions in queue, the interface closes the media stream 9212 and completes uploading the recorded media content and associated respondent interaction data as respondent response data 9213, including the time stamps associated with when the respondent indicated readiness to continue. The device then uploads the media stream and associated respondent response data 9214 and the respondent may complete the remainder of the components 9216 of the survey which may include other instances of the present invention. The device may upload the media stream and respondent response data to the server system hosting the survey or to another survey system, for example through an API. Once the server has received the media file and data, it may synchronously or asynchronously split the media stream 9215 according to the time stamps associated with the respondent indicating question completion.

Figure 98:
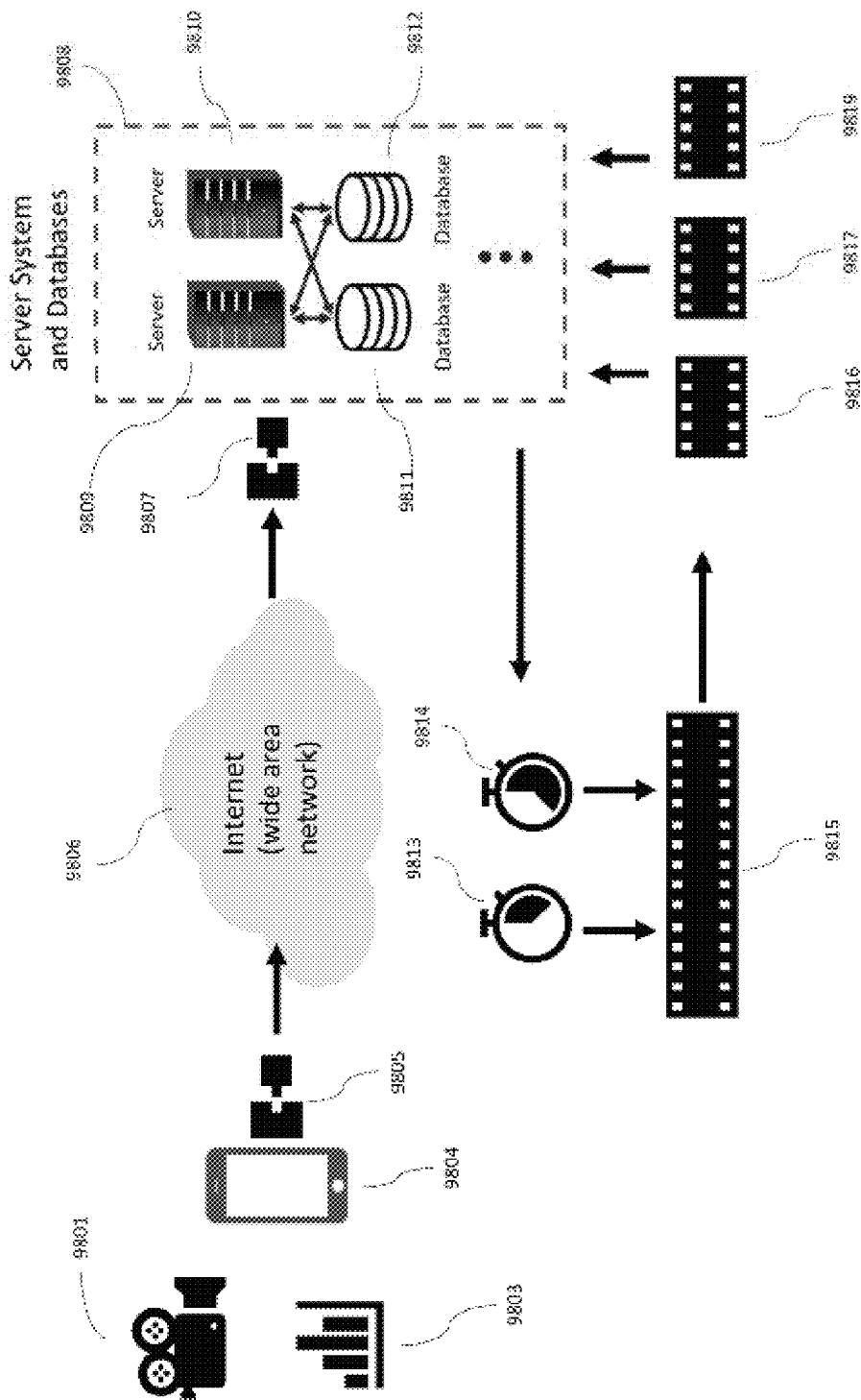
FIG. 98 is an example of a basic software process used to split out media files gathered in response to a Continuous Segmented Media Recording Interface in accordance with an embodiment of the present invention, into separate media files based on time stamps associated with respondent responses.

In accordance with one variant of the Continuous Segmented Media Recording Interface, FIG. 98 presents an example of a process to split a media file using data gathered in the interface. The mobile device 9804 gathers a media stream 9801 and other respondent response data 9803 and bundles the data to conform to an API 9805 such as XML or REST, and sends the data through a wide area network such as the internet 9806 to a server system 9808 consisting of servers 9809, 9810 with databases 9811, 9812. The server system receives the data by means of an API 9807. The server system or other computation tools then use the time stamps 9813, 9814 associated with the user indication of recording completion to parse the full media stream 9815 into separate media files 9816, 9817, 9818 that align with the focal questions that the respondent was responding to, and return the parsed files to the server system and databases for further analysis.

The media stream can be parsed either in real time or after the recording is completed using the time stamps associated with the respondent responses.

The primary use of the Continuous Segmented Media Recording Interface is to enable respondents to answer a sequence of related questions. For example, a respondent might be asked to answer in the form of a narrative, with individual questions in the sequence structured in such a way as to walk a respondent through the narrative. Asking an individual all of the questions at the beginning of the narrative creates an excessive cognitive burden, such that respondents cannot recall or respond to all of the questions without harming the quality of the response. Breaking the questions into completely distinct questions, perhaps on different screens, breaks the respondent's flow of thought and stream of consciousness, and also takes additional time. Using the time stamps to segment the media stream enables an analyst or software to determine which segments of the media stream contain responses that are relevant to specific questions, and to conduct analysis using tools such as natural language processing, topic analysis, sentiment analysis, and other artificial intelligence tools on each question separately or on any set of questions included in the Continuous Segmented Media Recording interface.

Figure 99:
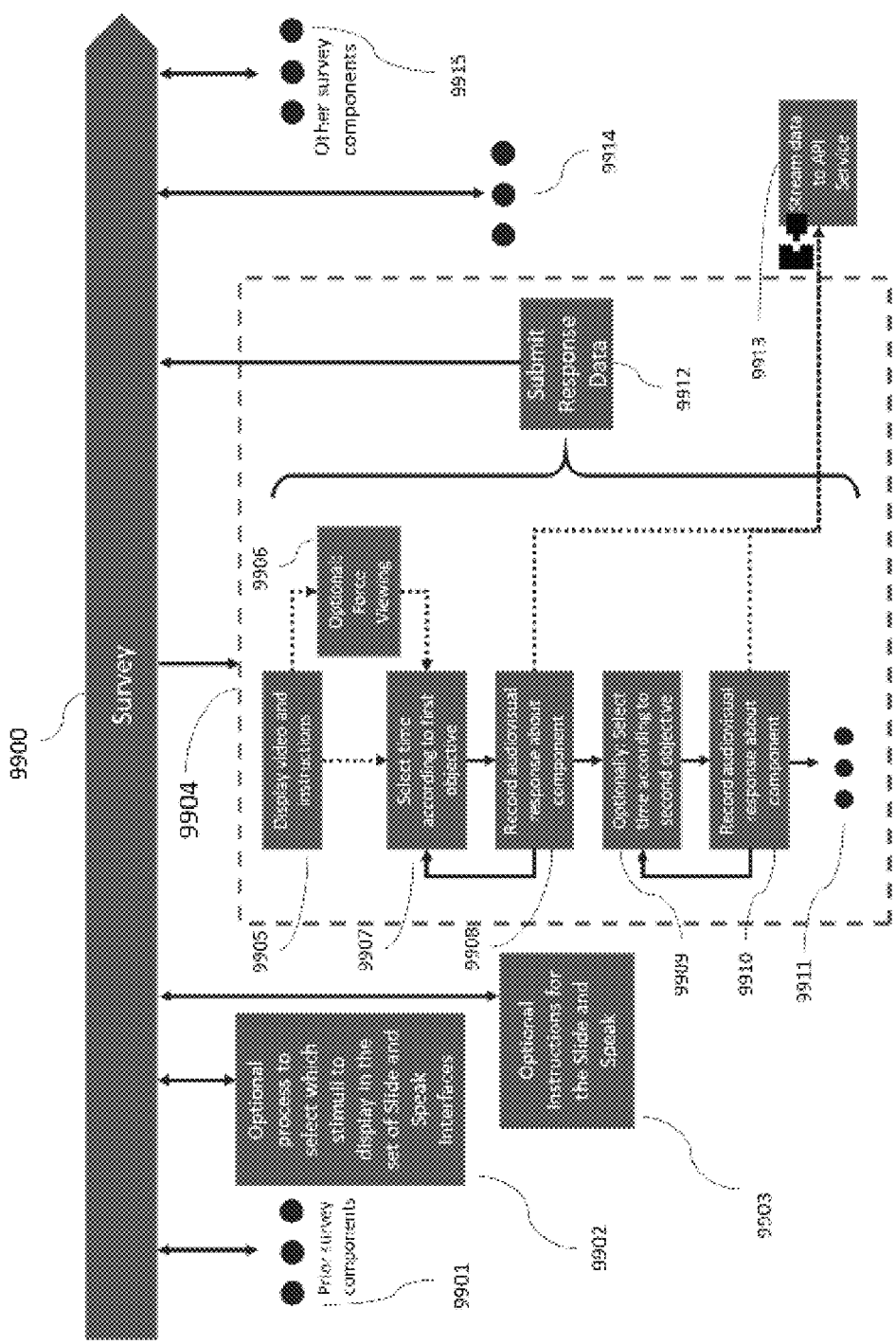
FIG. 99 is an example of a basic software process configuration used in an embodiment of the present invention which we call the Slide and Speak Interface, which is designed to capture a respondent's audiovisual responses to temporal regions of an audiovisual media stimulus

In another embodiment of the present invention, which we call the Slide and Speak Interface, an audiovisual media stimulus is presented to a respondent who is directed to select time regions of the stimulus according to an objective, and then explain why the selection was made using an audiovisual response (as defined in the Definitions). FIG. 99 illustrates an example process flow in accordance with an embodiment of the present invention when it is embedded within a survey 9900. In this example, a respondent may complete elements of a survey 9901 before engaging a Slide and Speak Interface 9904. Various elements of that survey and responses to those elements 9902 may be used to select a set of stimuli to ask questions about. Such mechanisms to select questions to include are considered standard in the practice of survey creation. Before engaging with the Slide and Speak Interface, a respondent may receive an instruction screen 9903 explaining how to interact with the forthcoming interface. The instructions may alternatively be shown as an overlay on the interface itself, or dynamically on the screen through other mechanisms.

When presented with an audiovisual media stimulus 9905, a respondent may be required 9906 to interact with the stimulus, for example by watching a video. The respondent may be prevented from responding to questions or directions without first completing the required interactions.

A respondent then selects a temporal region of the audiovisual stimulus 9907. When a respondent has selected a temporal region of the stimulus according to one or more objectives, the Tap and Talk Interface enables the respondent to then to record audiovisual responses pertaining to the selected region or regions 9908. After responding to questions pertaining to an initial objective, the interface may request or require the respondent to select one or more temporal regions according to a second objective 9909 and record audiovisual content 9910 pertaining to the selected region and according to the objective. Additional objectives may be included without changing the fundamental nature of the invention, and many variants on this flow are possible. The interface receives interactions and respondent response data associated with respondent actions, and translates this data to a form which can be transmitted and stored in the survey system 9912 or another system that may be accessed through the internet, for example through an API enabled software service 9913. Response data may be sent to the survey software, perhaps in a server system, after the respondent is done. Further, response data (including audiovisual responses) may be sent to the survey software or another destination before the respondent has completed all interactions with the interface. For example, the interface may record respondent response data resulting from touch interactions and accumulate this data for submission to survey software which is hosted in a server system at the end of the respondent's interactions with the interface, but might stream audiovisual responses to an API that is hosted in another server system. Data sent to multiple locations might be later aggregated using a variety of mechanisms. For example, audiovisual data might be streamed to a server as part of a single file that contains multiple responses, and then split into separate files based on time stamps associated with various respondent interactions in response to objectives. Innumerable methods can be used to store and manage data gathered from this interface without changing the fundamental nature of the invention. After the respondent has completed the questions in the Tap and Talk Interface, he or she might proceed to another instance of the interface 9914 or continue to other components of the survey 9915.

Figure 100:
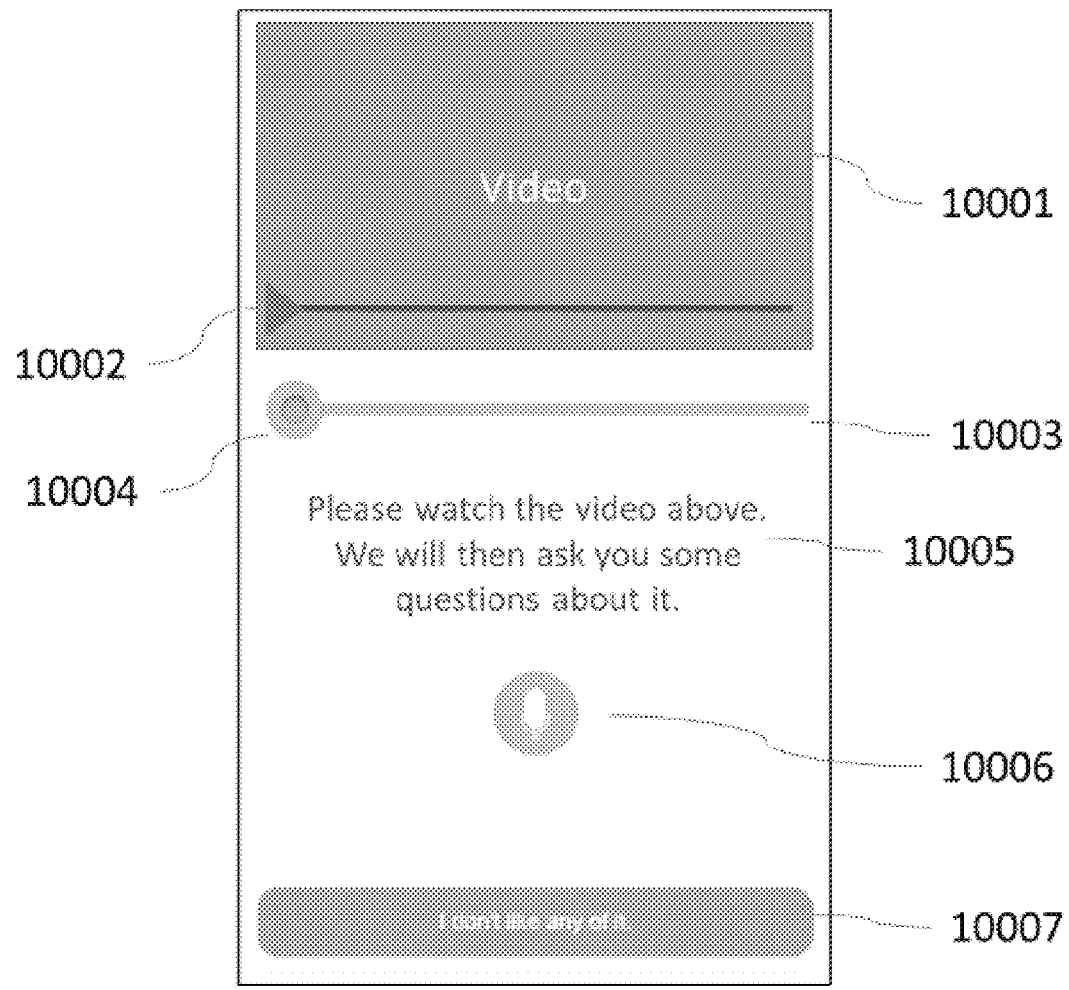
FIG. 100 is an example of a first screen of a Slide and Speak Interface in accordance with an embodiment of the present invention, showing instructions to view a video, in which a respondent is unable to provide activate controls to provide an audiovisual response until the respondent has viewed the entire video.

FIG. 100 shows an example of an initial screen of a Slide and Speak Interface in accordance with an embodiment of the present invention. In this example, the respondent is shown an audiovisual media stimulus 10001, such as a commercial, and may be directed 10005 to activate controls to view the video 10002 before progressing to the next step of the interface. Controls such as the button to initiate an audio recording 10006, the button to skip the audio recording 10007, and the button to select a time region on the video 10004 using the slider 10003 may be disabled until the respondent has watched all or part of the video. Various introductory screens can be used, though such screens are not essential to this embodiment of the present invention.

Figure 101:
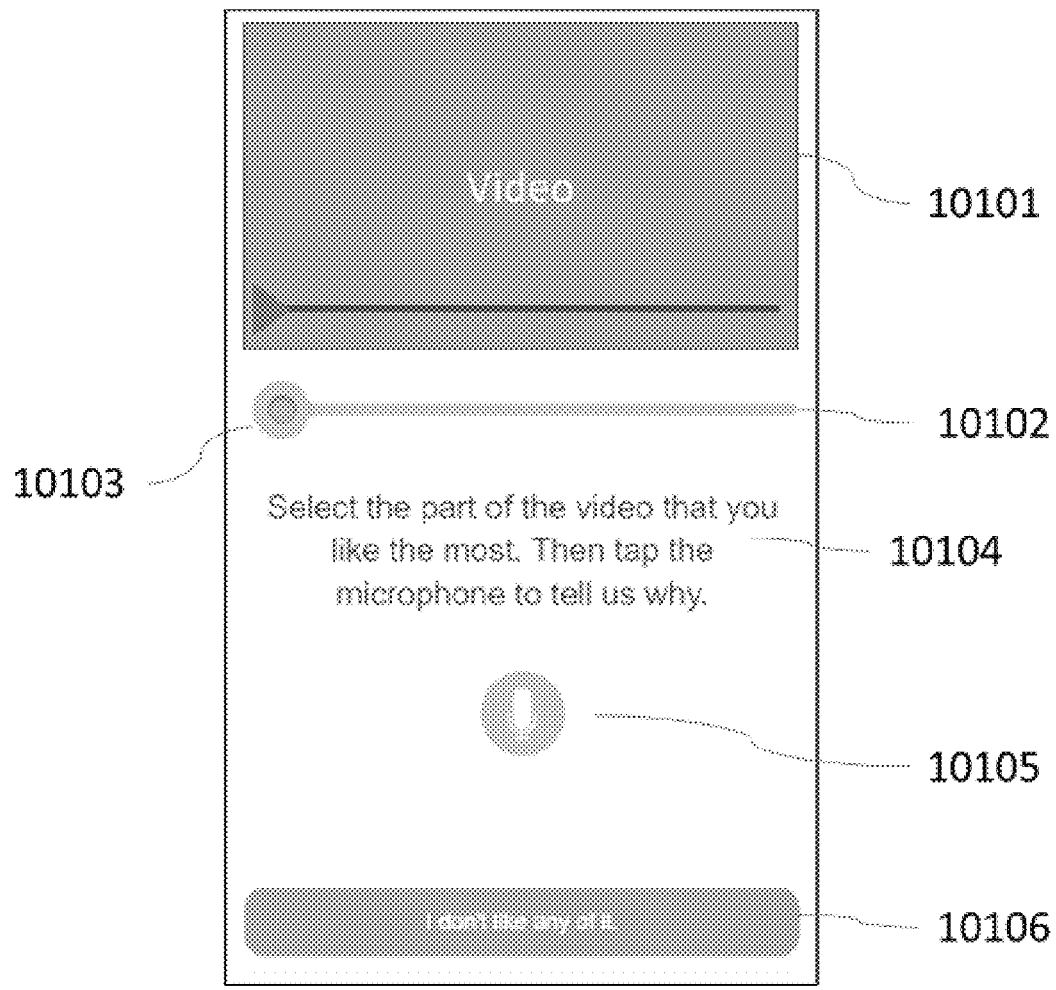
FIG. 101 is an example of a screen of a Slide and Speak Interface in accordance with an embodiment of the present invention, in which a respondent is directed to select a region of the video according to an objective.
Figure 102:
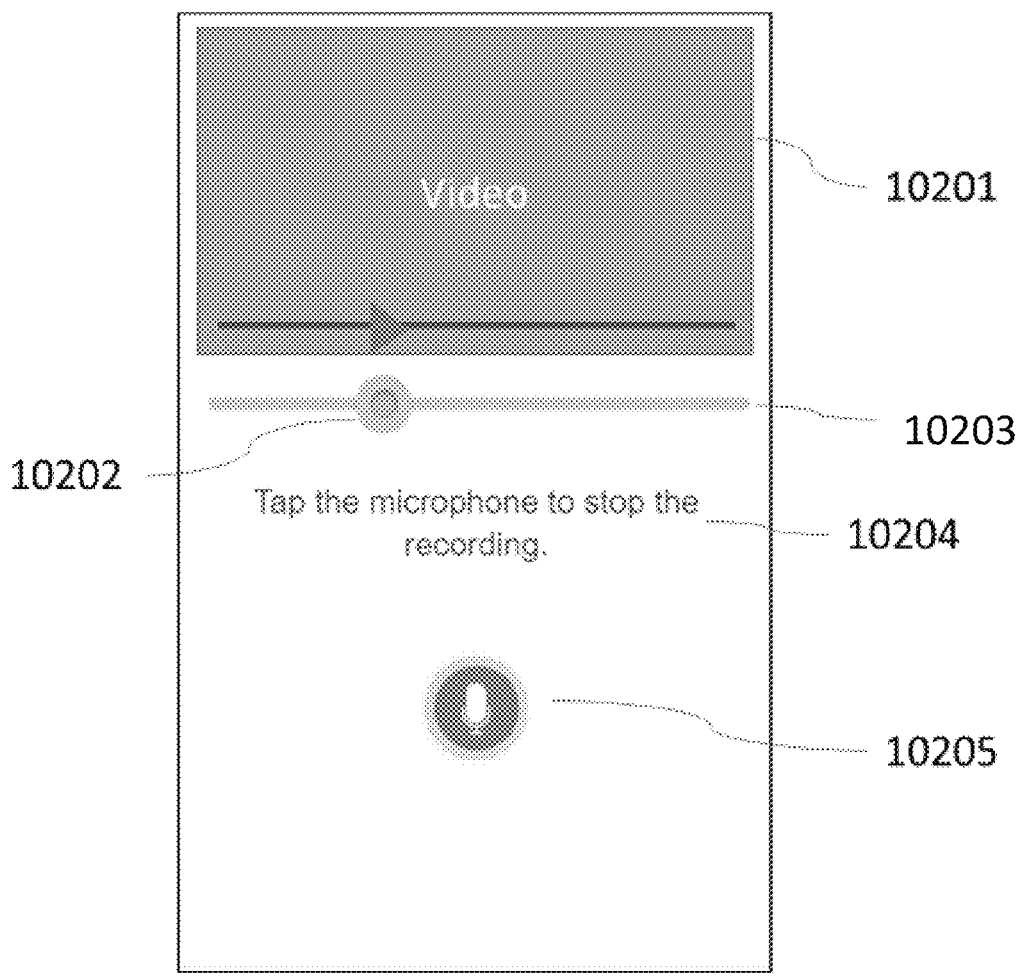
FIG. 102 is an example of a screen of a Slide and Speak Interface in accordance with an embodiment of the present invention, in which a respondent is recording an audiovisual response pertaining to the selected region of the video.
Figure 103:
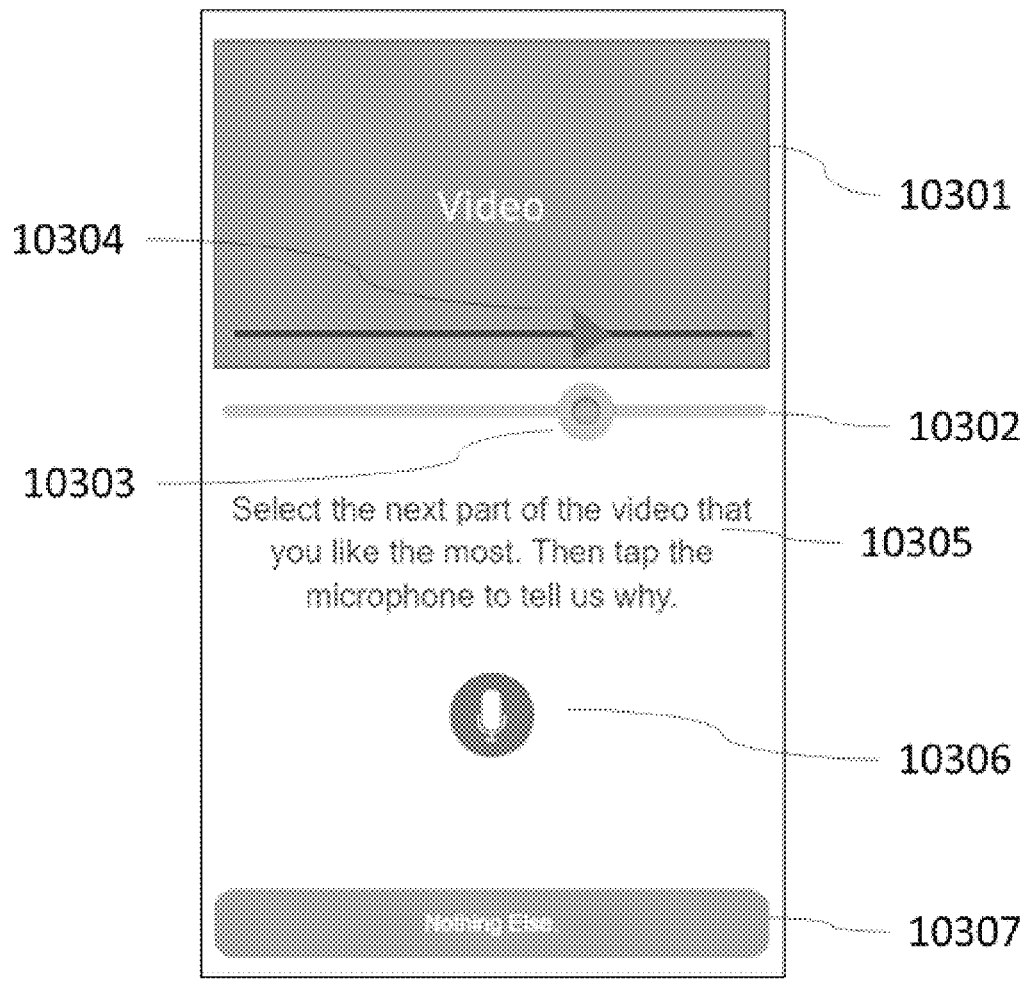
FIG. 103 is an example of a screen of a Slide and Speak Interface in accordance with an embodiment of the present invention, in which a respondent has completed recording an audiovisual response and is presented with an opportunity to select another region of the video according to an objective.

FIG. 101 shows an example of a screen of a Slide and Speak Interface in accordance with an embodiment of the present invention, in which the respondent is presented an objective or question 10104, and directed to select a region of the video 10101. In this example, the respondent can drag a button 10103 on a slider 10102 to select a region which consists of a single point of time in the video. Alternately or additionally, a Slide and Speak Interface might enable a respondent to select a region spanning between two time points in the video, or multiple time points or regions. Once a time point or region is selected, a respondent might initiate an audio response by tapping a button 10105, or might indicate that he or she does not believe that any part of the video matches the objective or question 10106. The Slide and Speak Interface will typically enable a respondent to preview the video as a region is being selected. FIG. 102 continues this example, showing a respondent has selected a temporal region 10202, 10203 of a video 10201 according to an objective and is recording an audio response. The respondent is directed according to directions 10204 to tap an icon to end the recording 10205. FIG. 103 continues this example from FIG. 102, showing a follow-up question 10305 which directs the respondent to select another region 10304 of the video stimulus 10301 using the selector button 10303 and the slider 10304. Upon selection of a region, a respondent might tap a button to initiate another recording 10306. Alternatively, a respondent might indicate 10307 there are no further areas of the stimulus that meet the present objective. The Slide and Speak Interface might incorporate a sequence of multiple objectives or repeat the same objective multiple times, or any combination thereof, on subsequent screens.

The Slide and Speak Interface may present a respondent with one or more objectives in the course of gathering a set of responses. For example, a respondent may be directed to select one or more temporal regions of an audiovisual media stimulus that he or she likes and to comment on each of those, then to select one or more temporal regions of an audiovisual media stimulus he or she dislikes and to comment on each those areas. As another example, the respondent may be asked to indicate specific regions of the audiovisual stimulus that meet some requested objectives, such as triggering a respondent perception or emotional response (such as happiness, sadness, hunger, attraction, economic value, uniqueness, or some other criteria). A respondent may engage with multiple instances of this embodiment in a survey, possibly in sequence and sharing the same set of general instructions.

For each temporal region selected by the respondent, some versions of the Slide and Speak Interface embodiment of the present invention might enable the respondent to indicate his or her intensity of response using an intuitive gesture. For example, the respondent interface may enable the respondent to tap the same temporal region on an image repeatedly, to press the spot for a longer duration, or to indicate intensity of response through a pop-up widget that is overlaid on the screen. Such a pop-up widget would present additional micro-interactions that could be as simple as selecting an option (i.e. a scale response or one of a set of available icons), possibly using another embodiment of the present invention. Alternatively, and instead of a pop-up widget, the main interface may utilize interactions such as one or more of repeated swiping, fast swiping, high tactile pressure, swipe length, tap intensity, tap frequency, shaking the device, and tap speed to assess intensity of response.

Alternatively, and as another variant of the Slide and Speak Interface, the respondent may be directed to indicate the temporal region of an audiovisual stimulus that he or she notices or reacts to most intensely, regardless of the directionality of the reaction (i.e. regardless of liking or disliking, value or lack of value, etc.). The respondent may then be presented with a pop-up widget overlaying the stimulus which enables the respondent to indicate both intensity and directionality of the response. Such a pop-up widget would present additional micro-interactions that could be as simple as selecting an option (i.e. a scale response or one of a set of available icons). Alternatively, and instead of a pop-up widget, the main interface may utilize interactions such as one or more of repeated swiping, fast swiping, high tactile pressure, swipe length, tap intensity, tap frequency, shaking the device, and tap speed to assess intensity of response.

Further, the respondent may be directed to provide a non-audiovisual response to a selected region of an audiovisual media file and then to record an audiovisual response that incorporates aspects of the non-audiovisual response. For example, a respondent may be directed to select a temporal region, then directed according to an objective to quickly tap on images from a set that is presented to the respondent. The set of available images might be preselected, or selected dynamically using respondent data captured earlier in the survey. Such a set of images may incorporate emotional or cognitive associations, for example. A respondent might then be directed to record an audiovisual response explaining why he or she tapped on the images.

The respondent's commentary on his or her selections, or explanation of his or her actions, is gathered through one or more multimedia input/output devices, such as a microphone, touchscreen, camera, or biofeedback input device. The respondent's audiovisual response may also be encoded into text or another medium using machine learning methods, may be in near real time, may be grouped or tagged (for instance, using semantic tagging) based on analysis using machine learning or artificial intelligence tools, may be scored (for instance, using sentiment analysis to assign a sentiment score), and may be displayed back to the respondent on the interface for editing or confirmation.

The combination of these multiple embodiments of the present invention through connecting logic and sequencing causes the interface to gather data that indicates an initial "fast-thinking" response to the audiovisual media stimulus using images that do not require articulating thoughts, feelings or perceptions in words (thus reducing fatigue and various biases), and then cognitively primes the respondent to justify the selection of those images. The use of audiovisual responses helps enhance the quality, quantity, and accuracy of data in the open-ended response by using an easier and more natural activity for the respondent than typing text into an entry box on the small screen of a mobile computing device.

In another example of the Slide and Speak Interface in accordance with the present invention, a respondent might be given alternate mechanisms of selecting a temporal region of the audiovisual media stimulus. For example, a respondent might pause a video during play. Alternatively, a respondent might provide real time responses to the video as it plays, such as by manipulating an input device or control on the screen. For example, a respondent might apply pressure or tap onscreen controls while the video is playing to indicate response to an objective, such as holding down or sliding up a control to indicate how much he or she likes or dislikes a particular part of the video while it is playing. A respondent might then be directed after completing the viewing of the video to record an audio or audiovisual response explaining his or her selections as they pertain to an objective. Multiple mechanisms to select the temporal region of an audiovisual media stimulus are possible within the Slide and Speak Interface without changing the fundamental nature of the invention.

In the Slide and Speak Interface in accordance with an embodiment of the present invention, the interface might enable the respondent to change the view of the stimulus, such as by zooming in or viewing the stimulus in a landscape (e.g. sideways) mode to maximize viewing area, which could include additional interactions or controls to switch between views or select a temporal region of the audiovisual media stimulus.

Further continuing with the Slide and Speak Interface embodiment, data generated by the respondent's interactions are recorded as respondent response data. This data includes at a minimum the selections made by the respondent and the respondent's associated audiovisual responses, but can also include data selected from the group consisting of timings associated with actions, the number of times a stimulus was magnified or zoomed, the number of times an audiovisual response was replaced, other data associated with the respondent's interactions, and combinations thereof.

The embodiments of the present invention described above are intended to be merely exemplary; numerous variations and modifications will be apparent to those skilled in the art. All such variations and modifications are intended to be within the scope of the present invention as defined in any appended claims.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A computer user interface for gathering respondent response data for a grouping question for a set of graphically rich stimuli that cannot be visibly displayed on a mobile computing device single screen simultaneously without impairing integrity of the stimuli, the computer user interface produced on a mobile computing device, operated by the respondent, in communication with a server system and executing code establishing computer processes comprising:

causing by the server system presentation on a display of the mobile computing device to the respondent an original set of graphically rich stimuli on an extended screen, in a context of an instruction asking the respondent to respond with a set of gestures to select a set of smaller sets of the graphically rich stimuli, by moving the selected items into a grouping area such that the selected items are simultaneously visibly displayed on the single screen and remain visibly displayed on the single screen as the respondent navigates across the extended screen, wherein the grouping area is of a small size that cannot cause useful display of the selected items without modification;

in consequence of having received on the display of the mobile computing device a responding set of gestures indicating the selection of the set of smaller sets of graphically rich stimuli, moving the selected items from the original set into the set of smaller sets and replacing the selected items with corresponding reduced form stimuli configured to fit into the grouping area; and receiving, by the server system from the mobile computing device, data corresponding to the responding set of gestures and associated selected items as response data pertinent to the graphically rich stimuli and associated with the respondent;

wherein causing by the server system presentation temporarily on the display of the mobile computing device an extended form stimulus corresponding to a stimulus selected from the group consisting of a graphically rich stimulus, a reduced form stimulus, and combinations thereof in response to receiving a set of gestures from the respondent.

P2. A computer user interface according to Potential Claim P1, wherein the computer processes further comprise:

configuring by the server system for display on the mobile computing device to the respondent a full set of graphically rich stimuli in a manner selected from a group consisting of:

presenting to the respondent a stream of graphically rich stimuli that moves across the screen according to time increments;

presenting to the respondent sets of graphically rich stimuli that fit on a single screen, wherein the respondent can move the graphically rich stimuli from one set to another set by providing a set of gestures;

presenting to the respondent reduced form stimuli corresponding to the graphically rich stimuli, wherein the respondent can view a set of the graphically rich stimuli corresponding to a set of reduced form stimuli by providing a set of gestures; and combinations thereof.

P3. A computer user interface according to Potential Claim P1, wherein the computer processes further comprise:

configuring by the server the display of the mobile computing device to receive graphical gestures by the respondent in a mode selected from the group consisting of:

moving a reduced form stimulus from one section of the grouping area signifying membership in a given selected set to another section of the grouping area signifying membership in another given selected set;

removing a reduced form stimulus from the grouping area and restoring its corresponding graphically rich stimulus to the original set of graphically rich stimuli; and combinations thereof.

P4. A computer user interface according to Potential Claim P1, the computer processes further comprise:

accessing by the server system a centralized datastore to record respondent price sensitivity response data.

P5. A computer user interface according to Potential Claim P1, the computer processes further comprise:

aggregating data by the server system from a centralized datastore that contains respondent price sensitivity response data; and applying by the server system a process selected from the group consisting of numerical algorithms, statistical processes, and combinations thereof aggregated data for a set of respondents to create derived metrics pertaining to a set selected from the group consisting of a set of respondents, a set of stimuli, a set of associated stimulus items, and combinations thereof.

P6. A computer user interface according to Potential Claim P1, the computer processes further comprising:

determining by the server system a set of metrics that are derived from a set of surveys using a process selected from the group consisting of numerical algorithms, statistical processes, and combinations thereof; and characterizing the set of derived metrics to create a framework selected from the group consisting of an interpretive framework, a predictive framework, and combinations thereof.

P7. A computer user interface for gathering respondent response data and a set of associated audiovisual responses to a question displaying a stimulus, the computer user interface produced on a mobile computing device, operated by the respondent, in communication with a server system and executing code establishing computer processes comprising:

causing by the server system presentation on a display of the mobile computing device to a respondent a stimulus in the context of instructions to indicate a set of elements of the stimulus according to a set of objectives by a responding set of gestures;

in consequence of having received on the display of the mobile computing device the responding set of gestures indicating a set of elements of the stimulus, receiving from the respondent a set of audiovisual responses associated with the indicated set of elements using a recording mechanism in the mobile computing device;

receiving, by the server system from the mobile computing device, data corresponding to the responding set of gestures as respondent response data pertinent to the stimulus and associated with the respondent; and receiving, by a server system from the mobile computing device, data corresponding to the set of audiovisual responses as respondent response data pertinent to the stimulus and associated with the respondent response data and the respondent.

P8. A computer user interface according to Potential Claim P7, wherein the computer processes further comprise:

providing the respondent directions relating to a set of gestures, wherein each set of gestures is associated with a different objective;

receiving on the display of the mobile computing device a responding set of gestures indicating a set of elements of the stimulus pertaining to an associated objective;

receiving from the respondent a set of audiovisual responses associated with the indicated set of elements and pertaining to the associated objective using a recording mechanism in the mobile computing device;

storing data corresponding to the responding set of gestures as response data pertinent to the stimulus, pertaining to the associated objective, and associated with the respondent; and storing the set of audiovisual responses pertinent to the stimulus, pertaining to the associated objective, and associated with the respondent.

P9. A computer user interface according to Potential Claim P7, wherein the computer processes further comprise:

providing the respondent control of the recording mechanism in the mobile computing device to influence a set of audiovisual responses associated with a set of stimuli, wherein the control of the recording mechanism is selected from the group consisting of starting recording, pausing recording, resuming recording, stopping recording, deleting a recording, deleting a portion of a recording, reviewing a recording, reviewing a portion of the recording, submitting a recording, submitting a portion of a recording, and combinations thereof.

P10. A computer user interface according to Potential Claim P7, wherein the computer processes further comprise:

causing presentation on a display of the mobile computing device to a respondent visual cues selected from the group consisting of:
- visual cues signifying response data provided by the respondent pertaining to the stimulus;
- visual cues signifying aspects of a set of audiovisual responses;
- visual cues signifying a relationship between a particular set of respondent response data and a particular set of audiovisual responses; and
- combinations thereof.

P11. A computer user interface according to Potential Claim P7, wherein a stimulus is an assemblage of a set of stimuli selected by the respondent earlier in a survey.

P12. A computer user interface according to Potential Claim P7, wherein the computer processes further comprise:

accessing by the server system a centralized datastore that records respondent response data and audiovisual responses.

P13. A computer user interface according to Potential Claim P12, wherein the computer processes further comprise:

using a process selected from the group consisting of machine learning, artificial intelligence algorithms, or combinations thereof to encode a set of audiovisual responses into a set of structured data fields that indicate aspects of the set of audiovisual responses.

P14. A computer user interface according to Potential Claim P12, wherein the computer processes further comprise:

aggregating by the server system data from a centralized datastore that contains data selected from the group consisting of respondent response data, encoded structured data, and combinations thereof derived from audiovisual responses; and applying by the server system a process selected from the group consisting of numerical algorithms, statistical processes, and combinations thereof to aggregated data from a set of respondents to create derived metrics pertaining to a set selected from the group consisting of a set of respondents, a set of stimuli, a set of associated stimulus items, and combination thereof.

P15. A computer user interface according to Potential Claim P7, wherein the computer processes further comprise:

determining by the server system a set of derived metrics that are derived from a set of surveys using a process selected from the group consisting of numerical algorithms, statistical processes, and combinations thereof; and characterizing by the server system the set of derived metrics to create a framework selected from the group consisting of an interpretive framework, a predictive framework, and combinations thereof.

P16. A computer user interface for obtaining respondent price sensitivity response data for a pricing question, the computer user interface produced on a mobile computing device, operated by the respondent, in communication with a server system and executing code establishing computer processes comprising:

causing by the server system presentation on a display of the mobile computing device to the respondent a set of stimuli with associated prices, wherein the prices begin at a certain value and incrementally change over time according to an algorithm, in a context of an instruction directing the respondent to select a set of stimuli when a price associated with each stimulus matches a particular objective; and in consequence of having received on the display of the mobile computing device a responding set of gestures indicating the selection of a set of stimuli at associated prices, receiving, by the server system from the mobile computing device, data corresponding to the responding set of gestures as response data pertinent to the stimuli and associated prices, and associated with the respondent.

P17. A computer user interface according to Potential Claim P16, wherein the algorithm that governs speed of incremental price changes incorporates a set of inputs selected from the group consisting of number of price changes that have occurred, amount of time that has passed, proximity to an initial starting price, proximity to an ending target price, number of stimuli not been selected, and combinations thereof.

P18. A computer user interface according to Potential Claim P16, wherein the computer processes further comprise:

pausing incremental changing of prices associated with the stimuli by receiving on the display of the mobile computing device a responding set of gestures; and selecting a set of stimuli while the changing of prices is paused or to resuming the incremental changing of prices without selecting a set of stimuli.

P19. A computer user interface according to Potential Claim P16, wherein the computer processes further comprise:

causing by the server system on the display of the computing device freezing of the associated price of each selected stimulus on the screen at a value that is present when the stimulus is selected; and configuring the display of the mobile computing device to operate in a manner causing the incremental price changes for stimuli that are not selected prior to their associated prices reaching a designated level to stop.

P20. A computer user interface according to Potential Claim P16, wherein the computer processes further comprise:

causing by server system presentation on the mobile computing device to the respondent a new instruction directing the respondent to select a set of stimuli when the price associated with each stimulus matches a new particular objective pertaining to an associated stimulus item that differs from the prior particular objective, wherein the associated price for each stimulus that was selected according to the prior directed objective beginning at the value at which it was frozen and incrementally changing over time according to an algorithm, in a context of the new instruction; and repeating a process similar to a process enacted in response to a prior instruction, and similarly receiving a responding set of gestures and storing data corresponding to this set of gestures.

P21. A computer user interface according to Potential Claim P16, the computer process further comprise:

accessing by the server system a centralized datastore that records respondent price sensitivity response data.

P22. A computer user interface according to Potential Claim P16, the computer processes further comprise:

aggregating by the server system data from the centralized datastore that contains respondent price sensitivity response data; and applying by the server system a process selected from the group consisting of numerical algorithms, statistical processes, and combinations thereof to aggregated data from a set of respondents to create derived metrics pertaining to one of a set selected from the group consisting of a set of respondents, a set of stimuli, a set of associated stimulus items, a set of associated prices, and combination thereof.

P23. A computer user interface according to Potential Claim P16, the computer processes further comprise:

determining by the server system a set of metrics that are derived from a set of surveys using a process selected from the group consisting of numerical algorithms, statistical processes, and combinations thereof; and characterizing by the server system the set of derived metrics to create a framework selected from the group consisting of an interpretive framework, a predictive framework, and combinations thereof.

P24. A computer user interface for obtaining respondent response data for a grid question, the computer user interface produced on a mobile computing device, operated by the respondent, in communication with a server system and executing code establishing computer processes comprising:

causing by the server system presentation on a display of the mobile computing device to the respondent a screen displaying instructions, the instructions corresponding to a first response item in the grid question; and causing by the server system presentation on a display of the mobile computing device to the respondent a next screen displaying a set of stimuli corresponding to child questions in the grid; and in consequence of having received on the display of the mobile computing device a responding set of gestures indicating the set of stimuli that correspond to the given instructions on the prior screen, receiving, by the server system from the mobile computing device, data corresponding to the responding set of gestures as response data pertinent to the given response item and the set of selected stimuli, and associated with the respondent; and causing by the server system presentation on a display of the mobile computing device to the respondent a next screen displaying instructions, the instructions corresponding to a second response item in the grid; and causing by the server system presentation on a display of the mobile computing device to the respondent a next screen displaying a set of stimuli in the same position as previously displayed, of which stimuli that were selected on any prior screen are disabled and are partially or fully obscured; and in consequence of having received on the display of the mobile computing device a responding set of gestures indicating the set of stimuli that correspond to the given instructions on the prior screen, receiving, by the server system from the mobile computing device, data corresponding to the responding set of gestures as response data pertinent to the given response item and the set of selected stimuli, and associated with the respondent.

P25. A computer user interface according to Potential Claim P24, wherein the computer processes further comprise:

causing by the server system presentation on a display of the mobile computing device to the respondent a screen displaying instructions corresponding to a response item, such that the instructions appears as an overlay on top of a screen with stimuli, and the stimuli are partially obscured.

P26. A computer user interface according to Potential Claim P24, wherein the instructions corresponding to the grid question response items and the stimuli corresponding to the grid question child questions are displayed on the same screen, and in which the instructions change to a next set of instructions when a respondent indicates that selection of stimuli in accordance with the current set of instructions is complete.

P27. A computer user interface according to Potential Claim P24, wherein the computer processes further comprise:

causing by the server system presentation on a display of the mobile computing device to the respondent more than two pairs of instruction and response screens, wherein each instruction screen displays instructions pertaining to a distinct response item in a grid question, and each response screen displays a set of stimuli corresponding to the child questions in the grid question, and each response screen after the first displays the same set of stimuli in the same position as they were displayed on the first response screen, and in which stimuli that were selected on any prior screen are disabled and are partially or fully obscured; and in consequence of having received on the display of the mobile computing device in a response screen a responding set of gestures indicating the set of stimuli that correspond to the given instructions on the prior screen, receiving, by the server system from the mobile computing device, data corresponding to the responding set of gestures as response data pertinent to the given response item and the set of selected stimuli, and associated with the respondent.

P28. A computer user interface according to Potential Claim P24, wherein the computer processes further comprise:

causing a gamified reaction by the mobile computing device.

P29. A computer user interface according to Potential Claim P24, wherein the computer processes further comprise configuring by the server system presentation of stimuli and response items in a manner selected from the group consisting of:

causing a set of instruction screens and stimulus displays screens to be presented sequentially, in which the determination of which pairs of instruction screens and response screens are presented depends on respondent response data captured earlier in a survey; and causing a set of instruction screens and stimulus displays screens to be presented sequentially, in which the determination of the order of pairs of instruction screens and response screens depends on respondent response data captured earlier in a survey; and combinations thereof.

P30. A computer user interface according to Potential Claim P24, wherein the computer processes further comprise causing, by the server system, advancing from one screen to the next based on criteria selected from the group consisting of passage of a certain amount of time, selection of a certain number of stimuli, activation by the respondent of a control indicating readiness to proceed to the next stimulus-focused screen, and combinations thereof.

P31. A computer user interface according to Potential Claim P24, the computer processes further comprise:
  accessing by the server system a centralized datastore to record respondent response data.

P32. A fast and intuitive computer user interface for obtaining respondent response data for a rank question with a large number of response items, the computer user interface produced on a mobile computing device, operated by the respondent, in communication with a server system and executing code establishing computer processes comprising:
  causing by the server system presentation on a display of the mobile computing device to the respondent a screen displaying of a set of stimuli representing response items for a rank question in a grid consisting of at least two rows and at least two columns; and
  in consequence of having received on the display of the mobile computing device a responding initial set of rapid intuitive gestures indicating a set of stimuli that should receive initial rankings without explicitly indicating an exact rank for each stimulus, causing by the server system on the display of the mobile computing device a set of gamified reactions that move the indicated stimuli into ranked positions on the screen such that a first indicated stimulus receives the top rank and subsequent indicated stimuli receive a rank just below the current lowest ranked stimulus; and
  in consequence of having received on the display of the mobile computing device a subsequent set of gestures, causing by the server system on the display of the mobile computing device a set of gamified reactions consisting of: moving an indicated stimulus from an unranked position to a ranked position, moving an indicated stimulus from a ranked position to another ranked position, moving an indicated stimulus from a ranked position to an unranked position, and combinations thereof; and
  in consequence of causing on the display of the mobile computing device a change in the ranked position of a stimulus, causing an animation wherein the positions of other stimuli are altered in order to cognitively reinforce the new rankings of all of the stimuli; and
  in consequence of having received on the display of the mobile computing device a responding set of gestures indicating the ranking of stimuli, receiving, by the server system from the mobile computing device, data corresponding to the responding set of gestures as response data pertinent to the set of displayed stimuli, and associated with the respondent.

P33. A computer user interface according to Potential Claim P32, wherein the computer processes further comprise:
  causing by the server system presentation on a display of the mobile computing device to the respondent an instruction screen in which the stimuli for the rank question are partially obscured and disabled, such that the display focuses respondent attention on the instructions while providing context; and
  removing the instructions and obscurement of the stimuli, such that the interface maximizes the area of a mobile computing device screen that can be used for the ranking activity while minimizing distraction;
  and enabling the stimuli to be responsive to respondent gestures.

P34. A computer user interface according to Potential Claim P32, wherein the computer processes further comprise:
  causing instructions that are removed to continue to be accessible on a ranking screen by interacting with an object on the screen that causes the instructions to reappear in a larger and more readable format.

P35. A computer user interface according to Potential Claim P32, wherein the computer processes further comprise:
  causing a gamified reaction by the mobile computing device.

P36. A computer user interface according to Potential Claim P32, wherein the computer processes further comprise causing, by the server system, a set of limitations on respondent behavior from a group consisting of a limitation on the time spent on the ranking activity, a maximum on the number of ranked items, a minimum on the number of ranked items, a limit on the number of times that ranked items can be re-ranked, a limitation on the number of times that ranked items can be un-ranked, and any combination of these; and
  causing by the server system presentation on a display of the mobile computing device to the respondent a set of gamified interactions that communication and reinforce the set of limitations on respondent behavior.

P37. A computer user interface according to Potential Claim P32, the computer processes further comprise:
  accessing by the server system a centralized datastore to record respondent response data.

P38. A computer user interface for obtaining respondent response data for a rating scale question, the computer user interface produced on a mobile computing device, operated by the respondent, in communication with a server system and executing code establishing computer processes comprising:
  causing by the server system presentation on a display of the mobile computing device to the respondent a question that may include graphically rich stimuli, in a context of an instruction asking the respondent to respond by engaging in a set of gestures;
  in consequence of having received on the display of the mobile computing device a responding time based intuitive gesture, causing a gamified reaction that indicates an incremental change in a rating scale; and
  in consequence of the continuation of the gesture, causing the continuation of the gamified reaction to indicate a further change in the rating scale in proportion to the amount of time spent engaged in the time based intuitive gesture; and
  receiving, by the server system from the mobile computing device, data corresponding to the responding set of gestures as response data pertinent to the rating scale question and associated with the respondent.

P39. A computer user interface according to Potential Claim P38, wherein the computer processes further comprise:
  in response to additional time based intuitive gestures, causing a gamified reaction that indicates a further incremental change in the rating scale; and
  in consequence of the continuation of the gesture, causing the continuation of the gamified reaction to indicate a further change in the rating scale in proportion to the amount of time spent engaged in the time based intuitive gesture.

P40. A computer user interface according to Potential Claim P38, the computer processes further comprise:
  accessing by the server system a centralized datastore to record the respondent response data.

P41. A computer user interface according to Potential Claim P38, wherein the computer processes further comprise:
  aggregating by the server system data from the centralized datastore that contains respondent response data; and
  applying by the server system a process selected from the group consisting of: numerical algorithms, statistical processes, and combinations thereof to aggregated data for a set of respondents to create derived metrics pertaining to a set selected from the group consisting of a set of respondents, a set of stimuli, a set of associated stimulus items, and combinations thereof.

P42. A computer user interface according to Potential Claim P38, the computer processes further comprise:
  determining by the server system a set of metrics that are derived from a set of surveys using a process selected from the group consisting of numerical algorithms, statistical processes, and combinations thereof; and
  characterizing by the server system the set of derived metrics to create a framework selected from the group consisting of an interpretive framework, a predictive framework, and combinations thereof.

P43. A computer user interface and associated server system for gathering respondent response data and a set of associated audiovisual responses to a question, the computer user interface produced on a mobile computing device, operated by the respondent, in communication with a server system and executing code establishing computer processes comprising:
  causing by the server system presentation on a display of the mobile computing device to a respondent an initial question that is prominently displayed and a follow-up question that is less prominently displayed; and
  in consequence of having received on the display of the mobile computing device a first responding gesture, initiating an audiovisual media stream recording by means of the mobile computing device; and
  continuing the audiovisual media stream recording until and after a second responding gesture is received on the display of the mobile computing device; and
  in consequence of having received on the display of the mobile computing device the second responding gesture, causing the initial question to cease to be displayed, the second question to become prominently displayed; and
  recording the time stamp of the second responding gesture as respondent response data; and
  continuing the audiovisual media stream recording until a third responding gesture is received on the display of the mobile computing device; and
  receiving, by the server system from the mobile computing device, time stamp data corresponding to the responding set of gestures; and
  receiving, by a server system from the mobile computing device, data corresponding to the audiovisual media stream and associated with the response data and the respondent; and
  using the time stamp data corresponding to the responding set of gestures to separate the content in the audiovisual media stream in accordance with the questions that were asked on the mobile computing device.

P44. A computer user interface and associated server system according to Potential Claim P43, wherein the computer processes further comprise:
  in consequence of having received on the display of the mobile computing device an additional responding gesture, causing a current prominently displayed question to cease to be displayed, causing an additional question that is currently displayed but not prominently displayed to to become prominently displayed, and causing an additional question to become displayed but not prominently displayed; and'; and
  continuing the audiovisual media stream recording; and
  recording the time stamp of the responding gesture as respondent response data; and
  receiving, by the server system from the mobile computing device, time stamp data corresponding to the responding set of gestures; and
  receiving, by a server system from the mobile computing device, data corresponding to the audiovisual media stream and associated with the response data and the respondent; and
  using the time stamp data corresponding to the responding set of gestures to separate the content in the audiovisual media stream in accordance with the questions that were asked on the mobile computing device.

P45. A computer user interface and associated server system according to Potential Claim P43, wherein the computer processes further comprise:
  displaying a prominent instruction and a less prominent initial question on the screen of the mobile computing device prior to beginning the recording of the audiovisual media stream; and
  in consequence of having received on the display of the mobile computing device a first responding gesture, causing the instructions to cease to be displayed, causing the initial question to be prominently displayed, and causing a second question to be displayed less prominently than the initial question; and
  initiating an audiovisual media stream recording by means of the mobile computing device.

P46. A computer user interface according to Potential Claim P43, wherein the computer processes further comprise:
  accessing by the server system a centralized datastore that records respondent response data and audiovisual responses.

P47. A computer user interface according to Potential Claim P43, wherein the computer processes further comprise:
  For each of a set of two or more audiovisual responses that are derived from splitting the single media stream using the time stamps associated with the responding gestures, using a process selected from the group consisting of machine learning, artificial intelligence algorithms, or combinations thereof to encode into a set of structured data fields that indicate aspects of the set of audiovisual responses.

P48. A computer user interface according to Potential Claim P43, wherein the computer processes further comprise:
  providing the respondent control of the recording mechanism in the mobile computing device to influence a set of audiovisual responses associated with a set of stimuli, wherein the control of the recording mechanism is selected from the group consisting of starting recording, pausing recording, resuming recording, stopping recording, deleting a recording, deleting a portion of a recording, reviewing a recording, reviewing a portion of the recording, submitting a recording, submitting a portion of a recording, and combinations thereof.

P49. A computer user interface according to Potential Claim P43, wherein the computer processes further comprise:
  causing presentation on a display of the mobile computing device to a respondent visual cues selected from the group consisting of:
    visual cues signifying response data provided by the respondent pertaining to the question;
    visual cues signifying aspects of a set of audiovisual responses;
    visual cues signifying a relationship between a particular set of respondent response data and a particular set of audiovisual responses; and
    combinations thereof.

P50. A computer user interface for gathering respondent response data and a set of associated audiovisual responses to a question displaying an audiovisual media stimulus, the computer user interface produced on a mobile computing device, operated by the respondent, in communication with a server system and executing code establishing computer processes comprising:
  causing by the server system presentation on a display of the mobile computing device to a respondent an audiovisual media stimulus in the context of instructions to indicate a set of temporal regions of the stimulus according to a set of objectives by a responding set of gestures;
  in consequence of having received on the display of the mobile computing device the responding set of gestures indicating a set of temporal regions of the stimulus, receiving from the respondent a set of audiovisual responses associated with the indicated set of temporal regions using a recording mechanism in the mobile computing device;
  receiving, by the server system from the mobile computing device, data corresponding to the responding set of gestures as respondent response data pertinent to the stimulus and associated with the respondent; and
  receiving, by a server system from the mobile computing device, data corresponding to the set of audiovisual responses as respondent response data pertinent to the stimulus and associated with the respondent response data and the respondent.

P51. A computer user interface according to Potential Claim P50, wherein the computer processes further comprise:
  providing the respondent directions relating to a set of gestures, wherein each set of gestures is associated with a different objective;
  receiving on the display of the mobile computing device a responding set of gestures indicating a set of temporal regions of the stimulus pertaining to an associated objective;
  receiving from the respondent a set of audiovisual responses associated with the indicated set of temporal regions and pertaining to the associated objective using a recording mechanism in the mobile computing device;
  storing data corresponding to the responding set of gestures as response data pertinent to the stimulus, pertaining to the associated objective, and associated with the respondent; and
  storing the set of audiovisual responses pertinent to the stimulus, pertaining to the associated objective, and associated with the respondent.

P52. A computer user interface according to Potential Claim P50, wherein the computer processes further comprise:
  providing the respondent control of the recording mechanism in the mobile computing device to influence a set of audiovisual responses associated with a set of stimuli, wherein the control of the recording mechanism is selected from the group consisting of starting recording, pausing recording, resuming recording, stopping recording, deleting a recording, deleting a portion of a recording, reviewing a recording, reviewing a portion of the recording, submitting a recording, submitting a portion of a recording, and combinations thereof.

P53. A computer user interface according to Potential Claim P50, wherein the computer processes further comprise:
  causing presentation on a display of the mobile computing device to a respondent visual cues selected from the group consisting of:
    visual cues signifying response data provided by the respondent pertaining to the stimulus;
    visual cues signifying aspects of a set of audiovisual responses;
    visual cues signifying a relationship between a particular set of respondent response data and a particular set of audiovisual responses; and
    combinations thereof.

P54. A computer user interface according to Potential Claim P50, wherein the computer processes further comprise:
  accessing by the server system a centralized datastore that records respondent response data and audiovisual responses.

P55. A computer user interface according to Potential Claim P54, wherein the computer processes further comprise:
  using a process selected from the group consisting of machine learning, artificial intelligence algorithms, or combinations thereof to encode a set of audiovisual responses into a set of structured data fields that indicate aspects of the set of audiovisual responses.

P56. A computer user interface according to Potential Claim P54, wherein the computer processes further comprise:
  aggregating by the server system data from a centralized datastore that contains data selected from the group consisting of respondent response data, encoded structured data, and combinations thereof derived from audiovisual responses; and
  applying by the server system a process selected from the group consisting of numerical algorithms, statistical processes, and combinations thereof to aggregated data from a set of respondents to create derived metrics pertaining to a set selected from the group consisting of a set of respondents, a set of stimuli, a set of associated temporal regions, and combination thereof.

P57. A computer user interface according to Potential Claim P54, wherein the computer processes further comprise:
  determining by the server system a set of derived metrics that are derived from a set of surveys using a process selected from the group consisting of numerical algorithms, statistical processes, and combinations thereof; and
  characterizing by the server system the set of derived metrics to create a framework selected from the group consisting of an interpretive framework, a predictive framework, and combinations thereof.

What is claimed is:

1. A computer user interface method for obtaining respondent response data for scale questions in a market research survey, the computer user interface produced on a mobile computing device, operated by the respondent, in communication with a server system executing code establishing computer processes comprising:

causing, by the server system, on a display of the mobile computing device, presentation to the respondent, in a single screen, of a stimulus in a grid question with a plurality of child questions related to the stimulus in a context of an instruction to respond to each child question in the screen with a first set of effortful intuitive gestures to indicate a magnitude and a directionality of a set of objectives, wherein the magnitude corresponds to a number of gestures in the first set of effortful intuitive gestures and the directionality of a given one of the gestures corresponds to a physical direction of the given gesture on the single screen;

receiving, by the server system from the mobile computing device, display-evinced market research gestural response data corresponding to the set of gestures made on the single screen by the respondent in response to each child question, the display-evinced gestural response data being to the stimulus and associated with the respondent and for each such child question a number of gestures in the display-evinced gestural response data corresponding to a magnitude of the response and the physical direction of the given gesture corresponding to the directionality thereof; and causing, by the server system, the display-evinced gestural response data to be stored as the respondent's response to the stimulus.

2. A computer user interface method according to claim 1, wherein the computer processes further comprise:

causing display of a representation of the response data on the display of the mobile computing device.

3. A computer user interface method according to claim 1, wherein the computer processes further comprise:

causing a gamified reaction by the mobile computing device.

4. A computer user interface method according to claim 1, wherein the computer processes further comprise:

causing stimuli to be presented sequentially on the same screen or a set of related screens according to an algorithmically determined sequence that takes into account respondent response data captured earlier.

5. A computer user interface method according to claim 1, wherein the computer processes further comprise configuring, by the server system, the display of the mobile computing device to receive a respondent input selected from the group consisting of:

an effortful intuitive gesture made directly upon a stimulus that is presented on a screen;

an effortful intuitive gesture made via a set of user computer user interface controls that are presented onscreen that pertain to the stimulus; and combinations thereof.

6. A computer user interface method according to claim 1, wherein the computer processes further comprise:

receiving on the display of the mobile computing device a responding set of gestures in which an individual gesture pertains to more than one objective, such that a direction of a swipe can be selected from the group consisting of vertically, horizontally, and combinations thereof, and wherein a vertical dimension pertains to a first objective and a horizontal dimension pertains to a second objective.

7. A computer user interface method according to claim 1, wherein the computer processes further comprise:

accessing by the server system a centralized datastore to record the respondent response data.

8. A computer user interface method according to claim 1, wherein the computer processes further comprise:

aggregating by the server system data from the centralized datastore that contains respondent response data; and applying by the server system a process selected from the group consisting of: numerical algorithms, statistical processes, and combinations thereof to aggregated data for a set of respondents to create derived metrics pertaining to a set selected from the group consisting of a set of respondents, a set of stimuli, a set of associated stimulus items, and combinations thereof.

9. A computer user interface method according to claim 1, wherein the computer processes further comprise:

determining by the server system a set of metrics that are derived from a set of surveys using a process selected from the group consisting of numerical algorithms, statistical processes, and combinations thereof; and characterizing by the server system the set of derived metrics to create a framework selected from the group consisting of an interpretive framework, a predictive framework, and combinations thereof.

10. A computer user interface method for obtaining respondent market research response data to a grid question, the computer user interface produced on a mobile computing device, operated by the respondent, in communication with a server system executing code establishing computer processes comprising:

causing, by the server system, presentation on a display of the mobile computing device, of a set of stimuli on a set of screens in a determined sequence, each stimulus representing a child question of the grid question, in a context of an instruction asking the respondent to select a set of rich media response items according to a specified objective that pertains to each stimulus, wherein the set of stimuli and set of rich media response items cannot be visually displayed in a grid on a single screen without impairing integrity of the stimuli;

receiving, by the server system from the mobile computing device, market research response data corresponding to gestures made by the respondent on the display of the mobile computing device in response to the instruction seeking selection of the set of rich media response items, the response data being pertinent to the given stimulus and the set of selected rich media response items, and associated with the respondent; and causing, by the server system, the response data to be stored as the respondent's response to the set of stimuli.

11. A computer user interface method according to claim 10, wherein the computer processes further comprise:

in consequence of having received on the display of the mobile computing device a responding second set of gestures indicating additional respondent response data associated with a second set of rich media response items that is selected for a given stimulus, receiving, by the server system from the mobile computing device, data corresponding to the responding second set of gestures as response data pertinent to the given stimulus and the second set of selected rich media response items, and associated with the respondent.

12. A computer user interface method according to claim 10, wherein the computer processes further comprise:

causing display of a representation of the response data on the display of the mobile computing device.

13. A computer user interface method according to claim 10, wherein the computer processes further comprise:
   causing a gamified reaction by the mobile computing device.

14. A computer user interface method according to claim 10, wherein the computer processes further comprise configuring by the server system presentation of stimuli in a manner selected from the group consisting of:
   causing a set of stimuli to be presented sequentially, wherein members of the set of stimuli include respondent response data captured earlier in a survey;
   causing a set of stimuli to be presented sequentially, wherein a sequence in which the stimuli is presented depends on respondent response data captured earlier in a survey;
and combinations thereof.

15. A computer user interface method according to claim 10, wherein the computer processes further comprise causing, by the server system, advancing from one stimulus-focused screen to a next stimulus-focused screen based on criteria selected from the group consisting of passage of a certain amount of time, selection of a certain number of rich media response items, activation by the respondent of a control indicating readiness to proceed to the next stimulus-focused screen, and combinations thereof.

16. A computer user interface method according to claim 10, wherein the computer processes further comprise:
   accessing by the server system a centralized datastore to record respondent response data.

17. A computer user interface method according to claim 16, wherein the computer processes further comprise:
   aggregating by the server system data from the centralized datastore that contains respondent response data; and
   applying by the server system a process selected from the group consisting of numerical algorithms, statistical processes, and combinations thereof to the aggregated data for a set of respondents to create derived metrics pertaining to a set selected from the group consisting of a set of respondents, a set of stimuli, a set of associated stimulus items, and combinations thereof.

18. A computer user interface method according to claim 10, wherein the computer processes further comprise:
   determining by the computer system a set of metrics that are derived from a set of surveys using a process selected from the group consisting of numerical algorithms, statistical processes, and combinations thereof; and
   characterizing the set of derived metrics to create a framework selected from the group consisting of an interpretive framework, a predictive framework, and combinations thereof.

* * * * *